(12) United States Patent
Watanabe et al.

(10) Patent No.: US 8,662,755 B2
(45) Date of Patent: Mar. 4, 2014

(54) ROLLER BEARING DEVICE HAVING RADIAL-PLANE ARRANGEMENT STRUCTURE OF ROTATION SENSOR

(75) Inventors: Hayao Watanabe, Fujisawa (JP); Masaki Kuwahara, Fujisawa (JP); Kazuhiro Yoshida, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/616,979

(22) Filed: Sep. 14, 2012

(65) Prior Publication Data

US 2013/0011087 A1    Jan. 10, 2013

Related U.S. Application Data

(62) Division of application No. 12/741,129, filed as application No. PCT/JP2008/065956 on Sep. 4, 2008.

(30) Foreign Application Priority Data

| Nov. 6, 2007 | (JP) | 2007-288888 |
| Nov. 7, 2007 | (JP) | 2007-289851 |
| Nov. 7, 2007 | (JP) | 2007-289852 |
| Nov. 9, 2007 | (JP) | 2007-292046 |
| Nov. 9, 2007 | (JP) | 2007-292184 |
| Feb. 8, 2008 | (JP) | 2008-029222 |

(51) Int. Cl.
*F16C 32/00* (2006.01)
*H02K 5/16* (2006.01)
*G01B 7/30* (2006.01)

(52) U.S. Cl.
USPC ............ 384/448; 310/90; 324/207.25

(58) Field of Classification Search
USPC ......... 384/456, 548, 559, 564, 584, 585, 448, 384/609; 324/173, 174, 207.2, 207.21, 324/207.16, 207.25; 310/90
See application file for complete search history.

(56) References Cited

U.S. PATENT DOCUMENTS

2006/0140521 A1    6/2006   Uenosono et al.

FOREIGN PATENT DOCUMENTS

| JP | 62-85657 A | 4/1987 |
| JP | 64-53618 U | 4/1989 |
| JP | 1-146775 | * 10/1989 |
| JP | 1-146775 U | 10/1989 |
| JP | 6-9362 U | * 2/1994 |
| JP | 8-205453 A | 8/1996 |
| JP | 2001-234927 A | 8/2001 |

(Continued)

OTHER PUBLICATIONS

Japanese Office Action with mechanical English translation dated Feb. 26, 2013 (five (5) pages).
International Search Report dated Dec. 2, 2008 (Five (5) pages).

(Continued)

*Primary Examiner* — Alan B Waits
(74) *Attorney, Agent, or Firm* — Crowell & Moring LLP

(57) ABSTRACT

Provided is a roller bearing device, which is suitable for preventing misdetection of a rotation sensor when a moment load is applied. A thin motor 100 includes a cross roller bearing 14 having an inner ring 14a and an outer ring 14b, a stator 22 supported by the inner ring 14a, a rotor 12 supported by the outer ring 14b, a motor unit 16 that applies rotation torque to the rotor 12, and a resolver 30 that detects a rotation angle position of the rotor 12. The resolver 30, the cross roller bearing 14, and the motor unit 16 are arranged in the recited order from the radially inner side on a radially identical plane.

11 Claims, 72 Drawing Sheets

(56) References Cited

FOREIGN PATENT DOCUMENTS

| | | | |
|---|---|---|---|
| JP | 2002-281720 A | | 9/2002 |
| JP | 2003-299299 A | | 10/2003 |
| JP | 2004-176857 A | | 6/2004 |
| JP | 2003-299299 | * | 3/2005 |
| JP | 2005-69252 A | | 3/2005 |
| JP | 2005-76730 A | | 3/2005 |
| JP | 2005-148055 A | | 6/2005 |
| JP | 2006-25525 A | | 1/2006 |
| JP | 2006-46380 A | | 2/2006 |
| JP | 2006-90511 A | | 4/2006 |
| JP | 2006-90831 A | | 4/2006 |
| JP | 2006-183787 A | | 7/2006 |
| JP | 2006-211806 A | | 8/2006 |
| JP | 2006-250864 A | | 9/2006 |
| JP | 2006-288159 | * | 10/2006 |
| JP | 2006-288159 A | | 10/2006 |

OTHER PUBLICATIONS

Form PCT/ISA/237 (Seven (7) pages). Form PCT/IB/338 (One (1) page); Form PCT/IB/373 (One (1) page); and Form PCT/ISA/237 (Nine (9) pages) (totaling Eleven (11) pages).

Japanese Office Action dated Jun. 14, 2011 with English translation (Nine (9) pages).

Japanese Office Action dated Jun. 14, 2011 with English translation (Eleven (11) pages).

Japanese Office Action dated Jul. 12, 2011 with English translation (Eleven (11) pages).

Japanese Official Decision on Refusal dated Sep. 13, 2011 including English-language translation (Five (5) pages).

Japanese Office Action dated Jul. 31, 2012 including English-language translation (Seven (7) sheets).

Japanese Decision of Rejection with English translation thereof dated Jun. 25, 2013 {Four (4) Pages}.

\* cited by examiner

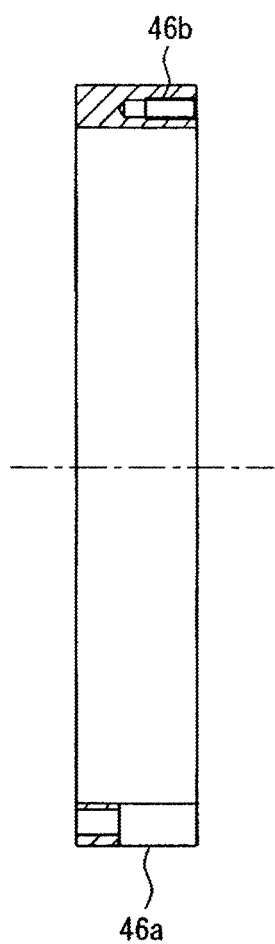
F I G. 4

F I G. 9
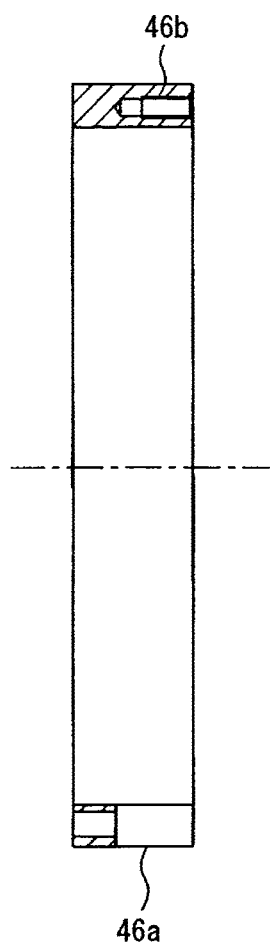

F I G. 1 2
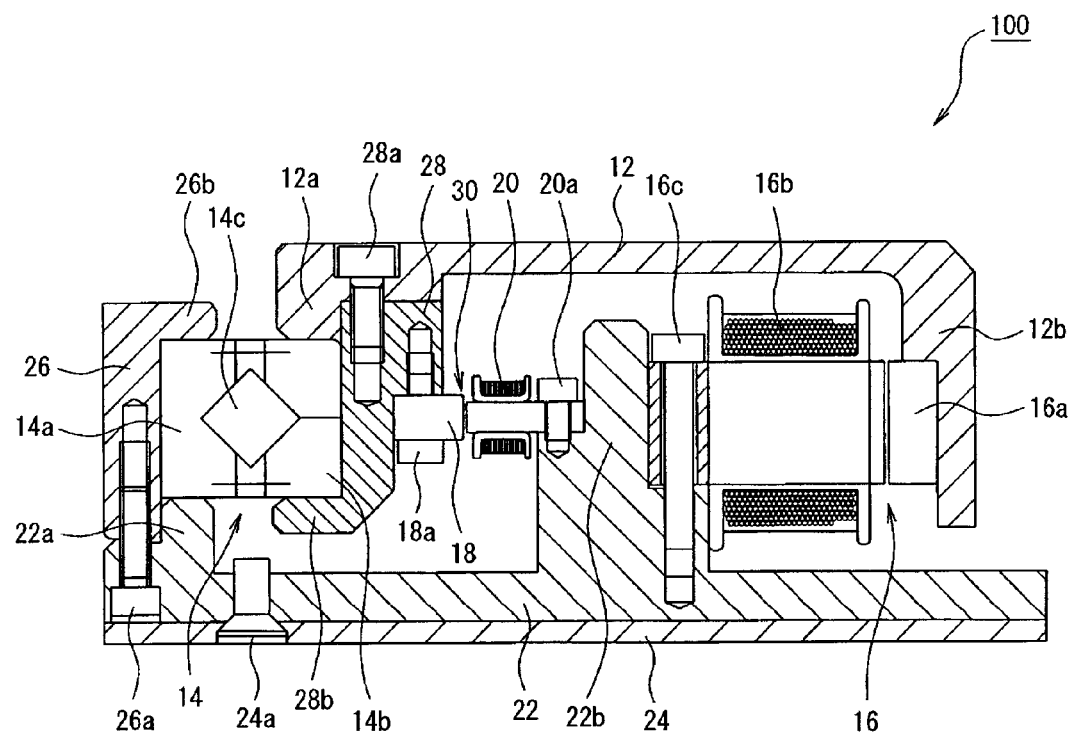

F I G. 4 1
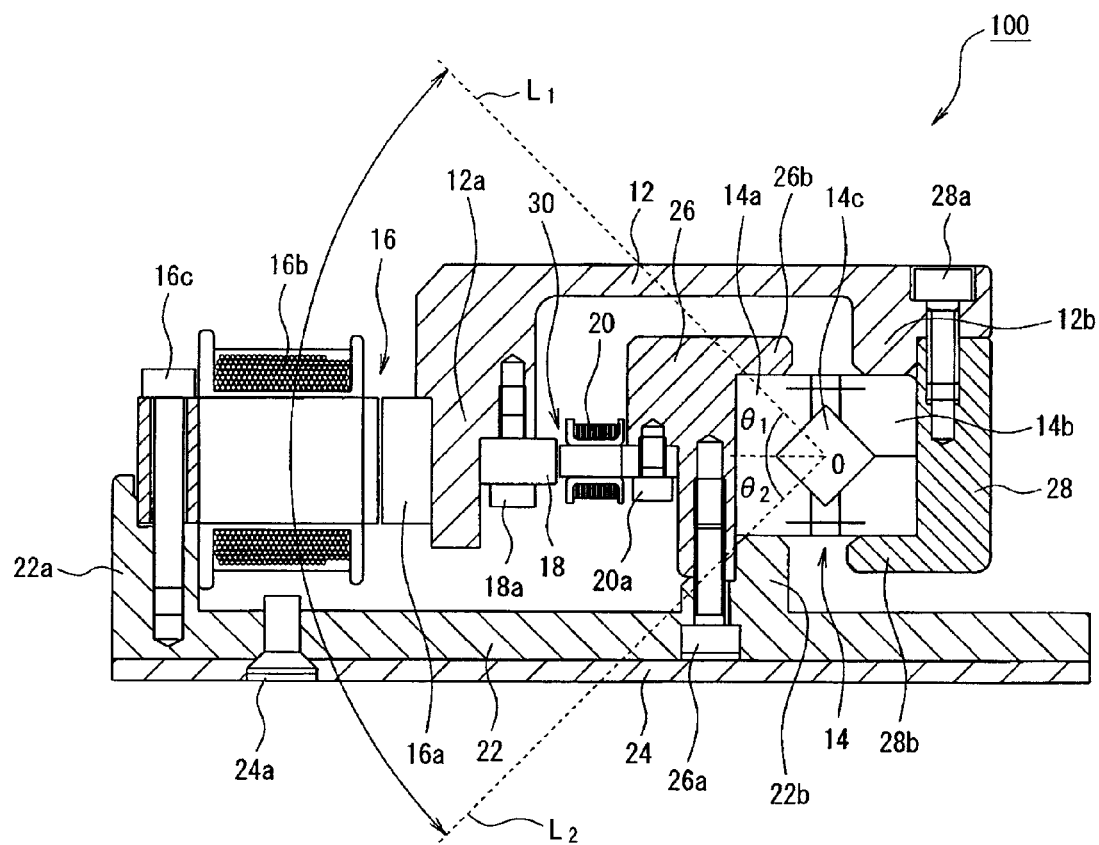

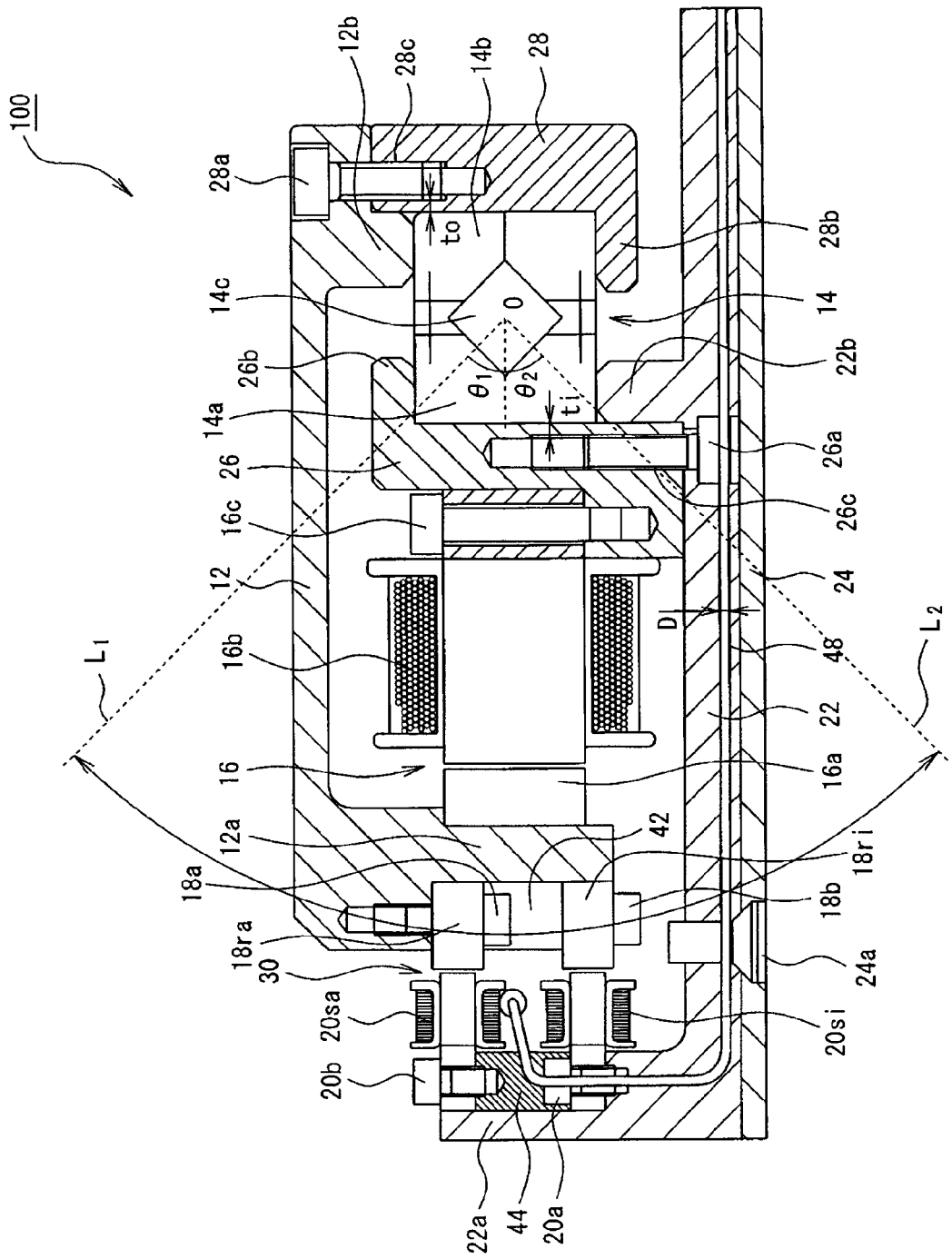

F I G. 4 8
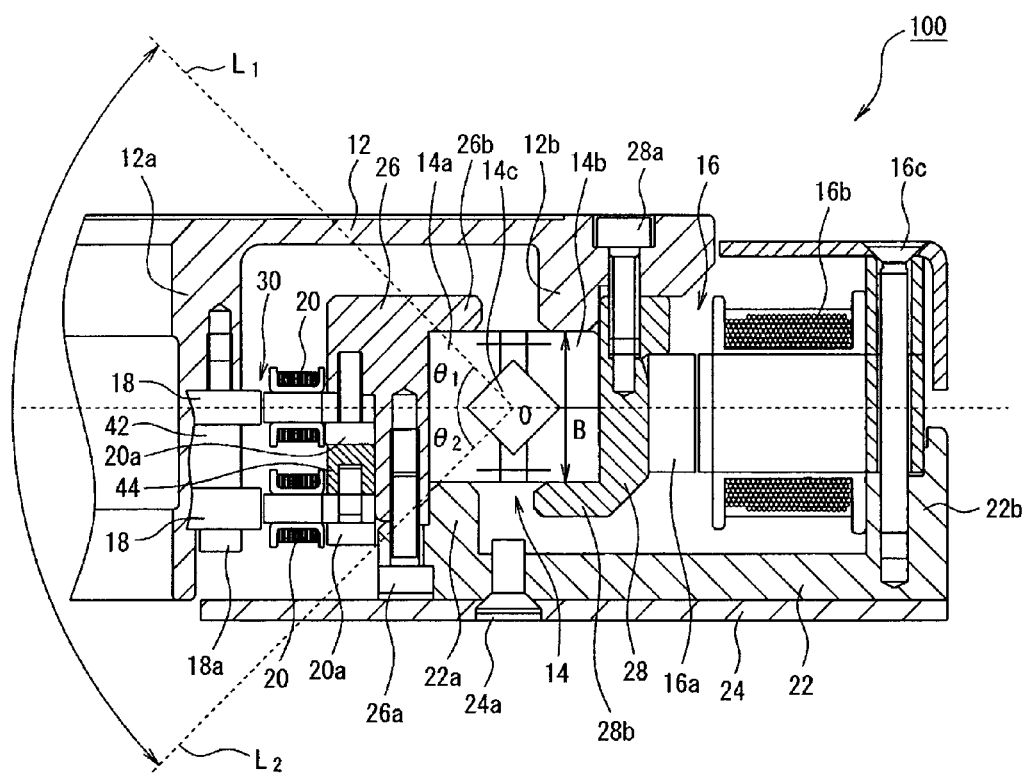

F I G. 5 1
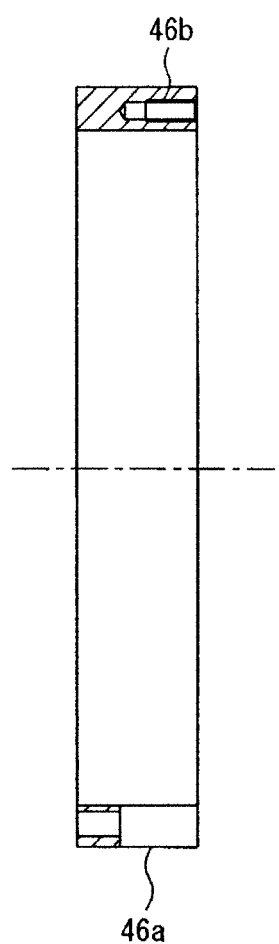

F I G. 6 5
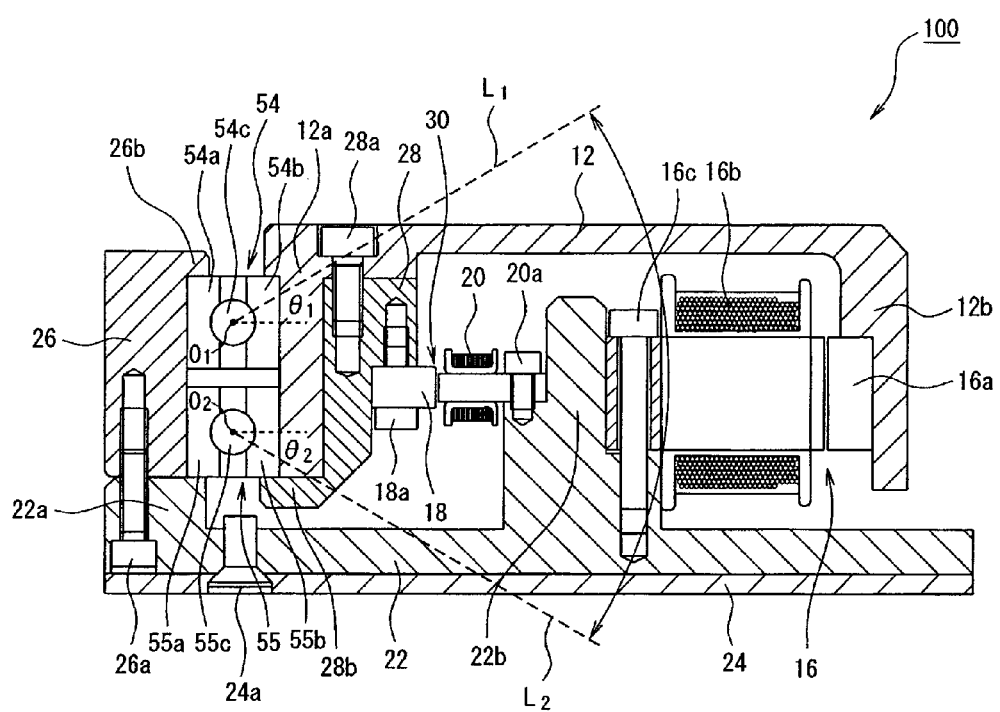

F I G. 6 6
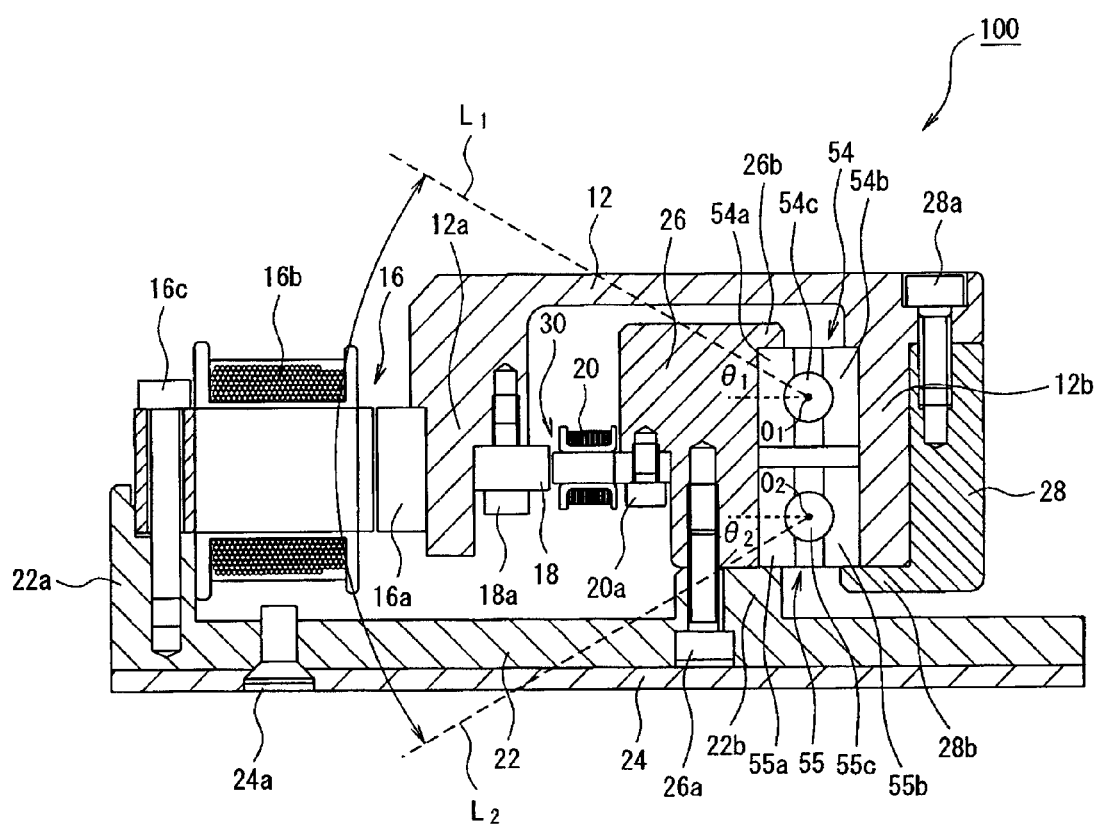

ROLLER BEARING DEVICE HAVING RADIAL-PLANE ARRANGEMENT STRUCTURE OF ROTATION SENSOR

CROSS-REFERENCE TO RELATED APPLICATIONS

This application is a division of application Ser. No. 12/741,129, filed May 3, 2010, which is a national stage of PCT/JP2008/065956, filed Sep. 4, 2008, which claims priority under 35 U.S.C. §119 to Japanese Patent Application Nos. JP 2007-288888, filed Nov. 6, 2007; JP 2007-289851, filed Nov. 7, 2007; JP 2007-289852, filed Nov. 7, 2007; JP 2007-292046, filed Nov. 9, 2007; JP 2007-292184, filed Nov. 9, 2007; and JP 2007-292222, filed Nov. 8, 2008.

TECHNICAL FIELD

The present invention relates to a roller bearing device including a roller bearing and a rotation sensor, and, more particularly to a roller bearing device suitable for preventing misdetection of a rotation sensor when moment load is applied thereto.

BACKGROUND ART

Conventionally, as a thin motor, there is known a thin motor including a roller bearing and a rotation sensor.

FIG. 72 is a sectional view in the axial direction of a conventional thin motor 200.

The thin motor 200 includes, as shown in FIG. 72, a housing inner 220 as a stator, a rotor 12 as a rotor, and a cross roller bearing 14 that is interposed between the rotor 12 and the housing inner 220 and rotatably supports the rotor 12.

The cross roller bearing 14 includes an inner ring 14a and an outer ring 14b. The inner ring 14a fits in the outside edge of the housing inner 220 and is fixed to the housing inner 220 in a state in which the inner ring 14a is pressed in the axial direction by an inner ring clamp 26. The outer ring 14b fits in the inside edge of the rotor 12 and is fixed to the rotor 12 in a state in which the outer ring 14b is pressed in the axial direction by an outer ring clamp 28.

A motor unit 16 that applies rotation torque to the rotor 12 and a resolver 30 as a rotation sensor that detects a rotation angle position of the rotor 12 are provided between the rotor 12 and the housing inner 220.

The resolver 30 includes an annular resolver rotor 18 having an inner circumference decentered with respect to the shaft center of the cross roller bearing 14 and a position detector 20 that is arranged to be opposed to the resolver rotor 18 at a predetermined interval and detects a reluctance change between the resolver rotor 18 and the position detector 20. The resolver rotor 18 is integrally attached to the inside edge of the rotor 12. The position detector 20 is integrally attached to the outside edge of the housing inner 220. The resolver rotor 18 is decentered to change the distance between the resolver rotor 18 and the position detector 20 in the circumferential direction, whereby the reluctance changes according to the position of the resolver rotor 18. Therefore, since a fundamental wave component of the reluctance change is one period per one rotation of the rotor 12, the resolver 30 outputs a resolver signal that changes according to the rotation angle position of the rotor 12.

As a conventional roller bearing device, for example, bearing devices described in Patent Documents 1 to 3 are known. The bearing device described in Patent Document 1 is a bearing device in which preload in the axial direction is applied to fix the inner ring 14a and the outer ring 14b. The bearing device described in Patent Document 2 is a bearing device in which a point of action of a bearing is set on the outside of an output shaft. The bearing device described in Patent Document 3 is a bearing device in which a motor is arranged on the outer circumference of a bearing.

Patent Document 1: JP 2005-69252 A
Patent Document 2: JP 2006-25525 A
Patent Document 3: JP 2002-281720 A However, in the conventional thin motor 200, when the moment load is applied to the thin motor 200, the thin motor 200 tilts around the cross roller bearing 14 and a gap of the resolver 30 changes. Therefore, there is a problem in that the rotation angle position of the rotor 12 cannot be accurately detected. In particular, since the thin motor 200 tilts around the cross roller bearing 14, the gap change is larger as the resolver 30 is further away from the cross roller bearing 14. Since the thin motor 200 is a thin motor, one cross roller bearing 14 has to receive the moment load. It is difficult to increase rigidity and prevent the gap change by increasing the number of cross roller bearings 14.

Therefore, the present invention has been devised in view of such unsolved problems of the conventional techniques and it is an object of the present invention to provide a roller bearing device suitable for preventing misdetection of a rotation sensor when moment load is applied thereto.

DISCLOSURE OF THE INVENTION

[Invention 1]

In order to attain the object, a roller bearing device having a radial-plane arrangement structure of a rotation sensor according to an invention 1 is a roller bearing device including: a roller bearing having an inner ring and an outer ring; an inner-ring supported member supported by the inner ring; an outer-ring supported member supported by the outer ring; and a rotation sensor that is arranged between the inner-ring supported member and the outer-ring supported member and outputs a sensor signal that changes according to relative positions thereof, wherein the rotation sensor and the roller bearing are arranged on a radially identical plane.

With such a configuration, the inner-ring supported member and the outer-ring supported member are relatively rotatably supported by the roller bearing.

When moment load is applied to the roller bearing device, the roller bearing device tilts around the roller bearing. However, since the rotation sensor is arranged on a plane radially identical with the roller bearing, it is possible to reduce a gap change of the rotation sensor.

Since the rotation sensor and the roller bearing are arranged on a radially identical plane, it is possible to reduce the height (the length in the axial direction) of the roller bearing device.

Further, when a method of, for example, increasing the preload of the roller bearing is adopted, whereas the gap change can be suppressed, a deficiency in that the life of the roller bearing is shortened is involved. However, in the present invention, since the gap change is reduced by arranging the rotation sensor in a position where the gap change is small, it is possible to realize extension of the life of the roller bearing.

Consequently, even if the moment load is applied to the roller bearing device, since the rotation sensor is arranged in the position where the gap change is small, compared with the past, there can be obtained an effect that it is possible to reduce the gap change of the rotation sensor and reduce the likelihood that the rotation sensor makes misdetection. Since the rotation sensor and the roller bearing are arranged on a radially identical plane, there can also be obtained an effect that it is possible to reduce the height of the roller bearing device. Further, there can also be obtained an effect that it is possible to realize extension of the life of the roller bearing compared with the method of, for example, increasing the preload of the roller bearing.

The inner-ring supported member and the outer-ring supported member only have to be relatively rotatably supported by the roller bearing. The inner-ring supported member may be fixed and the outer-ring supported member may be rotatably supported, the outer-ring supported member may be fixed and the inner-ring supported member may be rotatably supported, or both the supported members may be rotatably supported. The same holds true for a roller bearing device having a radial-plane arrangement structure of a rotation sensor according to an invention 2.

For example, a resolver in which reluctance between the inner-ring supported member and the outer-ring supported member changes according to relative positions thereof or a tape scale that detects a mark formed in a circumferential direction corresponds to the rotation sensor. The same holds true for the roller bearing device having a radial-plane arrangement structure of a rotation sensor according to the invention 2.

[Invention 2]

A roller bearing device having a radial-plane arrangement structure of a rotation sensor according to an invention 2 is a roller bearing device including: a roller bearing having an inner ring and an outer ring; an inner-ring supported member supported by the inner ring; an outer-ring supported member supported by the outer ring; a driver that relatively rotates the inner-ring supported member and the outer-ring supported member; and a rotation sensor that is arranged between the inner-ring supported member and the outer-ring supported member and outputs a sensor signal that changes according to relative positions thereof, wherein the rotation sensor, the roller bearing, and the driver are arranged in the recited order from the radially inner side on a radially identical plane.

With such a configuration, the inner-ring supported member and the outer-ring supported member are relatively rotatably supported by the roller bearing.

When moment load is applied to the roller bearing device, the roller bearing device tilts around the roller bearing. However, since the rotation sensor is arranged on a plane radially identical with the roller bearing, it is possible to reduce a gap change of the rotation sensor.

Since the rotation sensor, the roller bearing, and the driver are arranged on a radially identical plane, it is possible to reduce the height (the length in the axial direction) of the roller bearing device.

Further, since the rotation sensor is arranged on the opposite side of the driver across the roller bearing, the rotation sensor is less easily affected by noise and heat from the driver.

Further, when a method of, for example, increasing the preload of the roller bearing is adopted, whereas the gap change can be suppressed, a deficiency in that the life of the roller bearing is shortened is involved. However, in the present invention, since the gap change is reduced by arranging the rotation sensor in a position where the gap change is small, it is possible to realize extension of the life of the roller bearing.

Consequently, even if the moment load is applied to the roller bearing device, since the rotation sensor is arranged in the position where the gap change is small, compared with the past, there can be obtained an effect that it is possible to reduce the gap change of the rotation sensor and reduce the likelihood that the rotation sensor makes misdetection. Since the rotation sensor and the roller bearing are arranged on a radially identical plane, there can also be obtained an effect that it is possible to reduce the height of the roller bearing device. Since the rotation sensor is arranged on the opposite side of the driver across the roller bearing, there can also be obtained an effect that the rotation sensor is less easily affected by noise and heat from the driver and high detection accuracy can be realized. Further, there can also be obtained an effect that it is possible to realize extension of the life of the roller bearing compared with the method of, for example, increasing the preload of the roller bearing.

An actuator such as a motor or an engine corresponds to the driver.

[Invention 3]

A roller bearing device having a radial-plane arrangement structure of a rotation sensor according to an invention 3 is the roller bearing device having a radial-plane arrangement structure of a rotation sensor according to the invention 2, wherein the inner-ring supported member and the outer-ring supported member respectively have inner wall members and outer wall members formed on the inside and the outside in the radial direction, the inner wall member of the inner-ring supported member and the outer wall member of the outer-ring supported member are arranged to extend over each other such that the inner wall member of the inner-ring supported member is located between the inner wall member and the outer wall member of the outer-ring supported member and the outer wall member of the outer-ring supported member is located between the inner wall member and the outer wall member of the inner-ring supported member, a detected member of the rotation sensor is fixed to one of the inner wall member of the outer-ring supported member and the inner wall member of the inner-ring supported member and detecting means of the rotation sensor is fixed to the other, the inner ring is fixed to the inner wall member of the inner-ring supported member and the outer ring is fixed to the outer wall member of the outer ring supported member, and a rotor of the driver is fixed to one of the outer wall member of the outer-ring supported member and the outer wall member of the inner-ring supported member and a stator of the driver is fixed to the other.

With such a configuration, when the rotor of the driver is fixed to the outer wall member of the outer-ring supported member, the outer-ring supported member and the outer ring rotate and, when the rotor of the driver is fixed to the outer wall member of the inner-ring supported member, the inner-ring supported member and the inner ring rotate. When the outer-ring supported member and the outer ring and the inner-ring supported member and the inner ring rotate, the detected member of the rotation sensor fixed to one of the inner wall member of the outer-ring supported member and the inner wall member of the inner-ring supported member is detected by the detecting means of the rotation sensor fixed to the other, whereby a sensor signal that changes according to relative positions of the inner-ring supported member and the outer-ring supported member is output from the rotation sensor.

The inner wall member or the outer wall member of the inner-ring supported member may be configured integrally with the inner-ring supported member or may be configured separately from the inner-ring supported member. When the inner wall member or the outer wall member of the inner-ring supported member is configured separately from the inner-ring supported member, a member such as an inner ring clamp may configure the inner wall member of the inner-ring supported member.

The inner wall member or the outer wall member of the outer-ring supported member may be configured integrally with the outer-ring supported member or may be configured separately from the outer-ring supported member. When the inner wall member or the outer wall member of the outer-ring supported member is configured separately from the outer-ring supported member, a member such as an outer ring clamp may configure the outer wall member of the outer-ring supported member.

The fixing to the inner wall member or the outer wall member (in this paragraph, hereinafter abbreviated as "wall member") includes a stationary state in which the detected member, the detecting means, the inner ring, the outer ring, the rotor, or the stator is not directly fixed to the wall member but is arranged near or in contact with the wall member and fixed to a member to which the wall member is fixed or a member integral with the wall member to thereby being substantially integral with the wall member.

[Invention 4]

A roller bearing device having a radial-plane arrangement structure of a rotation sensor according to an invention 4 is the roller bearing device having a radial-plane arrangement structure of a rotation sensor according to any one of the inventions 1 to 3, wherein the roller bearing is a cross roller bearing or a four-point contact ball bearing.

With such a configuration, it is possible to simultaneously receive moment load, axial load, and radial load.

Consequently, since it is possible to simultaneously receive the moment load, the axial load, and the radial load, there can be obtained an effect that it is possible to reduce a gap change due to the moment load while maintaining rigidity against the axial load and the radial load.

[Invention 5]

A roller bearing device having a radial-plane arrangement structure of a rotation sensor according to an invention 5 is the roller bearing device having a radial-plane arrangement structure of a rotation sensor according to any one of the inventions 1 to 4, wherein the rotation sensor includes: an annular detected member, one of an inner circumference and an outer circumference of which is decentered with respect to the shaft center of the roller bearing; and detecting means for detecting a reluctance change between the detecting means and the detected member, and the detected member is provided in one of the inner-ring supported member and the outer-ring supported member and the detecting means is provided in the other such that a decentered side of the inner circumference and the outer circumference of the detected member is opposed to the detecting means.

With such a configuration, when the inner-ring supported member and the outer-ring supported member relatively rotate, the detecting means and the detected member also relatively rotate according to the rotation. Since the side opposed to the detecting means of the inner circumference and the outer circumference of the detected member is decentered, a reluctance change is caused by the rotation and the reluctance change is detected by the detecting means.

In this way, in the rotation sensor of a type in which a fundamental wave component of a reluctance change is one period per one rotation, since the influence of a gap change due to moment load is large, a reduction in the gap change is effective for prevention of misdetection.

Concerning the detected member and the detecting means, the detected member may be provided in the inner-ring supported member and the detecting means may be provided in the outer-ring supported member. The detected member and the detecting means may be provided in the opposite arrangement. In the former case, the outer circumference of the detected member is decentered and the detected member and the detecting means are provided with the outer circumference of the detected member opposed to the detecting means. In the latter case, the inner circumference of the detected member is decentered and the detected member and the detecting means are provided with the inner circumference of the detected member opposed to the detecting means.

[Invention 6]

A roller bearing device having a radial-plane arrangement structure of a rotation sensor according to an invention 6 is the roller bearing device having a radial-plane arrangement structure of a rotation sensor according to any one of the inventions 1 to 5, wherein the rotation sensor includes: a first resolver having a first resolver rotor; and a second resolver having a second resolver rotor, and the first resolver rotor and the second resolver rotor are arranged at a very small interval via an inter-rotor seat and attached to each other by two fixing means.

With such a configuration, the first resolver rotor and the second resolver rotor are independently fixed by the two fixing means.

Consequently, since the first resolver rotor and the second resolver rotor can be independently fixed, there can be obtained an effect that it is possible to adjust each of the positions in the axial direction of the first resolver rotor and the second resolver rotor.

[Invention 7]

A roller bearing device having a radial-plane arrangement structure of a rotation sensor according to an invention 7 is the roller bearing device having a radial-plane arrangement structure of a rotation sensor according to any one of the inventions 1 to 6, wherein a wiring tube that pierces through from a radially inner side to a radially outer side of the inner-ring supported member and houses wires of the rotation sensor is formed in the inner-ring supported member, and height D of the wiring tube is set to a value obtained by $D=2d+\alpha$ when the diameter of one wire of the rotation sensor is represented as d and a predetermined margin is represented as $\alpha$ ($0<\alpha<d$).

With such a configuration, the height of the wiring tube is reduced. Height required for plural wires to cross once is allowed.

Consequently, since the height of the wiring tube is reduced, there can be obtained an effect that it is possible to reduce the height of the roller bearing device. Since the height required for plural wires to cross once is allowed, there can also be obtained an effect that it is possible to reduce the likelihood that workability for housing the wires of the rotation sensor in the wiring tube falls.

[Invention 8]

A roller bearing device having a radial-plane arrangement structure of a rotation sensor according to an invention 8 is the roller bearing device having a radial-plane arrangement structure of a rotation sensor according to any one of the inventions 1 to 7, further including an inner ring clamp that fixes the inner ring to the inner-ring supported member in the axial direction, wherein a bolt hole through which a bolt for fixing the inner ring clamp is inserted is formed in the inner ring clamp in the axial direction, and thickness ti between an outside edge of the inner ring clamp and an inner wall surface of the bolt hole is set to a value in a range of $pi<ti<2pi$ when length for one pitch of the bolt hole is represented as pi.

With such a configuration, when the bolt is screwed into the bolt hole of the inner ring clamp, the outside edge of the inner ring clamp is pushed out to the inner ring side to lock the inner ring. Therefore, it is possible to fix the inner ring without a gap.

Consequently, since the inner ring can be fixed without a gap, there can be obtained an effect that it is possible to improve detection accuracy.

[Invention 9]

A roller bearing device having a radial-plane arrangement structure of a rotation sensor according to an invention 9 is the roller bearing device having a radial-plane arrangement structure of a rotation sensor according to any one of the inventions 1 to 8, further including an outer ring clamp that fixes the outer ring to the outer-ring supported member in the axial direction, wherein a bolt hole through which a bolt for fixing the outer ring clamp is inserted is formed in the outer ring clamp in the axial direction, and thickness to between an inside edge of the outer ring clamp and an inner wall surface of the bolt hole is set to a value in a range of po<to<2po when length for one pitch of the bolt hole is represented as po.

With such a configuration, when the bolt is screwed into the bolt hole of the outer ring clamp, the inside edge of the outer ring clamp is pushed out to the outer ring side to lock the outer ring. Therefore, it is possible to fix the outer ring without a gap.

Consequently, since the outer ring can be fixed without a gap, there can be obtained an effect that it is possible to improve detection accuracy.

[Invention 10]

A roller bearing device having a radial-plane arrangement structure of a rotation sensor according to an invention 10 is the roller bearing device having a radial-plane arrangement structure of a rotation sensor according to any one of the inventions 1 to 7 and 9, further including an inner ring clamp that fixes the inner ring to the inner-ring supported member in the axial direction, wherein the rotation sensor, the inner ring clamp, and the roller bearing are arranged in the recited order from the radially inner side on a radially identical plane, and height H of a pressing section of the inner ring clamp is set to a value obtained by H=½B when the height of the roller bearing is represented as B.

With such a configuration, since it is possible to prevent the inner ring clamp from tilting to the rotation sensor side, a gap of the rotation sensor less easily changes.

Consequently, since it is possible to reduce the likelihood that the gap of the rotation sensor changes, there can be obtained an effect that it is possible to reduce the likelihood that the rotation sensor makes misdetection.

[Invention 11]

On the other hand, in order to attain the object, a roller bearing device having a radial-plane arrangement structure of a complex resolver according to an invention 11 is a roller bearing device including: a roller bearing having an inner ring and an outer ring; an inner-ring supported member supported by the inner ring; an outer-ring supported member supported by the outer ring; and a rotation sensor that is arranged between the inner-ring supported member and the outer-ring supported member and outputs a sensor signal that changes according to relative positions thereof, wherein the rotation sensor and the roller bearing are arranged on a radially identical plane, the rotation sensor includes: a first resolver that outputs the sensor signal in which a fundamental wave component of a reluctance change that changes in synchronization with the rotation of the inner-ring supported member or the outer-ring supported member is a first period; and a second resolver that outputs the sensor signal in which the fundamental wave component of the reluctance change is a second period different from the first period, and the roller bearing device further includes: an oscillator that outputs an excitation signal; and switching means for switching a supply path for the excitation signal supplied from the oscillator to the first resolver and the second resolver such that the excitation signal is supplied to a resolver alternatively selected from the first resolver and the second resolver.

With such a configuration, the inner-ring supported member and the outer-ring supported member are relatively rotatably supported by the roller bearing.

When moment load is applied to the roller bearing device, the roller bearing device tilts around the roller bearing. However, since the rotation sensor is arranged on a plane radially identical with the roller bearing, it is possible to reduce a gap change of the rotation sensor.

Since the rotation sensor and the roller bearing are arranged on a radially identical plane, it is possible to reduce the height (the length in the axial direction) of the roller bearing device.

Further, when a method of, for example, increasing the preload of the roller bearing is adopted, whereas the gap change can be suppressed, a deficiency in that the life of the roller bearing is shortened is involved. However, in the present invention, since the gap change is reduced by arranging the rotation sensor in a position where the gap change is small, it is possible to realize extension of the life of the roller bearing.

On the other hand, when the supply path is switched by the switching means such that the excitation signal is supplied to the first resolver, reluctance changes in synchronization with the rotation of the inner-ring supported member or the outer-ring supported member and the sensor signal in which a fundamental wave component of the reluctance change is the first period is output from the first resolver. When the supply path is switched by the switching means such that the excitation signal is supplied to the second resolver, reluctance changes in synchronization with the rotation of the inner-ring supported member or the outer-ring supported member and the sensor signal in which a fundamental wave component of the reluctance change is the second period is output from the second resolver. Therefore, since the first resolver and the second resolver are not at least simultaneously excited, a leakage flux of one of the first resolver and the second resolver does not magnetically interfere with the other.

Consequently, even if the moment load is applied to the roller bearing device, since the rotation sensor is arranged in the position where the gap change is small, compared with the past, there can be obtained an effect that it is possible to reduce the gap change of the rotation sensor and reduce the likelihood that the rotation sensor makes misdetection. Since the rotation sensor and the roller bearing are arranged on a radially identical plane, there can also be obtained an effect that it is possible to reduce the height of the roller bearing device. Further, there can also be obtained an effect that it is possible to realize extension of the life of the roller bearing compared with the method of, for example, increasing the preload of the roller bearing. Further, since the leakage flux of one of the first resolver and the second resolver does not magnetically interfere with the other, it is possible to arrange the first resolver and the second resolver near to each other. Therefore, there can also be obtained an effect that it is possible to further reduce the height of the roller bearing device.

The inner-ring supported member and the outer-ring supported member only have to be relatively rotatably supported by the roller bearing. The inner-ring supported member may be fixed and the outer-ring supported member may be rotatably supported, the outer-ring supported member may be fixed and the inner-ring supported member may be rotatably supported, or both the supported members may be rotatably supported. The same holds true for a roller bearing device having a radial-plane arrangement structure of a complex resolver according to an invention 12.

[Invention 12]

A roller bearing device having a radial-plane arrangement structure of a complex resolver according to an invention 12 is a roller bearing device including: a roller bearing having an inner ring and an outer ring; an inner-ring supported member supported by the inner ring; an outer-ring supported member supported by the outer ring; a driver that relatively rotates the inner-ring supported member and the outer-ring supported member; and a rotation sensor that is arranged between the inner-ring supported member and the outer-ring supported member and outputs a sensor signal that changes according to relative positions thereof, wherein the rotation sensor, the roller bearing, and the driver are arranged in the recited order from the radially inner side on a radially identical plane, the rotation sensor includes: a first resolver that outputs the sensor signal in which a fundamental wave component of a reluctance change that changes in synchronization with the rotation of the inner-ring supported member or the outer-ring supported member is a first period; and a second resolver that outputs the sensor signal in which the fundamental wave component of the reluctance change is a second period different from the first period, and the roller bearing device further includes: an oscillator that outputs an excitation signal; and switching means for switching a supply path for the excitation signal supplied from the oscillator to the first resolver and the second resolver such that the excitation signal is supplied to a resolver alternatively selected from the first resolver and the second resolver.

With such a configuration, the inner-ring supported member and the outer-ring supported member are relatively rotatably supported by the roller bearing.

When moment load is applied to the roller bearing device, the roller bearing device tilts around the roller bearing. However, since the rotation sensor is arranged on a plane radially identical with the roller bearing, it is possible to reduce a gap change of the rotation sensor.

Since the rotation sensor, the roller bearing, and the driver are arranged on a radially identical plane, it is possible to reduce the height (the length in the axial direction) of the roller bearing device.

Further, since the rotation sensor is arranged on the opposite side of the driver across the roller bearing, the rotation sensor is less easily affected by noise and heat from the driver.

Further, when a method of, for example, increasing the preload of the roller bearing is adopted, whereas the gap change can be suppressed, a deficiency in that the life of the roller bearing is shortened is involved. However, in the present invention, since the gap change is reduced by arranging the rotation sensor in a position where the gap change is small, it is possible to realize extension of the life of the roller bearing.

On the other hand, when the supply path is switched by the switching means such that the excitation signal is supplied to the first resolver, reluctance changes in synchronization with the rotation of the inner-ring supported member or the outer-ring supported member and the sensor signal in which a fundamental wave component of the reluctance change is the first period is output from the first resolver. When the supply path is switched by the switching means such that the excitation signal is supplied to the second resolver, reluctance changes in synchronization with the rotation of the inner-ring supported member or the outer-ring supported member and the sensor signal in which a fundamental wave component of the reluctance change is the second period is output from the second resolver. Therefore, since the first resolver and the second resolver are not at least simultaneously excited, a leakage flux of one of the first resolver and the second resolver does not magnetically interfere with the other.

Consequently, even if the moment load is applied to the roller bearing device, since the rotation sensor is arranged in the position where the gap change is small, compared with the past, there can be obtained an effect that it is possible to reduce the gap change of the rotation sensor and reduce the likelihood that the rotation sensor makes misdetection. Since the rotation sensor, the roller bearing, and the driver are arranged on a radially identical plane, there can also be obtained an effect that it is possible to reduce the height of the roller bearing device. Since the rotation sensor is arranged on the opposite side of the driver across the roller bearing, the rotation sensor is less easily affected by noise and heat from the driver. Therefore, there can be obtained an effect that it is possible to realize high detection accuracy. Further, there can also be obtained an effect that it is possible to realize extension of the life of the roller bearing compared with the method of, for example, increasing the preload of the roller bearing. Further, since the leakage flux of one of the first resolver and the second resolver does not magnetically interfere with the other, it is possible to arrange the first resolver and the second resolver near to each other. Therefore, there can also be obtained an effect that it is possible to further reduce the height of the roller bearing device.

An actuator such as a motor or an engine corresponds to the driver.

[Invention 13]

A roller bearing device having a radial-plane arrangement structure of a complex resolver according to an invention 13 is the roller bearing device having a radial-plane arrangement structure of a complex resolver according to the invention 12, wherein the inner-ring supported member and the outer-ring supported member respectively have inner wall members and outer wall members formed on the inside and the outside in the radial direction, the inner wall member of the inner-ring supported member and the outer wall member of the outer-ring supported member are arranged to extend over each other such that the inner wall member of the inner-ring supported member is located between the inner wall member and the outer wall member of the outer-ring supported member and the outer wall member of the outer-ring supported member is located between the inner wall member and the outer wall member of the inner-ring supported member, a detected member of the rotation sensor is fixed to one of the inner wall member of the outer-ring supported member and the inner wall member of the inner-ring supported member and detecting means of the rotation sensor is fixed to the other, the inner ring is fixed to the inner wall member of the inner-ring supported member and the outer ring is fixed to the outer wall member of the outer ring supported member, and a rotor of the driver is fixed to one of the outer wall member of the outer-ring supported member and the outer wall member of the inner-ring supported member and a stator of the driver is fixed to the other.

With such a configuration, when the rotor of the driver is fixed to the outer wall member of the outer-ring supported member, the outer-ring supported member and the outer ring rotate and, when the rotor of the driver is fixed to the outer wall member of the inner-ring supported member, the inner-ring supported member and the inner ring rotate. When the outer-ring supported member and the outer ring and the inner-ring supported member and the inner ring rotate, the detected member of the rotation sensor fixed to one of the inner wall member of the outer-ring supported member and the inner wall member of the inner-ring supported member is detected by the detecting means of the rotation sensor fixed to the other, whereby a sensor signal that changes according to relative positions of the inner-ring supported member and the outer-ring supported member is output from the rotation sensor.

The inner wall member or the outer wall member of the inner-ring supported member may be configured integrally with the inner-ring supported member or may be configured separately from the inner-ring supported member. When the inner wall member or the outer wall member of the inner-ring supported member is configured separately from the inner-ring supported member, a member such as an inner ring clamp may configure the inner wall member of the inner-ring supported member.

The inner wall member or the outer wall member of the outer-ring supported member may be configured integrally with the outer-ring supported member or may be configured separately from the outer-ring supported member. When the inner wall member or the outer wall member of the outer-ring supported member is configured separately from the outer-ring supported member, a member such as an outer ring clamp may configure the outer wall member of the outer-ring supported member.

The fixing to the inner wall member or the outer wall member (in this paragraph, hereinafter abbreviated as "wall member") includes a stationary state in which the detected member, the detecting means, the inner ring, the outer ring, the rotor, or the stator is not directly fixed to the wall member but is arranged near or in contact with the wall member and fixed to a member to which the wall member is fixed or a member integral with the wall member to thereby being substantially integral with the wall member.

[Invention 14]

A roller bearing device having a radial-plane arrangement structure of a complex resolver according to an invention 14 is the roller bearing device having a radial-plane arrangement structure of a complex resolver according to any one of the inventions 11 to 13, wherein the roller bearing is a cross roller bearing or a four-point contact ball bearing.

With such a configuration, it is possible to simultaneously receive moment load, axial load, and radial load.

Consequently, since it is possible to simultaneously receive the moment load, the axial load, and the radial load, there can be obtained an effect that it is possible to reduce a gap change due to the moment load while maintaining rigidity against the axial load and the radial load.

[Invention 15]

A roller bearing device having a radial-plane arrangement structure of a complex resolver according to an invention 15 is the roller bearing device having a radial-plane arrangement structure of a complex resolver according to any one of the inventions 11 to 14, wherein the first resolver is a single-pole resolver that has a first resolver stator and a first resolver rotor, reluctance between which changes according to the position of the first resolver rotor, and outputs a sensor signal in which a fundamental wave component of the reluctance change is one period per one rotation of the first resolver rotor, and the second resolver is a multi-pole resolver that has a second resolver stator and a second resolver rotor, reluctance between which changes according to the position of the second resolver rotor, and outputs a sensor signal in which a fundamental wave component of the reluctance change is a multi-period per one rotation of the second resolver rotor.

With such a configuration, when the supply path is switched by the switching means such that the excitation signal is supplied to the first resolver, the first resolver rotor rotates in synchronization with the rotation of the inner-ring supported member or the outer-ring supported member and the reluctance between the first resolver rotor and the first resolver stator changes according to the rotation. The sensor signal in which the fundamental component of the reluctance change is one period per one rotation of the first resolver rotor is output from the first resolver.

In the single-pole resolver, since the influence of a gap change due to moment load is particularly large, a reduction in the gap change is effective for prevention of misdetection.

When the supply path is switched by the switching means such that the excitation signal is supplied to the second resolver, the second resolver rotor rotates in synchronization with the rotation of the inner-ring supported member or the outer-ring supported member and the reluctance between the second resolver rotor and the second resolver stator changes according to the rotation. The sensor signal in which the fundamental component of the reluctance change is a multi-period per one rotation of the second resolver rotor is output from the second resolver.

[Invention 16]

A roller bearing device having a radial-plane arrangement structure of a complex resolver according to an invention 16 is the roller bearing device having a radial-plane arrangement structure of a complex resolver according to any one of the inventions 11 to 14, wherein the first resolver has a first resolver rotor, the second resolver has a second resolver rotor, and the first resolver rotor and the second resolver rotor are arranged at a very small interval via an inter-rotor seat and attached to each other by two fixing means.

With such a configuration, the first resolver rotor and the second resolver rotor are independently fixed by the two fixing means.

Consequently, since the first resolver rotor and the second resolver rotor can be independently fixed, there can be obtained an effect that it is possible to adjust each of the positions in the axial direction of the first resolver rotor and the second resolver rotor.

[Invention 17]

A roller bearing device having a radial-plane arrangement structure of a complex resolver according to an invention 17 is the roller bearing device having a radial-plane arrangement structure of a complex resolver according to any one of the inventions 11 to 16, wherein a wiring tube that pierces through from a radially inner side to a radially outer side of the inner-ring supported member and houses wires of the rotation sensor is formed in the inner-ring supported member, and height D of the wiring tube is set to a value obtained by $D=2d+\alpha$ when the diameter of one wire of the rotation sensor is represented as d and a predetermined margin is represented as $\alpha$ ($0<\alpha<d$).

With such a configuration, the height of the wiring tube is reduced. Height required for plural wires to cross once is allowed.

Consequently, since the height of the wiring tube is reduced, there can be obtained an effect that it is possible to reduce the height of the roller bearing device. Since the height required for plural wires to cross once is allowed, there can also be obtained an effect that it is possible to reduce the likelihood that workability for housing the wires of the rotation sensor in the wiring tube falls.

[Invention 18]

A roller bearing device having a radial-plane arrangement structure of a complex resolver according to an invention 18 is the roller bearing device having a radial-plane arrangement structure of a rotation sensor according to any one of the inventions 11 to 17, further including an inner ring clamp that fixes the inner ring to the inner-ring supported member in the axial direction, wherein a bolt hole through which a bolt for fixing the inner ring clamp is inserted is formed in the inner ring clamp in the axial direction, and thickness ti between an outside edge of the inner ring clamp and an inner wall surface of the bolt hole is set to a value in a range of pi<ti<2pi when length for one pitch of the bolt hole is represented as pi.

With such a configuration, when the bolt is screwed into the bolt hole of the inner ring clamp, the outside edge of the inner ring clamp is pushed out to the inner ring side to lock the inner ring. Therefore, it is possible to fix the inner ring without a gap.

Consequently, since the inner ring can be fixed without a gap, there can be obtained an effect that it is possible to improve detection accuracy.

[Invention 19]

A roller bearing device having a radial-plane arrangement structure of a complex resolver according to an invention 19 is the roller bearing device having a radial-plane arrangement structure of a complex resolver according to any one of the inventions 11 to 18, further including an outer ring clamp that fixes the outer ring to the outer-ring supported member in the axial direction, wherein a bolt hole through which a bolt for fixing the outer ring clamp is inserted is formed in the outer ring clamp in the axial direction, and thickness to between an inside edge of the outer ring clamp and an inner wall surface of the bolt hole is set to a value in a range of po<to<2po when length for one pitch of the bolt hole is represented as po.

With such a configuration, when the bolt is screwed into the bolt hole of the outer ring clamp, the inside edge of the outer ring clamp is pushed out to the outer ring side to lock the outer ring. Therefore, it is possible to fix the outer ring without a gap.

Consequently, since the outer ring can be fixed without a gap, there can be obtained an effect that it is possible to improve detection accuracy.

[Invention 20]

A roller bearing device having a radial-plane arrangement structure of a complex resolver according to an invention 20 is the roller bearing device having a radial-plane arrangement structure of a complex resolver according to any one of the inventions 11 to 17 and 19, further including an inner ring clamp that fixes the inner ring to the inner-ring supported member in the axial direction, wherein the rotation sensor, the inner ring clamp, and the roller bearing are arranged in the recited order from the radially inner side on a radially identical plane, and height H of a pressing section of the inner ring clamp is set to a value obtained by H=½B when the height of the roller bearing is represented as B.

With such a configuration, since it is possible to prevent the inner ring clamp from tilting to the rotation sensor side, a gap of the rotation sensor less easily changes.

Consequently, since it is possible to reduce the likelihood that the gap of the rotation sensor changes, there can be obtained an effect that it is possible to reduce the likelihood that the rotation sensor makes misdetection.

[Invention 21]

On the other hand, in order to attain the object, a roller bearing device having an intra-contact angle arrangement structure of a driver according to an invention 21 is a roller bearing device including: a roller bearing having an inner ring and an outer ring; an inner-ring supported member supported by the inner ring; an outer-ring supported member supported by the outer ring; a driver that has a stator and a rotor and relatively rotates the inner-ring supported member and the outer-ring supported member; and a rotation sensor that is arranged between the inner-ring supported member and the outer-ring supported member and outputs a sensor signal that changes according to relative positions thereof, wherein the rotation sensor, the roller bearing, and the driver are arranged on a radially identical plane, the roller bearing has different two contact angles, and the driver is arranged such that a gap surface of the stator and the rotor is located between a first straight line extending from a vertex of the contact angles in a direction of one of the contact angles and a second straight line extending from the vertex of the contact angles in a direction of the other contact angle and on one side of the inner ring and the outer ring.

With such a configuration, the inner-ring supported member and the outer-ring supported member are relatively rotatably supported by the roller bearing. The sensor signal that changes according to the relative positions of the inner-ring supported member and the outer-ring supported member is output by the rotation sensor.

When moment load is applied to the roller bearing device, the roller bearing device tilts around the roller bearing. However, since the rotation sensor is arranged on a plane radially identical with the roller bearing, it is possible to reduce a gap change of the rotation sensor.

The driver is arranged such that the gap surface of the stator and the rotor of the driver is located within the two contact angles (between the first straight line and the second straight line and on one side of the inner ring and the outer ring). Therefore, it is possible to reduce a gap change of the driver.

Further, since the rotation sensor, the roller bearing, and the driver are arranged on a radially identical plane, it is possible to reduce the height (the length in the axial direction) of the roller bearing device.

Further, when a method of, for example, increasing the preload of the roller bearing is adopted, whereas the gap change can be suppressed, a deficiency in that the life of the roller bearing is shortened is involved. However, in the present invention, since the gap change is reduced by arranging the rotation sensor in a position where the gap change is small, it is possible to realize extension of the life of the roller bearing.

Consequently, even if the moment load is applied to the roller bearing device, since the rotation sensor is arranged in the position where the gap change is small, compared with the past, there can be obtained an effect that it is possible to reduce the gap change of the rotation sensor and reduce the likelihood that the rotation sensor makes misdetection. There can also be obtained an effect that it is possible to reduce the gap change of the driver and reduce cogging torque. Further, since the rotation sensor, the roller bearing, and the driver are arranged on a radially identical plane, there can also be obtained an effect that it is possible to reduce the height of the roller bearing device. Further, there can also be obtained an effect that it is possible to realize extension of the life of the roller bearing compared with the method of, for example, increasing the preload of the roller bearing.

The inner-ring supported member and the outer-ring supported member only have to be relatively rotatably supported by the roller bearing. The inner-ring supported member may be fixed and the outer-ring supported member may be rotatably supported, the outer-ring supported member may be fixed and the inner-ring supported member may be rotatably supported, or both the supported members may be rotatably supported. The same holds true for the roller bearing device having an intra-bearing width arrangement structure of a driver according to an invention 26.

An actuator such as a motor or an engine corresponds to the driver. The same holds true for a roller bearing device having an intra-bearing width arrangement structure of a driver according to an invention 26.

For example, a resolver in which reluctance between the inner-ring supported member and the outer-ring supported member changes according to relative positions thereof or a tape scale that detects a mark formed in a circumferential direction corresponds to the rotation sensor. The same holds true for the roller bearing device having an intra-bearing width arrangement structure of a driver according to an invention 26.

[Invention 22]

A roller bearing device having an intra-contact angle arrangement structure of a driver according to an invention 22 is the roller bearing device having an intra-contact angle arrangement structure of a driver according to the invention 21, wherein the driver is arranged such that the gap surface of the stator and the rotor is located within a range of bearing width of the roller bearing in the axial direction.

With such a configuration, the driver is arranged such that the gap surface of the stator and the rotor of the driver is located within the bearing width (within a range of the bearing width of the roller bearing in the axial direction). Therefore, it is possible to further reduce the gap change of the driver.

Consequently, there can be obtained an effect that it is possible to further reduce the gap change of the driver and further reduce the cogging torque.

[Invention 23]

A roller bearing device having an intra-contact angle arrangement structure of a driver according to an invention 23 is the roller bearing device having an intra-contact angle arrangement structure of a driver according to the invention 21 or 22, wherein the rotation sensor is arranged on the opposite side of the driver across the roller bearing.

With such a configuration, since the rotation sensor is arranged on the opposite side of the driving ember across the roller bearing, the rotation sensor is less easily affected by noise and heat of the rotation sensor.

Consequently, since the rotation sensor is arranged on the opposite side of the driver across the roller bearing, the rotation sensor is less easily affected by noise and heat from the driver. Therefore, there can also be obtained an effect that high detection accuracy can be realized.

[Invention 24]

A roller bearing device having an intra-contact angle arrangement structure of a driver according to an invention 24 is the roller bearing device having an intra-contact angle arrangement structure of a driver according to any one of the inventions 21 to 23, wherein the inner-ring supported member and the outer-ring supported member respectively have inner wall members and outer wall members formed on the inside and the outside in the radial direction, the inner wall member of the inner-ring supported member and the outer wall member of the outer-ring supported member are arranged to extend over each other such that the inner wall member of the inner-ring supported member is located between the inner wall member and the outer wall member of the outer-ring supported member and the outer wall member of the outer-ring supported member is located between the inner wall member and the outer wall member of the inner-ring supported member, a detected member of the rotation sensor is fixed to one of the inner wall member of the outer-ring supported member and the inner wall member of the inner-ring supported member and detecting means of the rotation sensor is fixed to the other, the inner ring is fixed to the inner wall member of the inner-ring supported member and the outer ring is fixed to the outer wall member of the outer ring supported member, and the rotor is fixed to one of the outer wall member of the outer-ring supported member and the outer wall member of the inner-ring supported member and the stator is fixed to the other.

With such a configuration, when the rotor of the driver is fixed to the outer wall member of the outer-ring supported member, the outer-ring supported member and the outer ring rotate and, when the rotor of the driver is fixed to the outer wall member of the inner-ring supported member, the inner-ring supported member and the inner ring rotate. When the outer-ring supported member and the outer ring and the inner-ring supported member and the inner ring rotate, the detected member of the rotation sensor fixed to one of the inner wall member of the outer-ring supported member and the inner wall member of the inner-ring supported member is detected by the detecting means of the rotation sensor fixed to the other, whereby a sensor signal that changes according to relative positions of the inner-ring supported member and the outer-ring supported member is output from the rotation sensor.

The inner wall member or the outer wall member of the inner-ring supported member may be configured integrally with the inner-ring supported member or may be configured separately from the inner-ring supported member. When the inner wall member or the outer wall member of the inner-ring supported member is configured separately from the inner-ring supported member, a member such as an inner ring clamp may configure the inner wall member of the inner-ring supported member.

The inner wall member or the outer wall member of the outer-ring supported member may be configured integrally with the outer-ring supported member or may be configured separately from the outer-ring supported member. When the inner wall member or the outer wall member of the outer-ring supported member is configured separately from the outer-ring supported member, a member such as an outer ring clamp may configure the outer wall member of the outer-ring supported member.

The fixing to the inner wall member or the outer wall member (in this paragraph, hereinafter abbreviated as "wall member") includes a stationary state in which the detected member, the detecting means, the inner ring, the outer ring, the rotor, or the stator is not directly fixed to the wall member but is arranged near or in contact with the wall member and fixed to a member to which the wall member is fixed or a member integral with the wall member to thereby being substantially integral with the wall member.

[Invention 25]

A roller bearing device having an intra-contact angle arrangement structure of a driver according to an invention 25 is the roller bearing device having an intra-contact angle arrangement structure of a driver according to any one of the inventions 21 to 24, wherein the roller bearing is a cross roller bearing or a four-point contact ball bearing.

With such a configuration, it is possible to simultaneously receive moment load, axial load, and radial load.

Consequently, since it is possible to simultaneously receive the moment load, the axial load, and the radial load, there can be obtained an effect that it is possible to reduce a gap change due to the moment load while maintaining rigidity against the axial load and the radial load.

[Invention 26]

On the other hand, in order to attain the object, a roller bearing device having an intra-bearing width arrangement structure of a driver according to an invention 26 is a roller bearing device including: a roller bearing having an inner ring and an outer ring; an inner-ring supported member supported by the inner ring; an outer-ring supported member supported by the outer ring; a driver that has a stator and a rotor and relatively rotates the inner-ring supported member and the outer-ring supported member; and a rotation sensor that is arranged between the inner-ring supported member and the outer-ring supported member and outputs a sensor signal that changes according to relative positions thereof, wherein the driver is arranged such that a gap surface of the stator and the rotor is located within a range of bearing width of the roller bearing in an axial direction.

With such a configuration, the inner-ring supported member and the outer-ring supported member are relatively rotatably supported by the roller bearing. The sensor signal that changes according to the relative positions of the inner-ring supported member and the outer-ring supported member is output by the rotation sensor.

When moment load is applied to the roller bearing device, the roller bearing device tilts around the roller bearing. However, since the rotation sensor is arranged on a plane radially identical with the roller bearing, it is possible to reduce a gap change of the rotation sensor.

The driver is arranged such that the gap surface of the stator and the rotor of the driver is located within the bearing width (in the range of the bearing width of the roller bearing in the axial direction). Therefore, it is possible to reduce a gap change of the driver.

Further, since the rotation sensor, the roller bearing, and the driver are arranged on a radially identical plane, it is possible to reduce the height (the length in the axial direction) of the roller bearing device.

Further, when a method of, for example, increasing the preload of the roller bearing is adopted, whereas the gap change can be suppressed, a deficiency in that the life of the roller bearing is shortened is involved. However, in the present invention, since the gap change is reduced by arranging the rotation sensor in a position where the gap change is small, it is possible to realize extension of the life of the roller bearing.

Consequently, even if the moment load is applied to the roller bearing device, since the rotation sensor is arranged in the position where the gap change is small, compared with the past, there can be obtained an effect that it is possible to reduce the gap change of the rotation sensor and reduce the likelihood that the rotation sensor makes misdetection. There can also be obtained an effect that it is possible to reduce the gap change of the driver and reduce cogging torque. Further, since the rotation sensor, the roller bearing, and the driver are arranged on a radially identical plane, there can also be obtained an effect that it is possible to reduce the height of the roller bearing device. Further, there can also be obtained an effect that it is possible to realize extension of the life of the roller bearing compared with the method of, for example, increasing the preload of the roller bearing.

[Invention 27]

On the other hand, in order to attain the object, a roller bearing device having an intra-contact angle arrangement structure of a driver according to an invention 27 is the roller bearing device having an intra-contact angle arrangement structure of a driver according to any one of the inventions 21 to 25, wherein the rotation sensor includes: a first resolver having a first resolver rotor; and a second resolver having a second resolver rotor, and the first resolver rotor and the second resolver rotor are arranged at a very small interval via an inter-rotor seat and attached to each other by two fixing means.

With such a configuration, the first resolver rotor and the second resolver rotor are independently fixed by the two fixing means.

Consequently, since the first resolver rotor and the second resolver rotor can be independently fixed, there can be obtained an effect that it is possible to adjust each of the positions in the axial direction of the first resolver rotor and the second resolver rotor.

[Invention 28]

A roller bearing device having an intra-contact angle arrangement structure of a driver according to an invention 28 is the roller bearing device having an intra-contact angle arrangement structure of a driver according to any one of the inventions 21 to 25 and 27, wherein a wiring tube that pierces through from a radially inner side to a radially outer side of the inner-ring supported member and houses wires of the rotation sensor is formed in the inner-ring supported member, and height D of the wiring tube is set to a value obtained by $D=2d+\alpha$ when the diameter of one wire of the rotation sensor is represented as d and a predetermined margin is represented as $\alpha$ ($0<\alpha<d$).

With such a configuration, the height of the wiring tube is reduced. Height required for plural wires to cross once is allowed.

Consequently, since the height of the wiring tube is reduced, there can be obtained an effect that it is possible to reduce the height of the roller bearing device. Since the height required for plural wires to cross once is allowed, there can also be obtained an effect that it is possible to reduce the likelihood that workability for housing the wires of the rotation sensor in the wiring tube falls.

[Invention 29]

A roller bearing device having an intra-contact angle arrangement structure of a driver according to an invention 29 is the roller bearing device having an intra-contact angle arrangement structure of a driver according to any one of the inventions 21 to 25, 27, and 28, further including an inner ring clamp that fixes the inner ring to the inner-ring supported member in the axial direction, wherein a bolt hole through which a bolt for fixing the inner ring clamp is inserted is formed in the inner ring clamp in the axial direction, and thickness ti between an outside edge of the inner ring clamp and an inner wall surface of the bolt hole is set to a value in a range of $pi<ti<2pi$ when length for one pitch of the bolt hole is represented as pi.

With such a configuration, when the bolt is screwed into the bolt hole of the inner ring clamp, the outside edge of the inner ring clamp is pushed out to the inner ring side to lock the inner ring. Therefore, it is possible to fix the inner ring without a gap.

Consequently, since the inner ring can be fixed without a gap, there can be obtained an effect that it is possible to improve detection accuracy.

[Invention 30]

A roller bearing device having an intra-contact angle arrangement structure of a driver according to an invention 30 is the roller bearing device having an intra-contact angle arrangement structure of a driver according to any one of the inventions 21 to 25 and 27 to 29, further including an outer ring clamp that fixes the outer ring to the outer-ring supported member in the axial direction, wherein a bolt hole through which a bolt for fixing the outer ring clamp is inserted is formed in the outer ring clamp in the axial direction, and thickness to between an inside edge of the outer ring clamp and an inner wall surface of the bolt hole is set to a value in a range of $po<to<2po$ when length for one pitch of the bolt hole is represented as po.

With such a configuration, when the bolt is screwed into the bolt hole of the outer ring clamp, the inside edge of the outer ring clamp is pushed out to the outer ring side to lock the outer ring. Therefore, it is possible to fix the outer ring without a gap.

Consequently, since the outer ring can be fixed without a gap, there can be obtained an effect that it is possible to improve detection accuracy.

[Invention 31]

A roller bearing device having an intra-contact angle arrangement structure of a driver according to an invention 31 is the roller bearing device having an intra-contact angle arrangement structure of a driver according to any one of the inventions 21 to 25, 27, 28, and 30, further including an inner ring clamp that fixes the inner ring to the inner-ring supported member in the axial direction, wherein the rotation sensor, the inner ring clamp, and the roller bearing are arranged in the recited order from the radially inner side on a radially identical plane, and height H of a pressing section of the inner ring clamp is set to a value obtained by H=½B when the height of the roller bearing is represented as B.

With such a configuration, since it is possible to prevent the inner ring clamp from tilting to the rotation sensor side, a gap of the rotation sensor less easily changes.

Consequently, since it is possible to reduce the likelihood that the gap of the rotation sensor changes, there can be obtained an effect that it is possible to reduce the likelihood that the rotation sensor makes misdetection.

[Invention 32]

On the other hand, in order to attain the object, a roller bearing device having an intra-contact angle arrangement structure of a rotation sensor according to an invention 32 is a roller bearing device including: a roller bearing having an inner ring and an outer ring; an inner-ring supported member supported by the inner ring; an outer-ring supported member supported by the outer ring; and a rotation sensor that is arranged between the inner-ring supported member and the outer-ring supported member and outputs a sensor signal that changes according to relative positions thereof, wherein the roller bearing has different two contact angles, and the rotation sensor is arranged between a first straight line extending from a vertex of the contact angles in a direction of one of the contact angles and a second straight line extending from the vertex of the contact angles in a direction of the other contact angle and on one side of the inner ring and the outer ring.

With such a configuration, the inner-ring supported member and the outer-ring supported member are relatively rotatably supported by the roller bearing. The sensor signal that changes according to the relative positions of the inner-ring supported member and the outer-ring supported member is output by the rotation sensor.

When moment load is applied to the roller bearing device, the roller bearing device tilts around the roller bearing. However, since the rotation sensor is arranged within the two contact angles (between the first straight line and the second straight line and on one side of the inner ring and the outer ring), it is possible to reduce a gap change of the rotation sensor.

Further, when a method of, for example, increasing the preload of the roller bearing is adopted, whereas the gap change can be suppressed, a deficiency in that the life of the roller bearing is shortened is involved. However, in the present invention, since the gap change is reduced by arranging the rotation sensor in a position where the gap change is small, it is possible to realize extension of the life of the roller bearing.

Consequently, even if the moment load is applied to the roller bearing device, since the rotation sensor is arranged in the position where the gap change is small, compared with the past, there can be obtained an effect that it is possible to reduce the gap change of the rotation sensor and reduce the likelihood that the rotation sensor makes misdetection. Further, there can also be obtained an effect that it is possible to realize extension of the life of the roller bearing compared with the method of, for example, increasing the preload of the roller bearing.

The inner-ring supported member and the outer-ring supported member only have to be relatively rotatably supported by the roller bearing. The inner-ring supported member may be fixed and the outer-ring supported member may be rotatably supported, the outer-ring supported member may be fixed and the inner-ring supported member may be rotatably supported, or both the supported members may be rotatably supported.

For example, a resolver in which reluctance between the inner-ring supported member and the outer-ring supported member changes according to relative positions thereof or a tape scale that detects a mark formed in a circumferential direction corresponds to the rotation sensor.

[Invention 33]

A roller bearing device having an intra-contact angle arrangement structure of a rotation sensor according to an invention 33 is the roller bearing device having an intra-contact angle arrangement structure of a rotation sensor according to the invention 32, wherein the rotation sensor is arranged between the first straight line and the second straight line and on the side of the inner ring.

With such a configuration, when moment load is applied to the roller bearing device, the roller bearing device tilts around the roller bearing. However, since the rotation sensor is arranged within the two contact angles (between the first straight line and the second straight line and on the side of the inner ring), it is possible to reduce a gap change of the rotation sensor.

[Invention 34]

A roller bearing device having an intra-contact angle arrangement structure of a rotation sensor according to an invention 34 is the roller bearing device having an intra-contact angle arrangement structure of a rotation sensor according to the invention 32 or 33, further including a driver that relatively rotates the inner-ring supported member and the outer-ring supported member, wherein the driver is arranged on the opposite side of the rotation sensor across the roller bearing.

With such a configuration, since the driver is arranged on the opposite side of the rotation sensor across the roller bearing, the rotation sensor is less easily affected by noise and heat from the driver.

Consequently, since the driver is arranged on the opposite side of the rotation sensor across the roller bearing, the rotation sensor is less easily affected by noise and heat from the driver. Therefore, there can also be obtained an effect that it is possible to realize high detection accuracy.

An actuator such as a motor or an engine corresponds to the driver.

[Invention 35]

A roller bearing device having an intra-contact angle arrangement structure of a rotation sensor according to an invention 35 is the roller bearing device having an intra-contact angle arrangement structure of a rotation sensor according to any one of the inventions 32 to 34, wherein the roller bearing is a cross roller bearing or a four-point contact ball bearing.

With such a configuration, it is possible to simultaneously receive moment load, axial load, and radial load.

Consequently, since it is possible to simultaneously receive the moment load, the axial load, and the radial load, there can be obtained an effect that it is possible to reduce a gap change due to the moment load while maintaining rigidity against the axial load and the radial load.

[Invention 36]

A roller bearing device having an intra-contact angle arrangement structure of a rotation sensor according to an invention 36 is the roller bearing device having an intra-contact angle arrangement structure of a rotation sensor according to any one of the inventions 32 to 35, wherein the rotation sensor includes: an annular detected member, one of an inner circumference and an outer circumference of which is decentered with respect to the shaft center of the roller bearing; and detecting means for detecting a reluctance change between the detecting means and the detected member, and the detected member is provided in one of the inner-ring supported member and the outer-ring supported member and the detecting means is provided in the other such that a decentered side of the inner circumference and the outer circumference of the detected member is opposed to the detecting means.

With such a configuration, when the inner-ring supported member and the outer-ring supported member relatively rotate, the detecting means and the detected member also relatively rotate according to the rotation. Since the side opposed to the detecting means of the inner circumference and the outer circumference of the detected member is decentered, a reluctance change is caused by the rotation and the reluctance change is detected by the detecting means.

In this way, in the rotation sensor of a type in which a fundamental wave component of a reluctance change is one period per one rotation, since the influence of a gap change due to moment load is large, a reduction in the gap change is effective for prevention of misdetection.

Concerning the detected member and the detecting means, the detected member may be provided in the inner-ring supported member and the detecting means may be provided in the outer-ring supported member. The detected member and the detecting means may be provided in the opposite arrangement. In the former case, the outer circumference of the detected member is decentered and the detected member and the detecting means are provided with the outer circumference of the detected member opposed to the detecting means. In the latter case, the inner circumference of the detected member is decentered and the detected member and the detecting means are provided with the inner circumference of the detected member opposed to the detecting means.

[Invention 37]

A roller bearing device having an intra-contact angle arrangement structure of a rotation sensor according to an invention 37 is the roller bearing device having an intra-contact angle arrangement structure of a rotation sensor according to any one of the inventions 32 to 36, wherein the rotation sensor includes: a first resolver having a first resolver rotor; and a second resolver having a second resolver rotor, and the first resolver rotor and the second resolver rotor are arranged at a very small interval via an inter-rotor seat and attached to each other by two fixing means.

With such a configuration, the first resolver rotor and the second resolver rotor are independently fixed by the two fixing means.

Consequently, since the first resolver rotor and the second resolver rotor can be independently fixed, there can be obtained an effect that it is possible to adjust each of the positions in the axial direction of the first resolver rotor and the second resolver rotor.

[Invention 38]

A roller bearing device having an intra-contact angle arrangement structure of a rotation sensor according to an invention 38 is the roller bearing device having an intra-contact angle arrangement structure of a rotation sensor according to any one of the inventions 32 to 37, wherein a wiring tube that pierces through from a radially inner side to a radially outer side of the inner-ring supported member and houses wires of the rotation sensor is formed in the inner-ring supported member, and height D of the wiring tube is set to a value obtained by $D=2d+\alpha$ when the diameter of one wire of the rotation sensor is represented as d and a predetermined margin is represented as $\alpha$ ($0<\alpha<d$).

With such a configuration, the height of the wiring tube is reduced. Height required for plural wires to cross once is allowed.

Consequently, since the height of the wiring tube is reduced, there can be obtained an effect that it is possible to reduce the height of the roller bearing device. Since the height required for plural wires to cross once is allowed, there can also be obtained an effect that it is possible to reduce the likelihood that workability for housing the wires of the rotation sensor in the wiring tube falls.

[Invention 39]

A roller bearing device having an intra-contact angle arrangement structure of a rotation sensor according to an invention 39 is the roller bearing device having an intra-contact angle arrangement structure of a rotation sensor according to any one of the inventions 32 to 38, further including an inner ring clamp that fixes the inner ring to the inner-ring supported member in the axial direction, wherein a bolt hole through which a bolt for fixing the inner ring clamp is inserted is formed in the inner ring clamp in the axial direction, and thickness ti between an outside edge of the inner ring clamp and an inner wall surface of the bolt hole is set to a value in a range of $pi<ti<2pi$ when length for one pitch of the bolt hole is represented as pi.

With such a configuration, when the bolt is screwed into the bolt hole of the inner ring clamp, the outside edge of the inner ring clamp is pushed out to the inner ring side to lock the inner ring. Therefore, it is possible to fix the inner ring without a gap.

Consequently, since the inner ring can be fixed without a gap, there can be obtained an effect that it is possible to improve detection accuracy.

[Invention 40]

A roller bearing device having an intra-contact angle arrangement structure of a rotation sensor according to an invention 40 is the roller bearing device having an intra-contact angle arrangement structure of a rotation sensor according to any one of the inventions 32 to 39, further including an outer ring clamp that fixes the outer ring to the outer-ring supported member in the axial direction, wherein a bolt hole through which a bolt for fixing the outer ring clamp is inserted is formed in the outer ring clamp in the axial direction, and thickness to between an inside edge of the outer ring clamp and an inner wall surface of the bolt hole is set to a value in a range of $po<to<2po$ when length for one pitch of the bolt hole is represented as po.

With such a configuration, when the bolt is screwed into the bolt hole of the outer ring clamp, the inside edge of the outer ring clamp is pushed out to the outer ring side to lock the outer ring. Therefore, it is possible to fix the outer ring without a gap.

Consequently, since the outer ring can be fixed without a gap, there can be obtained an effect that it is possible to improve detection accuracy.

[Invention 41]

A roller bearing device having an intra-contact angle arrangement structure of a rotation sensor according to an invention 41 is the roller bearing device having an intra-contact angle arrangement structure of a rotation sensor according to any one of the inventions 32 to 38 and 40, further including an inner ring clamp that fixes the inner ring to the inner-ring supported member in the axial direction, wherein the rotation sensor, the inner ring clamp, and the roller bearing are arranged in the recited order from the radially inner side on a radially identical plane, and height H of a pressing section of the inner ring clamp is set to a value obtained by H=½B when the height of the roller bearing is represented as B.

With such a configuration, since it is possible to prevent the inner ring clamp from tilting to the rotation sensor side, a gap of the rotation sensor less easily changes.

Consequently, since it is possible to reduce the likelihood that the gap of the rotation sensor changes, there can be obtained an effect that it is possible to reduce the likelihood that the rotation sensor makes misdetection.

[Invention 42]

On the other hand, in order to attain the object, a roller bearing device having an intra-contact angle arrangement structure of a resolver according to an invention 42 is a roller bearing device including: a roller bearing having an inner ring and an outer ring; an inner-ring supported member supported by the inner ring; an outer-ring supported member supported by the outer ring; and a rotation sensor that is arranged between the inner-ring supported member and the outer-ring supported member and outputs a sensor signal that changes according to relative positions thereof, wherein the rotation sensor includes: a first resolver that outputs the sensor signal in which a fundamental wave component of a reluctance change that changes in synchronization with the rotation of the inner-ring supported member or the outer-ring supported member is a first period; and a second resolver that outputs the sensor signal in which a fundamental wave component of the reluctance change is a second period shorter than the first period, the roller bearing has different two contact angles, and the first resolver is arranged such that a gap surface of the first resolver is located between a first straight line extending from a vertex of the contact angles in a direction of one of the contact angles and a second straight line extending from the vertex of the contact angles in a direction of the other contact angle and on one side of the inner ring and the outer ring.

With such a configuration, the inner-ring supported member and the outer-ring supported member are relatively rotatably supported by the roller bearing.

When moment load is applied to the roller bearing device, the roller bearing device tilts around the roller bearing. However, since the first resolver is arranged such that the gap surface of the first resolver is located within the two contact angles (between the first straight line and the second straight line and on one side of the inner ring and the outer ring), it is possible to reduce a gap change of the first resolver having larger influence than a gap change of the second resolver.

Further, when a method of, for example, increasing the preload of the roller bearing is adopted, whereas the gap change can be suppressed, a deficiency in that the life of the roller bearing is shortened is involved. However, in the present invention, since the gap change is reduced by arranging the first resolver in a position where the gap change is small, it is possible to realize extension of the life of the roller bearing.

On the other hand, when the inner-ring supported member and the outer-ring supported member relatively rotates, reluctance changes in synchronization with the rotation of the inner-ring supported member or the outer-ring supported member and the sensor signal in which a fundamental wave component of the reluctance change is the first period is output from the first resolver. The sensor signal in which a fundamental wave component of a reluctance change is the second period is output from the second resolver.

Consequently, even if the moment load is applied to the roller bearing device, since the first resolver is arranged in the position where the gap change is small, compared with the past, there can be obtained an effect that it is possible to reduce the gap change of the first resolver and reduce the likelihood that the first resolver makes misdetection. In particular, since the gap change of the first resolver having larger influence than the gap change of the second resolver can be reduced, there can also be obtained an effect that it is possible to effectively reduce the influence of the gap change. Further, there can also be obtained an effect that it is possible to realize extension of the life of the roller bearing compared with the method of, for example, increasing the preload of the roller bearing.

The inner-ring supported member and the outer-ring supported member only have to be relatively rotatably supported by the roller bearing. The inner-ring supported member may be fixed and the outer-ring supported member may be rotatably supported, the outer-ring supported member may be fixed and the inner-ring supported member may be rotatably supported, or both the supported members may be rotatably supported. The same holds true for a roller bearing device having an intra-bearing width arrangement structure of a resolver according to an invention 47.

[Invention 43]

A roller bearing device having an intra-contact angle arrangement structure of a resolver according to an invention 43 is the roller bearing device having an intra-contact angle arrangement structure of a resolver according to the invention 42, wherein the first resolver is arranged such that the gap surface of the first resolver is located within a range of bearing width of the roller bearing in the axial direction.

With such a configuration, the first resolver is arranged such that the gap surface of the first resolver is located within the bearing width (with a range of bearing width of the roller bearing in the axial direction). Therefore, it is possible to further reduce the gap change of the first resolver.

Since the first resolver and the roller bearing are arranged on a radially identical plane, it is possible to reduce the height (the length in the axial direction) of the roller bearing device.

Consequently, there can be obtained an effect that it is possible to further reduce the gap change of the first resolver and it is possible to further reduce the likelihood that the first resolver makes misdetection. Since the first resolver and the roller bearing are arranged on a radially identical plane, there can also be obtained an effect that it is possible to reduce the height of the roller bearing device.

[Invention 44]

A roller bearing device having an intra-contact angle arrangement structure of a resolver according to an invention 44 is the roller bearing device having an intra-contact angle arrangement structure of a resolver according to the invention 42 or 43, wherein the first resolver is arranged between the first straight line and the second straight line and on the side of the inner ring.

With such a configuration, when the moment load is applied to the roller bearing device, the roller bearing device tilts around the roller bearing. However, since the first resolver is arranged within the two contact angles (between the first straight line and the second straight line and on the side of the inner ring), it is possible to reduce the gap change of the first resolver.

[Invention 45]

A roller bearing device having an intra-contact angle arrangement structure of a resolver according to an invention 45 is the roller bearing device having an intra-contact angle arrangement structure of a resolver according to any one of the inventions 42 to 44, further including a driver that relatively rotates the inner-ring supported member and the outer-ring supported member, wherein the driver is arranged on the opposite side of the rotation sensor across the roller bearing.

With such a configuration, since the driver is arranged on the opposite side of the rotation sensor across the roller bearing, the rotation sensor is less easily affected by noise and heat from the driver.

Consequently, since the driver is arranged on the opposite side of the rotation sensor across the roller bearing, the rotation sensor is less easily affected by noise and heat from the driver. Therefore, there can also be obtained an effect that it is possible to realize high detection accuracy.

An actuator such as a motor or an engine corresponds to the driver.

[Invention 46]

A roller bearing device having an intra-contact angle arrangement structure of a resolver according to an invention 46 is the roller bearing device having an intra-contact angle arrangement structure of a resolver according to any one of the inventions 42 to 45, wherein the roller bearing is a cross roller bearing or a four-point contact ball bearing.

With such a configuration, it is possible to simultaneously receive moment load, axial load, and radial load.

Consequently, since it is possible to simultaneously receive the moment load, the axial load, and the radial load, there can be obtained an effect that it is possible to reduce a gap change due to the moment load while maintaining rigidity against the axial load and the radial load.

[Invention 47]

On the other hand, in order to attain the object, a roller bearing device having an intra-bearing width arrangement structure of a resolver according to an invention 47 is a roller bearing device including: a roller bearing having an inner ring and an outer ring; an inner-ring supported member supported by the inner ring; an outer-ring supported member supported by the outer ring; and a rotation sensor that is arranged between the inner-ring supported member and the outer-ring supported member and outputs a sensor signal that changes according to relative positions thereof, wherein the rotation sensor includes: a first resolver that outputs the sensor signal in which a fundamental wave component of a reluctance change that changes in synchronization with the rotation of the inner-ring supported member or the outer-ring supported member is a first period; and a second resolver that outputs the sensor signal in which a fundamental wave component of the reluctance change is a second period shorter than the first period, and the first resolver is arranged such that a gap surface of the first resolver is located within a range of bearing width of the roller bearing in an axial direction.

With such a configuration, the inner-ring supported member and the outer-ring supported member are relatively rotatably supported by the roller bearing.

When moment load is applied to the roller bearing device, the roller bearing device tilts around the roller bearing. However, since the first resolver is arranged such that the gap surface of the first resolver is located within the bearing width (within a range of the bearing width of the roller bearing in the axial direction), it is possible to reduce a gap change of the first resolver having larger influence than a gap change of the second resolver.

Since the first resolver and the roller bearing are arranged on a radially identical plane, it is possible to reduce the height (the length in the axial direction) of the roller bearing device.

Further, when a method of, for example, increasing the preload of the roller bearing is adopted, whereas the gap change can be suppressed, a deficiency in that the life of the roller bearing is shortened is involved. However, in the present invention, since the gap change is reduced by arranging the first resolver in a position where the gap change is small, it is possible to realize extension of the life of the roller bearing.

On the other hand, when the inner-ring supported member and the outer-ring supported member relatively rotates, reluctance changes in synchronization with the rotation of the inner-ring supported member or the outer-ring supported member and the sensor signal in which a fundamental wave component of the reluctance change is the first period is output from the first resolver. The sensor signal in which a fundamental wave component of a reluctance change is the second period is output from the second resolver.

Consequently, even if the moment load is applied to the roller bearing device, since the first resolver is arranged in the position where the gap change is small, compared with the past, there can be obtained an effect that it is possible to reduce the gap change of the first resolver and reduce the likelihood that the first resolver makes misdetection. In particular, since the gap change of the first resolver having larger influence than the gap change of the second resolver can be reduced, there can also be obtained an effect that it is possible to effectively reduce the influence of the gap change. Since the first resolver and the roller bearing are arranged on a radially identical plane, there can also be obtained an effect that it is possible to reduce the height of the roller bearing device. Further, there can also be obtained an effect that it is possible to realize extension of the life of the roller bearing compared with the method of, for example, increasing the preload of the roller bearing.

[Invention 48]

On the other hand, in order to attain the object, a roller bearing device having an intra-contact angle arrangement structure of a resolver according to an invention 48 is the roller bearing device having an intra-contact angle arrangement structure of a resolver according to any one of the inventions 42 to 46, wherein the first resolver has a first resolver rotor and the second resolver has a second resolver rotor, and the first resolver rotor and the second resolver rotor are arranged at a very small interval via an inter-rotor seat and attached to each other by two fixing means.

With such a configuration, the first resolver rotor and the second resolver rotor are independently fixed by the two fixing means.

Consequently, since the first resolver rotor and the second resolver rotor can be independently fixed, there can be obtained an effect that it is possible to adjust each of the positions in the axial direction of the first resolver rotor and the second resolver rotor.

[Invention 49]

A roller bearing device having an intra-contact angle arrangement structure of a resolver according to an invention 49 is the roller bearing device having an intra-contact angle arrangement structure of a resolver according to any one of the inventions 42 to 46 and 48, wherein a wiring tube that pierces through from a radially inner side to a radially outer side of the inner-ring supported member and houses wires of the rotation sensor is formed in the inner-ring supported member, and height D of the wiring tube is set to a value obtained by $D=2d+\alpha$ when the diameter of one wire of the rotation sensor is represented as d and a predetermined margin is represented as $\alpha$ ($0<\alpha<d$).

With such a configuration, the height of the wiring tube is reduced. Height required for plural wires to cross once is allowed.

Consequently, since the height of the wiring tube is reduced, there can be obtained an effect that it is possible to reduce the height of the roller bearing device. Since the height required for plural wires to cross once is allowed, there can also be obtained an effect that it is possible to reduce the likelihood that workability for housing the wires of the rotation sensor in the wiring tube falls.

[Invention 50]

A roller bearing device having an intra-contact angle arrangement structure of a resolver according to an invention 50 is the roller bearing device having an intra-contact angle arrangement structure of a resolver according to any one of the inventions 42 to 46, 48, and 49, further including an inner ring clamp that fixes the inner ring to the inner-ring supported member in the axial direction, wherein a bolt hole through which a bolt for fixing the inner ring clamp is inserted is formed in the inner ring clamp in the axial direction, and thickness ti between an outside edge of the inner ring clamp and an inner wall surface of the bolt hole is set to a value in a range of $pi<ti<2pi$ when length for one pitch of the bolt hole is represented as pi.

With such a configuration, when the bolt is screwed into the bolt hole of the inner ring clamp, the outside edge of the inner ring clamp is pushed out to the inner ring side to lock the inner ring. Therefore, it is possible to fix the inner ring without a gap.

Consequently, since the inner ring can be fixed without a gap, there can be obtained an effect that it is possible to improve detection accuracy.

[Invention 51]

A roller bearing device having an intra-contact angle arrangement structure of a resolver according to an invention 51 is the roller bearing device having an intra-contact angle arrangement structure of a resolver according to any one of the inventions 42 to 46 and 48 to 50, further including an outer ring clamp that fixes the outer ring to the outer-ring supported member in the axial direction, wherein a bolt hole through which a bolt for fixing the outer ring clamp is inserted is formed in the outer ring clamp in the axial direction, and thickness to between an inside edge of the outer ring clamp and an inner wall surface of the bolt hole is set to a value in a range of $po<to<2po$ when length for one pitch of the bolt hole is represented as po.

With such a configuration, when the bolt is screwed into the bolt hole of the outer ring clamp, the inside edge of the outer ring clamp is pushed out to the outer ring side to lock the outer ring. Therefore, it is possible to fix the outer ring without a gap.

Consequently, since the outer ring can be fixed without a gap, there can be obtained an effect that it is possible to improve detection accuracy.

[Invention 52]

A roller bearing device having an intra-contact angle arrangement structure of a resolver according to an invention 52 is the roller bearing device having an intra-contact angle arrangement structure of a resolver according to any one of the inventions 42 to 46, 48, 49, and 51, further including an inner ring clamp that fixes the inner ring to the inner-ring supported member in the axial direction, wherein the rotation sensor, the inner ring clamp, and the roller bearing are arranged in the recited order from the radially inner side on a radially identical plane, and height H of a pressing section of the inner ring clamp is set to a value obtained by $H=\frac{1}{2}B$ when the height of the roller bearing is represented as B.

With such a configuration, since it is possible to prevent the inner ring clamp from tilting to the rotation sensor side, a gap of the rotation sensor less easily changes.

Consequently, since it is possible to reduce the likelihood that the gap of the rotation sensor changes, there can be obtained an effect that it is possible to reduce the likelihood that the rotation sensor makes misdetection.

[Invention 53]

In order to attain the object, a roller bearing device having an intra-contact angle arrangement structure of a duplex bearing according to an invention 53 is a roller bearing device including: a roller bearing having an inner ring and an outer ring; an inner-ring supported member supported by the inner ring; an outer-ring supported member supported by the outer ring; and a rotation sensor that is arranged between the inner-ring supported member and the outer-ring supported member and outputs a sensor signal that changes according to relative positions thereof, wherein the roller bearing includes a duplex bearing in which two roller bearings are arranged to be opposed to each other with preload applied thereto, and the rotation sensor is arranged between a first straight line extending from one vertex of the two roller bearings in a direction of the contact angle and a second straight line extending from the other vertex of the two roller bearings in a direction of the contact angle and on one side of the inner ring and the outer ring.

With such a configuration, the inner-ring supported member and the outer-ring supported member are relatively rotatably supported by the roller bearing. The sensor signal that changes according to the relative positions of the inner-ring supported member and the outer-ring supported member is output by the rotation sensor.

When moment load is applied to the roller bearing device, the roller bearing device tilts around the roller bearing. However, since the rotation sensor is arranged within the two contact angles (between the first straight line and the second straight line and on one side of the inner ring and the outer ring), it is possible to reduce a gap change of the rotation sensor.

Further, when a method of, for example, increasing the preload of the roller bearing is adopted, whereas the gap change can be suppressed, a deficiency in that the life of the roller bearing is shortened is involved. However, in the present invention, since the gap change is reduced by arranging the rotation sensor in a position where the gap change is small, it is possible to realize extension of the life of the roller bearing.

Further, since the duplex bearing is adopted as the roller bearing, even if a supporting component such as a bearing for backup is set on the outside of the roller bearing device or even if plural roller bearings are set, it is possible to use the bearings without causing the bearings to interfere with one another.

Consequently, even if the moment load is applied to the roller bearing device, since the rotation sensor is arranged in the position where the gap change is small, compared with the past, there can be obtained an effect that it is possible to reduce the gap change of the rotation sensor and reduce the likelihood that the rotation sensor makes misdetection. There can also be obtained an effect that it is possible to realize extension of the life of the roller bearing compared with the method of, for example, increasing the preload of the roller bearing. Further, since the duplex bearing is adopted as the roller bearing, there can also be obtained an effect that, even if a supporting component such as a bearing for backup is set on the outside of the roller bearing device or even if plural roller bearings are set, it is possible to use the bearings without causing the bearings to interfere with one another.

The inner-ring supported member and the outer-ring supported member only have to be relatively rotatably supported by the roller bearing. The inner-ring supported member may be fixed and the outer-ring supported member may be rotatably supported, the outer-ring supported member may be fixed and the inner-ring supported member may be rotatably supported, or both the supported members may be rotatably supported.

For example, a resolver in which reluctance between the inner-ring supported member and the outer-ring supported member changes according to relative positions thereof or a tape scale that detects a mark formed in a circumferential direction corresponds to the rotation sensor.

The duplex bearing may be a face-to-face duplex bearing or may be a back-to-back duplex bearing.

[Invention 54]

A roller bearing device having an intra-contact angle arrangement structure of a duplex bearing according to an invention 54 is the roller bearing device having an intra-contact angle arrangement structure of a duplex bearing according to the invention 53, wherein the rotation sensor is arranged between the first straight line and the second straight line and on the side of the inner ring.

With such a configuration, when moment load is applied to the roller bearing device, the roller bearing device tilts around the roller bearing. However, since the rotation sensor is arranged within the two contact angles (between the first straight line and the second straight line and on the side of the inner ring), it is possible to reduce a gap change of the rotation sensor.

[Invention 55]

A roller bearing device having an intra-contact angle arrangement structure of a duplex bearing according to an invention 55 is the roller bearing device having an intra-contact angle arrangement structure of a duplex bearing according to the invention 54, wherein the rotation sensor is a resolver that has a resolver stator and a resolver rotor and in which reluctance between the resolver rotor and the resolver stator changes according to the position of the resolver rotor, and the rotation sensor is arranged such that a gap surface of the resolver stator and the resolver rotor is located between the first straight line and the second straight line and on the side of the inner ring.

With such a configuration, when moment load is applied to the roller bearing device, the roller bearing device tilts around the roller bearing. However, since the rotation sensor is arranged such that the gap surface of the resolver stator and the resolver rotor is located within the two contact angles (between the first straight line and the second straight line and on the side of the inner ring), it is possible to further reduce a gap change of the rotation sensor.

Consequently, there can be obtained an effect that it is possible to further reduce the gap change of the rotation sensor and it is possible to further reduce the likelihood that the rotation sensor makes misdetection.

[Invention 56]

A roller bearing device having an intra-contact angle arrangement structure of a duplex bearing according to an invention 56 is the roller bearing device having an intra-contact angle arrangement structure of a duplex bearing according to any one of the inventions 53 to 55, further including a driver that relatively rotates the inner-ring supported member and the outer-ring supported member, wherein the driver is arranged on the opposite side of the rotation sensor across the roller bearing.

With such a configuration, since the driver is arranged on the opposite side of the rotation sensor across the roller bearing, the rotation sensor is less easily affected by noise and heat from the driver.

Consequently, since the driver is arranged on the opposite side of the rotation sensor across the roller bearing, the rotation sensor is less easily affected by noise and heat from the driver. Therefore, there can also be obtained an effect that it is possible to realize high detection accuracy.

An actuator such as a motor or an engine corresponds to the driver.

[Invention 57]

A roller bearing device having an intra-contact angle arrangement structure of a duplex bearing according to an invention 57 is the roller bearing device having an intra-contact angle arrangement structure of a duplex bearing according to any one of the inventions 53 to 56, wherein the rotation sensor includes: an annular detected member, one of an inner circumference and an outer circumference of which is decentered with respect to the shaft center of the roller bearing; and detecting means for detecting a reluctance change between the detecting means and the detected member, and the detected member is provided in one of the inner-ring supported member and the outer-ring supported member and the detecting means is provided in the other such that a decentered side of the inner circumference and the outer circumference of the detected member is opposed to the detecting means.

With such a configuration, when the inner-ring supported member and the outer-ring supported member relatively rotate, the detecting means and the detected member also relatively rotate according to the rotation. Since the side opposed to the detecting means of the inner circumference and the outer circumference of the detected member is decentered, a reluctance change is caused by the rotation and the reluctance change is detected by the detecting means.

In this way, in the rotation sensor of a type in which a fundamental wave component of a reluctance change is one period per one rotation, since the influence of a gap change due to moment load is large, a reduction in the gap change is effective for prevention of misdetection.

Concerning the detected member and the detecting means, the detected member may be provided in the inner-ring supported member and the detecting means may be provided in the outer-ring supported member. The detected member and the detecting means may be provided in the opposite arrangement. In the former case, the outer circumference of the detected member is decentered and the detected member and the detecting means are provided with the outer circumference of the detected member opposed to the detecting means. In the latter case, the inner circumference of the detected member is decentered and the detected member and the detecting means are provided with the inner circumference of the detected member opposed to the detecting means.

[Invention 58]

A roller bearing device having an intra-contact angle arrangement structure of a duplex bearing according to an invention 58 is the roller bearing device having an intra-contact angle arrangement structure of a duplex bearing according to the invention 53, wherein the rotation sensor includes: a first resolver that outputs the sensor signal in which a fundamental wave component of a reluctance change that changes in synchronization with the rotation of the inner-ring supported member or the outer-ring supported member is a first period; and a second resolver that outputs the sensor signal in which a fundamental wave component of the reluctance change is a second period shorter than the first period, and the first resolver is arranged such that a gap surface of the first resolver is located between a first straight line extending from a vertex of one contact angle of the two roller bearings in a direction of the contact angle and a second straight line extending from a vertex of the other contact angle of the two roller bearings in a direction of the contact angle and on one side of the inner ring and the outer ring.

With such a configuration, when moment load is applied to the roller bearing device, the roller bearing device tilts around the roller bearing. However, since the first resolver is arranged such that the gap surface of the first resolver is located within the two contact angles (between the first straight line and the second straight line and on one side of the inner ring and the outer ring), it is possible to reduce a gap change of the first resolver having larger influence than a gap change of the second resolver.

Further, when a method of, for example, increasing the preload of the roller bearing is adopted, whereas the gap change can be suppressed, a deficiency in that the life of the roller bearing is shortened is involved. However, in the present invention, since the gap change is reduced by arranging the first resolver in a position where the gap change is small, it is possible to realize extension of the life of the roller bearing.

On the other hand, when the inner-ring supported member and the outer-ring supported member relatively rotates, reluctance changes in synchronization with the rotation of the inner-ring supported member or the outer-ring supported member and the sensor signal in which a fundamental wave component of the reluctance change is the first period is output from the first resolver. The sensor signal in which a fundamental wave component of a reluctance change is the second period is output from the second resolver.

Consequently, even if the moment load is applied to the roller bearing device, since the first resolver is arranged in the position where the gap change is small, there can be obtained an effect that it is possible to reduce the gap change of the first resolver and reduce the likelihood that the first resolver makes misdetection. In particular, since the gap change of the first resolver having larger influence than the gap change of the second resolver can be reduced, there can also be obtained an effect that it is possible to effectively reduce the influence of the gap change.

BRIEF DESCRIPTION OF THE DRAWINGS

FIG. 4 is a sectional view in the axial direction taken along an A-O-A' line in FIG. 3;

FIG. 9 is a sectional view in the axial direction taken along an A-O-A' line in FIG. 8;

FIG. 12 is a sectional view in the axial direction of the thin motor 100 in which the cross roller bearing 14, the resolver 30, and the motor unit 16 are arranged in the recited order from the radially inner side on a radially identical plane;

FIG. 41 is a sectional view in the axial direction of the thin motor 100 in which the motor unit 16, the resolver 30, and the cross roller bearing 14 are arranged in the recited order from the radially inner side on a radially identical plane;

FIG. 47 is a sectional view in the axial direction of the thin motor 100 in the case in which the configuration shown in FIG. 42 is applied to the eighth embodiment;

FIG. 48 is a sectional view in the axial direction of the thin motor 100 according to an embodiment of the present invention;

FIG. 51 is a sectional view in the axial direction taken along an A-O-A' line in FIG. 50;

FIG. 65 is a sectional view in the axial direction of the thin motor 100 in which the angular ball bearings 54 and 55, the resolver 30, and the motor unit 16 are arranged in the recited order from the radially inner side on a radially identical plane;

FIG. 66 is a sectional view in the axial direction of the thin motor 100 in which the motor unit 16, the resolver 30, and the angular ball bearings 54 and 55 are arranged in the recited order from the radially inner side on a radially identical plane;

Figure 1:
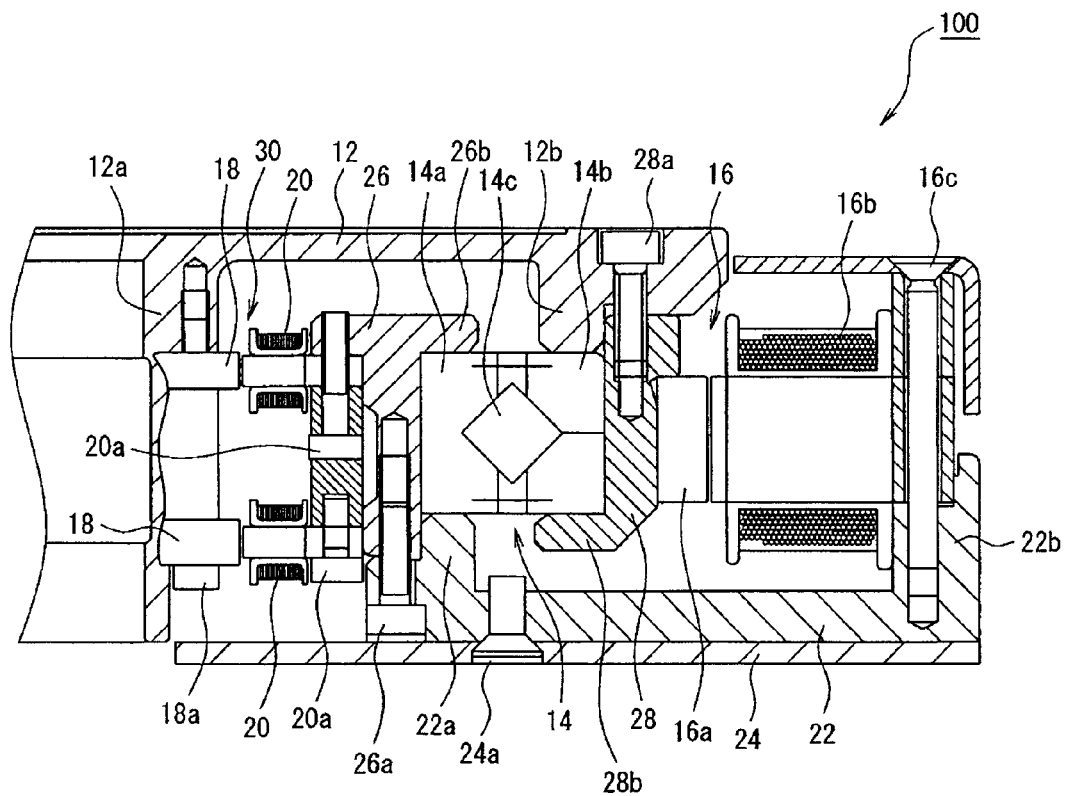
FIG. 1 is a sectional view in the axial direction of a thin motor 100 according to an embodiment of the present invention.

DESCRIPTION OF SYMBOLS 100, 200 thin motors
110 resolver device
12 rotor
14 cross roller bearing
14a inner ring
14b outer ring
14c cross roller
16 motor unit
16a permanent magnet
16b coil
30 resolver
18 resolver rotor
20 position detector
20 resolver stator
22 stator
42 inter-rotor seat
44 inter-stator seat
48 wiring tube
54, 55 angular ball bearings
54a, 55a inner rings
54b, 55b outer rings
54c, 55c balls
12a, 22a inner wall member
12b, 22b outer wall members
26 inner ring clamp
28 outer ring clamp
26b, 28b pressing sections
16c, 18a, 20a, 24a, 26a, 28a bolts
24 fixing plate
70 drive unit
60 servo driver
61 oscillator
63 changeover switch
220 housing inner
18ra, 18ri resolver rotors
20sa, 20si position detectors
20sa, 20si resolver stators
18b, 20b bolts
26c, 28c, 46a, 46b bolt holes

BEST MODE FOR CARRYING OUT THE INVENTION

First Embodiment

A first embodiment of the present invention is explained below with reference to the accompanying drawings. FIG. 1 is a diagram showing a first embodiment of a roller bearing device having a radial-plane arrangement structure of a rotation sensor according to the present invention.

First, the configuration of a thin motor 100 to which the present invention is applied is explained.

FIG. 1 is a sectional view in the axial direction of the thin motor 100 according to this embodiment.

The thin motor 100 includes, as shown in FIG. 1, a stator 22 as a stator, a rotor 12 as a rotor, a cross roller bearing 14 that is interposed between the rotor 12 and the stator 22 and rotatably supports the rotor 12, a motor unit 16 that applies rotation torque to the rotor 12, and a resolver 30 that detects a rotation angle position of the rotor 12. The resolver 30, the cross roller bearing 14, and the motor unit 16 are arranged in the recited order from the radially inner side on a radially identical plane.

In the stator 22, an annular inner wall member 22a projecting upward in the axial direction (the upward direction in FIG. 1) is formed. Further on the radially outer side than the inner wall member 22a, an annular outer wall member 22b projecting upward in the axial direction is formed. On the other hand, in the rotor 12, an annular inner wall member 12a projecting downward in the axial direction (the downward direction in FIG. 1) is formed. Further on the radially outer side than the inner wall member 12a, an annular outer wall member 12b projecting downward in the axial direction is formed. The stator 22 and the rotor 12 are arranged to extend over each other such that the inner wall member 22a of the stator 22 is located between the inner wall member 12a and the outer wall member 12b of the rotor 12 and the outer wall member 12b of the rotor 12 is located between the inner wall member 22a and the outer wall member 22b of the stator 22.

The cross roller bearing 14 includes an inner ring 14a, an outer ring 14b, and plural cross rollers (rollers) 14c rollably provided between the inner ring 14a and the outer ring 14b. The cross roller 14c is formed in a substantially cylindrical shape having a diameter slightly larger than length. An even number-th rotation axis on a track and an odd number-th rotation axis on the track incline 90° with respect to each other.

The inner ring 14a is fixed to the inner wall member 22a of the stator 22 in a state in which the inner ring 14a is pressed in the axial direction. Specifically, the inner ring 14a is fixed by setting the upper end of the inner wall member 22a of the stator 22 in contact with the lower surface of the inner ring 14a, setting a pressing section 26b of an inner ring clamp 26 in contact with the upper surface of the inner ring 14a, and fastening the inner ring clamp 26 to the inner wall member 22a of the stator 22 with a bolt 26a.

The outer ring 14b is fixed to the outer wall member 12b of the rotor 12 in a state in which the outer ring 14b is pressed in the axial direction. Specifically, the outer ring 14b is fixed by setting the lower end of the outer wall member 12b of the rotor 12 in contact with the upper surface of the outer ring 14b, setting a pressing section 28b of the outer ring clamp 28 in contact with the lower surface of the outer ring 14b, and fastening the outer ring clamp 28 to the outer wall member 12b of the rotor 12 with a bolt 28a.

The stator 22 is fixed to a fixing plate 24 by a bolt 24a and the rotor 12 fits in the outside edge of an output shaft.

The motor unit 16 includes a permanent magnet 16a and a coil 16b arranged to be opposed to the permanent magnet 16a at a predetermined interval. The permanent magnet 16a is attached to the outside edge of the outer ring clamp 28 and fixed to the outside edge side of the outer wall member 12b of the rotor 12 integrally with the outer ring clamp 28. On the other hand, the coil 16b is attached to the outer wall member 22b of the stator 22 by a bolt 16c.

The resolver 30 includes an annular resolver rotor 18 having an inner circumference decentered with respect to the shaft center of the cross roller bearing 14 and a position detector 20 (a resolver stator) that is arranged to be opposed to the resolver rotor 18 at a predetermined interval and detects a reluctance change between the position detector 20 and the resolver rotor 18. The resolver rotor 18 is attached to the outside edge of the inner wall member 12a of the rotor 12 by bolts 18a. On the other hand, the position detector 20 is attached to the inside edge of the inner ring clamp 26 by a bolt 20a and fixed to the inside edge side of the inner wall member 22a of the stator 22 integrally with the inner ring clamp 26. The resolver rotor 18 is decentered to change a distance between the resolver rotor 18 and the position detector 20 in the circumferential direction, whereby reluctance changes according to the position of the resolver rotor 18. Therefore, since a fundamental wave component of the reluctance change is one period per one rotation of the rotor 12, the resolver 30 outputs a resolver signal that changes according to a rotation angle position of the rotor 12.

The coil 16b is energized, whereby the rotor 12 and the resolver rotor 18 integrally rotate, a reactance change is detected by the position detector 20, and control of rotating speed and positioning is performed by a controller (not shown).

Next, operation in this embodiment is explained.

When the coil 16b is energized, rotation torque is applied to the rotor 12 and the rotor 12 rotates. A reluctance change between the position detector 20 and the resolver rotor 18, which rotates integrally with the rotor 12, is detected by the position detector 20 and control of rotating speed and positioning is performed by the controller (not shown).

When moment load is applied to the thin motor 100, the thin motor 100 tilts around the cross roller bearing 14. However, since the resolver 30 is arranged on a plane radially identical with the cross roller bearing 14, it is possible to reduce a gap change of the resolver 30.

Since the resolver 30, the cross roller bearing 14, and the motor unit 16 are arranged on a radially identical plane, it is possible to reduce the height (the length in the axial direction) of the thin motor 100.

Further, since the resolver 30 is arranged on the opposite side of the motor unit 16 across the cross roller bearing 14, the resolver 30 is less easily affected by noise and heat from the motor unit 16.

Further, when a method of, for example, increasing the preload of the cross roller bearing 14 is adopted, whereas the gap change can be suppressed, a deficiency in that the life of the cross roller bearing 14 is shortened is involved. However, in the present invention, since the gap change is reduced by arranging the resolver 30 in a position where the gap change is small, it is possible to realize extension of the life of the cross roller bearing 14.

In this way, in this embodiment, the thin motor 100 includes the cross roller bearing 14 including the inner ring 14a and the outer ring 14b, the stator 22 supported by the inner ring 14a, the rotor 12 supported by the outer ring 14b, the motor unit 16 that applies rotation torque to the rotor 12, and the resolver 30 that detects a rotation angle position of the rotor 12. The resolver 30, the cross roller bearing 14, and the motor unit 16 are arranged on a radially identical plane.

Consequently, even if the moment load is applied to the thin motor 100, since the resolver 30 is arranged in the position where the gap change is small, compared with the past, it is possible to reduce the gap change of the resolver 30 and reduce the likelihood that the resolver 30 makes misdetection. Since the resolver 30, the cross roller bearing 14, and the motor unit 16 are arranged on a radially identical plane, it is possible to reduce the height of the thin motor 100. Further, compared with the method of, for example, increasing the preload of the cross roller bearing 14, it is possible to realize extension of the life of the cross roller bearing 14.

Further, in this embodiment, the resolver 30, the cross roller bearing 14, and the motor unit 16 are arranged in the recited order from the radially inner side on a radially identical plane.

Consequently, since the resolver 30 is arranged on the opposite side of the motor unit 16 across the cross roller bearing 14, the resolver 30 is less easily affected by noise and heat from the motor unit 16 and it is possible to realize high detection accuracy.

Further, in this embodiment, the cross roller bearing 14 is adopted.

Consequently, since it is possible to simultaneously receive moment load, axial load, and radial load, it is possible to reduce a gap change due to the moment load while maintaining rigidity against the axial load and the radial load.

Further, in this embodiment, the resolver 30 includes the annular resolver rotor 18 having an inner circumference decentered with respect to the shaft center of the cross roller bearing 14 and the position detector 20 that is arranged to be opposed to the resolver rotor 18 at the predetermined interval and detects a reluctance change between the position detector 20 and the resolver rotor 18.

In this way, in the resolver 30 of a type in which a fundamental wave component of the reluctance change is one period per one rotation, since the influence of the gap change due to the moment load is large, the reduction in the gap change is effective for prevention of misdetection.

In the first embodiment, the cross roller bearing 14 corresponds to the roller bearing in the inventions 1 to 5, the stator 22 corresponds to the inner-ring supported member of the inventions 1 to 3 or 5, the rotor 12 corresponds to the outer-ring supported member of the invention 1 to 3 or 5, and the resolver 30 corresponds to the rotation sensor of the inventions 1 to 5. The resolver rotor 18 corresponds to the detected member of the invention 3 or 5, the position detector 20 corresponds to the detecting means of the inventions 3 to 5, the motor unit 16 corresponds to the driver of the inventions 2 or 3, the permanent magnet 16a corresponds to the rotor of the invention 3, and the coil 16b corresponds to the stator of the invention 3.

Second Embodiment

Figure 2:
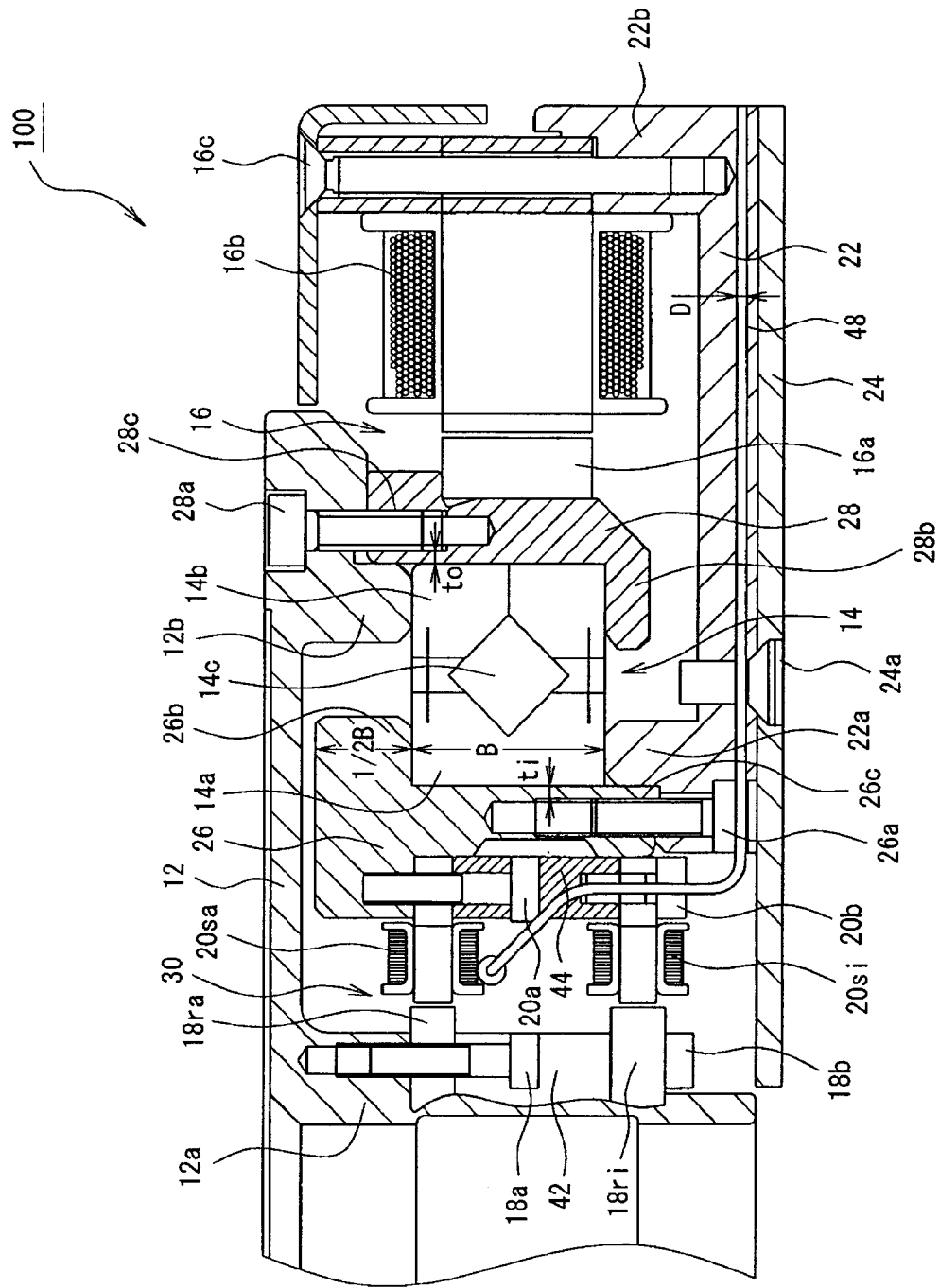
FIG. 2 is a sectional view in the axial direction of the thin motor 100 according to an embodiment of the present invention.
Figure 3:
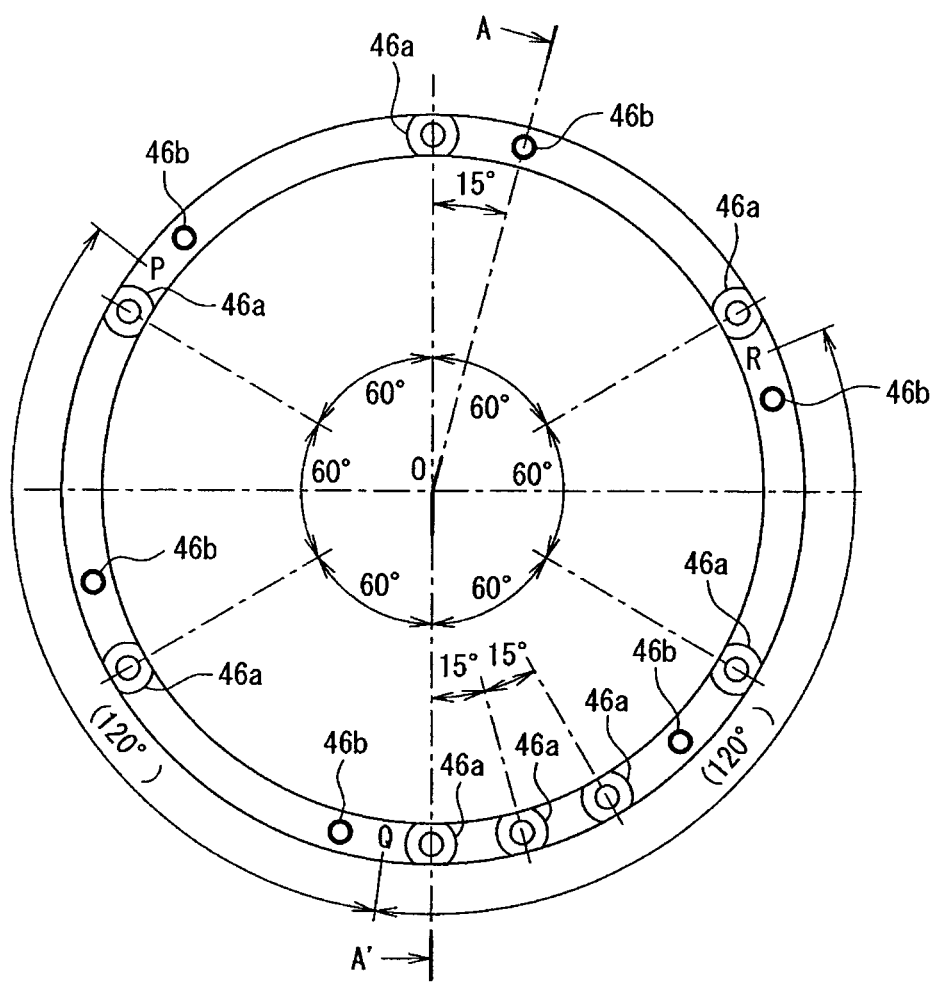
FIG. 3 is a bottom view of an inter-rotor seat 42.

Next, a second embodiment of the present invention is explained with reference to the drawings. FIGS. 2 to 4 are diagrams showing the second embodiment of the roller bearing device having a radial-plane arrangement structure of a rotation sensor according to the present invention.

First, the configuration of the resolver 30 is explained.

FIG. 2 is a sectional view in the axial direction of the thin motor 100 according to this embodiment.

The resolver 30 is a resolver of an outer rotor type including, as shown in FIG. 2, a resolver rotor made of a hollow annular laminated core and a position detector made of an annular laminated core that is arranged to be opposed to the resolver rotor at a predetermined interval and in which plural stator poles are formed at equal intervals in a circumferential direction thereof. In FIG. 2, one resolver 30 (the upper one in the axial direction) is a single-pole resolver of an ABS (Absolute) type that includes an annular resolver rotor 18ra having an inner circumference decentered with respect to the shaft center of the cross roller bearing 14 and a position detector 20sa arranged to be opposed to the resolver rotor 18ra and outputs a single-pole resolver signal in which a fundamental wave component of a reluctance change is one period per one rotation of the resolver rotor 18ra. The other resolver 30 (the lower one in the axial direction) is a multi-pole resolver of an INC (Increment) type that includes the resolver rotor 18*ri* in which plural teeth of a salient pole shape are formed at equal intervals in a circumferential direction thereof and a position detector 20*si* arranged to be opposed to the resolver rotor 18*ri* and outputs a multi-pole resolver signal in which a fundamental wave component of a reluctance change is a multi-period per one rotation of the resolver rotor 18*ri*.

The resolver rotors 18*ra* and 18*ri* are arranged at a very small interval via an inter-rotor seat 42. The resolver rotor 18*ra* is fixed and attached by the bolt 18*a* between the outside edge of the inner wall member 12*a* of the rotor 12 and the upper surface of the inter-rotor seat 42. The resolver rotor 18*ri* is attached to the lower surface of the inter-rotor seat 42 by bolts 18*b*.

FIG. 3 is a bottom view of the inter-rotor seat 42.

FIG. 4 is a sectional view in the axial direction taken along an A-O-A' line in FIG. 3.

In the lower surface of the inter-rotor seat 42, as shown in FIG. 3, bolt holes 46*a* through which the bolts 18*a* are inserted and bolt holes 46*b* through which the bolts 18*b* are inserted are formed. Six bolt holes 46*a* are formed at intervals of 60° in the circumferential direction of the inter-rotor seat 42 and two bolt holes 46*a* are formed at an interval of 15° counterclockwise from the bolt hole 46*a* at the bottom of FIG. 3. The bolt holes 46*b* are respectively formed in positions at 15° clockwise from the bolt holes 46*a* formed at the intervals of 60°.

As shown in FIG. 4, the bolt hole 46*a* pierces through the inter-rotor seat 42 in the axial direction and the depth of counter bore thereof reaches depth of about a half in the axial direction of the inter-rotor seat 42. The depth of the bolt hole 46*b* reaches depth of about a half in the axial direction of the inter-rotor seat 42.

On the other hand, as shown in FIG. 2, the position detectors 20*sa* and 20*si* are arranged at a very small interval via an inter-stator seat 44. The position detector 20*sa* is fixed and attached by the bolt 20*a* between the inside edge of the inner ring clamp 26 and the upper surface of the inter-stator seat 44. The position detector 20*si* is attached to the lower surface of the inter-stator seat 44 by bolts 20*b*. Therefore, the position detectors 20*sa* and 20*si* are fixed to the inside edge side of the inner wall member 22*a* of the stator 22 integrally with the inner ring clamp 26.

Next, the configuration of the stator 22 is explained.

In the stator 22, as shown in FIG. 2, a wiring tube 48 piercing through from the radially inner side to the radially outer side of the stator 22 is formed. Wires of the resolver 30 are housed in the wiring tube 48.

The height D of the wiring tube 48 is set to a value obtained by the following Expression (1) when a diameter of one wire of the resolver 30 is represented as d and a predetermined margin is represented as α (0<α<d):

$$D=2d+\alpha \tag{1}$$

The wires of the resolver 30 include plural wires such as a power line and a ground line. If these wires can be horizontally wired side by side without a twist, d is enough for the height D of the wiring tube. However, actually, the wires cross one another in the axial direction. Therefore, it is desirable to set the height D as 2d+α taking into account height required for the wires to cross once (d).

Next, the configuration of the inner ring clamp 26 and the outer ring clamp 28 is explained.

In the inner ring clamp 26, as shown in FIG. 2, a bolt hole 26*c* through which the bolt 26*a* is inserted is formed. In the first embodiment, the thickness between the outside edge of the inner ring clamp 26 and the inner wall surface of the bolt hole 26*c* is thickness equivalent to length for about three pitches of the bolt hole 26*c*. On the other hand, in this embodiment, thickness ti between the outside edge of the inner ring clamp 26 and the inner wall surface of the bolt hole 26*c* is set to a value in a range of the following Expression (2) when length for one pitch of the bolt hole 26*c* is represented as pi. Therefore, when the bolt 26*a* is screwed into the bolt hole 26*c*, since the outside edge of the inner ring clamp 26 is pushed out to the inner ring 14*a* side to lock the inner ring 14*a*, it is possible to fix the inner ring 14*a* without a gap. Therefore, it is possible to improve detection accuracy.

$$pi<ti<2pi \tag{2}$$

In Expression (2), when the thickness ti is set equal to or larger than 2pi an action of pushing out the outside edge of the inner ring clamp 26 decreases and it is difficult to fix the inner ring 14*a* without a gap. On the other hand, when the thickness ti is set equal to or smaller than pi, it is likely that the inner wall of the bolt hole 26*c* is broken. Therefore, it is desirable to set the thickness ti to a value obtained by the above Expression (2).

In the outer ring clamp 28, as shown in FIG. 2, a bolt hole 28*c* through which the bolt 28*a* is inserted is formed. In the first embodiment, the thickness between the inside edge of the outer ring clamp 28 and the inner wall surface of the bolt hole 28*c* is thickness equivalent to length for about three pitches of the bolt hole 28*c*. On the other hand, in this embodiment, the thickness to between the inside edge of the outer ring clamp 28 and the inner wall surface of the bolt hole 28*c* is set to a value in a range of the following Expression (3) when length for one pitch of the bolt hole 28*c* is represented as po. Therefore, when the bolt 28*a* is screwed into the bolt hole 28*c*, since the inside edge of the outer ring clamp 28 is pushed out to the outer ring 14*b* side to lock the outer ring 14*b*, it is possible to fix the outer ring 14*b* without a gap. Therefore, it is possible to improve detection accuracy.

$$po<to<2po \tag{3}$$

In Expression (3), when the thickness to is set equal to or larger than 2po, an action of pushing out the inside edge of the outer ring clamp 28 decreases and it is difficult to fix the outer ring 14*a* without a gap. On the other hand, when the thickness to is set equal to or smaller than po, it is likely that the inner wall of the bolt hole 28*c* is broken. Therefore, it is desirable to set the thickness to to a value obtained by the above Expression (3).

In the first embodiment, the height of the pressing section 26*b* of the inner ring clamp 26 is about ¼B when the height of the cross roller bearing 14 is represented as B. However, when the height of the pressing section 26*b* of the inner ring clamp 26 is about ¼B, it is likely that the inner ring clamp 26 tilts to the resolver 30 side and a gap of the resolver 30 changes. Therefore, there is a problem in that a rotation angle position of the rotor 12 cannot be accurately detected.

Therefore, in this embodiment, as shown in FIG. 2, the height H of the pressing section 26*b* of the inner ring clamp 26 is set to a value obtained by the following Expression (4):

$$H=\tfrac{1}{2}B \tag{4}$$

Consequently, it is possible to reduce the likelihood that the gap of the resolver 30 changes. Therefore, it is possible to reduce the likelihood that the resolver 30 makes misdetection.

The height of the pressing section 28*b* of the outer ring clamp 28 is set to ¼B.

In this way, in this embodiment, the resolver rotors 18*ra* and 18*ri* are arranged at a very small interval via the inter-rotor seat 42 and respectively attached by the two bolts 18*a* and 18*b*.

Consequently, since the resolver rotors 18*ra* and 18*ri* can be independently fixed, it is possible to adjust each of the positions in the axial direction of the resolver rotors 18*ra* and 18*ri*.

Further, in this embodiment, the position detectors 20*sa* and 20*si* are arranged at a very small interval via the interstator seat 44 and respectively attached by the two bolts 20*a* and 20*b*.

Consequently, since the position detectors 20*sa* and 20*si* can be independently fixed, it is possible to adjust each of the positions in the axial direction of the position detectors 20*sa* and 20*si*.

Further, in this embodiment, the resolver 30 is configured as a resolver of the ABS type and the INC type.

Consequently, it is possible to effectively reduce the influence of the gap change.

Further, in this embodiment, the height D of the wiring tube 48 is set to the value obtained by the above Expression (1).

Consequently, since the height of the wiring tube 48 is reduced, it is possible to reduce the height of the thin motor 100. Since height for the plural wires of the resolver 30 to cross once is allowed, it is possible to reduce the likelihood that workability of housing the wires of the resolver 30 in the wiring tube 48 falls.

Further, in this embodiment, the thickness ti between the outside edge of the inner ring clamp 26 and the inner wall surface of the bolt hole 26*c* is set to the value obtained by the above Expression (2).

Consequently, since it is possible to fix the inner ring 14*a* without a gap, it is possible to improve detection accuracy.

Further, in this embodiment, the thickness to between the inside edge of the outer ring clamp 28 and the inner wall surface of the bolt hole 28*c* is set to a value obtained by the above Expression (3).

Consequently, since it is possible to fix the outer ring 14*b* without a gap, it is possible to improve detection accuracy.

Further, in this embodiment, the height H of the pressing section 26*b* of the inner ring clamp 26 is set to a value obtained by the above Expression (4).

Consequently, since it is possible to reduce the likelihood that a gap of the resolver 30 changes, it is possible to reduce the likelihood that the resolver 30 makes misdetection.

In the second embodiment, the cross roller bearing 14 corresponds to the roller bearing of the inventions 6 to 10, the stator 22 corresponds to the inner-ring supported member of the invention 7, 8, or 10, the rotor 12 corresponds to the outer-ring supported member of the invention 9, and the resolver 30 corresponds to the rotation sensor of the inventions 6 to 10. The resolver rotor 18*ra* corresponds to the first resolver rotor of the invention 6, the resolver rotor 18*ri* corresponds to the second resolver rotor of the invention 6, and the bolts 18*a* and 18*b* correspond to the fixing means of the invention 6.

Modification of the First and Second Embodiments

In the first and second embodiments, the thin motor 100 is configured as an inner rotor type in which the inner side of the thin motor 100 rotates. However, the present invention is not limited to this. The thin motor 100 can also be configured as the outer rotor type in which the outer side of the thin motor 100 rotates. In this case, the rotor 12 is the inner-ring supported member and the stator 22 is the outer-ring supported member.

In the first embodiment, the resolver rotor 18 is attached to the outside edge of the inner wall member 12*a* of the rotor 12 and the position detector 20 is attached to the inside edge of the inner ring clamp 26. However, the present invention is not limited to this. The position detector 20 can also be attached to the outside edge of the inner wall member 12*a* and the resolver rotor 18 can also be attached to the inside edge of the inner ring clamp 26.

In the first embodiment, the resolver 30 of the ABS type in which a fundamental wave component of a reluctance change is one period per one rotation of the rotor 12 is provided. However, the present invention is not limited to this. The resolver of the INC type can also be provided in which plural teeth are formed in a resolver rotor, plural poles are formed in a resolver stator, and a fundamental wave component of a reluctance change is a multi-period per one rotation of the rotor 12. As in the second embodiment, the resolver 30 can also be configured as the resolvers of the ABS type and the INC type.

A tape scale that detects a mark formed in a circumferential direction can be provided instead of the resolver 30.

In the second embodiment, the resolvers of the ABS type and the INC type are provided. However, the present invention is not limited to this. The thin motor 100 can also be configured by only the resolver of the ABS type, can also be configured by only the resolver of the INC type, or can also be configured by the resolver of the ABS/INC integral type that outputs a single-pole resolver signal and a multi-pole resolver signal.

In the first and second embodiments, the inner wall member 22*a* and the outer wall member 22*b* of the stator 22 are formed as a part of the stator 22. However, the present invention is not limited to this. The inner wall member 22*a* or the outer wall member 22*b* of the stator 22 can also be configured by a separate member and attached to the stator 22. The inner ring clamp 26 can also be directly attached to the stator 22 without forming the inner wall member 22*a* of the stator 22. However, in this case, the inner ring clamp 26 configures the inner wall member of the stator 22.

In the first and second embodiments, the inner wall member 12*a* and the outer wall member 12*b* of the rotor 12 are formed as a part of the rotor 12. However, the present invention is not limited to this. The inner wall member 12*a* or the outer wall member 12*b* of the rotor 12 can also be configured by a separate member and attached to the rotor 12. The outer ring clamp 28 can also be directly attached to the rotor 12 without forming the outer wall member 12*b* of the rotor 12. However, in this case, the outer ring clamp 28 configures the outer wall member of the rotor 12.

In the first and second embodiments, the resolver 30, the cross roller bearing 14, and the motor unit 16 are arranged in the recited order from the radially inner side on a radially identical plane. However, the present invention is not limited to this. The arrangement order of the resolver 30, the cross roller bearing 14, and the motor unit 16 can be arbitrary. The motor unit 16 does not have to be arranged on a plane radially identical with the resolver 30 and the cross roller bearing 14.

In the first and second embodiments, the cross roller bearing 14 is applied. However, the present invention is not limited to this. A four-point contact ball bearing, an angular ball bearing, a deep groove ball bearing, a cylindrical roller bearing, a tapered roller bearing, and the like may be applied. In this case, it is desirable to adopt a roller bearing that can simultaneously receive moment load, axial load, and radial load. For example, the four-point contact ball bearing corresponds to such a roller bearing.

In the first and second embodiments, the roller bearing device having a radial-plane arrangement structure of a rotation sensor according to the present invention is applied to the structure for rotatably supporting the stator 22 and the rotor 12. However, the present invention is not limited to this. The roller bearing device can be applied to any structure as long as the structure is interposed between two members and relatively rotatably supports the members.

Third Embodiment

Figure 5:
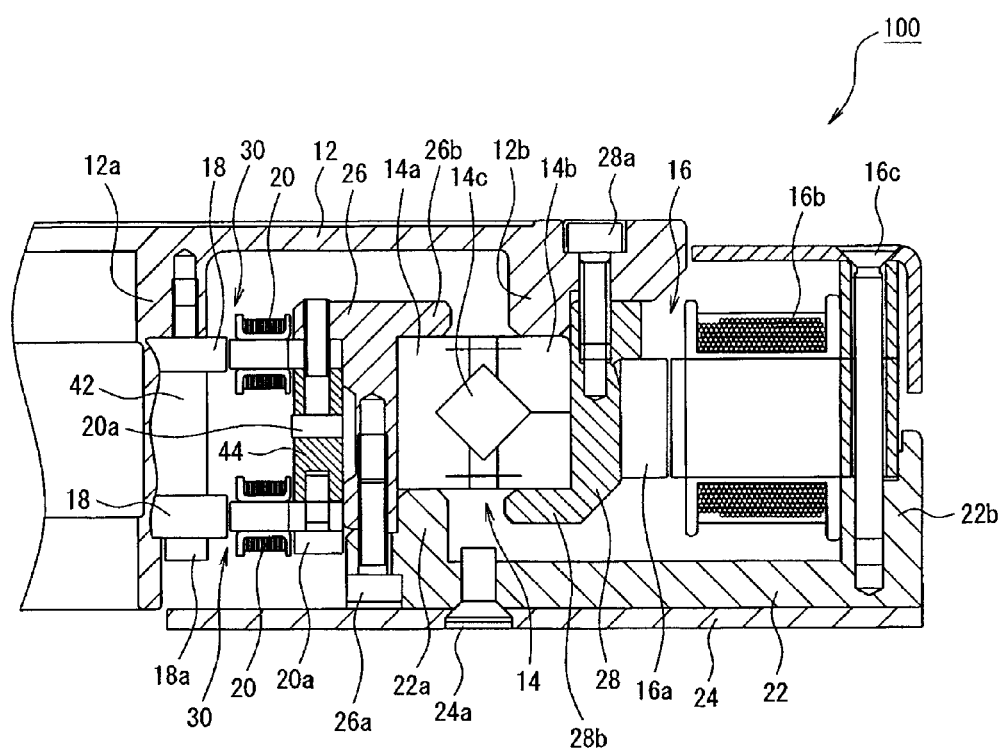
FIG. 5 is a sectional view in the axial direction of the thin motor 100 according to an embodiment of the present invention.
Figure 6:
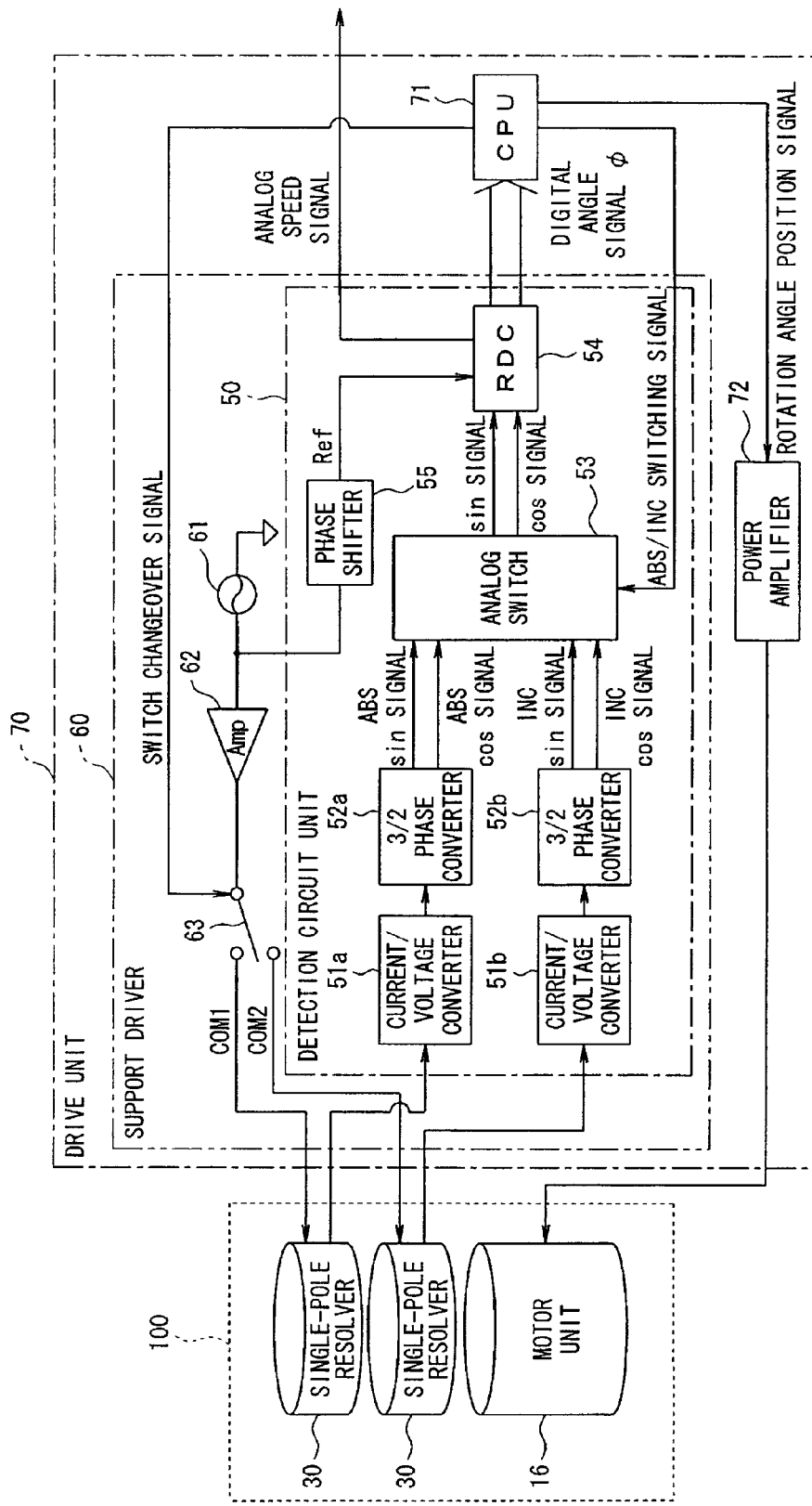
FIG. 6 is a block diagram showing the configuration of a control system for the thin motor 100.

Next, a third embodiment of the present invention is explained with reference to the drawings. FIGS. 5 and 6 are diagrams showing the third embodiment of a roller bearing device having a radial-plane arrangement structure of a complex resolver according to the present invention.

First, the configuration of the thin motor 100 to which the present invention is applied is explained.

FIG. 5 is a sectional view in the axial direction of the thin motor 100 according to this embodiment.

The thin motor 100 includes, as shown in FIG. 5, the stator 22 as a stator, the rotor 12 as a rotor, the cross roller bearing 14 that is interposed between the rotor 12 and the stator 22 and rotatably supports the rotor 12, the motor unit 16 that applies rotation torque to the rotor 12, and the resolver 30 that detects a rotation angle position of the rotor 12. The resolver 30, the cross roller bearing 14, and the motor unit 16 are arranged in the recited order from the radially inner side on a radially identical plane.

In the stator 22, the annular inner wall member 22a projecting upward in the axial direction (the upward direction in FIG. 5) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 5) is formed. Further on the radially outer side than the inner wall member 12a, the annular outer wall member 12b projecting downward in the axial direction is formed. The stator 22 and the rotor 12 are arranged to extend over each other such that the inner wall member 22a of the stator 22 is located between the inner wall member 12a and the outer wall member 12b of the rotor 12 and the outer wall member 12b of the rotor 12 is located between the inner wall member 22a and the outer wall member 22b of the stator 22.

The cross roller bearing 14 includes the inner ring 14a, the outer ring 14b, and the plural cross rollers (rollers) 14c rollably provided between the inner ring 14a and the outer ring 14b. The cross roller 14c is formed in a substantially cylindrical shape having a diameter slightly larger than length. An even number-th rotation axis on a track and an odd number-th rotation axis on the track incline 90° with respect to each other.

The inner ring 14a is fixed to the inner wall member 22a of the stator 22 in a state in which the inner ring 14a is pressed in the axial direction. Specifically, the inner ring 14a is fixed by setting the upper end of the inner wall member 22a of the stator 22 in contact with the lower surface of the inner ring 14a, setting the pressing section 26b of the inner ring clamp 26 in contact with the upper surface of the inner ring 14a, and fastening the inner ring clamp 26 to the inner wall member 22a of the stator 22 with the bolt 26a.

The outer ring 14b is fixed to the outer wall member 12b of the rotor 12 in a state in which the outer ring 14b is pressed in the axial direction. Specifically, the outer ring 14b is fixed by setting the lower end of the outer wall member 12b of the rotor 12 in contact with the upper surface of the outer ring 14b, setting the pressing section 28b of the outer ring clamp 28 in contact with the lower surface of the outer ring 14b, and fastening the outer ring clamp 28 to the outer wall member 12b of the rotor 12 with the bolt 28a.

The stator 22 is fixed to the fixing plate 24 by the bolt 24a and the rotor 12 fits in the outside edge of an output shaft.

The motor unit 16 includes the permanent magnet 16a and the coil 16b arranged to be opposed to the permanent magnet 16a at a predetermined interval. The permanent magnet 16a is attached to the outside edge of the outer ring clamp 28 and fixed to the outside edge side of the outer wall member 12b of the rotor 12 integrally with the outer ring clamp 28. On the other hand, the coil 16b is attached to the outer wall member 22b of the stator 22 by the bolt 16c.

The resolver 30 is a resolver of the outer rotor type including the resolver rotor 18 made of an hollow annular laminated core and the resolver stator 20 made of an annular laminated core that is arranged to be opposed to the resolver rotor 18 at a predetermined interval and in which plural stator poles are formed at equal intervals in the circumferential direction thereof. In FIG. 5, one resolver 30 (the upper one in the axial direction) is a single-pole resolver of the ABS type that includes the annular resolver rotor 18 having an inner circumference decentered with respect to the shaft center of the cross roller bearing 14 and outputs a single-pole resolver signal in which a fundamental wave component of a reluctance change is one period per one rotation of the resolver rotor 18 (in the following explanation, when the resolver 30 indicates the single-pole resolver, the resolver 30 is described as "single-pole resolver 30"). The other resolver 30 (the lower one in the axial direction) is a multi-pole resolver of the INC type that includes the resolver rotor 18 in which plural teeth of a salient pole shape are formed at equal intervals in a circumferential direction thereof and outputs a multi-pole resolver signal in which a fundamental wave component of a reluctance change is a multi-period per one rotation of the resolver rotor 18 (in the following explanation, when the resolver 30 indicates the multi-pole resolver, the resolver 30 is described as "multi-pole resolver 30).

The resolver rotors 18 of the two resolvers 30 are arranged at a very small interval via the inter-rotor seat 42 and attached to the outside edge of the inner wall member 12a of the rotor 12 by the bolt 18a. On the other hand, the resolver stators 20 of the two resolvers 30 are arranged at a very small interval via the inter-stator seat 44, attached to the inside edge of the inner ring clamp 26 by the bolt 20a, and fixed to the inside edge side of the inner wall member 22a of the stator 22 integrally with the inner ring clamp 26.

Next, the configuration of a control system for the thin motor 100 is explained.

FIG. 6 is a block diagram showing the configuration of the control system for the thin motor 100.

As shown in FIG. 6, the control system is configured by a part of a drive unit 70 that controls the thin motor 100.

The drive unit 70 includes a servo driver 60 that supplies an excitation signal to one of the single-pole resolver 30 and the multi-pole resolver 30, captures a resolver signal, and outputs a digital angle signal φ and a CPU 71 that generates a rotation angle position signal from the digital angle signal φ and supplies electric power to the thin motor 100 via a power amplifier 72.

The servo driver 60 amplifies an excitation signal output from an oscillator 61 to a moderate signal level with an amplifier 62, switches a supply path for the excitation signal to one of a common terminal COM1 of the single-pole resolver 30 and a common terminal COM2 of the multi-pole resolver 30 via a changeover switch 63, and supplies the excitation signal.

The changeover switch 63 is switching means that is arranged on the excitation signal supply path from the oscillator 61 to the single-pole resolver 30 and the multi-pole resolver 30 and switches the supply path for the excitation signal to the single-pole resolver 30 and the multi-pole resolver 30. Connection changeover of the changeover switch 63 to the common terminals COM1 and COM2 is controlled according to a switch changeover signal output from the CPU 71.

Immediately after a power supply is turned on and the system is started, the CPU 71 changes over and connects the changeover switch 63 to the common terminal COM1 to thereby supply the excitation signal to the single-pole resolver 30. A current signal output from the single-pole resolver 30 is converted into an ABS signal by a current/voltage converter 51a and then converted into a two-phase signal (a sin signal and a cos signal) by a 3/2-phase converter 52a and supplied to an analog switch 53.

On the other hand, after the CPU 71 acquires a value (abs described later) of the digital angle signal φ from the ABS signal, the CPU 71 changes over and connects the changeover switch 63 to the common terminal COM2 to thereby supply the excitation signal to the multi-pole resolver 30. A current signal output from the multi-pole resolver 30 is converted into an INC signal by a current/voltage converter 51b and then converted into a two-phase signal (a sin signal and a cos signal) by a 3/2-phase converter 52b and supplied to the analog switch 53.

The analog switch 53 is a switch element that is subjected to changeover control by an ABS/INC switching signal from the CPU 71. The analog switch 53 selectively allows one of a two-phase ABS signal and a two-phase INC signal to pass and supplies the signal to a RDC (Resolver Digital Converter) 54. The ABS/INC switching signal is output from the CPU 71 to the analog switch 53 such that timing when the signal that passes the analog switch 53 is switched from the two-phase ABS signal to the two-phase INC signal and timing when a connection destination of the changeover switch 63 is switched from the COM1 to the COM2 substantially synchronize with each other.

A phase shifter 55 supplies, to the RDC 54, a Ref signal obtained by delaying a phase of the excitation signal output from the oscillator 61 and synchronizing the phase with a phase of a carrier signal of the sin signal and the cos signal of the ABS signal or the INC signal converted into two phases.

The RDC 54 digitizes the two-phase signal supplied from the analog switch 53 and outputs the digital angle signal φ to the CPU 71. An analog speed signal after synchronous rectification by an oscillation angle frequency of the oscillator 61 is output from the RDC 54.

Next, operation in this embodiment is explained.

When the coil 16b is energized, rotation torque is applied to the rotor 12 and the rotor 12 rotates.

First, when the supply path is switched by the changeover switch 63 such that the excitation signal is supplied to the single-pole resolver 30, the resolver rotor 18 rotates in synchronization with the rotation of the rotor 12 and reluctance between the resolver rotor 18 and the resolver stator 20 changes according to the rotation of the resolver rotor 18. A single-pole resolver signal in which a fundamental wave component of a reluctance change is one period per one rotation of the resolver rotor 18 is output from the single-pole resolver 30.

When the supply path is switched by the changeover switch 63 such that the excitation signal is supplied to the multi-pole resolver 30, the resolver rotor 18 rotates in synchronization with the rotation of the rotor 12 and reluctance between the resolver rotor 18 and the resolver stator 20 changes according to the rotation of the resolver rotor 18. A multi-pole resolver signal in which a fundamental wave component of a reluctance change is a multi-period per one rotation of the resolver rotor 18 is output from the multi-pole resolver 30.

Therefore, since the single-pole resolver 30 and the multi-pole resolver 30 do not at least simultaneously excited, a leakage flux of one of the single-pole resolver 30 and the multi-pole resolver 30 does not magnetically interfere with the other. In the single-pole resolver 30, the influence of a gap change due to moment load is particularly large, the reduction in the gap change is effective for prevention of misdetection.

In the control system, control of rotating speed and positioning of the motor 16 is performed on the basis of the single-pole resolver signal or the multi-pole resolver signal.

When moment load is applied to the thin motor 100, the thin motor 100 inclines around the cross roller bearing 14. However, since the resolver 30 and the cross roller bearing 14 are arranged on a radially identical plane, it is possible to reduce the gap change of the resolver 30.

Since the resolver 30, the cross roller bearing 14, and the motor unit 16 are arranged on a radially identical plane, it is possible to reduce the height (the length in the axial direction) of the thin motor 100.

Further, since the resolver 30 is arranged on the opposite side of the motor unit 16 across the cross roller bearing 14, the resolver 30 is less easily affected by noise and heat from the motor unit 16.

Further, when a method of, for example, increasing the preload of the cross roller bearing 14 is adopted, whereas the gap change can be suppressed, a deficiency in that the life of the cross roller bearing 14 is shortened is involved. However, in the present invention, since the gap change is reduced by arranging the resolver 30 in a position where the gap change is small, it is possible to realize extension of the life of the cross roller bearing 14.

In this way, in this embodiment, the thin motor 100 includes the cross roller bearing 14 having the inner ring 14a and the outer ring 14b, the stator 22 supported by the inner ring 14a, the rotor 12 supported by the outer ring 14b the motor unit 16 that applies rotation torque to the rotor 12, and the resolver 30 that detects a rotation angle position of the rotor 12. The resolver 30, the cross roller bearing 14, and the motor unit 16 are arranged on a radially identical plane.

Consequently, even if the moment load is applied to the thin motor 100, since the resolver 30 is arranged in the position where the gap change is small, compared with the past, it is possible to reduce the gap change of the resolver 30 and reduce the likelihood that the resolver 30 makes misdetection. Since the resolver 30, the cross roller bearing 14, and the motor unit 16 are arranged on a radially identical plane, it is possible to reduce the height of the thin motor 100. Further, it is possible to realize extension of the life of the cross roller bearing 14 compared with the method of, for example, increasing the preload of the cross roller bearing 14.

Further, in this embodiment, the thin motor 100 includes the single-pole resolver 30 that outputs the single-pole resolver signal in which a fundamental wave component of a reluctance change is one period, the multi-pole resolver 30 that outputs the multi-pole resolver signal in which a fundamental wave component of a reluctance change is a multi-period, the oscillator 61 that outputs the excitation signal, and the changeover switch 63 that switches the supply path for the excitation signal supplied from the oscillator 61 to the single-pole resolver 30 and the multi-pole resolver 30 such that the excitation signal is supplied to a resolver alternatively selected from the single-pole resolver 30 and the multi-pole resolver 30.

Consequently, since a leakage flux of one of the single-pole resolver 30 and the multi-pole resolver 30 does not magnetically interfere with the other, it is possible to arrange the single-pole resolver 30 and the multi-pole resolver 30 near to each other and it is possible to further reduce the height of the thin motor 100.

Further, in this embodiment, the resolver 30, the cross roller bearing 14, and the motor 16 are arranged in the recited order from the radially inner side on a radially identical plane.

Consequently, since the resolver 30 is arranged on the opposite side of the motor unit 16 across the cross roller bearing 14, the resolver 30 is less easily affected by noise and heat from the motor unit 16 and it is possible to realize high detection accuracy.

Further, in this embodiment, the cross roller bearing 14 is adopted.

Consequently, since it is possible to simultaneously receive moment load, axial load, and radial load, it is possible to reduce a gap change due to the moment load while maintaining rigidity against the axial load and the radial load.

In the third embodiment, the cross roller bearing 14 corresponds to the roller bearing of the inventions 11 to 15, the stator 22 corresponds to the inner-ring supported member of the inventions 11 to 13, the rotor 12 corresponds to the outer-ring supported member of the inventions 11 to 13, and the single-pole resolver 30 corresponds to the first resolver of the invention 11, 12, or 15. The multi-pole resolver 30 corresponds to the second resolver of the invention 11, 12, or 15, the changeover switch 63 corresponds to the switching means of the invention 11 or 12, the resolver rotor 18 corresponds to the detected member of the invention 13, and the resolver stator 20 corresponds to the detecting means of the invention 13.

In the third embodiment, the motor unit 16 corresponds to the driver of the invention 12 or 13, the permanent magnet 16a corresponds to the rotor of the invention 13, and the coil 16b corresponds to the stator of the invention 13.

Fourth Embodiment

Figure 7:
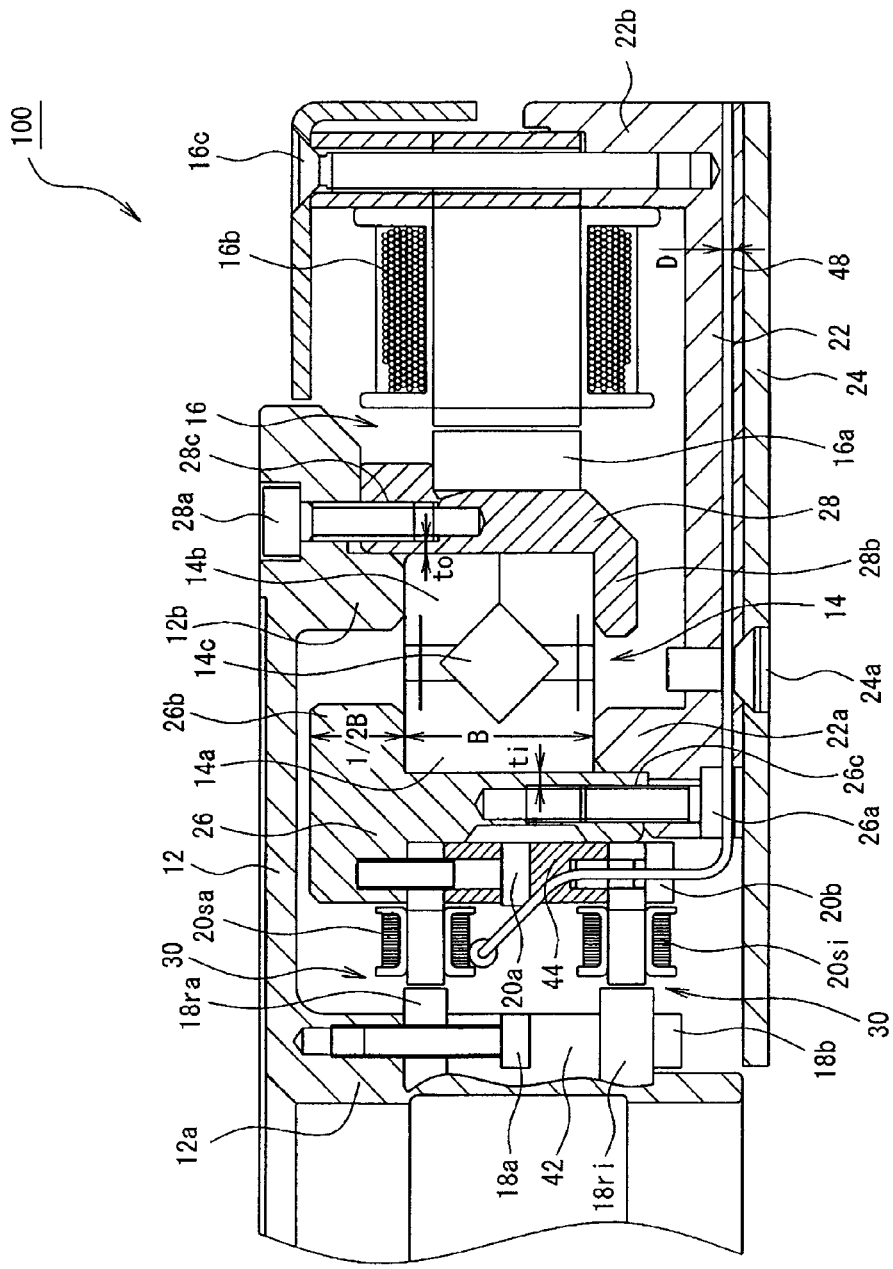
FIG. 7 is a sectional view in the axial direction of the thin motor 100 according to an embodiment of the present invention.
Figure 8:
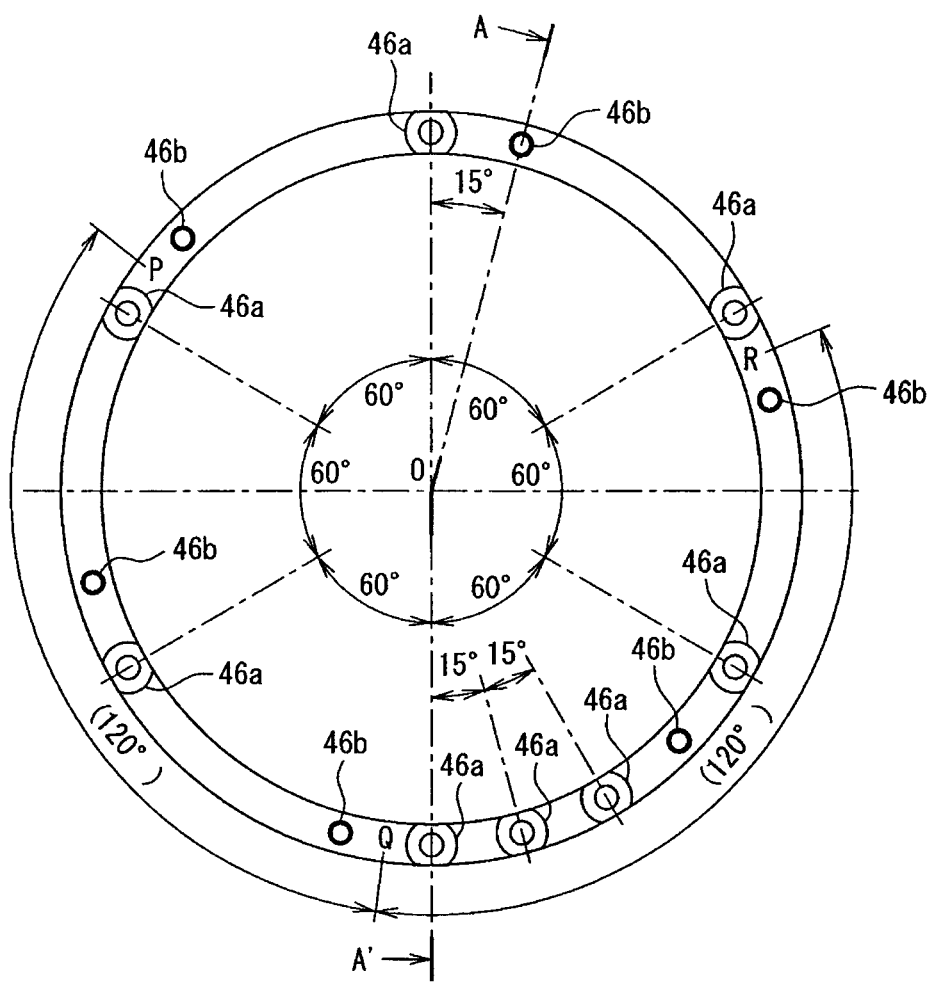
FIG. 8 is a bottom view of the inter-rotor seat 42.

Next, a fourth embodiment of the present invention is explained with reference to the drawings. FIGS. 7 to 9 are diagrams showing the fourth embodiment of the roller bearing device having a radial-plane arrangement structure of a complex resolver according to the present invention.

First, the configuration of the resolver 30 is explained.

FIG. 7 is a sectional view in the axial direction of the thin motor 100 according to this embodiment. The resolver 30 is a resolver of the outer rotor type including, as shown in FIG. 7, a resolver rotor made of a hollow annular laminated core and a resolver stator made of an annular laminated core that is arranged to be opposed to the resolver rotor at a predetermined interval and in which plural stator poles are formed at equal intervals in a circumferential direction thereof. In FIG. 7, one resolver 30 (the upper one in the axial direction) is a single-pole resolver of the ABS type that includes the annular resolver rotor 18ra having an inner circumference decentered with respect to the shaft center of the cross roller bearing 14 and the resolver stator 20sa arranged to be opposed to the resolver rotor 18ra and outputs a single-pole resolver signal in which a fundamental wave component of a reluctance change is one period per one rotation of the resolver rotor 18ra. The other resolver 30 (the lower one in the axial direction) is a multi-pole resolver of the INC type that includes the resolver rotor 18ri in which the plural teeth of a salient pole shape are formed at equal intervals in the circumferential direction thereof and the resolver stator 20si arranged to be opposed to the resolver rotor 18ri and outputs a multi-pole resolver signal in which a fundamental wave component of a reluctance change is a multi-period per one rotation of the resolver rotor 18ri.

The resolver rotors 18ra and 18ri are arranged at a very small interval via the inter-rotor seat 42. The resolver rotor 18ra is fixed and attached by the bolt 18a between the outside edge of the inner wall member 12a of the rotor 12 and the upper surface of the inter-rotor seat 42. The resolver rotor 18ri is attached to the lower surface of the inter-rotor seat 42 by the bolt 18b.

FIG. 8 is a bottom view of the inter-rotor seat 42.

FIG. 9 is a sectional view in the axial direction taken along an A-O-A' line in FIG. 8.

In the lower surface of the inter-rotor seat 42, as shown in FIG. 8, the bolt holes 46a through which the bolts 18a are inserted and the bolt holes 46b through which the bolts 18b are inserted are formed. Six bolt holes 46a are formed at intervals of 60° in the circumferential direction of the inter-rotor seat 42 and two bolt holes 46a are formed at an interval of 15° counterclockwise from the bolt hole 46a at the bottom of FIG. 8. The bolt holes 46b are respectively formed in positions at 15° clockwise from the bolt holes 46a formed at the intervals of 60°.

As shown in FIG. 9, the bolt hole 46a pierces through the inter-rotor seat 42 in the axial direction and the depth of counter bore thereof reaches depth of about a half in the axial direction of the inter-rotor seat 42. The depth of the bolt hole 46b reaches depth of about a half in the axial direction of the inter-rotor seat 42.

On the other hand, as shown in FIG. 7, the resolver stators 20sa and 20si are arranged at a very small interval via an inter-stator seat 44. The resolver stator 20sa is fixed and attached by the bolt 20a between the inside edge of the inner ring clamp 26 and the upper surface of the inter-stator seat 44. The resolver stator 20si is attached to the lower surface of the inter-stator seat 44 by the bolt 20b. Therefore, the resolver stators 20sa and 20si are fixed to the inside edge side of the inner wall member 22a of the stator 22 integrally with the inner ring clamp 26.

Next, the configuration of the stator 22 is explained.

In the stator 22, as shown in FIG. 7, the wiring tube 48 piercing through from the radially inner side to the radially outer side of the stator 22 is formed. The wires of the resolver 30 are housed in the wiring tube 48.

The height D of the wiring tube 48 is set to a value obtained by the following Expression (5) when a diameter of one wire of the resolver 30 is represented as d and a predetermined margin is represented as α (0<α<d):

$$D=2d+\alpha \quad (5)$$

The wires of the resolver 30 include plural wires such as a power line and a ground line. If these wires can be horizontally wired side by side without a twist, d is enough for the height D of the wiring tube. However, actually, the wires cross one another in the axial direction. Therefore, it is desirable to set the height D as 2d+α taking into account height required for the wires to cross once (d).

Next, the configuration of the inner ring clamp 26 and the outer ring clamp 28 is explained.

In the inner ring clamp 26, as shown in FIG. 7, the bolt hole 26c through which the bolt 26a is inserted is formed. In the third embodiment, the thickness between the outside edge of the inner ring clamp 26 and the inner wall surface of the bolt hole 26c is thickness equivalent to length for about three pitches of the bolt hole 26c. On the other hand, in this embodiment, thickness ti between the outside edge of the inner ring clamp 26 and the inner wall surface of the bolt hole 26c is set to a value in a range of the following Expression (6) when length for one pitch of the bolt hole 26c is represented as pi. Therefore, when the bolt 26a is screwed into the bolt hole 26c, since the outside edge of the inner ring clamp 26 is pushed out to the inner ring 14a side to lock the inner ring 14a, it is possible to fix the inner ring 14a without a gap. Therefore, it is possible to improve detection accuracy.

$$pi < ti < 2pi \quad (6)$$

In Expression (6), when the thickness ti is set equal to or larger than 2pi, an action of pushing out the outside edge of the inner ring clamp 26 decreases and it is difficult to fix the inner ring 14a without a gap. On the other hand, when the thickness ti is set equal to or smaller than pi, it is likely that the inner wall of the bolt hole 26c is broken. Therefore, it is desirable to set the thickness ti to a value obtained by the above Expression (6).

In the outer ring clamp 28, as shown in FIG. 7, the bolt hole 28c through which the bolt 28a is inserted is formed. In the third embodiment, the thickness between the inside edge of the outer ring clamp 28 and the inner wall surface of the bolt hole 28c is thickness equivalent to length for about three pitches of the bolt hole 28c. On the other hand, in this embodiment, the thickness to between the inside edge of the outer ring clamp 28 and the inner wall surface of the bolt hole 28c is set to a value in a range of the following Expression (7) when length for one pitch of the bolt hole 28c is represented as po. Therefore, when the bolt 28a is screwed into the bolt hole 28c, since the inside edge of the outer ring clamp 28 is pushed out to the outer ring 14b side to lock the outer ring 14b, it is possible to fix the outer ring 14b without a gap. Therefore, it is possible to improve detection accuracy.

$$po < to < 2po \quad (7)$$

In Expression (7), when the thickness to is set equal to or larger than 2po, an action of pushing out the inside edge of the outer ring clamp 28 decreases and it is difficult to fix the outer ring 14a without a gap. On the other hand, when the thickness to is set equal to or smaller than po, it is likely that the inner wall of the bolt hole 28c is broken. Therefore, it is desirable to set the thickness to a value obtained by the above Expression (7).

In the third embodiment, the height of the pressing section 26b of the inner ring clamp 26 is about ¼B when the height of the cross roller bearing 14 is represented as B. However, when the height of the pressing section 26b of the inner ring clamp 26 is about ¼B, it is likely that the inner ring clamp 26 tilts to the resolver 30 side and a gap of the resolver 30 changes. Therefore, there is a problem in that a rotation angle position of the rotor 12 cannot be accurately detected.

Therefore, in this embodiment, as shown in FIG. 7, the height H of the pressing section 26b of the inner ring clamp 26 is set to a value obtained by the following Expression (8):

$$H = \tfrac{1}{2}B \quad (8)$$

Consequently, it is possible to reduce the likelihood that the gap of the resolver 30 changes. Therefore, it is possible to reduce the likelihood that the resolver 30 makes misdetection.

The height of the pressing section 28b of the outer ring clamp 28 is set to ¼B.

In this way, in this embodiment, the resolver rotors 18ra and 18ri are arranged at a very small interval via the inter-rotor seat 42 and respectively attached by the two bolts 18a and 18b.

Consequently, since the resolver rotors 18ra and 18ri can be independently fixed, it is possible to adjust each of the positions in the axial direction of the resolver rotors 18ra and 18ri.

Further, in this embodiment, the resolver stators 20sa and 20si are arranged at a very small interval via the inter-stator seat 44 and respectively attached by the two bolts 20a and 20b.

Consequently, since the resolver stators 20sa and 20si can be independently fixed, it is possible to adjust each of the positions in the axial direction of the resolver stators 20sa and 20si.

Further, in this embodiment, the resolver 30 is configured as the resolvers of the ABS type and the INC type.

Consequently, it is possible to effectively reduce the influence of the gap change.

Further, in this embodiment, the height D of the wiring tube 48 is set to the value obtained by the above Expression (5).

Consequently, since the height of the wiring tube 48 is reduced, it is possible to reduce the height of the thin motor 100. Since height for the plural wires of the resolver 30 to cross once is allowed, it is possible to reduce the likelihood that workability of housing the wires of the resolver 30 in the wiring tube 48 falls.

Further, in this embodiment, the thickness ti between the outside edge of the inner ring clamp 26 and the inner wall surface of the bolt hole 26c is set to the value obtained by the above Expression (6).

Consequently, since it is possible to fix the inner ring 14a without a gap, it is possible to improve detection accuracy.

Further, in this embodiment, the thickness to between the inside edge of the outer ring clamp 28 and the inner wall surface of the bolt hole 28c is set to a value obtained by the above Expression (7).

Consequently, since it is possible to fix the outer ring 14b without a gap, it is possible to improve detection accuracy.

Further, in this embodiment, the height H of the pressing section 26b of the inner ring clamp 26 is set to a value obtained by the above Expression (8).

Consequently, since it is possible to reduce the likelihood that a gap of the resolver 30 changes, it is possible to reduce the likelihood that the resolver 30 makes misdetection.

In the fourth embodiment, the cross roller bearing 14 corresponds to the roller bearing of the inventions 16 to 20, the stator 22 corresponds to the inner-ring supported member of the invention 17, 18, or 20, the rotor 12 corresponds to the outer-ring supported member of the invention 19, and the resolver 30 corresponds to the rotation sensor of the inventions 17 or 20. The resolver rotor 18ra corresponds to the first resolver rotor of the invention 16, the resolver rotor 18ri corresponds to the second resolver rotor of the invention 16, and the bolts 18a and 18b correspond to the fixing means of the invention 16.

Modification of the Third and Fourth Embodiments

In the third embodiment, the resolver 30, the cross roller bearing 14, and the motor unit 16 are arranged in the recited order from the radially inner side on a radially identical plane. However, the present invention is not limited to this. The arrangement order of the resolver 30, the cross roller bearing 14, and the motor unit 16 can be arbitrary. For example, five configurations explained below can be adopted.

First, a first configuration is explained.

Figure 10:
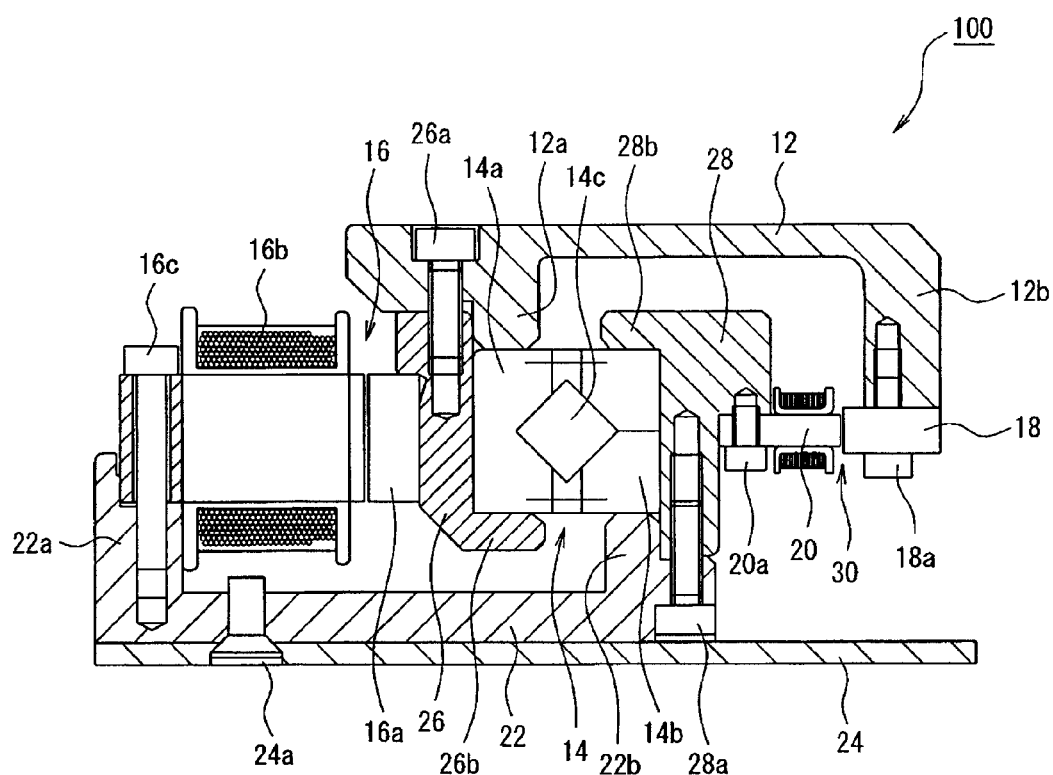
FIG. 10 is a sectional view in the axial direction of the thin motor 100 in which a motor unit 16, a cross roller bearing 14, and a resolver 30 are arranged in the recited order from the radially inner side on a radially identical plane from the radially inner side.

FIG. 10 is a sectional view in the axial direction of the thin motor 100 in which the motor unit 16, the cross roller bearing 14, and the resolver 30 are arranged in the recited order from the radially inner side on a radially identical plane.

As shown in FIG. 10, the motor unit 16, the cross roller bearing 14, and the resolver 30 are arranged in the recited order from the radially inner side on a radially identical plane.

In the stator 22, the annular inner wall member 22a projecting upward in the axial direction (the upward direction in FIG. 10) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 10) is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner ring 14a is fixed to the inner wall member 12a of the rotor 12 in a state in which the inner ring 14a is pressed in the axial direction. Specifically, the inner ring 14a is fixed by setting the lower end of the inner wall member 12a of the rotor 12 in contact with the upper surface of the inner ring 14a, setting the pressing section 26b of the inner ring clamp 26 in contact with the lower surface of the inner ring 14a, and fastening the inner ring clamp 26 to the inner wall member 12a of the rotor 12 with the bolt 26a.

The outer ring 14b is fixed to the outer wall member 22b of the stator 22 in a state in which the outer ring 14b is pressed in the axial direction. Specifically, the outer ring 14b is fixed by setting the upper end of the outer wall member 22b of the stator 22 in contact with the lower surface of the outer ring 14b, setting the pressing section 28b of the outer ring clamp 28 in contact with the upper surface of the outer ring 14b, and fastening the outer ring clamp 28 to the outer wall member 22b of the stator 22 with the bolt 28a.

The permanent magnet 16a is attached to the inside edge of the inner ring clamp 26 and fixed to the inside edge side of the inner wall member 12a of the rotor 12 integrally with the inner ring clamp 26. On the other hand, the coil 16b is attached to the outside edge of the inner wall member 22a of the stator 22 by the bolt 16c.

The resolver 30 is a resolver of the ABS/INC integral type that outputs a single-pole resolver signal and a multi-pole resolver signal. The resolver 30 has a function equivalent to that of the resolver 30 in the third and fourth embodiments except that the resolver 30 is integrally configured. The resolver rotor 18 is attached to the outer wall member 12b of the rotor 12 by the bolt 18a. On the other hand, the resolver stator 20 is attached to the outside edge of the outer ring clamp 28 by the bolt 20a and fixed to the outside edge side of the outer wall member 22b of the stator 22 integrally with the outer ring clamp 28.

In this way, in the first configuration, the motor unit 16, the cross roller bearing 14, and the resolver 30 are arranged in the recited order from the radially inner side on a radially identical plane.

Consequently, besides the effect of reducing the likelihood of misdetection of the resolver 30 and the effect of realizing extension of the life of the cross roller bearing 14, since the resolver 30 is arranged on the opposite side of the motor unit 16 across the cross roller bearing 14, the resolver 30 is less easily affected by noise and heat from the motor unit 16 and it is possible to realize high detection accuracy. Since the resolver 30 is arranged on the radially outermost side, the diameter of the resolver 30 can be increased. Therefore, it is possible to stabilize accuracy, for example, during die machining and realize higher detection accuracy.

Next, a second configuration is explained.

Figure 11:
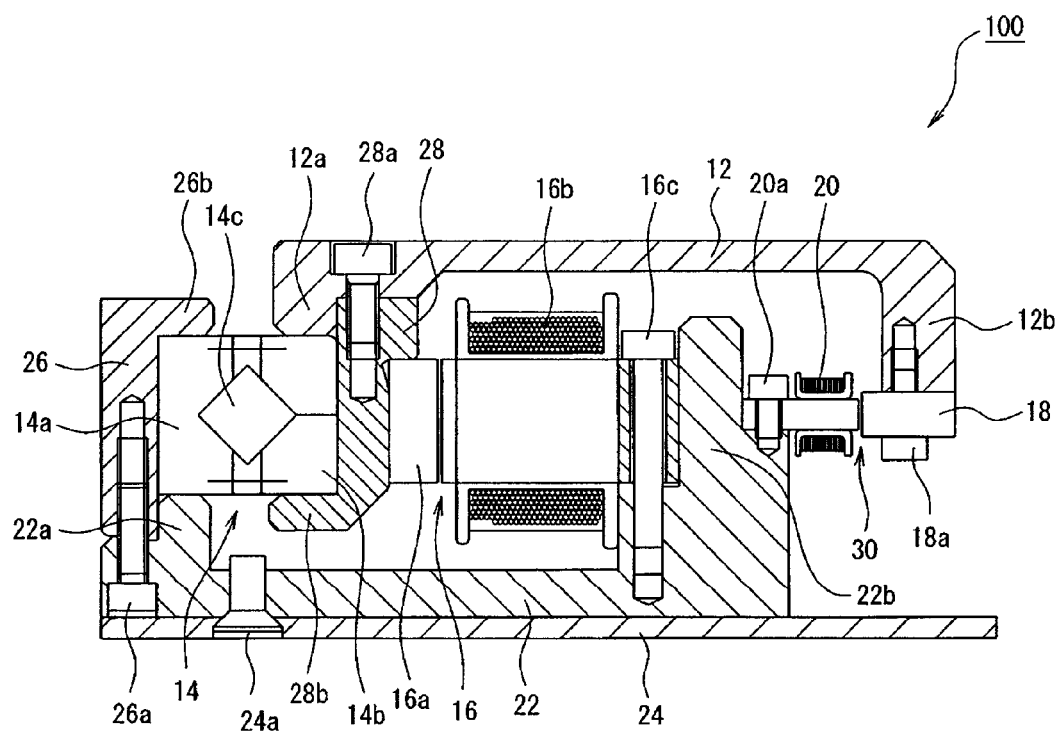
FIG. 11 is a sectional view in the axial direction of the thin motor 100 in which the cross roller bearing 14, the motor unit 16, and the resolver 30 are arranged in the recited order from the radially inner side on a radially identical plane.

FIG. 11 is a sectional view in the axial direction of the thin motor 100 in which the cross roller bearing 14, the motor unit 16, and the resolver 30 are arranged in the recited order from the radially inner side on a radially identical plane.

As shown in FIG. 11, the cross roller bearing 14, the motor unit 16, and the resolver 30 are arranged in the recited order from the radially inner side on a radially identical plane.

In the stator 22, the annular inner wall member 22a projecting upward in the axial direction (the upward direction in FIG. 11) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 11) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner ring 14a is fixed to the inner wall member 22a of the stator 22 in a state in which the inner ring 14a is pressed in the axial direction. Specifically, the inner ring 14a is fixed by setting the upper end of the inner wall member 22a of the stator 22 in contact with the lower surface of the inner ring 14a, setting the pressing section 26b of the inner ring clamp 26 in contact with the upper surface of the inner ring 14a, and fastening the inner ring clamp 26 to the inner wall member 22a of the stator 22 with the bolt 26a.

The outer ring 14b is fixed to the inner wall member 12a of the rotor 12 in a state in which the outer ring 14b is pressed in the axial direction. Specifically, the outer ring 14b is fixed by setting the lower end of the inner wall member 12a of the rotor 12 in contact with the upper surface of the outer ring 14b, setting the pressing section 28b of the outer ring clamp 28 in contact with the lower surface of the outer ring 14b, and fastening the outer ring clamp 28 to the inner wall member 12a of the rotor 12 with the bolt 28a.

The permanent magnet 16a is attached to the outside edge of the outer ring clamp 28 and fixed to the outside edge side of the inner wall member 12a of the rotor 12 integrally with the outer ring clamp 28. On the other hand, the coil 16b is attached to the inside edge of the outer wall member 22b of the stator 22 by the bolt 16c.

The resolver 30 is a resolver of the ABS/INC integral type that outputs a single-pole resolver signal and a multi-pole resolver signal. The resolver 30 has a function equivalent to that of the resolver 30 in the third and fourth embodiments except that the resolver 30 is integrally configured. The resolver rotor 18 is attached to the outer wall member 12b of the rotor 12 by the bolt 18a. On the other hand, the resolver stator 20 is attached to the outside edge of the outer wall member 22b of the stator 22 by the bolt 20a.

In this way, in the second configuration, the cross roller bearing 14, the motor unit 16, and the resolver 30 are arranged in the recited order from the radially inner side on a radially identical plane.

Consequently, besides the effect of reducing the likelihood of misdetection of the resolver 30 and the effect of realizing extension of the life of the cross roller bearing 14, since the resolver 30 is arranged on the radially outermost side, the diameter of the resolver 30 can be increased, it is possible to stabilize accuracy, for example, during die machining and realize higher detection accuracy. Since the cross roller bearing 14 is arranged on the radially innermost side, it is possible to reduce the height of the thin motor 100 by reducing the size of the cross roller bearing 14. Wiring to the motor unit 16 or the resolver 30 is easy and grease of the cross roller bearing 14 less easily leaks.

Next, a third configuration is explained.

FIG. 12 is a sectional view in the axial direction of the thin motor 100 in which the cross roller bearing 14, the resolver 30, and the motor unit 16 are arranged in the recited order from the radially inner side on a radially identical plane.

As shown in FIG. 12, the cross roller bearing 14, the resolver 30, and the motor unit 16 are arranged in the recited order from the radially inner side on a radially identical plane.

In the stator 22, the annular inner wall member 22a projecting upward in the axial direction (the upward direction in FIG. 12) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 12) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner ring 14a is fixed to the inner wall member 22a of the stator 22 in a state in which the inner ring 14a is pressed in the axial direction. Specifically, the inner ring 14a is fixed by setting the upper end of the inner wall member 22a of the stator 22 in contact with the lower surface of the inner ring 14a, setting the pressing section 26b of the inner ring clamp 26 in contact with the upper surface of the inner ring 14a, and fastening the inner ring clamp 26 to the inner wall member 22a of the stator 22 with the bolt 26a.

The outer ring 14b is fixed to the inner wall member 12a of the rotor 12 in a state in which the outer ring 14b is pressed in the axial direction. Specifically, the outer ring 14b is fixed by setting the lower end of the inner wall member 12a of the rotor 12 in contact with the upper surface of the outer ring 14b, setting the pressing section 28b of the outer ring clamp 28 in contact with the lower surface of the outer ring 14b, and fastening the outer ring clamp 28 to the inner wall member 12a of the rotor 12 with the bolt 28a.

The permanent magnet 16a is attached to the inside edge of the outer wall member 12b of the rotor 12. On the other hand, the coil 16b is attached to the outside edge of the outer wall member 22b of the stator 22 by the bolt 16c.

The resolver 30 is a resolver of the ABS/INC integral type that outputs a single-pole resolver signal and a multi-pole resolver signal. The resolver 30 has a function equivalent to that of the resolver 30 in the third and fourth embodiments except that the resolver 30 is integrally configured. The resolver rotor 18 is attached to the outside edge of the outer ring clamp 28 by the bolt 18a and fixed to the outside edge side of the inner wall member 12a of the rotor 12 integrally with the outer ring clamp 28. On the other hand, the resolver stator 20 is attached to the inside edge of the outer wall member 22b of the stator 22 by the bolt 20a.

In this way, in the third configuration, the cross roller bearing 14, resolver 30, and the motor unit 16 are arranged in the recited order from the radially inner side on a radially identical plane.

Consequently, besides the effect of reducing the likelihood of misdetection of the resolver 30 and the effect of realizing extension of the life of the cross roller bearing 14, since the cross roller bearing 14 is arranged on the radially innermost side, it is possible to reduce the height of the thin motor 100 by reducing the size of the cross roller bearing 14. Wiring to the motor unit 16 or the resolver 30 is easy and grease of the cross roller bearing 14 less easily leaks. Since the motor unit 16 is arranged on the radially outermost side, it is possible to secure a large space for winding wires and realize high output torque. Further, it is possible to increase the number of poles of the motor unit 16 and realize operation at low speed to ultra-low speed.

Next, a fourth configuration is explained.

Figure 13:
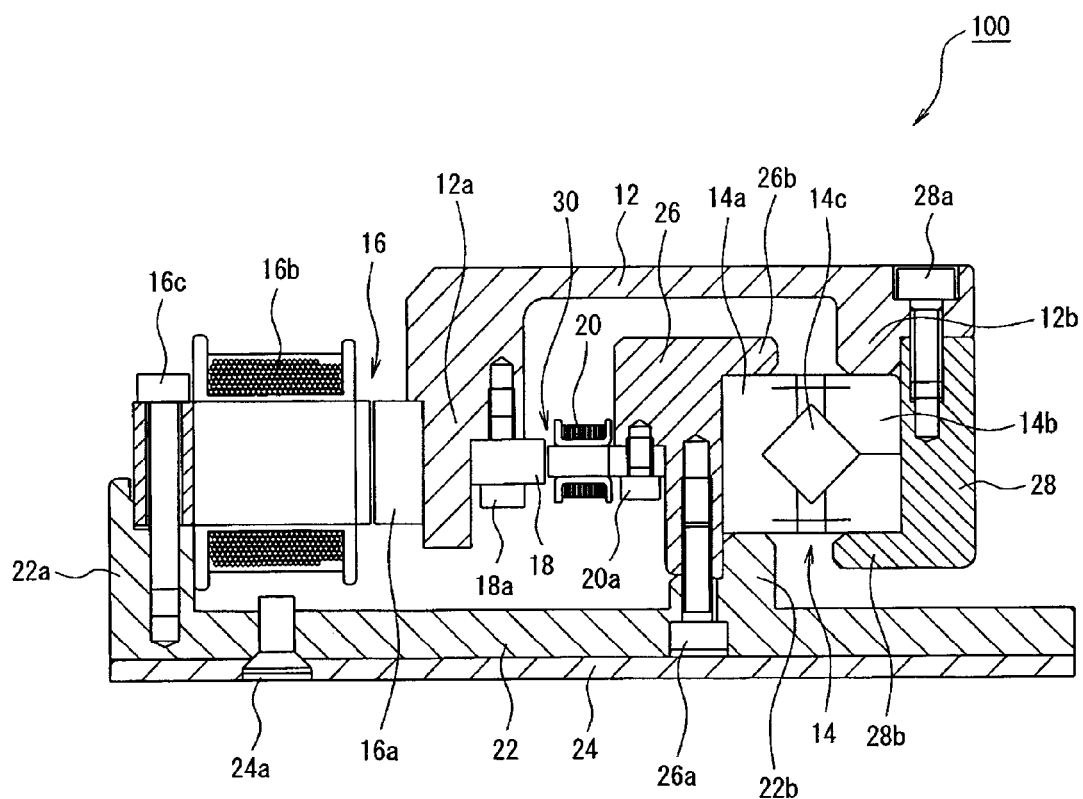
FIG. 13 is a sectional view in the axial direction of the thin motor 100 in which the motor unit 16, the resolver 30, and the cross roller bearing 14 are arranged in the recited order from the radially inner side on a radially identical plane.

FIG. 13 is a sectional view in the axial direction of the thin motor 100 in which the motor unit 16, the resolver 30, and the cross roller bearing 14 are arranged in the recited order from the radially inner side on a radially identical plane.

As shown in FIG. 13, the motor unit 16, the resolver 30, and the cross roller bearing 14 are arranged in the recited order from the radially inner side on a radially identical plane.

In the stator 22, the annular inner wall member 22a projecting upward in the axial direction (the upward direction in FIG. 13) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 13) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner ring 14a is fixed to the outer wall member 22b of the stator 22 in a state in which the inner ring 14a is pressed in the axial direction. Specifically, the inner ring 14a is fixed by setting the upper end of the outer wall member 22b of the stator 22 in contact with the lower surface of the inner ring 14a, setting the pressing section 26b of the inner ring clamp 26 in contact with the upper surface of the inner ring 14a, and fastening the inner ring clamp 26 to the outer wall member 22b of the stator 22 with the bolt 26a.

The outer ring 14b is fixed to the outer wall member 12b of the rotor 12 in a state in which the outer ring 14b is pressed in the axial direction. Specifically, the outer ring 14b is fixed by setting the lower end of the outer wall member 12b of the rotor 12 in contact with the upper surface of the outer ring 14b, setting the pressing section 28b of the outer ring clamp 28 in contact with the lower surface of the outer ring 14b, and fastening the outer ring clamp 28 to the outer wall member 12b of the rotor 12 with the bolt 28a.

The permanent magnet 16a is attached to the inside edge of the inner wall member 12a of the rotor 12. On the other hand, the coil 16b is attached to the outside edge of the inner wall member 22a of the stator 22 by the bolt 16c.

The resolver 30 is a resolver of the ABS/INC integral type that outputs a single-pole resolver signal and a multi-pole resolver signal. The resolver 30 has a function equivalent to that of the resolver 30 in the third and fourth embodiments except that the resolver 30 is integrally configured. The resolver rotor 18 is attached to the outside edge of the inner wall member 12a of the rotor 12 by the bolt 18a. On the other hand, the resolver stator 20 is attached to the inside edge of the inner ring clamp 26 by the bolt 20a and fixed to the inside edge side of the outer wall member 22b of the stator 22 integrally with the inner ring clamp 26.

In this way, in the fourth configuration, the motor unit 16, the resolver 30, and the cross roller bearing 14 are arranged in the recited order from the radially inner side on a radially identical plane.

Consequently, besides the effect of reducing the likelihood of misdetection of the resolver 30 and the effect of realizing extension of the life of the cross roller bearing 14, since the cross roller bearing 14 is arranged on the radially outermost side, it is possible to house the cross roller bearing 14 having a large diameter and realize high rigidity.

Next, a fifth configuration is explained.

Figure 14:
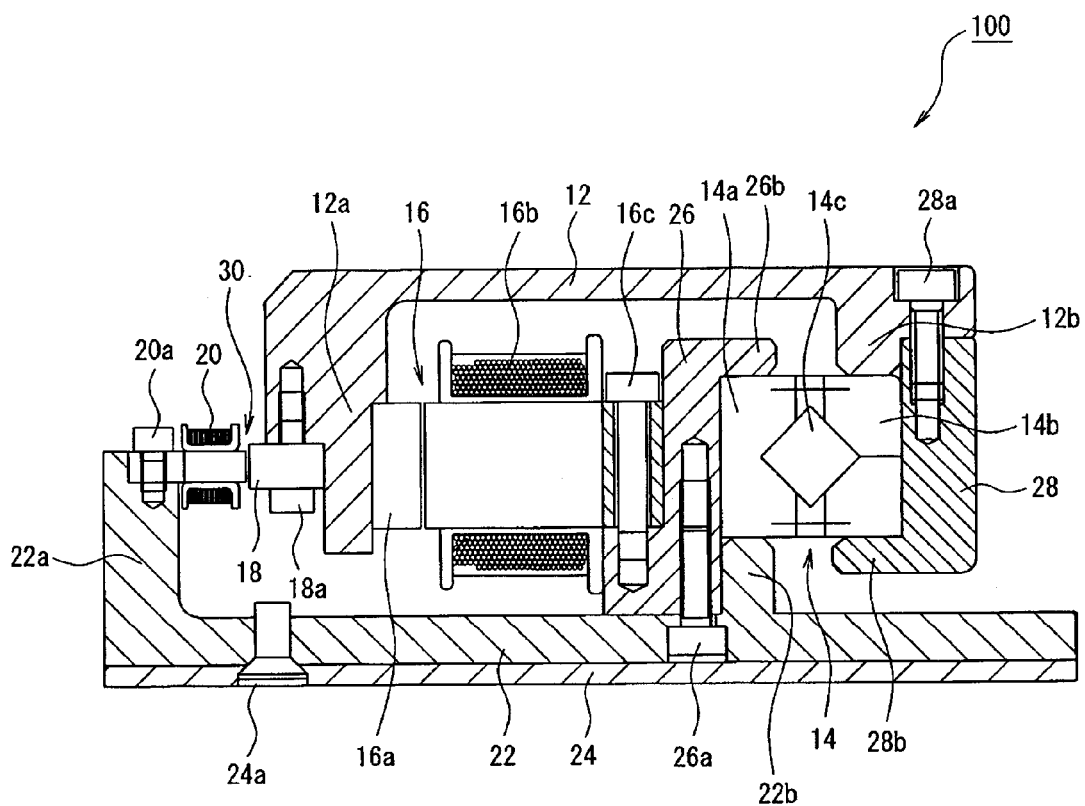
FIG. 14 is a sectional view in the axial direction of the thin motor 100 in which the resolver 30, the motor unit 16, and the cross roller bearing 14 are arranged in the recited order from the radially inner side on a radially identical plane.

FIG. 14 is a sectional view in the axial direction of the thin motor 100 in which the resolver 30, the motor unit 16, and the cross roller bearing 14 are arranged in the recited order from the radially inner side on a radially identical plane.

As shown in FIG. 14, the resolver 30, the motor unit 16, and the cross roller bearing 14 are arranged in the recited order from the radially inner side on a radially identical plane.

In the stator 22, the annular inner wall member 22a projecting upward in the axial direction (the upward direction in FIG. 14) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 14) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner ring 14a is fixed to the outer wall member 22b of the stator 22 in a state in which the inner ring 14a is pressed in the axial direction. Specifically, the inner ring 14a is fixed by setting the upper end of the outer wall member 22b of the stator 22 in contact with the lower surface of the inner ring 14a, setting the pressing section 26b of the inner ring clamp 26 in contact with the upper surface of the inner ring 14a, and fastening the inner ring clamp 26 to the outer wall member 22b of the stator 22 with the bolt 26a.

The outer ring 14b is fixed to the outer wall member 12b of the rotor 12 in a state in which the outer ring 14b is pressed in the axial direction. Specifically, the outer ring 14b is fixed by setting the lower end of the outer wall member 12b of the rotor 12 in contact with the upper surface of the outer ring 14b, setting the pressing section 28b of the outer ring clamp 28 in contact with the lower surface of the outer ring 14b, and fastening the outer ring clamp 28 to the outer wall member 12b of the rotor 12 with the bolt 28a.

The permanent magnet 16a is attached to the outside edge of the inner wall member 12a of the rotor 12. On the other hand, the coil 16b is attached to the inside edge of the inner ring clamp 26 by the bolt 16c and fixed to the inside edge side of the outer wall member 22b of the stator 22 integrally with the inner ring clamp 26.

The resolver 30 is a resolver of the ABS/INC integral type that outputs a single-pole resolver signal and a multi-pole resolver signal. The resolver 30 has a function equivalent to that of the resolver 30 in the third and fourth embodiments except that the resolver 30 is integrally configured. The resolver rotor 18 is attached to the inside edge of the inner wall member 12a of the rotor 12 by the bolt 18a. On the other hand, the resolver stator 20 is attached to the outside edge of the inner wall member 22a of the stator 22 by the bolt 20a.

In this way, in the fifth configuration, the resolver 30, the motor unit 16, and the cross roller bearing 14 are arranged in the recited order from the radially inner side on a radially identical plane.

Consequently, besides the effect of reducing the likelihood of misdetection of the resolver 30 and the effect of realizing extension of the life of the cross roller bearing 14, since the cross roller bearing 14 is arranged on the radially outermost side, it is possible to house the cross roller bearing 14 having a large diameter and realize high rigidity.

In the configurations shown in FIGS. 9 to 13, the resolver of the ABS/INC integral type is provided. However, the present invention is not limited to this. The thin motor 100 can also be configured by only the resolver of the ABS type, can also be configured by only the resolver of the INC type, or can also be configured by the resolvers of the ABS type and the INC type.

In the fourth embodiment, the resolver 30, the cross roller bearing 14, and the motor unit 16 are arranged in the recited order from the radially inner side on a radially identical plane. However, the present invention is not limited to this. The arrangement order of the resolver 30, the cross roller bearing 14, and the motor unit 16 can be arbitrary. For example, five configurations explained below can be adopted.

First, a first configuration is explained.

Figure 15:
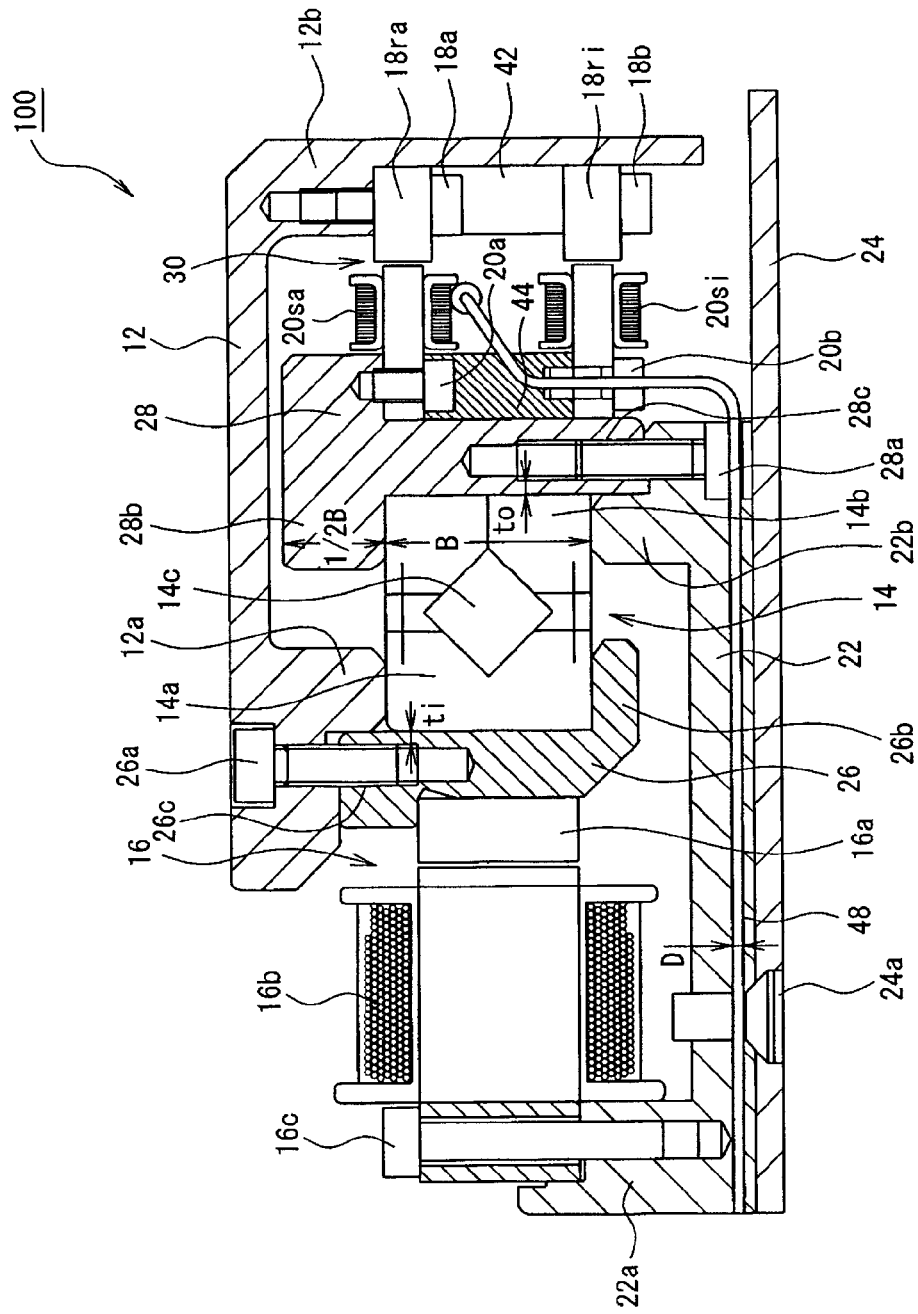
FIG. 15 is a sectional view in the axial direction of the thin motor 100 in the case in which the configuration shown in FIG. 9 is applied to the fourth embodiment.

FIG. 15 is a sectional view in the axial direction of the thin motor 100 in the case in which the configuration shown in FIG. 9 is applied to the fourth embodiment.

As shown in FIG. 15, the resolver 30 is configured as the resolvers of the ABS type and the INC type in the fourth embodiment rather than the resolver of the ABS/INC integral type.

The resolver rotors 18ra and 18ri are arranged at a very small interval via the inter-rotor seat 42. The resolver rotor 18ra is fixed and attached by the bolt 18a between the inside edge of the outer wall member 12b of the rotor 12 and the upper surface of the inter-rotor seat 42. The resolver rotor 18ri is attached to the lower surface of the inter-rotor seat 42 by the bolt 18b.

The resolver stators 20sa and 20si are arranged at a very small interval via the inter-stator seat 44. The resolver stator 20sa is fixed and attached by the bolt 20a between the outside edge of the outer ring clamp 28 and the upper surface of the inter-stator seat 44. The resolver stator 20si is attached to the lower surface of the inter-stator seat 44 by the bolt 20b. Therefore, the resolver stators 20sa and 20si are fixed to the outside edge side of the outer wall member 22b of the stator 22 integrally with the outer ring clamp 28.

The height D of the wiring tube 48 is set to the value obtained by the above Expression (5).

The thickness ti between the outside edge of the inner ring clamp 26 and the inner wall surface of the bolt hole 26c is set to a value in the range of the above Expression (6) and the thickness to between the inside edge of the outer ring clamp 28 and the inner wall surface of the bolt hole 28c is set to a value in the range of the above Expression (7).

The height H of the pressing section 28b of the outer ring clamp 28 is set to the value obtained by the above Expression (8).

Next, a second configuration is explained.

Figure 16:
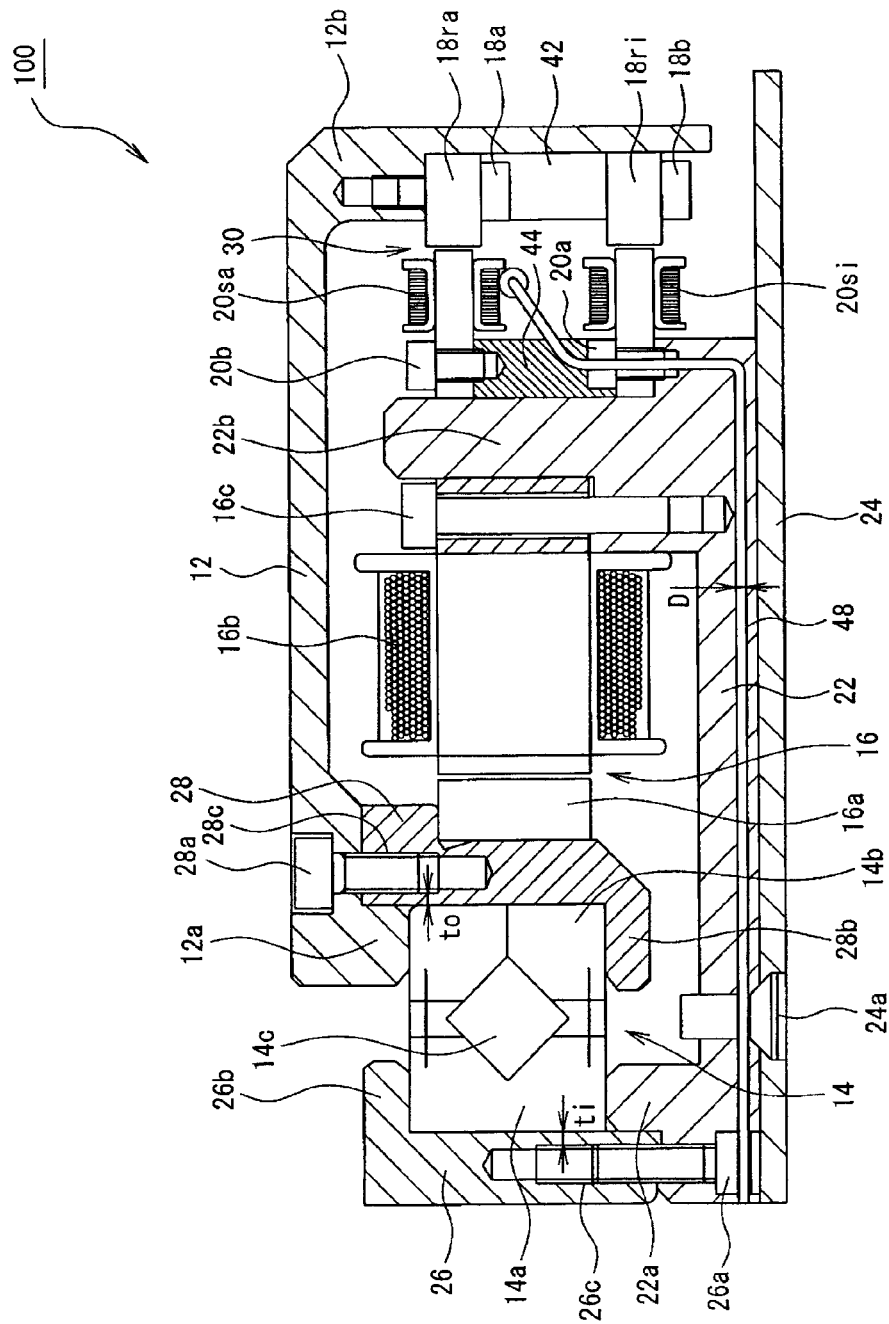
FIG. 16 is a sectional view in the axial direction of the thin motor 100 in the case in which the configuration shown in FIG. 10 is applied to the fourth embodiment.

FIG. 16 is a sectional view in the axial direction of the thin motor 100 in the case in which the configuration shown in FIG. 10 is applied to the fourth embodiment.

As shown in FIG. 16, the resolver 30 is configured as the resolvers of the ABS type and the INC type in the fourth embodiment rather than the resolver of the ABS/INC integral type.

The resolver rotors 18ra and 18ri are arranged at a very small interval via the inter-rotor seat 42. The resolver rotor 18ra is fixed and attached by the bolt 18a between the inside edge of the outer wall member 12b of the rotor 12 and the upper surface of the inter-rotor seat 42. The resolver rotor 18ri is attached to the lower surface of the inter-rotor seat 42 by the bolt 18b.

The resolver stators 20sa and 20si are arranged at a very small interval via the inter-stator seat 44. The resolver stator 20si is fixed and attached by the bolt 20a between the outside edge of the outer wall member 22b of the stator 22 and the lower surface of the inter-stator seat 44. The resolver stator 20sa is attached to the upper surface of the inter-stator seat 44 by the bolt 20b.

The height D of the wiring tube 48 is set to the value obtained by the above Expression (5).

The thickness ti between the outside edge of the inner ring clamp 26 and the inner wall surface of the bolt hole 26c is set to a value in the range of the above Expression (6) and the thickness to between the inside edge of the outer ring clamp 28 and the inner wall surface of the bolt hole 28c is set to a value in the range of the above Expression (7).

Next, a third configuration is explained.

Figure 17:
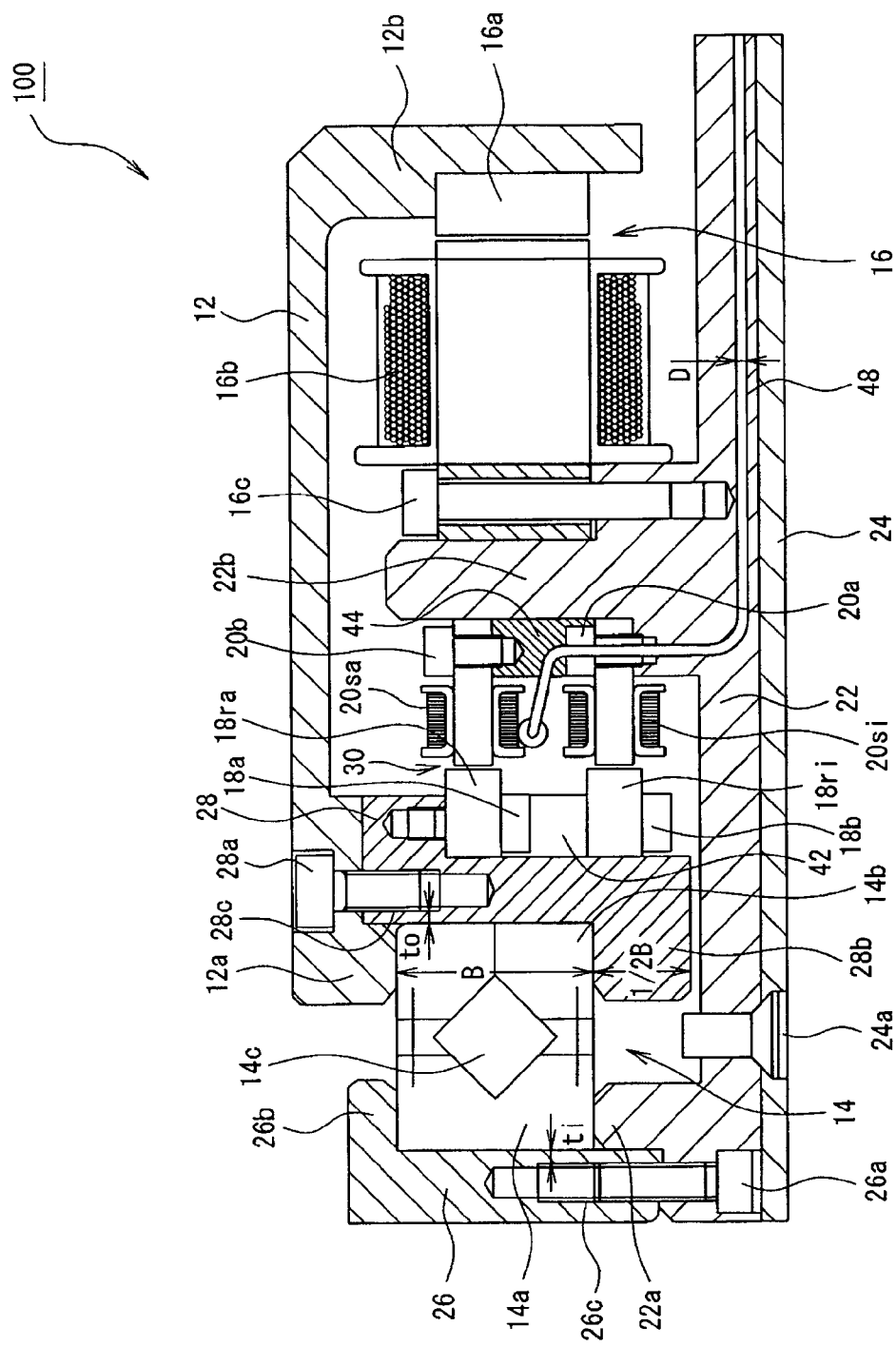
FIG. 17 is a sectional view in the axial direction of the thin motor 100 in the case in which the configuration shown in FIG. 11 is applied to the fourth embodiment.

FIG. 17 is a sectional view in the axial direction of the thin motor 100 in the case in which the configuration shown in FIG. 11 is applied to the fourth embodiment.

As shown in FIG. 17, the resolver 30 is configured as the resolvers of the ABS type and the INC type in the fourth embodiment rather than the resolver of the ABS/INC integral type.

The resolver rotors 18ra and 18ri are arranged at a very small interval via the inter-rotor seat 42. The resolver rotor 18ra is fixed and attached by the bolt 18a between the outside edge of the outer ring clamp 28 and the upper surface of the inter-rotor seat 42. The resolver rotor 18ri is attached to the lower surface of the inter-rotor seat 42 by the bolt 18b.

The resolver stators 20sa and 20si are arranged at a very small interval via the inter-stator seat 44. The resolver stator 20si is fixed and attached by the bolt 20a between the inside edge of the outer wall member 22b of the stator 22 and the lower surface of the inter-stator seat 44. The resolver stator 20sa is attached to the upper surface of the inter-stator seat 44 by the bolt 20b.

The height D of the wiring tube 48 is set to the value obtained by the above Expression (5).

The thickness ti between the outside edge of the inner ring clamp 26 and the inner wall surface of the bolt hole 26c is set to a value in the range of the above Expression (6) and the thickness to between the inside edge of the outer ring clamp 28 and the inner wall surface of the bolt hole 28c is set to a value in the range of the above Expression (7).

The height H of the pressing section 28b of the outer ring clamp 28 is set to the value obtained by the above Expression (8).

Next, a fourth configuration is explained.

Figure 18:
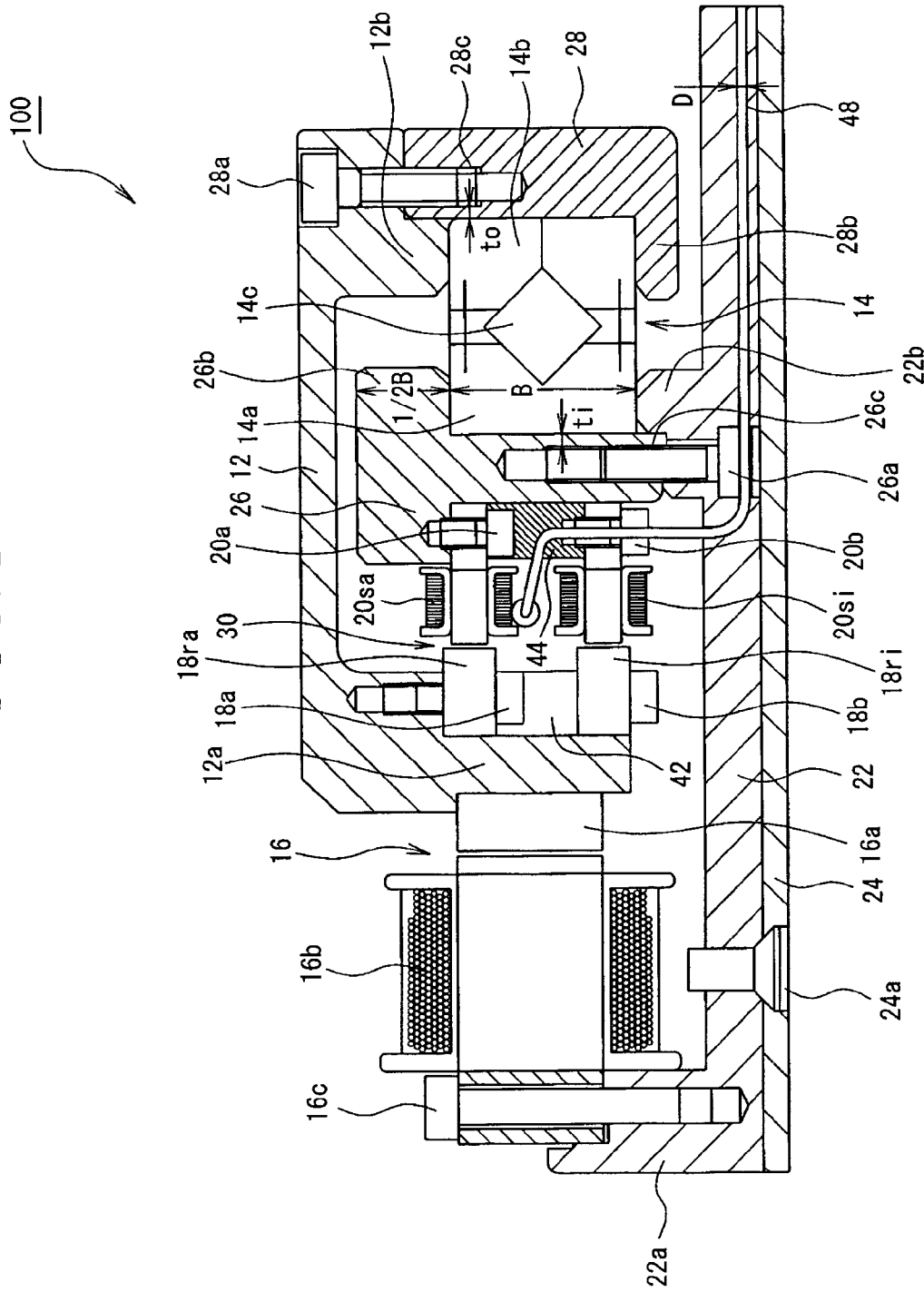
FIG. 18 is a sectional view in the axial direction of the thin motor 100 in the case in which the configuration shown in FIG. 12 is applied to the fourth embodiment.

FIG. 18 is a sectional view in the axial direction of the thin motor 100 in the case in which the configuration shown in FIG. 12 is applied to the fourth embodiment.

As shown in FIG. 18, the resolver 30 is configured as the resolvers of the ABS type and the INC type in the fourth embodiment rather than the resolver of the ABS/INC integral type.

The resolver rotors 18ra and 18ri are arranged at a very small interval via the inter-rotor seat 42. The resolver rotor 18ra is fixed and attached by the bolt 18a between the outside edge of the inner wall member 12a of the rotor 12 and the upper surface of the inter-rotor seat 42. The resolver rotor 18ri is attached to the lower surface of the inter-rotor seat 42 by the bolt 18b.

The resolver stators 20sa and 20si are arranged at a very small interval via the inter-stator seat 44. The resolver stator 20sa is fixed and attached by the bolt 20a between the inside edge of the inner ring clamp 26 and the upper surface of the inter-stator seat 44. The resolver stator 20si is attached to the lower surface of the inter-stator seat 44 by the bolt 20b. Therefore, the resolver stators 20sa and 20si are fixed to the inside edge side of the outer wall member 22b of the stator 22 integrally with the inner ring clamp 26.

The height D of the wiring tube 48 is set to the value obtained by the above Expression (5).

The thickness ti between the outside edge of the inner ring clamp 26 and the inner wall surface of the bolt hole 26c is set to a value in the range of the above Expression (6) and the thickness to between the inside edge of the outer ring clamp 28 and the inner wall surface of the bolt hole 28c is set to a value in the range of the above Expression (7).

The height H of the pressing section 26b of the inner ring clamp 26 is set to the value obtained by the above Expression (8).

Next, a fifth configuration is explained.

Figure 19:
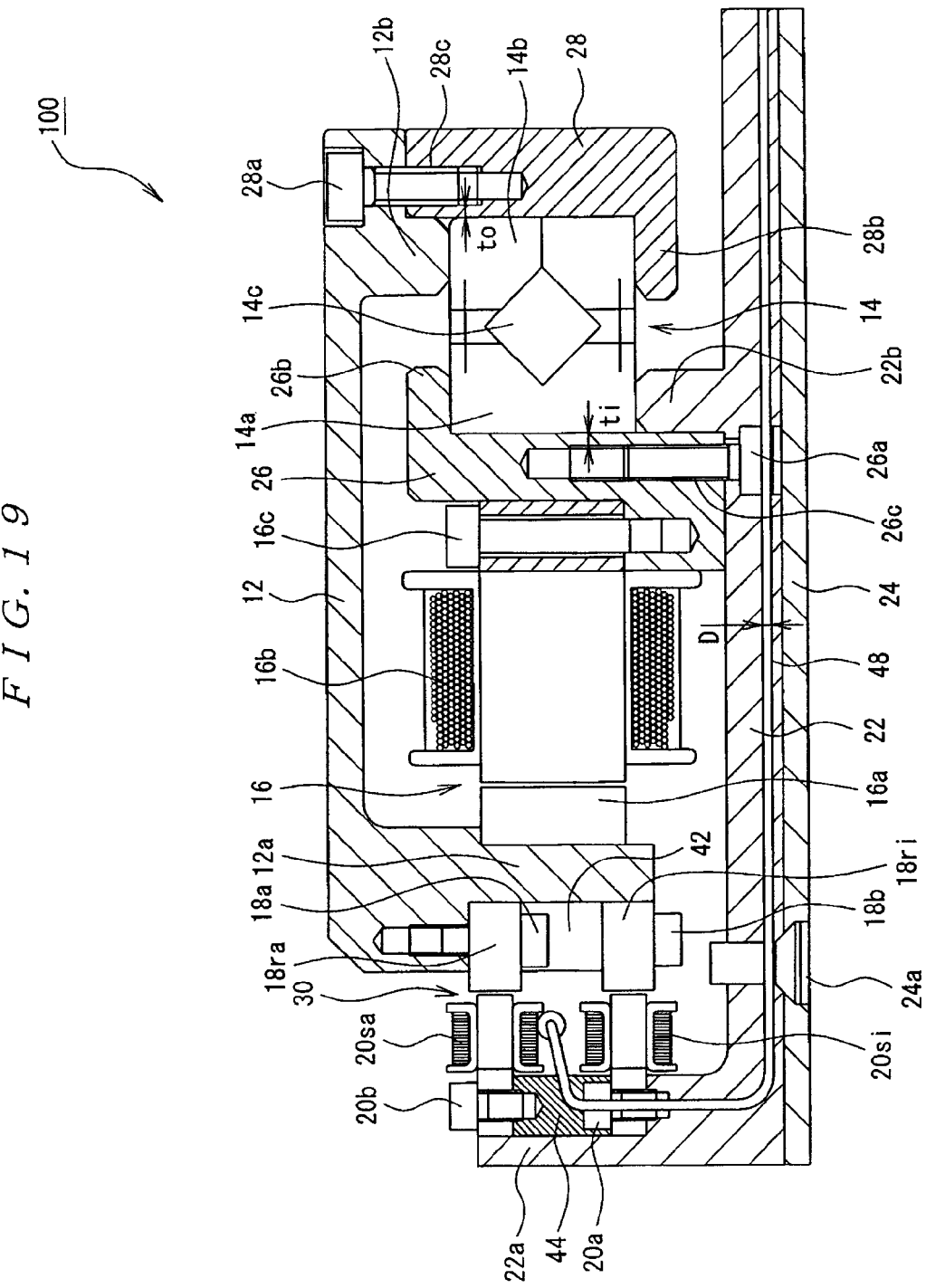
FIG. 19 is a sectional view in the axial direction of the thin motor 100 in the case in which the configuration shown in FIG. 13 is applied to the fourth embodiment.

FIG. 19 is a sectional view in the axial direction of the thin motor 100 in the case in which the configuration shown in FIG. 13 is applied to the fourth embodiment.

As shown in FIG. 19, the resolver 30 is configured as the resolvers of the ABS type and the INC type in the fourth embodiment rather than the resolver of the ABS/INC integral type.

The resolver rotors 18ra and 18ri are arranged at a very small interval via the inter-rotor seat 42. The resolver rotor 18ra is fixed and attached by the bolt 18a between the inside edge of the inner wall member 12a of the rotor 12 and the upper surface of the inter-rotor seat 42. The resolver rotor 18ri is attached to the lower surface of the inter-rotor seat 42 by the bolt 18b.

The resolver stators 20sa and 20si are arranged at a very small interval via the inter-stator seat 44. The resolver stator 20si is fixed and attached by the bolt 20a between the outside edge of the inner wall member 22a of the stator 22 and the lower surface of the inter-stator seat 44. The resolver stator 20sa is attached to the upper surface of the inter-stator seat 44 by the bolt 20b.

The height D of the wiring tube 48 is set to the value obtained by the above Expression (5).

The thickness ti between the outside edge of the inner ring clamp 26 and the inner wall surface of the bolt hole 26c is set to a value in the range of the above Expression (6) and the thickness to between the inside edge of the outer ring clamp 28 and the inner wall surface of the bolt hole 28c is set to a value in the range of the above Expression (7).

In the configurations shown in FIGS. 15 to 19, the resolvers of the ABS type and the INC type are provided. However, the present invention is not limited to this. The thin motor 100 can also be configured by only the resolver of the ABS type, can also be configured by only the resolver of the INC type, or can also be configured by the resolver of the ABS/INC integral type.

In the third and fourth embodiments, the thin motor 100 is configured as the inner rotor type in which the inner side of the thin motor 100 rotates. However, the present invention is not limited to this. The thin motor 100 can also be configured as the outer rotor type in which the outer side of the thin motor 100 rotates. In this case, the rotor 12 is the inner-ring supported member and the stator 22 is the outer-ring supported member.

In the configurations shown in FIGS. 10 to 19, the thin motor 100 is configured as the outer rotor type in which the outer side of the thin motor 100 rotates. However, the present invention is not limited to this. The thin motor 100 can also be configured as the inner rotor type in which the inner side of the thin motor 100 rotates. In this case, the rotor 12 is the inner-ring supported member and the stator 22 is the outer-ring supported member.

In the third embodiment, the resolver rotor 18 is attached to the outside edge of the inner wall member 12a of the rotor 12 and the resolver stator 20 is attached to the inside edge of the inner ring clamp 26. However, the present invention is not limited to this. The resolver stator 20 can also be attached to the outside edge of the inner wall member 12a of the rotor 12 and the resolver rotor 18 can also be attached to the inside edge of the inner ring clamp 26. The same holds true for the configurations shown in FIGS. 10 to 19.

In the third and fourth embodiments, the inner wall member 22a and the outer wall member 22b of the stator 22 are formed as a part of the stator 22. However, the present invention is not limited to this. The inner wall member 22a or the outer wall member 22b of the stator 22 can also be configured by a separate member and attached to the stator 22. The inner ring clamp 26 can also be directly attached to the stator 22 without forming the inner wall member 22a of the stator 22. However, in this case, the inner ring clamp 26 configures the inner wall member of the stator 22. The same holds true for the configurations shown in FIGS. 10 to 19.

In the third and fourth embodiments, the inner wall member 12a and the outer wall member 12b of the rotor 12 are formed as a part of the rotor 12. However, the present invention is not limited to this. The inner wall member 12a or the outer wall member 12b of the rotor 12 can also be configured by a separate member and attached to the rotor 12. The outer ring clamp 28 can also be directly attached to the rotor 12 without forming the outer wall member 12b of the rotor 12. However, in this case, the outer ring clamp 28 configures the outer wall member of the rotor 12. The same holds true for the configurations shown in FIGS. 10 to 19.

In the third and fourth embodiments, the resolver 30, the cross roller bearing 14, and the motor unit 16 are arranged on a radially identical plane. However, the present invention is not limited to this. The motor unit 16 does not have to be arranged on a plane radially identical with the resolver 30 and the cross roller bearing 14. The same holds true for the configurations shown in FIGS. 10 to 19.

In the third and fourth embodiments, the cross roller bearing 14 is applied. However, the present invention is not limited to this. A four-point contact ball bearing, an angular ball bearing, a deep groove ball bearing, a cylindrical roller bearing, a tapered roller bearing, and the like may be applied. In this case, it is desirable to adopt a roller bearing that can simultaneously receive moment load, axial load, and radial load. For example, the four-point contact ball bearing corresponds to such a roller bearing. The same holds true for the configurations shown in FIGS. 10 to 19.

In the third and fourth embodiments, the roller bearing device having a radial-plane arrangement structure of a complex resolver according to the present invention is applied to the structure for rotatably supporting the stator 22 and the rotor 12. However, the present invention is not limited to this. The roller bearing device can be applied to any structure as long as the structure is interposed between two members and relatively rotatably supports the members. The same holds true for the configurations shown in FIGS. 10 to 19.

Fifth Embodiment

Figure 20:
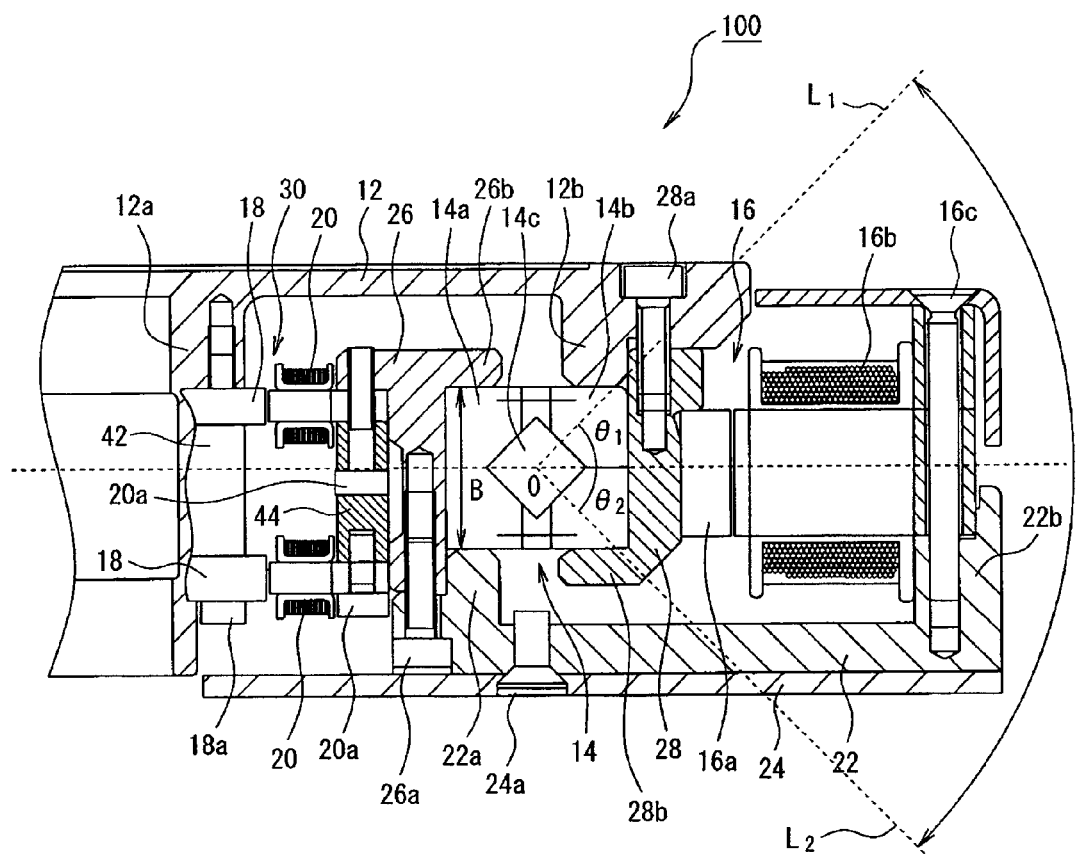
FIG. 20 is a sectional view in the axial direction of the thin motor 100 according to an embodiment of the present invention.

Next, a fifth embodiment of the present invention is explained with reference to the drawings. FIG. 20 is a diagram showing the fifth embodiment of a roller bearing device having an intra-contact angle arrangement structure of a driver and an intra-bearing width arrangement structure of a driver according to the present invention.

First, the configuration of the thin motor 100 to which the present invention is applied is explained.

FIG. 20 is a sectional view in the axial direction of the thin motor 100 according to this embodiment.

The thin motor 100 includes, as shown in FIG. 20, the stator 22 as a stator, the rotor 12 as a rotor, the cross roller bearing 14 that is interposed between the rotor 12 and the stator 22 and rotatably supports the rotor 12, the motor unit 16 that applies rotation torque to the rotor 12, and the resolver 30 that detects a rotation angle position of the rotor 12.

The cross roller bearing 14 has different two contact angles $\theta_1$ and $\theta_2$. As the contact angles $\theta_1$ and $\theta_2$ are set larger, an axial load bearing ability of the cross roller bearing 14 can be improved. Conversely, as the contact angles $\theta_1$ and $\theta_2$ are set smaller, a radial load bearing ability of the cross roller bearing 14 can be improved. It is arbitrarily selected according to an environment of use and a purpose of use of the thin motor 100 which of the bearing abilities is improved. Therefore, values of the contact angles $\theta_1$ and $\theta_2$ are not specifically limited.

The motor unit 16 is arranged such that a gap surface thereof is located between a straight line $L_1$ extending in the direction of the contact angle $\theta_1$ from a vertex O of the contact angles and a straight line $L_2$ extending in the direction of the contact angle $\theta_2$ from the vertex O and on the side of the outer ring 14b (hereinafter referred to as within two contact angles) and is arranged such that the gap surface is located within a range of bearing width of the cross roller bearing 14 in the axial direction (hereinafter referred to as within bearing width). A gap of the motor unit 16 means a gap in the radial direction between the permanent magnet 16a and the coil 16b. The gap surface means a surface where the permanent magnet 16a and the coil 16b are opposed to each other via the gap.

The resolver 30 is arranged on the opposite side of the motor unit 16 across the cross roller bearing 14. Further, the resolver 30, the cross roller bearing 14, and the motor unit 16 are arranged on a radially identical plane.

In the stator 22, the annular inner wall member 22a projecting upward in the axial direction (the upward direction in FIG. 20) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 20) is formed. Further on the radially outer side than the inner wall member 12a, the annular outer wall member 12b projecting downward in the axial direction is formed. The stator 22 and the rotor 12 are arranged to extend over each other such that the inner wall member 22a of the stator 22 is located between the inner wall member 12a and the outer wall member 12b of the rotor 12 and the outer wall member 12b of the rotor 12 is located between the inner wall member 22a and the outer wall member 22b of the stator 22.

The cross roller bearing 14 includes the inner ring 14a, the outer ring 14b, and the plural cross rollers (rollers) 14c rollably provided between the inner ring 14a and the outer ring 14*b*. The cross roller 14*c* is formed in a substantially cylindrical shape having a diameter slightly larger than length. An even number-th rotation axis on a track and an odd number-th rotation axis on the track incline 90° with respect to each other.

The inner ring 14*a* is fixed to the inner wall member 22*a* of the stator 22 in a state in which the inner ring 14*a* is pressed in the axial direction. Specifically, the inner ring 14*a* is fixed by setting the upper end of the inner wall member 22*a* of the stator 22 in contact with the lower surface of the inner ring 14*a*, setting the pressing section 26*b* of the inner ring clamp 26 in contact with the upper surface of the inner ring 14*a*, and fastening the inner ring clamp 26 to the inner wall member 22*a* of the stator 22 with the bolt 26*a*.

The outer ring 14*b* is fixed to the outer wall member 12*b* of the rotor 12 in a state in which the outer ring 14*b* is pressed in the axial direction. Specifically, the outer ring 14*b* is fixed by setting the lower end of the outer wall member 12*b* of the rotor 12 in contact with the upper surface of the outer ring 14*b*, setting the pressing section 28*b* of the outer ring clamp 28 in contact with the lower surface of the outer ring 14*b*, and fastening the outer ring clamp 28 to the outer wall member 12*b* of the rotor 12 with the bolt 28*a*.

The stator 22 is fixed to the fixing plate 24 by the bolt 24*a* and the rotor 12 fits in the outside edge of an output shaft.

The motor unit 16 includes the permanent magnet 16*a* and the coil 16*b* arranged to be opposed to the permanent magnet 16*a* at a predetermined interval. The permanent magnet 16*a* is attached to the outside edge of the outer ring clamp 28 and fixed to the outside edge side of the outer wall member 12*b* of the rotor 12 integrally with the outer ring clamp 28. On the other hand, the coil 16*b* is attached to the outer wall member 22*b* of the stator 22 by the bolt 16*c*.

The resolver 30 is a resolver of the outer rotor type including the resolver rotor 18 made of an hollow annular laminated core and the resolver stator 20 made of an annular laminated core that is arranged to be opposed to the resolver rotor 18 at a predetermined interval and in which plural stator poles are formed at equal intervals in the circumferential direction thereof. In FIG. 20, one resolver 30 (the upper one in the axial direction) is a single-pole resolver of the ABS type that includes the annular resolver rotor 18 having an inner circumference decentered with respect to the shaft center of the cross roller bearing 14 and outputs a single-pole resolver signal in which a fundamental wave component of a reluctance change is one period per one rotation of the resolver rotor 18. The other resolver 30 (the lower one in the axial direction) is a multi-pole resolver of the INC type that includes the resolver rotor 18 in which plural teeth of a salient pole shape are formed at equal intervals in a circumferential direction thereof and outputs a multi-pole resolver signal in which a fundamental wave component of a reluctance change is a multi-period per one rotation of the resolver rotor 18.

The resolver rotors 18 of the two resolvers 30 are arranged at a very small interval via the inter-rotor seat 42 and attached to the outside edge of the inner wall member 12*a* of the rotor 12 by the bolt 18*a*. On the other hand, the resolver stators 20 of the two resolvers 30 are arranged at a very small interval via the inter-stator seat 44, attached to the inside edge of the inner ring clamp 26 by the bolt 20*a*, and fixed to the inside edge side of the inner wall member 22*a* of the stator 22 integrally with the inner ring clamp 26.

The coil 16*b* is energized, whereby the rotor 12 and the resolver rotor 18 integrally rotate, a reactance change is detected by the resolver stator 20, and control of rotating speed and positioning is performed by the controller (not shown).

Next, operation in this embodiment is explained.

When the coil 16*b* is energized, rotation torque is applied to the rotor 12 and the rotor 12 rotates. A reluctance change between the resolver 30 and the resolver rotor 18, which rotates integrally with the rotor 12, is detected by the resolver 30 and control of rotating speed and positioning is performed by the controller (not shown).

When moment load is applied to the thin motor 100, the thin motor 100 tilts around the cross roller bearing 14. However, since the resolver 30 is arranged on a plane radially identical with the cross roller bearing 14, it is possible to reduce a gap change of the resolver 30.

Since the motor unit 16 is arranged such that a gap surface of the motor unit 16 is located within two contact angles and within bearing width, it is possible to reduce a gap change of the motor unit 16.

Since the resolver 30, the cross roller bearing 14, and the motor unit 16 are arranged on a radially identical plane, it is possible to reduce the height (the length in the axial direction) of the thin motor 100.

Further, since the resolver 30 is arranged on the opposite side of the motor unit 16 across the cross roller bearing 14, the resolver 30 is less easily affected by noise and heat from the motor unit 16.

Further, when a method of, for example, increasing the preload of the cross roller bearing 14 is adopted, whereas the gap change can be suppressed, a deficiency in that the life of the cross roller bearing 14 is shortened is involved. However, in the present invention, since the gap change is reduced by arranging the resolver 30 in a position where the gap change is small, it is possible to realize extension of the life of the cross roller bearing 14.

In this way, in this embodiment, the thin motor 100 includes the cross roller bearing 14 including the inner ring 14*a* and the outer ring 14*b*, the stator 22 supported by the inner ring 14*a*, the rotor 12 supported by the outer ring 14*b*, the motor unit 16 that applies rotation torque to the rotor 12, and the resolver 30 that detects a rotation angle position of the rotor 12. The resolver 30, the cross roller bearing 14, and the motor unit 16 are arranged on a radially identical plane. The motor unit 16 is arranged such that the gap surface of the motor unit 16 is located within the two contact angles.

Consequently, even if the moment load is applied to the thin motor 100, since the resolver 30 is arranged in the position where the gap change is small, compared with the past, it is possible to reduce the gap change of the resolver 30 and reduce the likelihood that the resolver 30 makes misdetection. It is possible to reduce the gap change of the motor unit 16 and reduce cogging torque. Further, since the resolver 30, the cross roller bearing 14, and the motor unit 16 are arranged on a radially identical plane, it is possible to reduce the height of the thin motor 100. Further, compared with the method of, for example, increasing the preload of the cross roller bearing 14, it is possible to realize extension of the life of the cross roller bearing 14.

Further, in this embodiment, the motor unit 16 is arranged such that the gap surface of the motor unit 16 is located within the bearing width.

Consequently, it is possible to further reduce the gap change of the motor unit 16 and further reduce the cogging torque.

Further, in this embodiment, the resolver 30, the cross roller bearing 14, and the motor unit 16 are arranged in the recited order from the radially inner side on a radially identical plane.

Consequently, since the resolver 30 is arranged on the opposite side of the motor unit 16 across the cross roller bearing 14, the resolver 30 is less easily affected by noise and heat from the motor unit 16 and it is possible to realize high detection accuracy.

Further, in this embedment, the cross roller bearing 14 is adopted.

Consequently, since it is possible to simultaneously receive moment load, axial load, and radial load, it is possible to reduce a gap change due to the moment load while maintaining rigidity against the axial load and the radial load.

Further, in this embodiment, the resolver 30 includes the annular resolver rotor 18 having an inner circumference decentered with respect to the shaft center of the cross roller bearing 14 and the resolver stator 20 that is arranged to be opposed to the resolver rotor 18 at the predetermined interval and detects a reluctance change between the resolver stator 20 and the resolver rotor 18.

In this way, in the resolver 30 of a type in which a fundamental wave component of the reluctance change is one period per one rotation, since the influence of the gap change due to the moment load is large, the reduction in the gap change is effective for prevention of misdetection.

In the fifth embodiment, the cross roller bearing 14 corresponds to the roller bearing in the inventions 21 to 26, the stator 22 corresponds to the inner-ring supported member of the invention 21, 24, or 26, the rotor 12 corresponds to the outer-ring supported member of the invention 21, 24, or 26, and the resolver 30 corresponds to the rotation sensor of the invention 21, 24, or 26. The resolver rotor 18 corresponds to the detected member of the invention 24, the resolver stator 20 corresponds to the detecting means of the invention 24, the motor unit 16 corresponds to the driver of the inventions 21 to 26, the coil 16b corresponds to the stator of the invention 21, 22, 24, or 26, and the permanent magnet 16a corresponds to the rotor of the invention 21, 22, 24, or 26.

In the fifth embodiment, the straight line $L_1$ corresponds to the first straight line of the invention 21 and the straight line $L_2$ corresponds to the second straight line of the invention 21.

Sixth Embodiment

Figure 21:
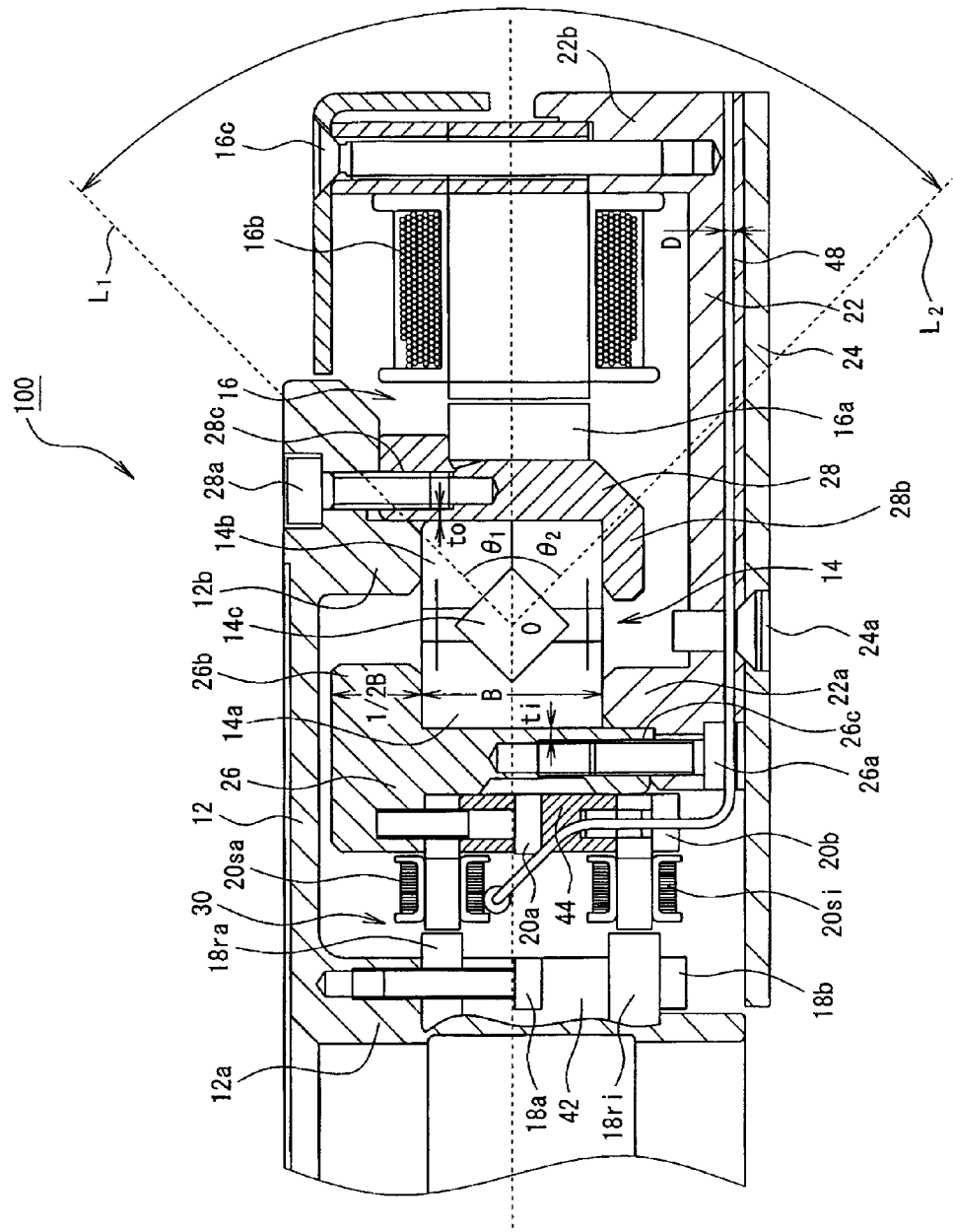
FIG. 21 is a sectional view in the axial direction of the thin motor 100 according to an embodiment of the present invention.
Figure 22:
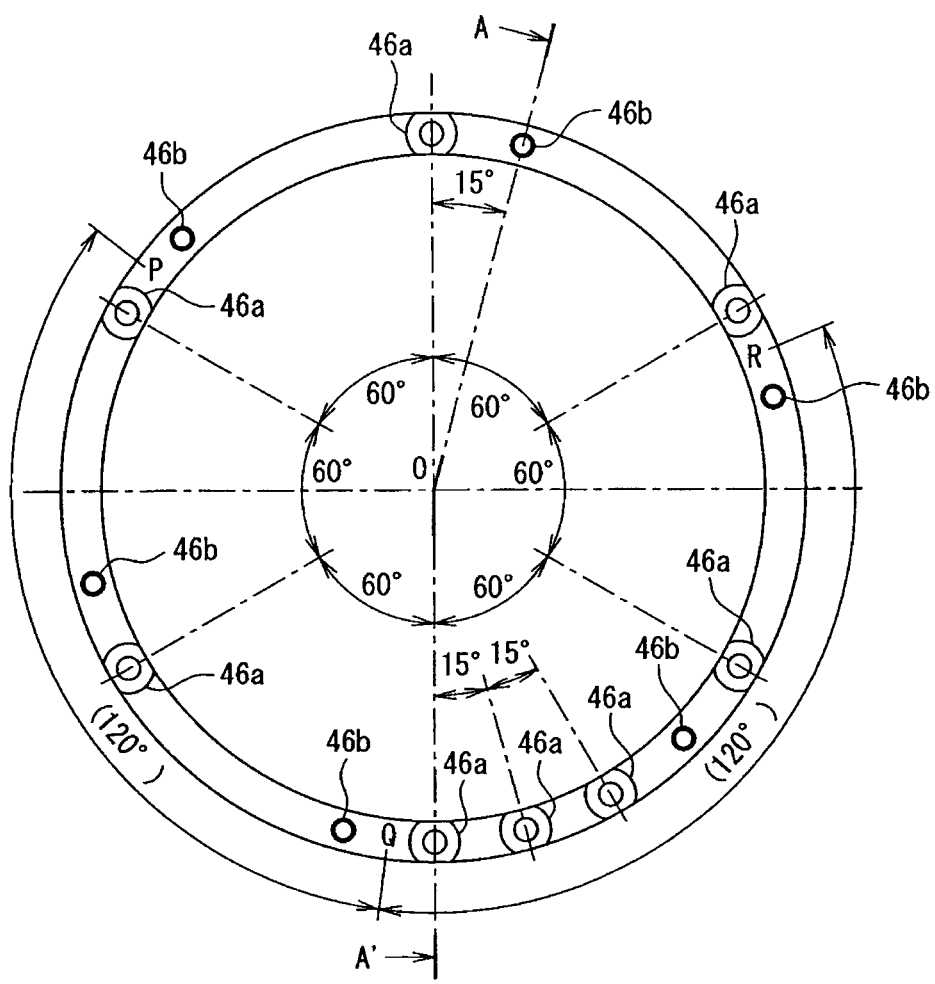
FIG. 22 is a bottom view of the inter-rotor seat 42.
Figure 23:
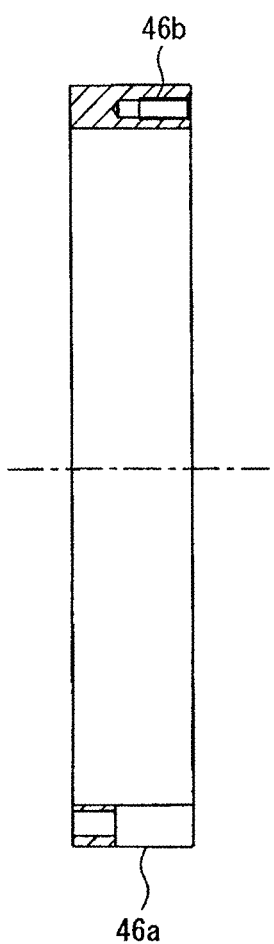
FIG. 23 is a sectional view in the axial direction taken along an A-O-A' line in FIG. 22.

Next, a sixth embodiment of the present invention is explained with reference to the drawings. FIGS. 21 to 23 are diagrams showing the sixth embodiment of the roller bearing device having an intra-contact angle arrangement structure of a driver and the roller bearing device having an intra-bearing width arrangement structure of a driver according to the present invention.

First, the configuration of the resolver 30 is explained.

FIG. 21 is a sectional view in the axial direction of the thin motor 100 according to this embodiment.

The resolver 30 is a resolver of the outer rotor type including, as shown in FIG. 21, a resolver rotor made of a hollow annular laminated core and a resolver stator that is arranged to be opposed to the resolver rotor at a predetermined interval and in which plural stator poles are formed at equal intervals in a circumferential direction thereof. In FIG. 21, one resolver 30 (the upper one in the axial direction) is a single-pole resolver of the ABS type that includes the annular resolver rotor 18ra having an inner circumference decentered with respect to the shaft center of the cross roller bearing 14 and the resolver stator 20sa arranged to be opposed to the resolver rotor 18ra and outputs a single-pole resolver signal in which a fundamental wave component of a reluctance change is one period per one rotation of the resolver rotor 18ra. The other resolver (the lower one in the axial direction) is a multi-pole resolver of the INC type that includes the resolver rotor 18ri in which the plural teeth of a salient pole shape are formed at equal intervals in the circumferential direction thereof and the resolver stator 20si arranged to be opposed to the resolver rotor 18ri and outputs a multi-pole resolver signal in which a fundamental wave component of a reluctance change is a multi-period per one rotation of the resolver rotor 18ri.

The resolver rotors 18ra and 18ri are arranged at a very small interval via the inter-rotor seat 42. The resolver rotor 18ra is fixed and attached by the bolt 18a between the outside edge of the inner wall member 12a of the rotor 12 and the upper surface of the inter-rotor seat 42. The resolver rotor 18ri is attached to the lower surface of the inter-rotor seat 42 by the bolt 18b.

FIG. 22 is a bottom view of the inter-rotor seat 42.

FIG. 23 is a sectional view in the axial direction taken along an A-O-A' line in FIG. 22.

In the lower surface of the inter-rotor seat 42, as shown in FIG. 22, the bolt holes 46a through which the bolts 18a are inserted and the bolt holes 46b through which the bolts 18b are inserted are formed. Six bolt holes 46a are formed at intervals of 60° in the circumferential direction of the inter-rotor seat 42 and two bolt holes 46a are formed at an interval of 15° counterclockwise from the bolt hole 46a at the bottom of FIG. 22. The bolt holes 46b are respectively formed in positions at 15° clockwise from the bolt holes 46a formed at the intervals of 60°.

As shown in FIG. 23, the bolt hole 46a pierces through the inter-rotor seat 42 in the axial direction and the depth of counter bore thereof reaches depth of about a half in the axial direction of the inter-rotor seat 42. The depth of the bolt hole 46b reaches depth of about a half in the axial direction of the inter-rotor seat 42.

On the other hand, as shown in FIG. 21, the resolver stators 20sa and 20si are arranged at a very small interval via an inter-stator seat 44. The resolver stator 20sa is fixed and attached by the bolt 20a between the inside edge of the inner ring clamp 26 and the upper surface of the inter-stator seat 44. The resolver stator 20si is attached to the lower surface of the inter-stator seat 44 by the bolt 20b. Therefore, the resolver stators 20sa and 20si are fixed to the inside edge side of the inner wall member 22a of the stator 22 integrally with the inner ring clamp 26.

Next, the configuration of the stator 22 is explained.

In the stator 22, as shown in FIG. 21, the wiring tube 48 piercing through from the radially inner side to the radially outer side of the stator 22 is formed. The wires of the resolver 30 are housed in the wiring tube 48.

The height D of the wiring tube 48 is set to a value obtained by the following Expression (9) when a diameter of one wire of the resolver 30 is represented as d and a predetermined margin is represented as α (0<α<d):

$$D = 2d + \alpha \quad (9)$$

The wires of the resolver 30 include plural wires such as a power line and a ground line. If these wires can be horizontally wired side by side without a twist, d is enough for the height D of the wiring tube. However, actually, the wires cross one another in the axial direction. Therefore, it is desirable to set the height D as 2d+α taking into account height required for the wires to cross once (d).

Next, the configuration of the inner ring clamp 26 and the outer ring clamp 28 is explained.

In the inner ring clamp 26, as shown in FIG. 21, the bolt hole 26c through which the bolt 26a is inserted is formed. In the fifth embodiment, the thickness between the outside edge of the inner ring clamp 26 and the inner wall surface of the bolt hole 26c is thickness equivalent to length for about three pitches of the bolt hole 26c. On the other hand, in this embodiment, thickness ti between the outside edge of the inner ring clamp 26 and the inner wall surface of the bolt hole 26c is set to a value in a range of the following Expression (10) when length for one pitch of the bolt hole 26c is represented as pi. Therefore, when the bolt 26a is screwed into the bolt hole 26c, since the outside edge of the inner ring clamp 26 is pushed out to the inner ring 14a side to lock the inner ring 14a, it is possible to fix the inner ring 14a without a gap. Therefore, it is possible to improve detection accuracy.

$$pi < ti < 2pi \qquad (10)$$

In Expression (10), when the thickness ti is set equal to or larger than 2pi, an action of pushing out the outside edge of the inner ring clamp 26 decreases and it is difficult to fix the inner ring 14a without a gap. On the other hand, when the thickness ti is set equal to or smaller than pi, it is likely that the inner wall of the bolt hole 26c is broken. Therefore, it is desirable to set the thickness ti to a value obtained by the above Expression (10).

In the outer ring clamp 28, as shown in FIG. 21, the bolt hole 28c through which the bolt 28a is inserted is formed. In the fifth embodiment, the thickness between the inside edge of the outer ring clamp 28 and the inner wall surface of the bolt hole 28c is thickness equivalent to length for about three pitches of the bolt hole 28c. On the other hand, in this embodiment, the thickness to between the inside edge of the outer ring clamp 28 and the inner wall surface of the bolt hole 28c is set to a value in a range of the following Expression (11) when length for one pitch of the bolt hole 28c is represented as po. Therefore, when the bolt 28a is screwed into the bolt hole 28c, since the inside edge of the outer ring clamp 28 is pushed out to the outer ring 14b side to lock the outer ring 14b, it is possible to fix the outer ring 14b without a gap. Therefore, it is possible to improve detection accuracy.

$$po < to < 2po \qquad (11)$$

In Expression (11), when the thickness to is set equal to or larger than 2po, an action of pushing out the inside edge of the outer ring clamp 28 decreases and it is difficult to fix the outer ring 14a without a gap. On the other hand, when the thickness to is set equal to or smaller than po, it is likely that the inner wall of the bolt hole 28c is broken. Therefore, it is desirable to set the thickness to to a value obtained by the above Expression (11).

In the fifth embodiment, the height of the pressing section 26b of the inner ring clamp 26 is about ¼B when the height of the cross roller bearing 14 is represented as B. However, when the height of the pressing section 26b of the inner ring clamp 26 is about ¼B, it is likely that the inner ring clamp 26 tilts to the resolver 30 side and a gap of the resolver 30 changes. Therefore, there is a problem in that a rotation angle position of the rotor 12 cannot be accurately detected.

Therefore, in this embodiment, as shown in FIG. 21, the height H of the pressing section 26b of the inner ring clamp 26 is set to a value obtained by the following Expression (12):

$$H = \tfrac{1}{2}B \qquad (12)$$

Consequently, it is possible to reduce the likelihood that the gap of the resolver 30 changes. Therefore, it is possible to reduce the likelihood that the resolver 30 makes misdetection.

The height of the pressing section 28b of the outer ring clamp 28 is set to ¼B.

In this way, in this embodiment, the resolver rotors 18ra and 18ri are arranged at a very small interval via the inter-rotor seat 42 and respectively attached by the two bolts 18a and 18b.

Consequently, since the resolver rotors 18ra and 18ri can be independently fixed, it is possible to adjust each of the positions in the axial direction of the resolver rotors 18ra and 18ri.

Further, in this embodiment, the resolver stators 20sa and 20si are arranged at a very small interval via the inter-stator seat 44 and respectively attached by the two bolts 20a and 20b.

Consequently, since the resolver stators 20sa and 20si can be independently fixed, it is possible to adjust each of the positions in the axial direction of the resolver stators 20sa and 20si.

Further, in this embodiment, the resolver 30 is configured as the resolvers of the ABS type and the INC type.

Consequently, it is possible to effectively reduce the influence of the gap change.

Further, in this embodiment, the height D of the wiring tube 48 is set to the value obtained by the above Expression (9).

Consequently, since the height of the wiring tube 48 is reduced, it is possible to reduce the height of the thin motor 100. Since height for the plural wires of the resolver 30 to cross once is allowed, it is possible to reduce the likelihood that workability of housing the wires of the resolver 30 in the wiring tube 48 falls.

Further, in this embodiment, the thickness ti between the outside edge of the inner ring clamp 26 and the inner wall surface of the bolt hole 26c is set to the value obtained by the above Expression (10).

Consequently, since it is possible to fix the inner ring 14a without a gap, it is possible to improve detection accuracy.

Further, in this embodiment, the thickness to between the inside edge of the outer ring clamp 28 and the inner wall surface of the bolt hole 28c is set to a value obtained by the above Expression (11).

Consequently, since it is possible to fix the outer ring 14b without a gap, it is possible to improve detection accuracy.

Further, in this embodiment, the height H of the pressing section 26b of the inner ring clamp 26 is set to a value obtained by the above Expression (12).

Consequently, since it is possible to reduce the likelihood that a gap of the resolver 30 changes, it is possible to reduce the likelihood that the resolver 30 makes misdetection.

In the sixth embodiment, the cross roller bearing 14 corresponds to the roller bearing of the inventions 27 to 31, the stator 22 corresponds to the inner-ring supported member of the invention 28, 29, or 31, the rotor 12 corresponds to the outer-ring supported member of the invention 30, and the resolver 30 corresponds to the rotation sensor of the invention 27, 28, or 31. The resolver rotor 18ra corresponds to the first resolver rotor of the invention 27, the resolver rotor 18ri corresponds to the second resolver rotor of the invention 27, and the bolts 18a and 18b correspond to the fixing means of the invention 27.

Modification of the Fifth and Sixth Embodiments

In the fifth embodiment, the resolver 30, the cross roller bearing 14, and the motor unit 16 are arranged in the recited order from the radially inner side on a radially identical plane. However, the present invention is not limited to this. The arrangement order of the resolver 30, the cross roller bearing 14, and the motor unit 16 can be arbitrary. For example, five configurations explained below can be adopted.

First, a first configuration is explained.

Figure 24:
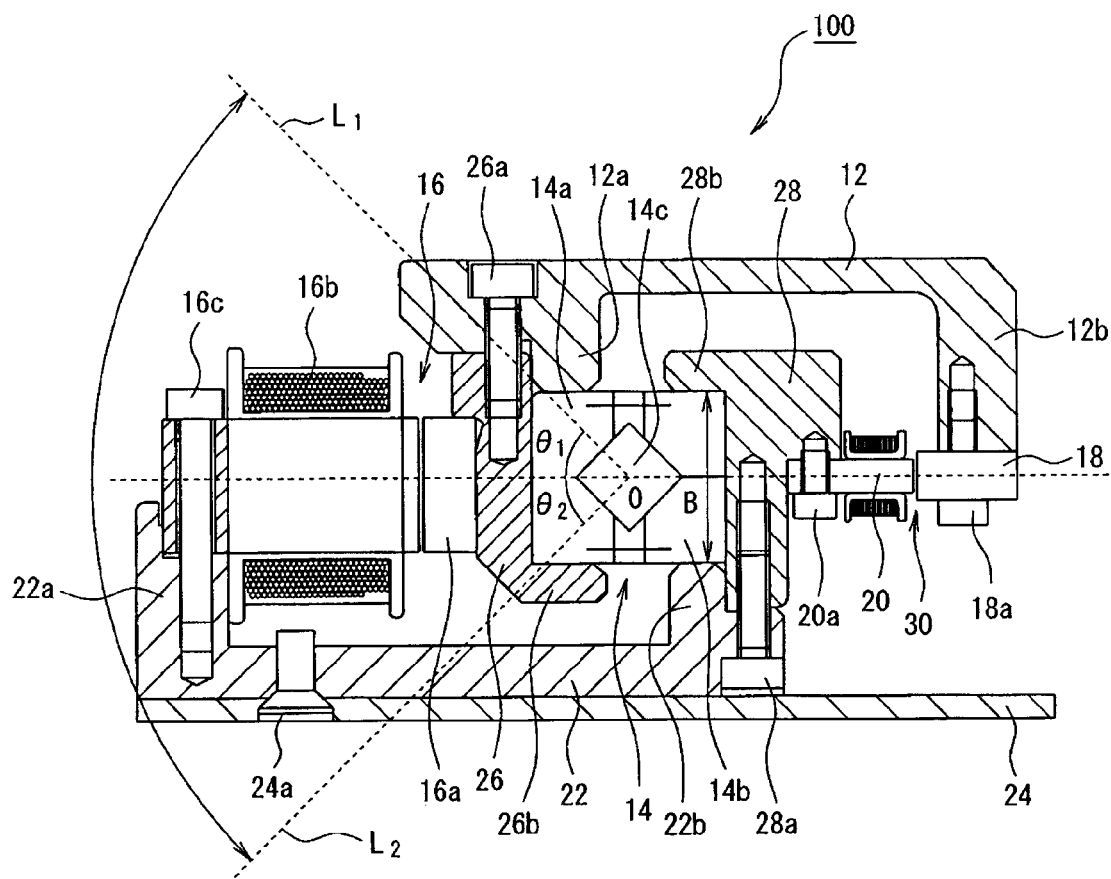
FIG. 24 is a sectional view in the axial direction of the thin motor 100 in which the motor unit 16, the cross roller bearing 14, and the resolver 30 are arranged in the recited order from the radially inner side on a radially identical plane.

FIG. 24 is a sectional view in the axial direction of the thin motor 100 in which the motor unit 16, the cross roller bearing 14, and the resolver 30 are arranged in the recited order from the radially inner side on a radially identical plane.

As shown in FIG. 24, the cross roller bearing 14 has the different two contact angles $\theta_1$ and $\theta_2$. The motor unit 16 is arranged such that a gap surface thereof is located between the straight line $L_1$ extending in the direction of the contact angle $\theta_1$ from the vertex O of the contact angles and the straight line $L_2$ extending in the direction of the contact angle $\theta_2$ from the vertex O and on the side of the inner ring 14a and is arranged such that the gap surface is located within the bearing width. The motor unit 16, the cross roller bearing 14, and the resolver 30 are arranged on a radially identical plane.

In the stator 22, the annular inner wall member 22a projecting upward in the axial direction (the upward direction in FIG. 24) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 24) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner ring 14a is fixed to the inner wall member 12a of the rotor 12 in a state in which the inner ring 14a is pressed in the axial direction. Specifically, the inner ring 14a is fixed by setting the lower end of the inner wall member 12a of the rotor 12 in contact with the upper surface of the inner ring 14a, setting the pressing section 26b of the inner ring clamp 26 in contact with the lower surface of the inner ring 14a, and fastening the inner ring clamp 26 to the inner wall member 12a of the rotor 12 with the bolt 26a.

The outer ring 14b is fixed to the outer wall member 22b of the stator 22 in a state in which the outer ring 14b is pressed in the axial direction. Specifically, the outer ring 14b is fixed by setting the upper end of the outer wall member 22b of the stator 22 in contact with the lower surface of the outer ring 14b, setting the pressing section 28b of the outer ring clamp 28 in contact with the upper surface of the outer ring 14b, and fastening the outer ring clamp 28 to the outer wall member 22b of the stator 22 with the bolt 28a.

The permanent magnet 16a is attached to the inside edge of the inner ring clamp 26 and fixed to the inside edge side of the inner wall member 12a of the rotor 12 integrally with the inner ring clamp 26. On the other hand, the coil 16b is attached to the outside edge of the inner wall member 22a of the stator 22 by the bolt 16c.

The resolver 30 is a resolver of the ABS/INC integral type that outputs a single-pole resolver signal and a multi-pole resolver signal. The resolver 30 has a function equivalent to that of the resolver 30 in the fifth and sixth embodiments except that the resolver 30 is integrally configured. The resolver rotor 18 is attached to the outer wall member 12b of the rotor 12 by the bolt 18a. On the other hand, the resolver stator 20 is attached to the outside edge of the outer ring clamp 28 by the bolt 20a and fixed to the outside edge side of the outer wall member 22b of the stator 22 integrally with the outer ring clamp 28.

In this way, in the first configuration, the motor unit 16, the cross roller bearing 14, and the resolver 30 are arranged in the recited order from the radially inner side on a radially identical plane.

Consequently, besides the effect of reducing the likelihood of misdetection of the resolver 30 and the effect of realizing extension of the life of the cross roller bearing 14, since the resolver 30 is arranged on the opposite side of the motor unit 16 across the cross roller bearing 14, the resolver 30 is less easily affected by noise and heat from the motor unit 16 and it is possible to realize high detection accuracy. Since the resolver 30 is arranged on the radially outermost side, the diameter of the resolver 30 can be increased. Therefore, it is possible to stabilize accuracy, for example, during die machining and realize higher detection accuracy.

Next, a second configuration is explained.

Figure 25:
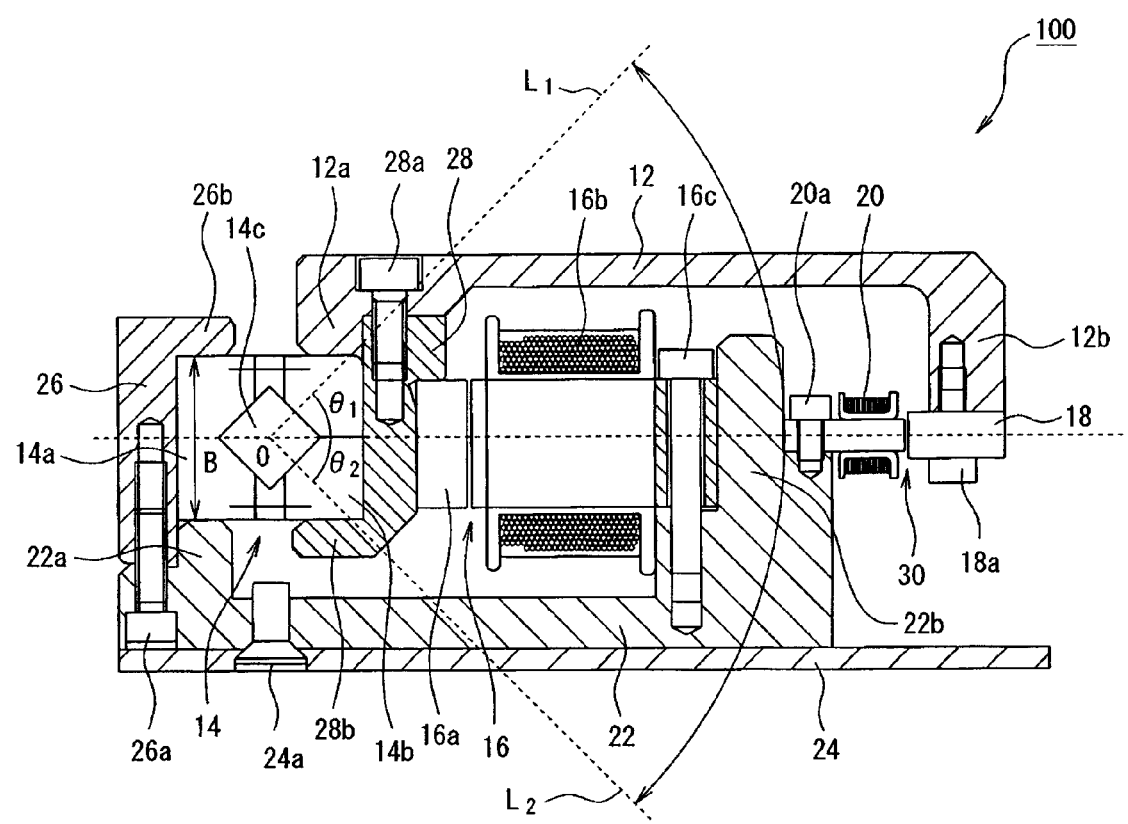
FIG. 25 is a sectional view in the axial direction of the thin motor 100 in which the cross roller bearing 14, the motor unit 16, and the resolver 30 are arranged in the recited order from the radially inner side on a radially identical plane.

FIG. 25 is a sectional view in the axial direction of the thin motor 100 in which the cross roller bearing 14, the motor unit 16, and the resolver 30 are arranged in the recited order from the radially inner side on a radially identical plane.

As shown in FIG. 25, the cross roller bearing 14 has the different two contact angles $\theta_1$ and $\theta_2$. The motor unit 16 is arranged such that a gap surface thereof is located between the straight line $L_1$ extending in the direction of the contact angle $\theta_1$ from the vertex O of the contact angles and the straight line $L_2$ extending in the direction of the contact angle $\theta_2$ from the vertex O and on the side of the outer ring 14b and is arranged such that the gap surface is located within the bearing width. The cross roller bearing 14, the motor unit 16, and the resolver 30 are arranged on a radially identical plane.

In the stator 22, the annular inner wall member 22a projecting upward in the axial direction (the upward direction in FIG. 25) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 25) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner ring 14a is fixed to the inner wall member 22a of the stator 22 in a state in which the inner ring 14a is pressed in the axial direction. Specifically, the inner ring 14a is fixed by setting the upper end of the inner wall member 22a of the stator 22 in contact with the lower surface of the inner ring 14a, setting the pressing section 26b of the inner ring clamp 26 in contact with the upper surface of the inner ring 14a, and fastening the inner ring clamp 26 to the inner wall member 22a of the stator 22 with the bolt 26a.

The outer ring 14b is fixed to the inner wall member 12a of the rotor 12 in a state in which the outer ring 14b is pressed in the axial direction. Specifically, the outer ring 14b is fixed by setting the lower end of the inner wall member 12a of the rotor 12 in contact with the upper surface of the outer ring 14b, setting the pressing section 28b of the outer ring clamp 28 in contact with the lower surface of the outer ring 14b, and fastening the outer ring clamp 28 to the inner wall member 12a of the rotor 12 with the bolt 28a.

The permanent magnet 16a is attached to the outside edge of the outer ring clamp 28 and fixed to the outside edge side of the inner wall member 12a of the rotor 12 integrally with the outer ring clamp 28. On the other hand, the coil 16b is attached to the inside edge of the outer wall member 22b of the stator 22 by the bolt 16c.

The resolver 30 is a resolver of the ABS/INC integral type that outputs a single-pole resolver signal and a multi-pole resolver signal. The resolver 30 has a function equivalent to that of the resolver 30 in the fifth and sixth embodiments except that the resolver 30 is integrally configured. The resolver rotor 18 is attached to the outer wall member 12b of the rotor 12 by the bolt 18a. On the other hand, the resolver stator 20 is attached to the outside edge of the outer wall member 22b of the stator 22 by the bolt 20a.

In this way, in the second configuration, the cross roller bearing 14, the motor unit 16, and the resolver 30 are arranged in the recited order from the radially inner side on a radially identical plane.

Consequently, besides the effect of reducing the likelihood of misdetection of the resolver 30 and the effect of realizing extension of the life of the cross roller bearing 14, since the resolver 30 is arranged on the radially outermost side, the diameter of the resolver 30 can be increased. Therefore, it is possible to stabilize accuracy, for example, during die machining and realize higher detection accuracy. Since the cross roller bearing 14 is arranged on the radially innermost side, it is possible to reduce the height of the thin motor 100 by reducing the size of the cross roller bearing 14. Wiring to the motor unit 16 or the resolver 30 is easy and grease of the cross roller bearing 14 less easily leaks.

Next, a third configuration is explained.

Figure 26:
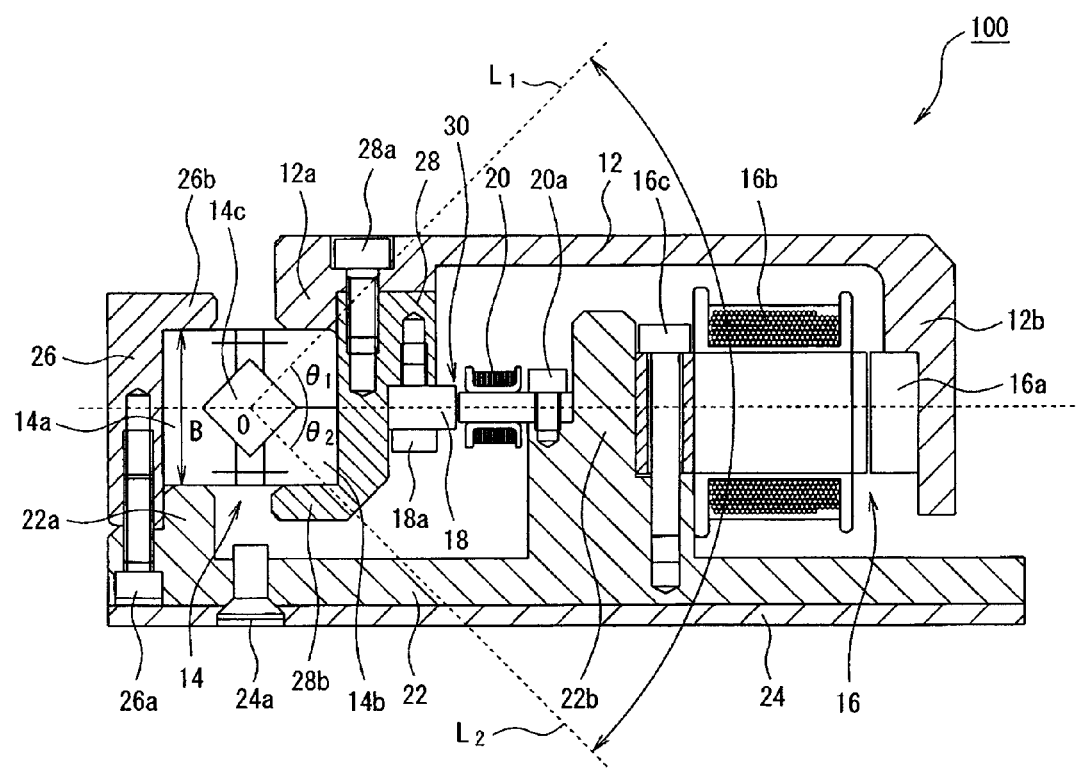
FIG. 26 is a sectional view in the axial direction of the thin motor 100 in which the cross roller bearing 14, the resolver 30, and the motor unit 16 are arranged in the recited order from the radially inner side on a radially identical plane.

FIG. 26 is a sectional view in the axial direction of the thin motor 100 in which the cross roller bearing 14, the resolver 30, and the motor unit 16 are arranged in the recited order from the radially inner side on a radially identical plane.

As shown in FIG. 26, the cross roller bearing 14 has the different two contact angles $\theta_1$ and $\theta_2$. The motor unit 16 is arranged such that a gap surface thereof is located between the straight line $L_1$ extending in the direction of the contact angle $\theta_1$ from the vertex O of the contact angles and the straight line $L_2$ extending in the direction of the contact angle $\theta_2$ from the vertex O and on the side of the outer ring 14b and is arranged such that the gap surface is located within the bearing width. The cross roller bearing 14, the resolver 30, and the motor unit 16 are arranged on a radially identical plane.

In the stator 22, the annular inner wall member 22a projecting upward in the axial direction (the upward direction in FIG. 26) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 26) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner ring 14a is fixed to the inner wall member 22a of the stator 22 in a state in which the inner ring 14a is pressed in the axial direction. Specifically, the inner ring 14a is fixed by setting the upper end of the inner wall member 22a of the stator 22 in contact with the lower surface of the inner ring 14a, setting the pressing section 26b of the inner ring clamp 26 in contact with the upper surface of the inner ring 14a, and fastening the inner ring clamp 26 to the inner wall member 22a of the stator 22 with the bolt 26a.

The outer ring 14b is fixed to the inner wall member 12a of the rotor 12 in a state in which the outer ring 14b is pressed in the axial direction. Specifically, the outer ring 14b is fixed by setting the lower end of the inner wall member 12a of the rotor 12 in contact with the upper surface of the outer ring 14b, setting the pressing section 28b of the outer ring clamp 28 in contact with the lower surface of the outer ring 14b, and fastening the outer ring clamp 28 to the inner wall member 12a of the rotor 12 with the bolt 28a.

The permanent magnet 16a is attached to the inside edge of the outer wall member 12b of the rotor 12. On the other hand, the coil 16b is attached to the outside edge of the outer wall member 22b of the stator 22 by the bolt 16c.

The resolver 30 is a resolver of the ABS/INC integral type that outputs a single-pole resolver signal and a multi-pole resolver signal. The resolver 30 has a function equivalent to that of the resolver 30 in the fifth and sixth embodiments except that the resolver 30 is integrally configured. The resolver rotor 18 is attached to the outside edge of the outer ring clamp 28 by the bolt 18a and fixed to the outside edge side of the inner wall member 12a of the rotor 12 integrally with the outer ring clamp 28. On the other hand, the resolver stator 20 is attached to the inside edge of the outer wall member 22b of the stator 22 by the bolt 20a.

In this way, in the third configuration, the cross roller bearing 14, the resolver 30, and the motor unit 16 are arranged in the recited order from the radially inner side on a radially identical plane.

Consequently, besides the effect of reducing the likelihood of misdetection of the resolver 30 and the effect of realizing extension of the life of the cross roller bearing 14, since the cross roller bearing 14 is arranged on the radially innermost side, it is possible to reduce the height of the thin motor 100 by reducing the size of the cross roller bearing 14. Wiring to the motor unit 16 or the resolver 30 is easy and grease of the cross roller bearing 14 less easily leaks. Since the motor unit 16 is arranged on the radially outermost side, it is possible to secure a large space for winding wires and realize high output torque. Further, it is possible to increase the number of poles of the motor unit 16 and realize operation at low speed to ultra-low speed.

Next, a fourth configuration is explained.

Figure 27:
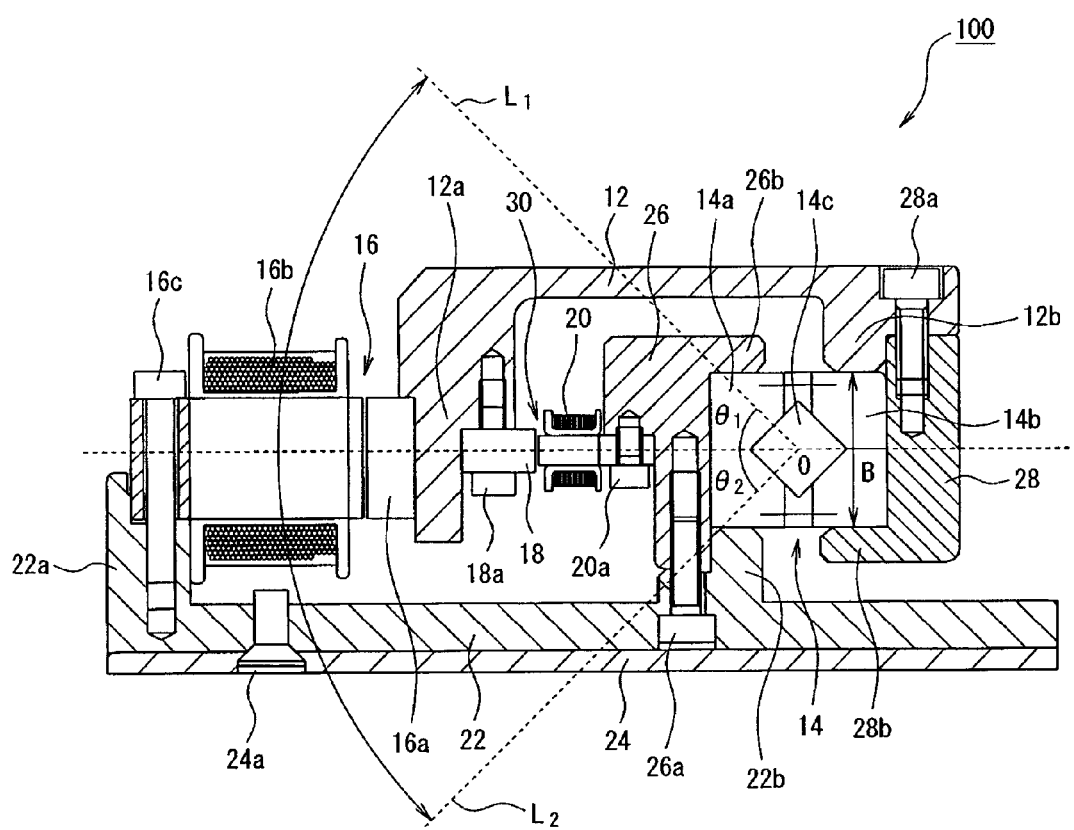
FIG. 27 is a sectional view in the axial direction of the thin motor 100 in which the motor unit 16, the resolver 30, and the cross roller bearing 14 are arranged in the recited order from the radially inner side on a radially identical plane.

FIG. 27 is a sectional view in the axial direction of the thin motor 100 in which the motor unit 16, the resolver 30, and the cross roller bearing 14 are arranged in the recited order from the radially inner side on a radially identical plane.

As shown in FIG. 27, the cross roller bearing 14 has the different two contact angles $\theta_1$ and $\theta_2$. The motor unit 16 is arranged such that a gap surface thereof is located between the straight line $L_1$ extending in the direction of the contact angle $\theta_1$ from the vertex O of the contact angles and the straight line $L_2$ extending in the direction of the contact angle $\theta_2$ from the vertex O and on the side of the inner ring 14a and is arranged such that the gap surface is located within the bearing width. The motor unit 16, the resolver 30, and the cross roller bearing 14 are arranged on a radially identical plane.

In the stator 22, the annular inner wall member 22a projecting upward in the axial direction (the upward direction in FIG. 27) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 27) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner ring 14a is fixed to the outer wall member 22b of the stator 22 in a state in which the inner ring 14a is pressed in the axial direction. Specifically, the inner ring 14a is fixed by setting the upper end of the outer wall member 22b of the stator 22 in contact with the lower surface of the inner ring 14a, setting the pressing section 26b of the inner ring clamp 26 in contact with the upper surface of the inner ring 14a, and fastening the inner ring clamp 26 to the outer wall member 22b of the stator 22 with the bolt 26a.

The outer ring 14b is fixed to the outer wall member 12b of the rotor 12 in a state in which the outer ring 14b is pressed in the axial direction. Specifically, the outer ring 14b is fixed by setting the lower end of the outer wall member 12b of the rotor 12 in contact with the upper surface of the outer ring 14b, setting the pressing section 28b of the outer ring clamp 28 in contact with the lower surface of the outer ring 14b, and fastening the outer ring clamp 28 to the outer wall member 12b of the rotor 12 with the bolt 28a.

The permanent magnet 16a is attached to the inside edge of the inner wall member 12a of the rotor 12. On the other hand, the coil 16b is attached to the outside edge of the inner wall member 22a of the stator 22 by the bolt 16c.

The resolver 30 is a resolver of the ABS/INC integral type that outputs a single-pole resolver signal and a multi-pole resolver signal. The resolver 30 has a function equivalent to that of the resolver 30 in the fifth and sixth embodiments except that the resolver 30 is integrally configured. The resolver rotor 18 is attached to the outside edge of the inner wall member 12a of the rotor 12 by the bolt 18a. On the other hand, the resolver stator 20 is attached to the inside edge of the inner ring clamp 26 by the bolt 20a and fixed to the inside edge side of the outer wall member 22b of the stator 22 integrally with the inner ring clamp 26.

In this way, in the fourth configuration, the motor unit 16, the resolver 30, and the cross roller bearing 14 are arranged in the recited order from the radially inner side on a radially identical plane.

Consequently, besides the effect of reducing the likelihood of misdetection of the resolver 30 and the effect of realizing extension of the life of the cross roller bearing 14, since the cross roller bearing 14 is arranged on the radially outermost side, it is possible to house the cross roller bearing 14 having a large diameter and realize high rigidity.

Next, a fifth configuration is explained.

Figure 28:
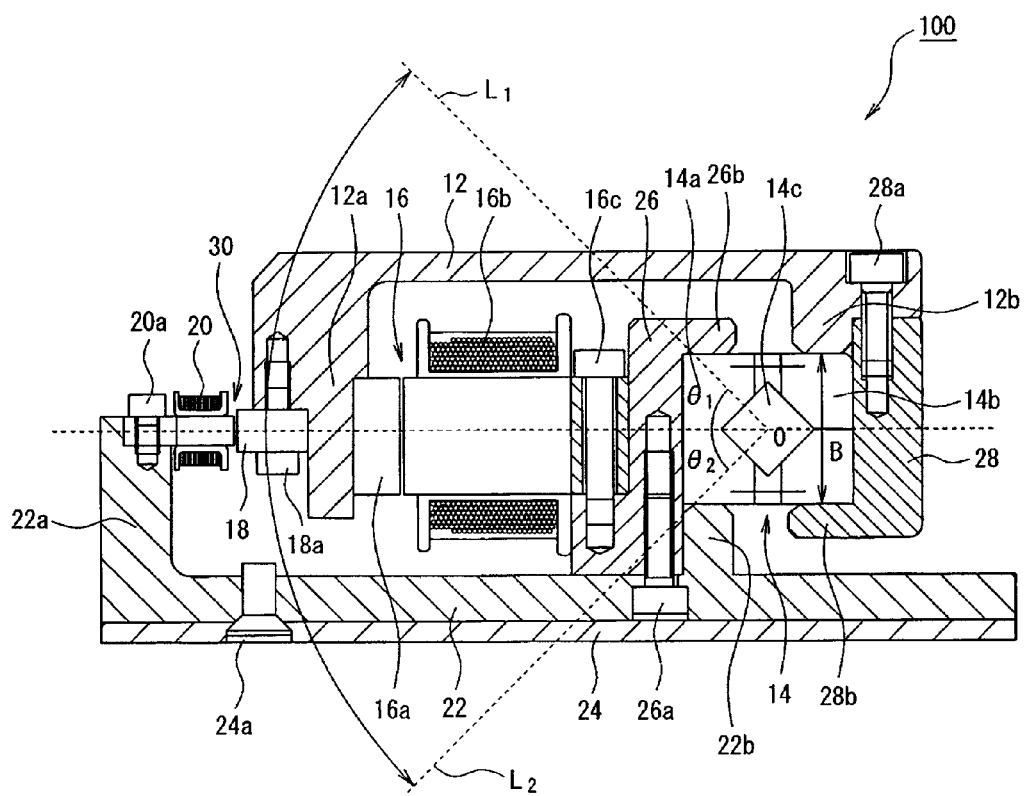
FIG. 28 is a sectional view in the axial direction of the thin motor 100 in which the resolver 30, the motor unit 16, and the cross roller bearing 14 are arranged in the recited order from the radially inner side on a radially identical plane.

FIG. 28 is a sectional view in the axial direction of the thin motor 100 in which the resolver 30, the motor unit 16, and the cross roller bearing 14 are arranged in the recited order from the radially inner side on a radially identical plane.

As shown in FIG. 28, the cross roller bearing 14 has the different two contact angles $\theta_1$ and $\theta_2$. The motor unit 16 is arranged such that a gap surface thereof is located between the straight line $L_1$ extending in the direction of the contact angle $\theta_1$ from the vertex O of the contact angles and the straight line $L_2$ extending in the direction of the contact angle $\theta_2$ from the vertex O and on the side of the inner ring 14a and is arranged such that the gap surface is located within the bearing width. The resolver 30, the motor unit 16, and the cross roller bearing 14 are arranged on a radially identical plane.

In the stator 22, the annular inner wall member 22a projecting upward in the axial direction (the upward direction in FIG. 28) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 28) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner ring 14a is fixed to the outer wall member 22b of the stator 22 in a state in which the inner ring 14a is pressed in the axial direction. Specifically, the inner ring 14a is fixed by setting the upper end of the outer wall member 22b of the stator 22 in contact with the lower surface of the inner ring 14a, setting the pressing section 26b of the inner ring clamp 26 in contact with the upper surface of the inner ring 14a, and fastening the inner ring clamp 26 to the outer wall member 22b of the stator 22 with the bolt 26a.

The outer ring 14b is fixed to the outer wall member 12b of the rotor 12 in a state in which the outer ring 14b is pressed in the axial direction. Specifically, the outer ring 14b is fixed by setting the lower end of the outer wall member 12b of the rotor 12 in contact with the upper surface of the outer ring 14b, setting the pressing section 28b of the outer ring clamp 28 in contact with the lower surface of the outer ring 14b, and fastening the outer ring clamp 28 to the outer wall member 12b of the rotor 12 with the bolt 28a.

The permanent magnet 16a is attached to the outside edge of the inner wall member 12a of the rotor 12. On the other hand, the coil 16b is attached to the inside edge of the inner ring clamp 26 by the bolt 16c and fixed to the inside edge side of the outer wall member 22b of the stator 22 integrally with the inner ring clamp 26.

The resolver 30 is a resolver of the ABS/INC integral type that outputs a single-pole resolver signal and a multi-pole resolver signal. The resolver 30 has a function equivalent to that of the resolver 30 in the fifth and sixth embodiments except that the resolver 30 is integrally configured. The resolver rotor 18 is attached to the inside edge of the inner wall member 12a of the rotor 12 by the bolt 18a. On the other hand, the resolver stator 20 is attached to the outside edge of the inner wall member 22a of the stator 22 by the bolt 20a.

In this way, in the fifth configuration, the resolver 30, the motor unit 16, and the cross roller bearing 14 are arranged in the recited order from the radially inner side on a radially identical plane.

Consequently, besides the effect of reducing the likelihood of misdetection of the resolver 30 and the effect of realizing extension of the life of the cross roller bearing 14, since the cross roller bearing 14 is arranged on the radially outermost side, it is possible to house the cross roller bearing 14 having a large diameter and realize high rigidity.

In the configurations shown in FIGS. 24 to 28, the resolver of the ABS/INC integral type is provided. However, the present invention is not limited to this. The thin motor 100 can also be configured by only the resolver of the ABS type, can also be configured by only the resolver of the INC type, or can also be configured by the resolvers of the ABS type and the INC type.

In the sixth embodiment, the resolver 30, the cross roller bearing 14, and the motor unit 16 are arranged in the recited order from the radially inner side on a radially identical plane.

However, the present invention is not limited to this. The arrangement order of the resolver 30, the cross roller bearing 14, and the motor unit 16 can be arbitrary. For example, five configurations explained below can be adopted.

First, a first configuration is explained.

Figure 29:
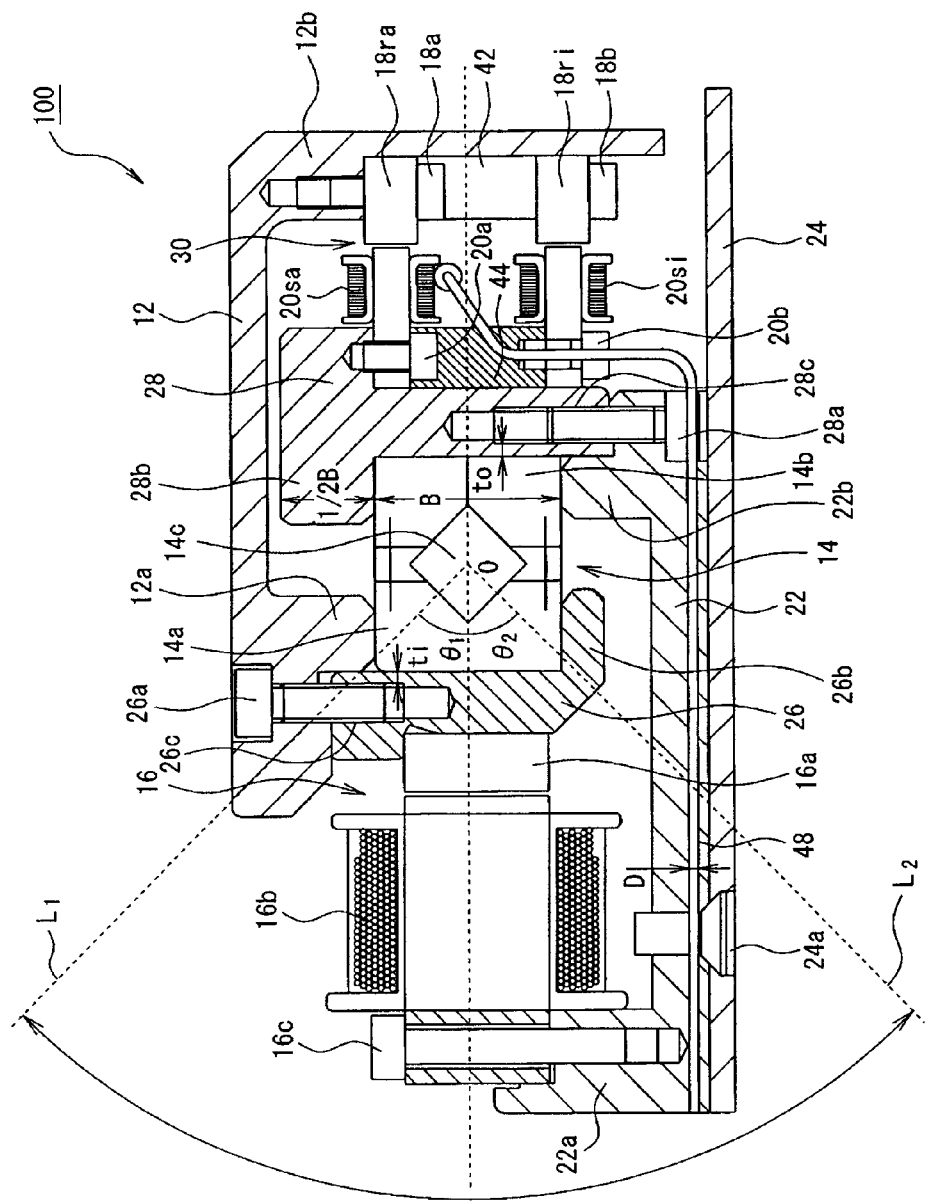
FIG. 29 is a sectional view in the axial direction of the thin motor 100 in the case in which the configuration shown in FIG. 24 is applied to the sixth embodiment.

FIG. 29 is a sectional view in the axial direction of the thin motor 100 in the case in which the configuration shown in FIG. 24 is applied to the sixth embodiment.

As shown in FIG. 29, the resolver 30 is configured as the resolvers of the ABS type and the INC type in the sixth embodiment rather than the resolver of the ABS/INC integral type.

The resolver rotors 18ra and 18ri are arranged at a very small interval via the inter-rotor seat 42. The resolver rotor 18ra is fixed and attached by the bolt 18a between the inside edge of the outer wall member 12b of the rotor 12 and the upper surface of the inter-rotor seat 42. The resolver rotor 18ri is attached to the lower surface of the inter-rotor seat 42 by the bolt 18b.

The resolver stators 20sa and 20si are arranged at a very small interval via the inter-stator seat 44. The resolver stator 20sa is fixed and attached by the bolt 20a between the outside edge of the outer ring clamp 28 and the upper surface of the inter-stator seat 44. The resolver stator 20si is attached to the lower surface of the inter-stator seat 44 by the bolt 20b. Therefore, the resolver stators 20sa and 20si are fixed to the outside edge side of the outer wall member 22b of the stator 22 integrally with the outer ring clamp 28.

The height D of the wiring tube 48 is set to the value obtained by the above Expression (9).

The thickness ti between the outside edge of the inner ring clamp 26 and the inner wall surface of the bolt hole 26c is set to a value in the range of the above Expression (10) and the thickness to between the inside edge of the outer ring clamp 28 and the inner wall surface of the bolt hole 28c is set to a value in the range of the above Expression (11).

The height H of the pressing section 28b of the outer ring clamp 28 is set to the value obtained by the above Expression (12).

Next, a second configuration is explained.

Figure 30:
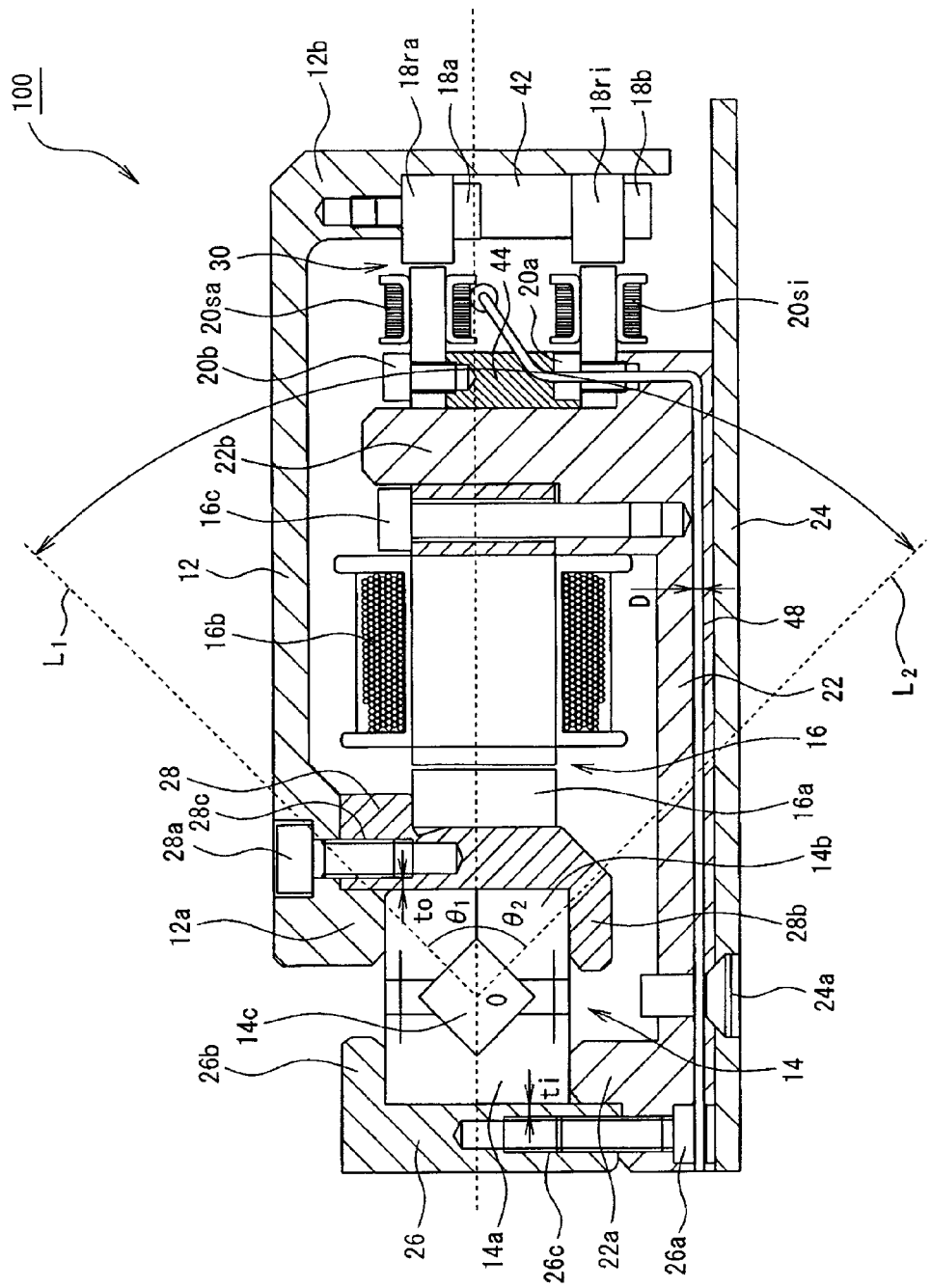
FIG. 30 is a sectional view in the axial direction of the thin motor 100 in the case in which the configuration shown in FIG. 25 is applied to the sixth embodiment.

FIG. 30 is a sectional view in the axial direction of the thin motor 100 in the case in which the configuration shown in FIG. 25 is applied to the sixth embodiment.

As shown in FIG. 30, the resolver 30 is configured as the resolvers of the ABS type and the INC type in the fourth embodiment rather than the resolver of the ABS/INC integral type.

The resolver rotors 18ra and 18ri are arranged at a very small interval via the inter-rotor seat 42. The resolver rotor 18ra is fixed and attached by the bolt 18a between the inside edge of the outer wall member 12b of the rotor 12 and the upper surface of the inter-rotor seat 42. The resolver rotor 18ri is attached to the lower surface of the inter-rotor seat 42 by the bolt 18b.

The resolver stators 20sa and 20si are arranged at a very small interval via the inter-stator seat 44. The resolver stator 20si is fixed and attached by the bolt 20a between the outside edge of the outer wall member 22b of the stator 22 and the lower surface of the inter-stator seat 44. The resolver stator 20sa is attached to the upper surface of the inter-stator seat 44 by the bolt 20b.

The height D of the wiring tube 48 is set to the value obtained by the above Expression (9).

The thickness ti between the outside edge of the inner ring clamp 26 and the inner wall surface of the bolt hole 26c is set to a value in the range of the above Expression (10) and the thickness to between the inside edge of the outer ring clamp 28 and the inner wall surface of the bolt hole 28c is set to a value in the range of the above Expression (11).

Next, a third configuration is explained.

Figure 31:
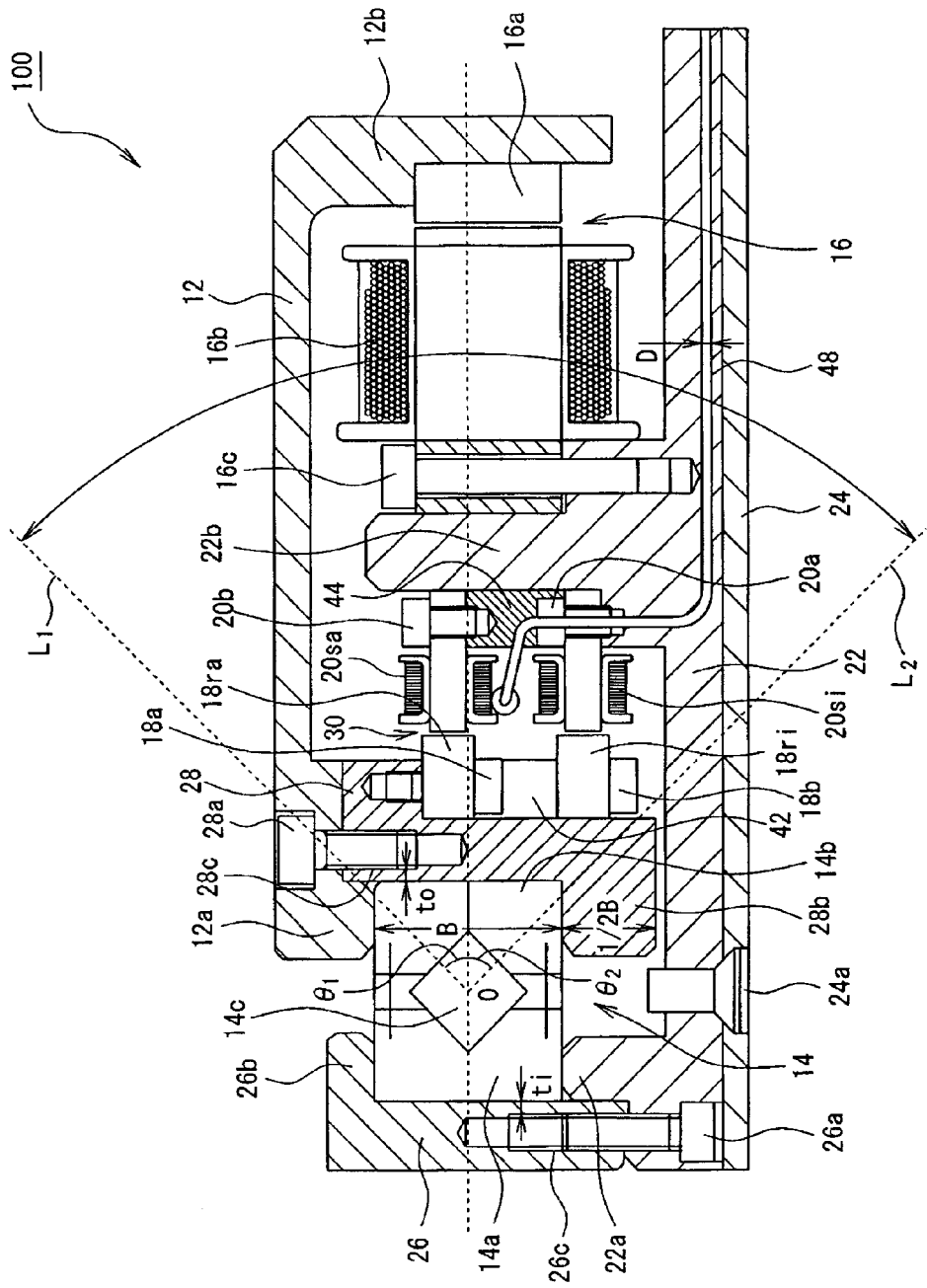
FIG. 31 is a sectional view in the axial direction of the thin motor 100 in the case in which the configuration shown in FIG. 26 is applied to the sixth embodiment.

FIG. 31 is a sectional view in the axial direction of the thin motor 100 in the case in which the configuration shown in FIG. 26 is applied to the sixth embodiment.

As shown in FIG. 31, the resolver 30 is configured as the resolvers of the ABS type and the INC type in the sixth embodiment rather than the resolver of the ABS/INC integral type.

The resolver rotors 18ra and 18ri are arranged at a very small interval via the inter-rotor seat 42. The resolver rotor 18ra is fixed and attached by the bolt 18a between the outside edge of the outer ring clamp 28 and the upper surface of the inter-rotor seat 42. The resolver rotor 18ri is attached to the lower surface of the inter-rotor seat 42 by the bolt 18b.

The resolver stators 20sa and 20si are arranged at a very small interval via the inter-stator seat 44. The resolver stator 20si is fixed and attached by the bolt 20a between the inside edge of the outer wall member 22b of the stator 22 and the lower surface of the inter-stator seat 44. The resolver stator 20sa is attached to the upper surface of the inter-stator seat 44 by the bolt 20b.

The height D of the wiring tube 48 is set to the value obtained by the above Expression (9).

The thickness ti between the outside edge of the inner ring clamp 26 and the inner wall surface of the bolt hole 26c is set to a value in the range of the above Expression (10) and the thickness to between the inside edge of the outer ring clamp 28 and the inner wall surface of the bolt hole 28c is set to a value in the range of the above Expression (11).

The height H of the pressing section 28b of the outer ring clamp 28 is set to the value obtained by the above Expression (12).

Next, a fourth configuration is explained.

Figure 32:
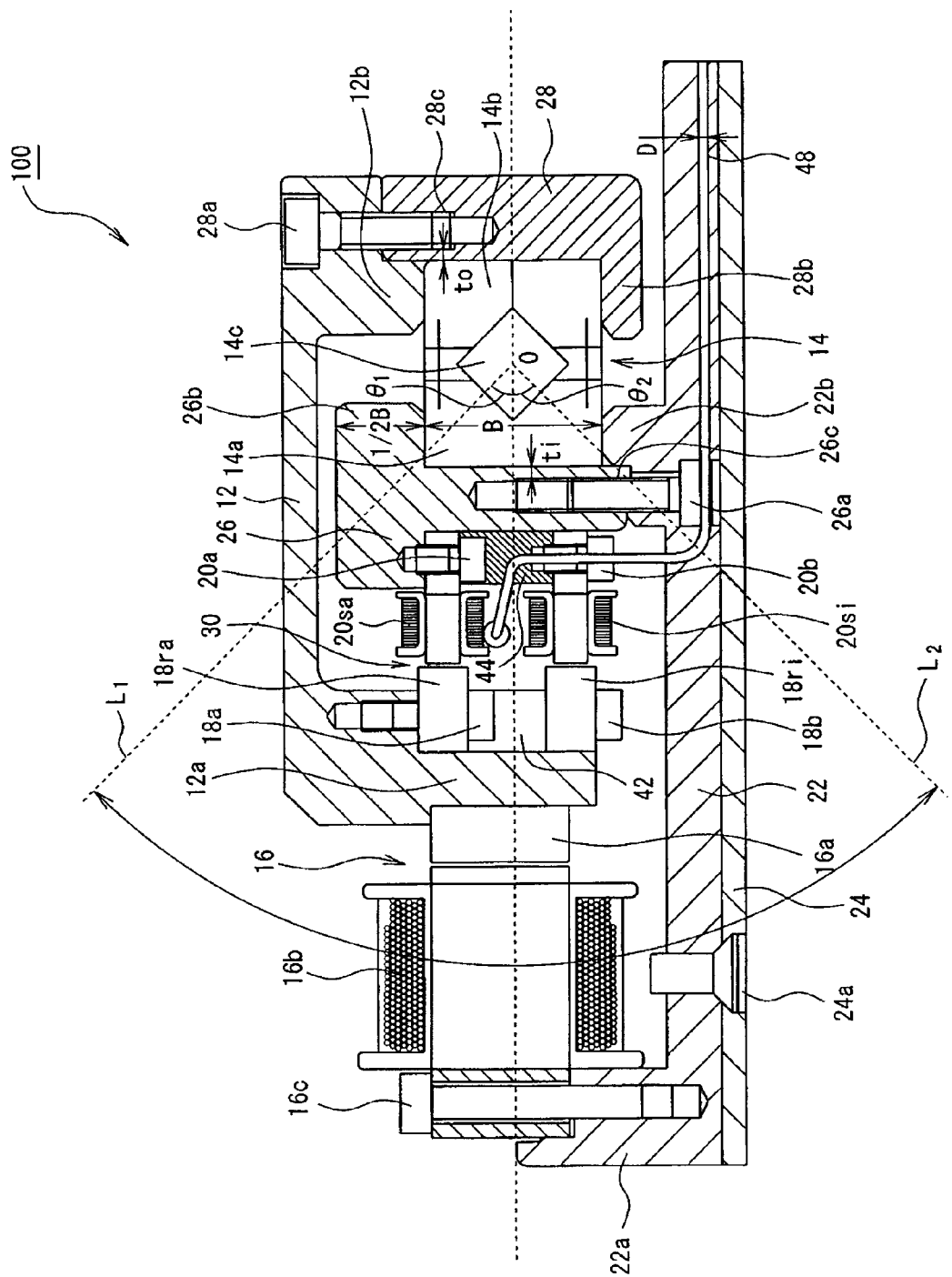
FIG. 32 is a sectional view in the axial direction of the thin motor 100 in the case in which the configuration shown in FIG. 27 is applied to the sixth embodiment.

FIG. 32 is a sectional view in the axial direction of the thin motor 100 in the case in which the configuration shown in FIG. 27 is applied to the sixth embodiment.

As shown in FIG. 32, the resolver 30 is configured as the resolvers of the ABS type and the INC type in the sixth embodiment rather than the resolver of the ABS/INC integral type.

The resolver rotors 18ra and 18ri are arranged at a very small interval via the inter-rotor seat 42. The resolver rotor 18ra is fixed and attached by the bolt 18a between the outside edge of the inner wall member 12a of the rotor 12 and the upper surface of the inter-rotor seat 42. The resolver rotor 18ri is attached to the lower surface of the inter-rotor seat 42 by the bolt 18b.

The resolver stators 20sa and 20si are arranged at a very small interval via the inter-stator seat 44. The resolver stator 20sa is fixed and attached by the bolt 20a between the inside edge of the inner ring clamp 26 and the upper surface of the inter-stator seat 44. The resolver stator 20si is attached to the lower surface of the inter-stator seat 44 by the bolt 20b. Therefore, the resolver stators 20sa and 20si are fixed to the inside edge side of the outer wall member 22b of the stator 22 integrally with the inner ring clamp 26.

The height D of the wiring tube 48 is set to the value obtained by the above Expression (9).

The thickness ti between the outside edge of the inner ring clamp 26 and the inner wall surface of the bolt hole 26c is set to a value in the range of the above Expression (10) and the thickness to between the inside edge of the outer ring clamp 28 and the inner wall surface of the bolt hole 28c is set to a value in the range of the above Expression (11).

The height H of the pressing section 26b of the inner ring clamp 26 is set to the value obtained by the above Expression (12).

Next, a fifth configuration is explained.

Figure 33:
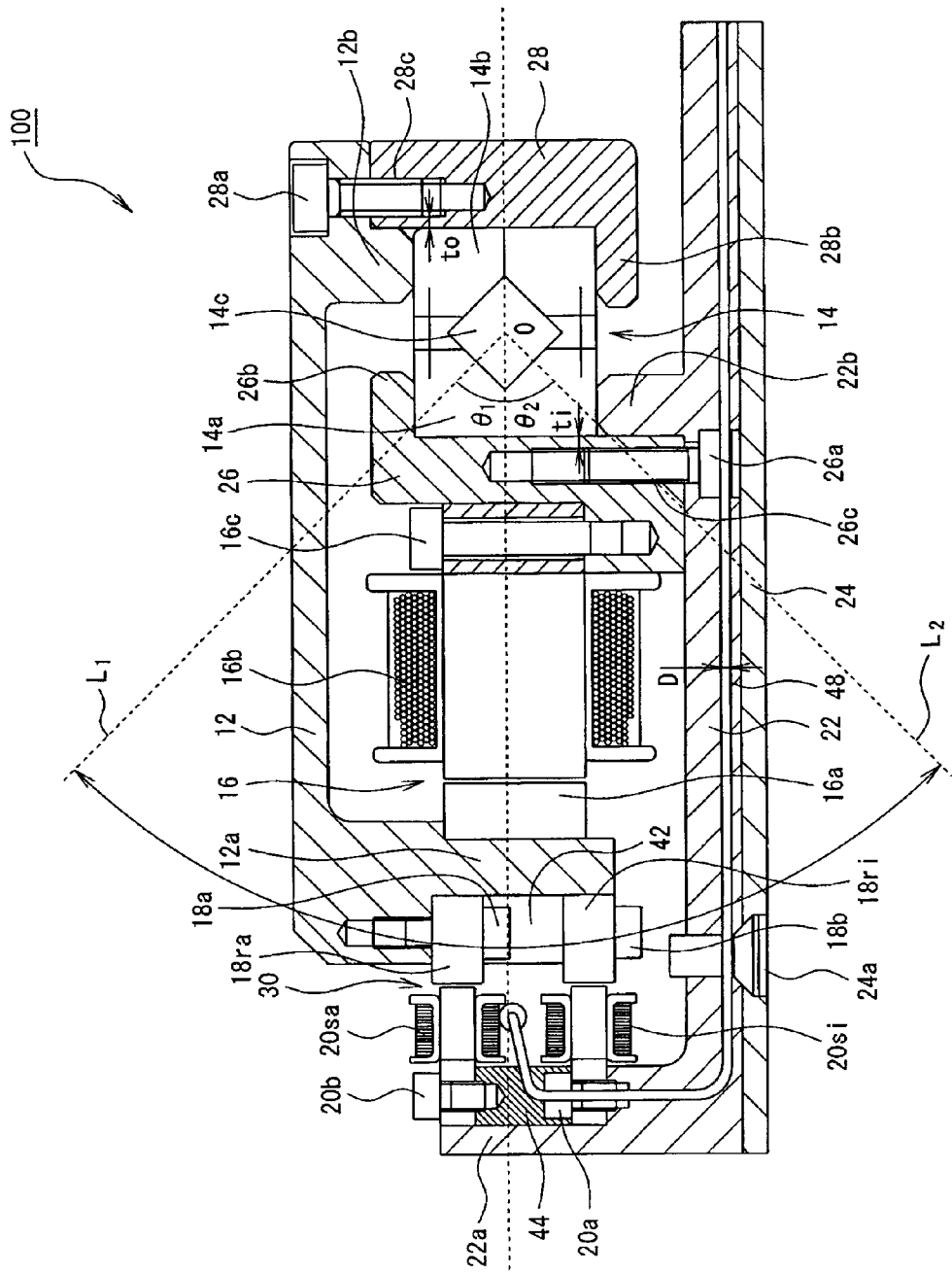
FIG. 33 is a sectional view in the axial direction of the thin motor 100 in the case in which the configuration shown in FIG. 28 is applied to the sixth embodiment.

FIG. 33 is a sectional view in the axial direction of the thin motor 100 in the case in which the configuration shown in FIG. 28 is applied to the sixth embodiment.

As shown in FIG. 33, the resolver 30 is configured as the resolvers of the ABS type and the INC type in the sixth embodiment rather than the resolver of the ABS/INC integral type.

The resolver rotors 18ra and 18ri are arranged at a very small interval via the inter-rotor seat 42. The resolver rotor 18ra is fixed and attached by the bolt 18a between the inside edge of the inner wall member 12a of the rotor 12 and the upper surface of the inter-rotor seat 42. The resolver rotor 18ri is attached to the lower surface of the inter-rotor seat 42 by the bolt 18b.

The resolver stators 20sa and 20si are arranged at a very small interval via the inter-stator seat 44. The resolver stator 20si is fixed and attached by the bolt 20a between the outside edge of the inner wall member 22a of the stator 22 and the lower surface of the inter-stator seat 44. The resolver stator 20sa is attached to the upper surface of the inter-stator seat 44 by the bolt 20b.

The height D of the wiring tube 48 is set to the value obtained by the above Expression (9).

The thickness ti between the outside edge of the inner ring clamp 26 and the inner wall surface of the bolt hole 26c is set to a value in the range of the above Expression (10) and the thickness to between the inside edge of the outer ring clamp 28 and the inner wall surface of the bolt hole 28c is set to a value in the range of the above Expression (11).

In the configurations shown in FIGS. 29 to 33, the resolvers of the ABS type and the INC type are provided. However, the present invention is not limited to this. The thin motor 100 can also be configured by only the resolver of the ABS type, can also be configured by only the resolver of the INC type, or can also be configured by the resolver of the ABS/INC integral type.

In the fifth and sixth embodiments, the thin motor 100 is configured as the inner rotor type in which the inner side of the thin motor 100 rotates. However, the present invention is not limited to this. The thin motor 100 can also be configured as the outer rotor type in which the outer side of the thin motor 100 rotates. In this case, the rotor 12 is the inner-ring supported member and the stator 22 is the outer-ring supported member.

In the configurations shown in FIGS. 24 to 33, the thin motor 100 is configured as the outer rotor type in which the outer side of the thin motor 100 rotates. However, the present invention is not limited to this. The thin motor 100 can also be configured as the inner rotor type in which the inner side of the thin motor 100 rotates. In this case, the rotor 12 is the inner-ring supported member and the stator 22 is the outer-ring supported member.

In the fifth embodiment, the resolver rotor 18 is attached to the outside edge of the inner wall member 12a of the rotor 12 and the resolver stator 20 is attached to the inside edge of the inner ring clamp 26. However, the present invention is not limited to this. The resolver stator 20 can also be attached to the outside edge of the inner wall member 12a of the rotor 12 and the resolver rotor 18 can also be attached to the inside edge of the inner ring clamp 26. The same holds true for the configurations shown in FIGS. 24 to 33.

In the fifth and sixth embodiments, the resolver 30 of the ABS type and the Inc type is provided. However, the present invention is not limited to this. A tape scale that detects a mark formed in a circumferential direction can also be provided. The same holds true for the configurations shown in FIGS. 24 to 33.

In the fifth and sixth embodiments, the inner wall member 22a and the outer wall member 22b of the stator 22 are formed as a part of the stator 22. However, the present invention is not limited to this. The inner wall member 22a or the outer wall member 22b of the stator 22 can also be configured by a separate member and attached to the stator 22. The inner ring clamp 26 can also be directly attached to the stator 22 without forming the inner wall member 22a of the stator 22. However, in this case, the inner ring clamp 26 configures the inner wall member of the stator 22. The same holds true for the configurations shown in FIGS. 24 to 33.

In the fifth and sixth embodiments, the inner wall member 12a and the outer wall member 12b of the rotor 12 are formed as a part of the rotor 12. However, the present invention is not limited to this. The inner wall member 12a or the outer wall member 12b of the rotor 12 can also be configured by a separate member and attached to the rotor 12. The outer ring clamp 28 can also be directly attached to the rotor 12 without forming the outer wall member 12b of the rotor 12. However, in this case, the outer ring clamp 28 configures the outer wall member of the rotor 12. The same holds true for the configurations shown in FIGS. 24 to 33.

In the fifth and sixth embodiments, the resolver 30, the cross roller bearing 14, and the motor unit 16 are arranged on a radially identical plane. However, the present invention is not limited to this. The motor unit 16 does not have to be arranged on a plane radially identical with the resolver 30 and the cross roller bearing 14. The same holds true for the configurations shown in FIGS. 24 to 33.

In the fifth and sixth embodiments, the cross roller bearing 14 is applied. However, the present invention is not limited to this. A four-point contact ball bearing, an angular ball bearing, a deep groove ball bearing, a cylindrical roller bearing, a tapered roller bearing, and the like may be applied. In this case, it is desirable to adopt a roller bearing that can simultaneously receive moment load, axial load, and radial load. For example, the four-point contact ball bearing corresponds to such a roller bearing. The same holds true for the configurations shown in FIGS. 24 to 33.

In the fifth and sixth embodiments, the roller bearing device having an intra-contact angle arrangement structure of a driver and the roller bearing device having an intra-bearing width arrangement structure of a driver according to the present invention are applied to the structure for rotatably supporting the stator 22 and the rotor 12. However, the present invention is not limited to this. The roller bearing devices can be applied to any structure as long as the structure is interposed between two members and relatively rotatably supports the members. The same holds true for the configurations shown in FIGS. 24 to 33.

Seventh Embodiment

Figure 34:
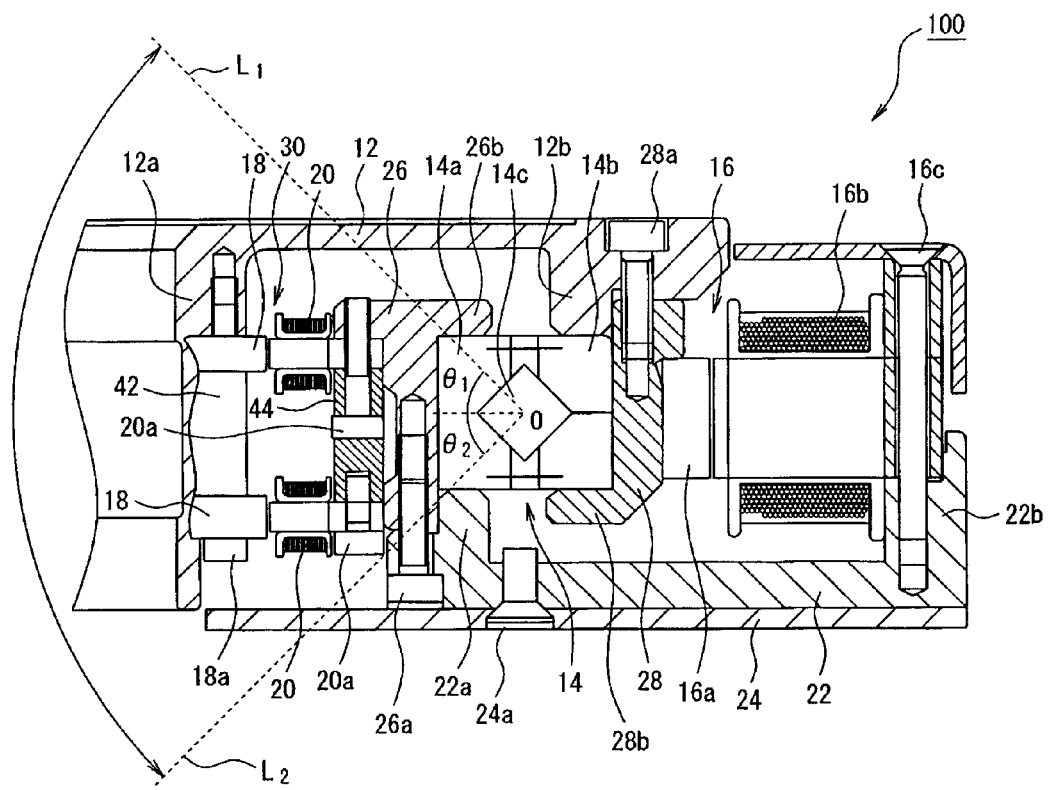
FIG. 34 is a sectional view in the axial direction of the thin motor 100 according to an embodiment of the present invention.

Next, a seventh embodiment of the present invention is explained with reference to the drawings. FIG. 34 is a diagram showing the seventh embodiment of a roller bearing device having an intra-contact angle arrangement structure of a rotation sensor according to the present invention.

First, a configuration of the thin motor 100 to which the present invention is applied is explained.

FIG. 34 is a sectional view in the axial direction of the thin motor 100 according to this embodiment.

The thin motor 100 includes, as shown in FIG. 34, the stator 22 as a stator, the rotor 12 as a rotor, the cross roller bearing 14 that is interposed between the rotor 12 and the stator 22 and rotatably supports the rotor 12, the motor unit 16 that applies rotation torque to the rotor 12, and the resolver 30 that detects a rotation angle position of the rotor 12.

The cross roller bearing 14 has different two contact angles $\theta_1$ and $\theta_2$. As the contact angles $\theta_1$ and $\theta_2$ are set larger, an axial load bearing ability of the cross roller bearing 14 can be improved. Conversely, as the contact angles $\theta_1$ and $\theta_2$ are set smaller, a radial load bearing ability of the cross roller bearing 14 can be improved. It is arbitrarily selected according to an environment of use and a purpose of use of the thin motor 100 which of the bearing abilities is improved. Therefore, values of the contact angles $\theta_1$ and $\theta_2$ are not specifically limited.

The resolver 30 is arranged between the straight line $L_1$ extending in the direction of the contact angle $\theta_1$ from the vertex O of the contact angles and the straight line $L_2$ extending in the direction of the contact angle $\theta_2$ from the vertex O and on the side of the inner ring 14*a* (hereinafter referred to as within two contact angle). The motor unit 16 is arranged on the opposite side of the resolver 30 across the cross roller bearing 14. Further, the resolver 30, the cross roller bearing 14, and the motor unit 16 are arranged on a radially identical plane.

In the stator 22, the annular inner wall member 22*a* projecting upward in the axial direction (the upward direction in FIG. 34) is formed. Further on the radially outer side than the inner wall member 22*a*, the annular outer wall member 22*b* projecting upward in the axial direction is formed. On the other hand, in the rotor 12, the annular inner wall member 12*a* projecting downward in the axial direction (the downward direction in FIG. 34) is formed. Further on the radially outer side than the inner wall member 12*a*, the annular outer wall member 12*b* projecting downward in the axial direction is formed. The stator 22 and the rotor 12 are arranged to extend over each other such that the inner wall member 22*a* of the stator 22 is located between the inner wall member 12*a* and the outer wall member 12*b* of the rotor 12 and the outer wall member 12*b* of the rotor 12 is located between the inner wall member 22*a* and the outer wall member 22*b* of the stator 22.

The cross roller bearing 14 includes the inner ring 14*a*, the outer ring 14*b*, and the plural cross rollers (rollers) 14*c* rollably provided between the inner ring 14*a* and the outer ring 14*b*. The cross roller 14*c* is formed in a substantially cylindrical shape having a diameter slightly larger than length. An even number-th rotation axis on a track and an odd number-th rotation axis on the track incline 90° with respect to each other.

The inner ring 14*a* is fixed to the inner wall member 22*a* of the stator 22 in a state in which the inner ring 14*a* is pressed in the axial direction. Specifically, the inner ring 14*a* is fixed by setting the upper end of the inner wall member 22*a* of the stator 22 in contact with the lower surface of the inner ring 14*a*, setting the pressing section 26*b* of the inner ring clamp 26 in contact with the upper surface of the inner ring 14*a*, and fastening the inner ring clamp 26 to the inner wall member 22*a* of the stator 22 with the bolt 26*a*.

The outer ring 14*b* is fixed to the outer wall member 12*b* of the rotor 12 in a state in which the outer ring 14*b* is pressed in the axial direction. Specifically, the outer ring 14*b* is fixed by setting the lower end of the outer wall member 12*b* of the rotor 12 in contact with the upper surface of the outer ring 14*b*, setting the pressing section 28*b* of the outer ring clamp 28 in contact with the lower surface of the outer ring 14*b*, and fastening the outer ring clamp 28 to the outer wall member 12*b* of the rotor 12 with the bolt 28*a*.

The stator 22 is fixed to the fixing plate 24 by the bolt 24*a* and the rotor 12 fits in the outside edge of an output shaft.

The motor unit 16 includes the permanent magnet 16*a* and the coil 16*b* arranged to be opposed to the permanent magnet 16*a* at a predetermined interval. The permanent magnet 16*a* is attached to the outside edge of the outer ring clamp 28 and fixed to the outside edge side of the outer wall member 12*b* of the rotor 12 integrally with the outer ring clamp 28. On the other hand, the coil 16*b* is attached to the outer wall member 22*b* of the stator 22 by the bolt 16*c*.

The resolver 30 is a resolver of the outer rotor type including the resolver rotor 18 made of an hollow annular laminated core and the resolver stator 20 made of an annular laminated core that is arranged to be opposed to the resolver rotor 18 at a predetermined interval and in which plural stator poles are formed at equal intervals in the circumferential direction thereof. In FIG. 34, one resolver 30 (the upper one in the axial direction) is a single-pole resolver of the ABS type that includes the annular resolver rotor 18 having an inner circumference decentered with respect to the shaft center of the cross roller bearing 14 and outputs a single-pole resolver signal in which a fundamental wave component of a reluctance change is one period per one rotation of the resolver rotor 18. The other resolver 30 (the lower one in the axial direction) is a multi-pole resolver of the INC type that includes the resolver rotor 18 in which plural teeth of a salient pole shape are formed at equal intervals in a circumferential direction thereof and outputs a multi-pole resolver signal in which a fundamental wave component of a reluctance change is a multi-period per one rotation of the resolver rotor 18.

The resolver rotors 18 of the two resolvers 30 are arranged at a very small interval via the inter-rotor seat 42 and attached to the outside edge of the inner wall member 12*a* of the rotor 12 by the bolt 18*a*. On the other hand, the resolver stators 20 of the two resolvers 30 are arranged at a very small interval via the inter-stator seat 44, attached to the inside edge of the inner ring clamp 26 by the bolt 20*a*, and fixed to the inside edge side of the inner wall member 22*a* of the stator 22 integrally with the inner ring clamp 26.

The coil 16*b* is energized, whereby the rotor 12 and the resolver rotor 18 integrally rotate, a reactance change is detected by the resolver stator 20, and control of rotating speed and positioning is performed by the controller (not shown).

Next, operation in this embodiment is explained.

When the coil 16*b* is energized, rotation torque is applied to the rotor 12 and the rotor 12 rotates. A reluctance change between the resolver 30 and the resolver rotor 18, which rotates integrally with the rotor 12, is detected by the resolver 30 and control of rotating speed and positioning is performed by the controller (not shown).

When moment load is applied to the thin motor 100, the thin motor 100 tilts around the cross roller bearing 14. However, since the resolver 30 is arranged within the two contact angles, it is possible to reduce a gap change of the resolver 30.

Since the resolver 30, the cross roller bearing 14, and the motor unit 16 are arranged on a radially identical plane, it is possible to reduce the height (the length in the axial direction) of the thin motor 100.

Further, since the resolver 30 is arranged on the opposite side of the motor unit 16 across the cross roller bearing 14, the resolver 30 is less easily affected by noise and heat from the motor unit 16.

Further, when a method of, for example, increasing the preload of the cross roller bearing 14 is adopted, whereas the gap change can be suppressed, a deficiency in that the life of the cross roller bearing 14 is shortened is involved. However, in the present invention, since the gap change is reduced by arranging the resolver 30 in a position where the gap change is small, it is possible to realize extension of the life of the cross roller bearing 14.

In this way, in this embodiment, the thin motor 100 includes the cross roller bearing 14 including the inner ring 14a and the outer ring 14b, the stator 22 supported by the inner ring 14a, the rotor 12 supported by the outer ring 14b, the motor unit 16 that applies rotation torque to the rotor 12, and the resolver 30 that detects a rotation angle position of the rotor 12. The resolver 30 is arranged within the two contact angles.

Consequently, even if the moment load is applied to the thin motor 100, since the resolver 30 is arranged in the position where the gap change is small, compared with the past, it is possible to reduce the gap change of the resolver 30 and reduce the likelihood that the resolver 30 makes misdetection. Further, compared with the method of, for example, increasing the preload of the cross roller bearing 14, it is possible to realize extension of the life of the cross roller bearing 14.

In this embodiment, the resolver 30, the cross roller bearing 14, and the motor unit 16 are arranged on a radially identical plane.

Consequently, it is possible to reduce the height of the thin motor 100.

Further, in this embodiment, the resolver 30, the cross roller bearing 14, and the motor unit 16 are arranged in the recited order from the radially inner side on a radially identical plane.

Consequently, since the resolver 30 is arranged on the opposite side of the motor unit 16 across the cross roller bearing 14, the resolver 30 is less easily affected by noise and heat from the motor unit 16 and it is possible to realize high detection accuracy.

Further, in this embodiment, the cross roller bearing 14 is adopted.

Consequently, since it is possible to simultaneously receive moment load, axial load, and radial load, it is possible to reduce a gap change due to the moment load while maintaining rigidity against the axial load and the radial load.

Further, in this embodiment, the resolver 30 includes the annular resolver rotor 18 having an inner circumference decentered with respect to the shaft center of the cross roller bearing 14 and the resolver stator 20 that is arranged to be opposed to the resolver rotor 18 at the predetermined interval and detects a reluctance change between the resolver stator 20 and the resolver rotor 18.

In this way, in the resolver 30 of a type in which a fundamental wave component of the reluctance change is one period per one rotation, since the influence of the gap change due to the moment load is large, the reduction in the gap change is effective for prevention of misdetection.

In the seventh embodiment, the cross roller bearing 14 corresponds to the roller bearing in the inventions 32 to 36, the stator 22 corresponds to the inner-ring supported member of the invention 32, 34, or 36, the rotor 12 corresponds to the outer-ring supported member of the invention 32, 34, or 36, and the resolver 30 corresponds to the rotation sensor of the inventions 32 to 36. The resolver rotor 18 corresponds to the detected member of the invention 36, the resolver stator 20 corresponds to the detecting means of the invention 36, the motor unit 16 corresponds to the driver of the invention 34, the straight line $L_1$ corresponds to the first straight line of the invention 32 or 33, and the straight line $L_2$ corresponds to the second straight line of the invention 32 or 33.

Eighth Embodiment

Figure 35:
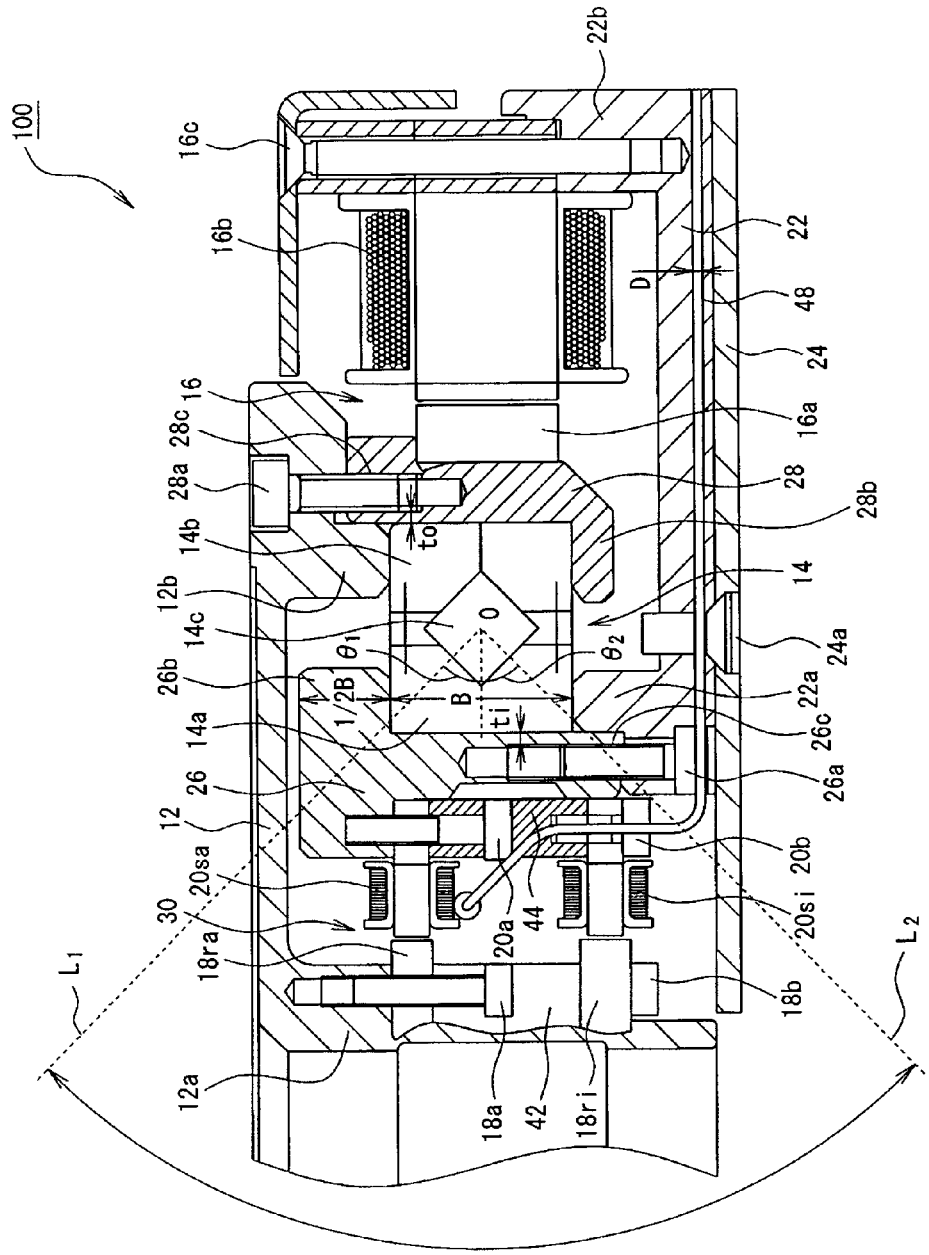
FIG. 35 is a sectional view in the axial direction of the thin motor 100 according to an embodiment of the present invention.
Figure 36:
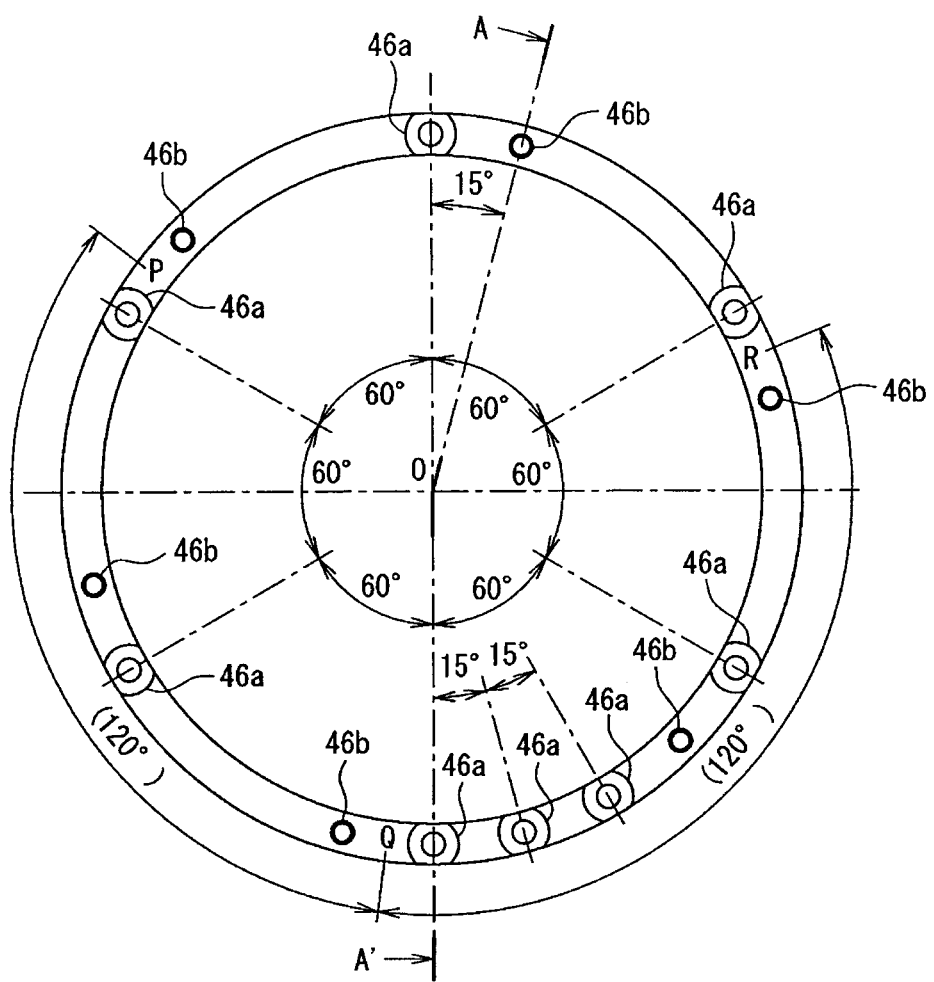
FIG. 36 is a bottom view of the inter-rotor seat 42.
Figure 37:
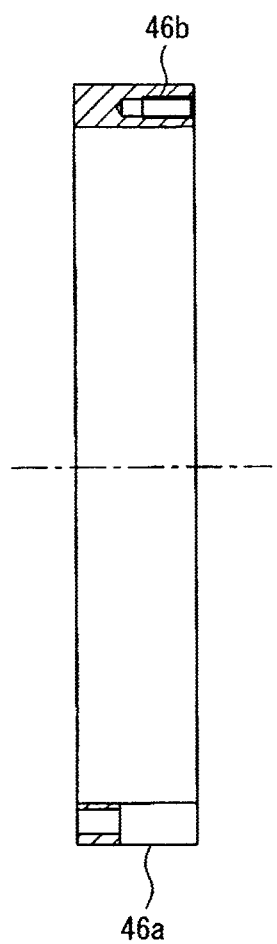
FIG. 37 is a sectional view in the axial direction taken along an A-O-A' line in FIG. 36.

Next, an eighth embodiment of the present invention is explained with reference to the drawings. FIGS. 35 to 37 are diagrams showing the eighth embodiment of the roller bearing device having an intra-contact angle arrangement structure of a rotation sensor according to the present invention.

First, the configuration of the resolver 30 is explained.

FIG. 35 is a sectional view in the axial direction of the thin motor 100 according to this embodiment.

The resolver 30 is a resolver of the outer rotor type including, as shown in FIG. 35, a resolver rotor made of a hollow annular laminated core and a resolver stator that is arranged to be opposed to the resolver rotor at a predetermined interval and in which plural stator poles are formed at equal intervals in a circumferential direction thereof. In FIG. 35, one resolver 30 (the upper one in the axial direction) is a single-pole resolver of the ABS type that includes the annular resolver rotor 18ra having an inner circumference decentered with respect to the shaft center of the cross roller bearing 14 and the resolver stator 20sa arranged to be opposed to the resolver rotor 18ra and outputs a single-pole resolver signal in which a fundamental wave component of a reluctance change is one period per one rotation of the resolver rotor 18ra. The other resolver (the lower one in the axial direction) is a multi-pole resolver of the INC type that includes the resolver rotor 18ri in which plural teeth of a salient pole shape are formed at equal intervals in a circumferential direction thereof and the resolver stator 20si arranged to be opposed to the resolver rotor 18ri and outputs a multi-pole resolver signal in which a fundamental wave component of a reluctance change is a multi-period per one rotation of the resolver rotor 18ri.

The resolver rotors 18ra and 18ri are arranged at a very small interval via an inter-rotor seat 42. The resolver rotor 18ra is fixed and attached by the bolt 18a between the outside edge of the inner wall member 12a of the rotor 12 and the upper surface of the inter-rotor seat 42. The resolver rotor 18ri is attached to the lower surface of the inter-rotor seat 42 by bolts 18b.

FIG. 36 is a bottom view of the inter-rotor seat 42.

FIG. 37 is a sectional view in the axial direction taken along an A-O-A' line in FIG. 36.

In the lower surface of the inter-rotor seat 42, as shown in FIG. 36, the bolt holes 46a through which the bolts 18a are inserted and the bolt holes 46b through which the bolts 18b are inserted are formed. Six bolt holes 46a are formed at intervals of 60° in the circumferential direction of the inter-rotor seat 42 and two bolt holes 46a are formed at an interval of 15° counterclockwise from the bolt hole 46a at the bottom of FIG. 36. The bolt holes 46b are respectively formed in positions at 15° clockwise from the bolt holes 46a formed at the intervals of 60°.

As shown in FIG. 37, the bolt hole 46a pierces through the inter-rotor seat 42 in the axial direction and the depth of counter bore thereof reaches depth of about a half in the axial direction of the inter-rotor seat 42. The depth of the bolt hole 46b reaches depth of about a half in the axial direction of the inter-rotor seat 42.

On the other hand, as shown in FIG. 35, the resolver stators 20sa and 20si are arranged at a very small interval via the inter-stator seat 44. The resolver stator 20sa is fixed and attached by the bolt 20a between the inside edge of the inner ring clamp 26 and the upper surface of the inter-stator seat 44. The resolver stator 20si is attached to the lower surface of the inter-stator seat 44 by bolts 20b. Therefore, the resolver stators 20sa and 20si are fixed to the inside edge side of the inner wall member 22a of the stator 22 integrally with the inner ring clamp 26.

Next, the configuration of the stator 22 is explained.

In the stator 22, as shown in FIG. 35, the wiring tube 48 piercing through from the radially inner side to the radially outer side of the stator 22 is formed. The wire of the resolver 30 are housed in the wiring tube 48.

The height D of the wiring tube 48 is set to a value obtained by the following Expression (13) when a diameter of one wire of the resolver 30 is represented as d and a predetermined margin is represented as α (0<α<d):

$$D=2d+\alpha \quad (13)$$

The wires of the resolver 30 include plural wires such as a power line and a ground line. If these wires can be horizontally wired side by side without a twist, d is enough for the height D of the wiring tube. However, actually, the wires cross one another in the axial direction. Therefore, it is desirable to set the height D as 2d+α taking into account height required for the wires to cross once (d).

Next, the configuration of the inner ring clamp 26 and the outer ring clamp 28 is explained.

In the inner ring clamp 26, as shown in FIG. 35, the bolt hole 26c through which the bolt 26a is inserted is formed. In the seventh embodiment, the thickness between the outside edge of the inner ring clamp 26 and the inner wall surface of the bolt hole 26c is thickness equivalent to length for about three pitches of the bolt hole 26c. On the other hand, in this embodiment, thickness ti between the outside edge of the inner ring clamp 26 and the inner wall surface of the bolt hole 26c is set to a value in a range of the following Expression (14) when length for one pitch of the bolt hole 26c is represented as pi. Therefore, when the bolt 26a is screwed into the bolt hole 26c, since the outside edge of the inner ring clamp 26 is pushed out to the inner ring 14a side to lock the inner ring 14a, it is possible to fix the inner ring 14a without a gap. Therefore, it is possible to improve detection accuracy.

$$pi<ti<2pi \quad (14)$$

In Expression (14), when the thickness ti is set equal to or larger than 2pi, an action of pushing out the outside edge of the inner ring clamp 26 decreases and it is difficult to fix the inner ring 14a without a gap. On the other hand, when the thickness ti is set equal to or smaller than pi, it is likely that the inner wall of the bolt hole 26c is broken. Therefore, it is desirable to set the thickness ti to a value obtained by the above Expression (14).

In the outer ring clamp 28, as shown in FIG. 35, the bolt hole 28c through which the bolt 28a is inserted is formed. In the seventh embodiment, the thickness between the inside edge of the outer ring clamp 28 and the inner wall surface of the bolt hole 28c is thickness equivalent to length for about three pitches of the bolt hole 28c. On the other hand, in this embodiment, the thickness to between the inside edge of the outer ring clamp 28 and the inner wall surface of the bolt hole 28c is set to a value in a range of the following Expression (15) when length for one pitch of the bolt hole 28c is represented as po. Therefore, when the bolt 28a is screwed into the bolt hole 28c, since the inside edge of the outer ring clamp 28 is pushed out to the outer ring 14b side to lock the outer ring 14b, it is possible to fix the outer ring 14b without a gap. Therefore, it is possible to improve detection accuracy.

$$po<to<2po \quad (15)$$

In Expression (15), when the thickness to is set equal to or larger than 2po, an action of pushing out the inside edge of the outer ring clamp 28 decreases and it is difficult to fix the outer ring 14a without a gap. On the other hand, when the thickness to is set equal to or smaller than po, it is likely that the inner wall of the bolt hole 28c is broken. Therefore, it is desirable to set the thickness to to a value obtained by the above Expression (15).

In the seventh embodiment, the height of the pressing section 26b of the inner ring clamp 26 is about ¼B when the height of the cross roller bearing 14 is represented as B. However, when the height of the pressing section 26b of the inner ring clamp 26 is about ¼B, it is likely that the inner ring clamp 26 tilts to the resolver 30 side and a gap of the resolver 30 changes. Therefore, there is a problem in that a rotation angle position of the rotor 12 cannot be accurately detected.

Therefore, in this embodiment, as shown in FIG. 35, the height H of the pressing section 26b of the inner ring clamp 26 is set to a value obtained by the following Expression (16):

$$H=\tfrac{1}{2}B \quad (16)$$

Consequently, it is possible to reduce the likelihood that the gap of the resolver 30 changes. Therefore, it is possible to reduce the likelihood that the resolver 30 makes misdetection.

The height of the pressing section 28b of the outer ring clamp 28 is set to ¼B.

In this way, in this embodiment, the resolver rotors 18ra and 18ri are arranged at a very small interval via the inter-rotor seat 42 and respectively attached by the two bolts 18a and 18b.

Consequently, since the resolver rotors 18ra and 18ri can be independently fixed, it is possible to adjust each of the positions in the axial direction of the resolver rotors 18ra and 18ri.

Further, in this embodiment, the resolver stators 20sa and 20si are arranged at a very small interval via the inter-stator seat 44 and respectively attached by the two bolts 20a and 20b.

Consequently, since the resolver stators 20sa and 20si can be independently fixed, it is possible to adjust each of the positions in the axial direction of the resolver stators 20sa and 20si.

Further, in this embodiment, the resolver 30 is configured as the resolver of the ABS type and the INC type.

Consequently, it is possible to effectively reduce the influence of the gap change.

Further, in this embodiment, the height D of the wiring tube 48 is set to the value obtained by the above Expression (13).

Consequently, since the height of the wiring tube 48 is reduced, it is possible to reduce the height of the thin motor 100. Since height for the plural wires of the resolver 30 to cross once is allowed, it is possible to reduce the likelihood that workability of housing the wires of the resolver 30 in the wiring tube 48 falls.

Further, in this embodiment, the thickness ti between the outside edge of the inner ring clamp 26 and the inner wall surface of the bolt hole 26c is set to the value obtained by the above Expression (14).

Consequently, since it is possible to fix the inner ring 14a without a gap, it is possible to improve detection accuracy.

Further, in this embodiment, the thickness to between the inside edge of the outer ring clamp 28 and the inner wall surface of the bolt hole 28c is set to a value obtained by the above Expression (15).

Consequently, since it is possible to fix the outer ring 14b without a gap, it is possible to improve detection accuracy.

Further, in this embodiment, the height H of the pressing section 26b of the inner ring clamp 26 is set to a value obtained by the above Expression (16).

Consequently, since it is possible to reduce the likelihood that a gap of the resolver 30 changes, it is possible to reduce the likelihood that the resolver 30 makes misdetection.

In the eighth embodiment, the cross roller bearing 14 corresponds to the roller bearing of the inventions 37 to 41, the stator 22 corresponds to the inner-ring supported member of the invention 38, 39, or 41, the rotor 12 corresponds to the outer-ring supported member of the invention 40, and the resolver 30 corresponds to the rotation sensor of the inventions 37 to 41. The resolver rotor 18ra corresponds to the first resolver rotor of the invention 37, the resolver rotor 18ri corresponds to the second resolver rotor of the invention 37, and the bolts 18a and 18b correspond to the fixing means of the invention 37.

Modification of the Seventh and Eighth Embodiments

In the seventh embodiment, the resolver 30, the cross roller bearing 14, and the motor unit 16 are arranged in the recited order from the radially inner side on a radially identical plane. However, the present invention is not limited to this. The arrangement order of the resolver 30, the cross roller bearing 14, and the motor unit 16 can be arbitrary as long as the resolver 30 is arranged in the two contact angles. For example, five configurations explained below can be adopted.

First, a first configuration is explained.

Figure 38:
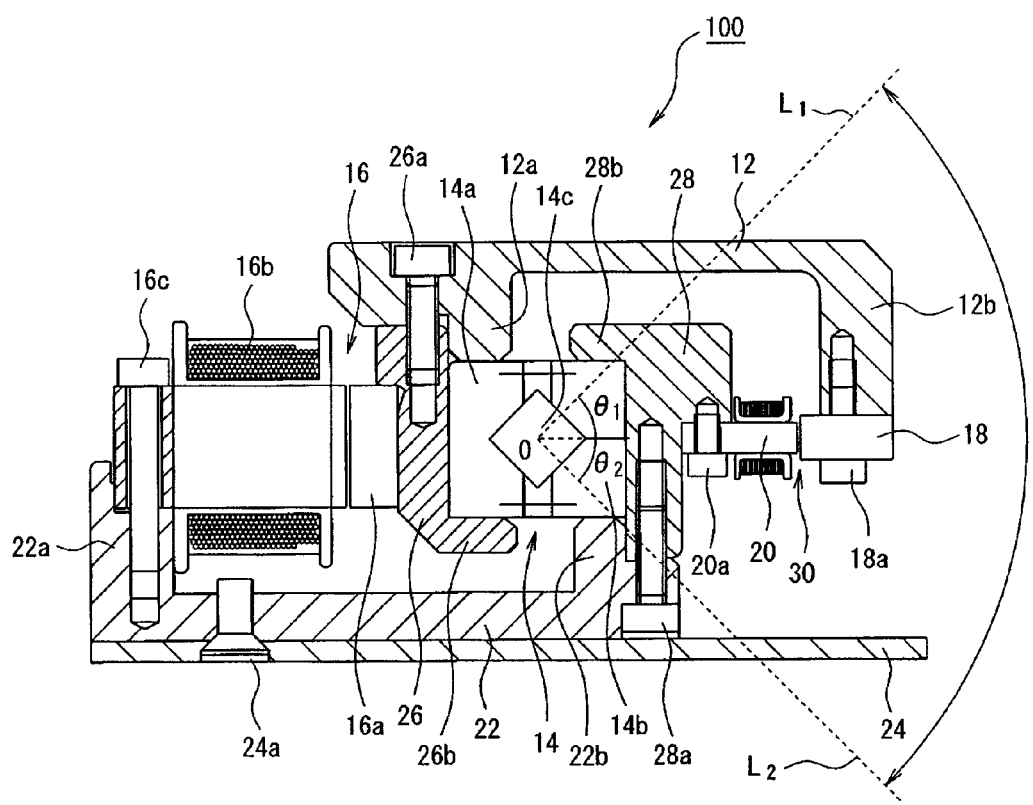
FIG. 38 is a sectional view in the axial direction of the thin motor 100 in which the motor unit 16, the cross roller bearing 14, and the resolver 30 are arranged in the recited order from the radially inner side on a radially identical plane.

FIG. 38 is a sectional view in the axial direction of the thin motor 100 in which the motor unit 16, the cross roller bearing 14, and the resolver 30 are arranged in the recited order from the radially inner side on a radially identical plane.

As shown in FIG. 38, the cross roller bearing 14 has the different two contact angles $\theta_1$ and $\theta_2$. The resolver 30 is arranged between the straight line $L_1$ extending in the direction of the contact angle $\theta_1$ from the vertex O of the contact angles and the straight line $L_2$ extending in the direction of the contact angle $\theta_2$ from the vertex O and on the side of the outer ring 14b. The motor unit 16, the cross roller bearing 14, and the resolver 30 are arranged on a radially identical plane.

In the stator 22, the annular inner wall member 22a projecting upward in the axial direction (the upward direction in FIG. 38) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 38) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner ring 14a is fixed to the inner wall member 12a of the rotor 12 in a state in which the inner ring 14a is pressed in the axial direction. Specifically, the inner ring 14a is fixed by setting the lower end of the inner wall member 12a of the rotor 12 in contact with the upper surface of the inner ring 14a, setting the pressing section 26b of the inner ring clamp 26 in contact with the lower surface of the inner ring 14a, and fastening the inner ring clamp 26 to the inner wall member 12a of the rotor 12 with the bolt 26a.

The outer ring 14b is fixed to the outer wall member 22b of the stator 22 in a state in which the outer ring 14b is pressed in the axial direction. Specifically, the outer ring 14b is fixed by setting the upper end of the outer wall member 22b of the stator 22 in contact with the lower surface of the outer ring 14b, setting the pressing section 28b of the outer ring clamp 28 in contact with the upper surface of the outer ring 14b, and fastening the outer ring clamp 28 to the outer wall member 22b of the stator 22 with the bolt 28a.

The permanent magnet 16a is attached to the inside edge of the inner ring clamp 26 and fixed to the inside edge side of the inner wall member 12a of the rotor 12 integrally with the inner ring clamp 26. On the other hand, the coil 16b is attached to the outside edge of the inner wall member 22a of the stator 22 by the bolt 16c.

The resolver 30 is a resolver of the ABS/INC integral type that outputs a single-pole resolver signal and a multi-pole resolver signal. The resolver 30 has a function equivalent to that of the resolver 30 in the seventh and eighth embodiments except that the resolver 30 is integrally configured. The resolver rotor 18 is attached to the outer wall member 12b of the rotor 12 by the bolt 18a. On the other hand, the resolver stator 20 is attached to the outside edge of the outer ring clamp 28 by the bolt 20a and fixed to the outside edge side of the outer wall member 22b of the stator 22 integrally with the outer ring clamp 28.

In this way, in the first configuration, the motor unit 16, the cross roller bearing 14, and the resolver 30 are arranged in the recited order from the radially inner side on a radially identical plane.

Consequently, besides the effect of reducing the likelihood of misdetection of the resolver 30 and the effect of realizing extension of the life of the cross roller bearing 14, since the resolver 30 is arranged on the opposite side of the motor unit 16 across the cross roller bearing 14, the resolver 30 is less easily affected by noise and heat from the motor unit 16 and it is possible to realize high detection accuracy. Since the resolver 30 is arranged on the radially outermost side, the diameter of the resolver 30 can be increased. Therefore, it is possible to stabilize accuracy, for example, during die machining and realize higher detection accuracy.

Next, a second configuration is explained.

Figure 39:
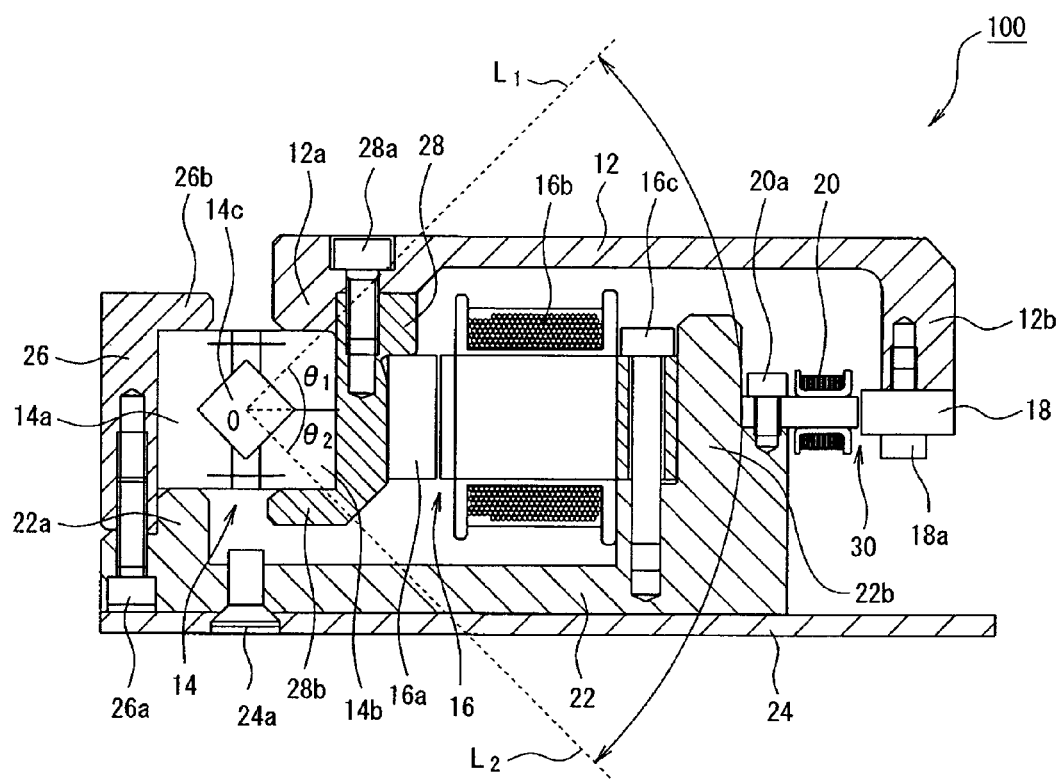
FIG. 39 is a sectional view in the axial direction of the thin motor 100 in which the cross roller bearing 14, the motor unit 16, and the resolver 30 are arranged in the recited order from the radially inner side on a radially identical plane.

FIG. 39 is a sectional view in the axial direction of the thin motor 100 in which the cross roller bearing 14, the motor unit 16, and the resolver 30 are arranged in the recited order from the radially inner side on a radially identical plane.

As shown in FIG. 39, the cross roller bearing 14 has the different two contact angles $\theta_1$ and $\theta_2$. The resolver 30 is arranged between the straight line $L_1$ extending in the direction of the contact angle $\theta_1$ from the vertex O of the contact angles and the straight line $L_2$ extending in the direction of the contact angle $\theta_2$ from the vertex O and on the side of the outer ring 14b. The cross roller bearing 14, the motor unit 16, and the resolver 30 are arranged on a radially identical plane.

In the stator 22, the annular inner wall member 22a projecting upward in the axial direction (the upward direction in FIG. 39) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 39) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner ring 14a is fixed to the inner wall member 22a of the stator 22 in a state in which the inner ring 14a is pressed in the axial direction. Specifically, the inner ring 14a is fixed by setting the upper end of the inner wall member 22a of the stator 22 in contact with the lower surface of the inner ring 14a, setting the pressing section 26b of the inner ring clamp 26 in contact with the upper surface of the inner ring 14a, and fastening the inner ring clamp 26 to the inner wall member 22a of the stator 22 with the bolt 26a.

The outer ring 14b is fixed to the inner wall member 12a of the rotor 12 in a state in which the outer ring 14b is pressed in the axial direction. Specifically, the outer ring 14b is fixed by setting the lower end of the inner wall member 12a of the rotor 12 in contact with the upper surface of the outer ring 14b, setting the pressing section 28b of the outer ring clamp 28 in contact with the lower surface of the outer ring 14b, and fastening the outer ring clamp 28 to the inner wall member 12a of the rotor 12 with the bolt 28a.

The permanent magnet 16a is attached to the outside edge of the outer ring clamp 28 and fixed to the outside edge side of the inner wall member 12a of the rotor 12 integrally with the outer ring clamp 28. On the other hand, the coil 16b is attached to the inside edge of the outer wall member 22b of the stator 22 by the bolt 16c.

The resolver 30 is a resolver of the ABS/INC integral type that outputs a single-pole resolver signal and a multi-pole resolver signal. The resolver 30 has a function equivalent to that of the resolver 30 in the seventh and eighth embodiments except that the resolver 30 is integrally configured. The resolver rotor 18 is attached to the outer wall member 12b of the rotor 12 by the bolt 18a. On the other hand, the resolver stator 20 is attached to the outside edge of the outer wall member 22b of the stator 22 by the bolt 20a.

In this way, in the second configuration, the cross roller bearing 14, the motor unit 16, and the resolver 30 are arranged in the recited order from the radially inner side on a radially identical plane.

Consequently, besides the effect of reducing the likelihood of misdetection of the resolver 30 and the effect of realizing extension of the life of the cross roller bearing 14, since the resolver 30 is arranged on the radially outermost side, the diameter of the resolver 30 can be increased. Therefore, it is possible to stabilize accuracy, for example, during die machining and realize higher detection accuracy. Since the cross roller bearing 14 is arranged on the radially innermost side, it is possible to reduce the height of the thin motor 100 by reducing the size of the cross roller bearing 14. Wiring to the motor unit 16 or the resolver 30 is easy and grease of the cross roller bearing 14 less easily leaks.

Next, a third configuration is explained.

Figure 40:
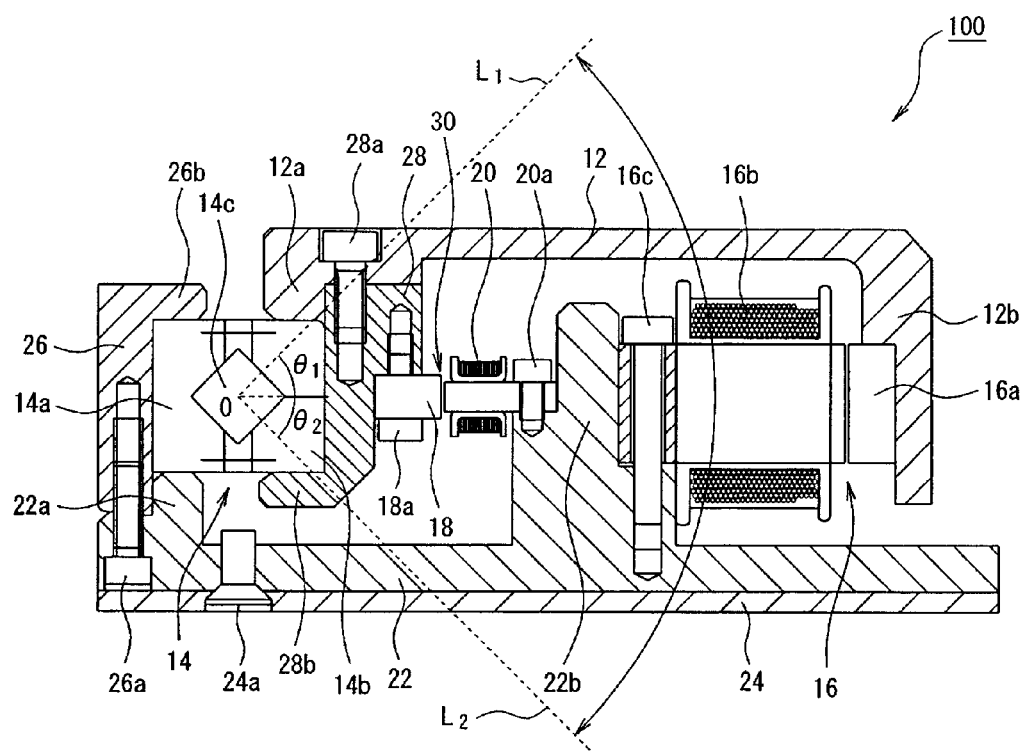
FIG. 40 is a sectional view in the axial direction of the thin motor 100 in which the cross roller bearing 14, the resolver 30, and the motor unit 16 are arranged in the recited order from the radially inner side on a radially identical plane.

FIG. 40 is a sectional view in the axial direction of the thin motor 100 in which the cross roller bearing 14, the resolver 30, and the motor unit 16 are arranged in the recited order from the radially inner side on a radially identical plane.

As shown in FIG. 40, the cross roller bearing 14 has the different two contact angles $\theta_1$ and $\theta_2$. The resolver 30 is arranged between the straight line $L_1$ extending in the direction of the contact angle $\theta_1$ from the vertex O of the contact angles and the straight line $L_2$ extending in the direction of the contact angle $\theta_2$ from the vertex O and on the side of the outer ring 14b. The cross roller bearing 14, the resolver 30, and the motor unit 16 are arranged on a radially identical plane.

In the stator 22, the annular inner wall member 22a projecting upward in the axial direction (the upward direction in FIG. 40) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 40) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner ring 14a is fixed to the inner wall member 22a of the stator 22 in a state in which the inner ring 14a is pressed in the axial direction. Specifically, the inner ring 14a is fixed by setting the upper end of the inner wall member 22a of the stator 22 in contact with the lower surface of the inner ring 14a, setting the pressing section 26b of the inner ring clamp 26 in contact with the upper surface of the inner ring 14a, and fastening the inner ring clamp 26 to the inner wall member 22a of the stator 22 with the bolt 26a.

The outer ring 14b is fixed to the inner wall member 12a of the rotor 12 in a state in which the outer ring 14b is pressed in the axial direction. Specifically, the outer ring 14b is fixed by setting the lower end of the inner wall member 12a of the rotor 12 in contact with the upper surface of the outer ring 14b, setting the pressing section 28b of the outer ring clamp 28 in contact with the lower surface of the outer ring 14b, and fastening the outer ring clamp 28 to the inner wall member 12a of the rotor 12 with the bolt 28a.

The permanent magnet 16a is attached to the inside edge of the outer wall member 12b of the rotor 12. On the other hand, the coil 16b is attached to the outside edge of the outer wall member 22b of the stator 22 by the bolt 16c.

The resolver 30 is a resolver of the ABS/INC integral type that outputs a single-pole resolver signal and a multi-pole resolver signal. The resolver 30 has a function equivalent to that of the resolver 30 in the seventh and eighth embodiments except that the resolver 30 is integrally configured. The resolver rotor 18 is attached to the outside edge of the outer ring clamp 28 by the bolt 18a and fixed to the outside edge side of the inner wall member 12a of the rotor 12 integrally with the outer ring clamp 28. On the other hand, the resolver stator 20 is attached to the inside edge of the outer wall member 22b of the stator 22 by the bolt 20a.

In this way, in the third configuration, the cross roller bearing 14, the resolver 30, and the motor unit 16 are arranged in the recited order from the radially inner side on a radially identical plane.

Consequently, besides the effect of reducing the likelihood of misdetection of the resolver 30 and the effect of realizing extension of the life of the cross roller bearing 14, since the cross roller bearing 14 is arranged on the radially innermost side, it is possible to reduce the height of the thin motor 100 by reducing the size of the cross roller bearing 14. Wiring to the motor unit 16 or the resolver 30 is easy and grease of the cross roller bearing 14 less easily leaks. Since the motor unit 16 is arranged on the radially outermost side, it is possible to secure a large space for winding wires and realize high output torque. Further, it is possible to increase the number of poles of the motor unit 16 and realize operation at low speed to ultra-low speed.

Next, a fourth configuration is explained.

FIG. 41 is a sectional view in the axial direction of the thin motor 100 in which the motor unit 16, the resolver 30, and the cross roller bearing 14 are arranged in the recited order from the radially inner side on a radially identical plane.

As shown in FIG. 41, the cross roller bearing 14 has the different two contact angles $\theta_1$ and $\theta_2$. The resolver 30 is arranged between the straight line $L_1$ extending in the direction of the contact angle $\theta_1$ from the vertex O of the contact angles and the straight line $L_2$ extending in the direction of the contact angle $\theta_2$ from the vertex O and on the side of the inner ring 14a. The motor unit 16, the resolver 30, and the cross roller bearing 14 are arranged on a radially identical plane.

In the stator 22, the annular inner wall member 22a projecting upward in the axial direction (the upward direction in FIG. 41) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 41) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner ring 14a is fixed to the outer wall member 22b of the stator 22 in a state in which the inner ring 14a is pressed in the axial direction. Specifically, the inner ring 14a is fixed by setting the upper end of the outer wall member 22b of the stator 22 in contact with the lower surface of the inner ring 14a, setting the pressing section 26b of the inner ring clamp 26 in contact with the upper surface of the inner ring 14a, and fastening the inner ring clamp 26 to the outer wall member 22b of the stator 22 with the bolt 26a.

The outer ring 14b is fixed to the outer wall member 12b of the rotor 12 in a state in which the outer ring 14b is pressed in the axial direction. Specifically, the outer ring 14b is fixed by setting the lower end of the outer wall member 12b of the rotor 12 in contact with the upper surface of the outer ring 14b, setting the pressing section 28b of the outer ring clamp 28 in contact with the lower surface of the outer ring 14b, and fastening the outer ring clamp 28 to the outer wall member 12b of the rotor 12 with the bolt 28a.

The permanent magnet 16a is attached to the inside edge of the inner wall member 12a of the rotor 12. On the other hand, the coil 16b is attached to the outside edge of the inner wall member 22a of the stator 22 by the bolt 16c.

The resolver 30 is a resolver of the ABS/INC integral type that outputs a single-pole resolver signal and a multi-pole resolver signal. The resolver 30 has a function equivalent to that of the resolver 30 in the seventh and eighth embodiments except that the resolver 30 is integrally configured. The resolver rotor 18 is attached to the outside edge of the inner wall member 12a of the rotor 12 by the bolt 18a. On the other hand, the resolver stator 20 is attached to the inside edge of the inner ring clamp 26 by the bolt 20a and fixed to the inside edge side of the outer wall member 22b of the stator 22 integrally with the inner ring clamp 26.

In this way, in the fourth configuration, the motor unit 16, the resolver 30, and the cross roller bearing 14 are arranged in the recited order from the radially inner side on a radially identical plane.

Consequently, besides the effect of reducing the likelihood of misdetection of the resolver 30 and the effect of realizing extension of the life of the cross roller bearing 14, since the cross roller bearing 14 is arranged on the radially outermost side, it is possible to house the cross roller bearing 14 having a large diameter and realize high rigidity.

Next, a fifth configuration is explained.

Figure 42:
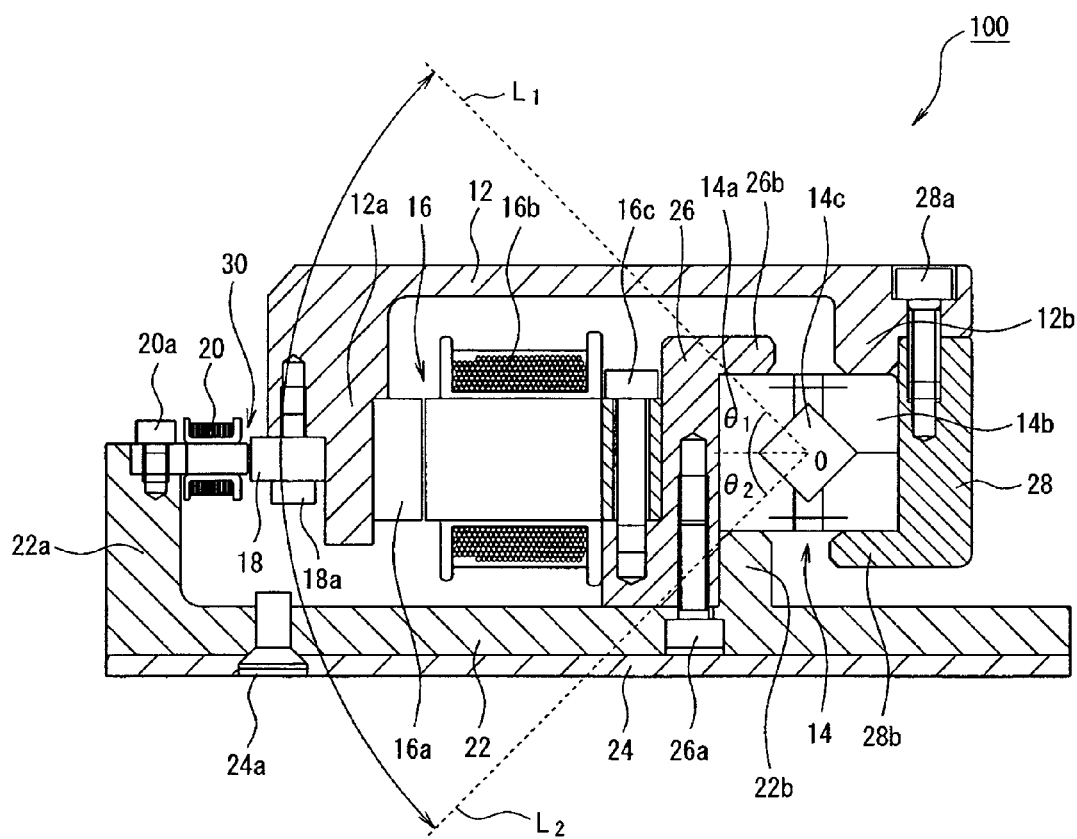
FIG. 42 is a sectional view in the axial direction of the thin motor 100 in which the resolver 30, the motor unit 16, and the cross roller bearing 14 are arranged in the recited order from the radially inner side on a radially identical plane.

FIG. 42 is a sectional view in the axial direction of the thin motor 100 in which the resolver 30, the motor unit 16, and the cross roller bearing 14 are arranged in the recited order from the radially inner side on a radially identical plane.

As shown in FIG. 42, the cross roller bearing 14 has the different two contact angles $\theta_1$ and $\theta_2$. The resolver 30 is arranged between the straight line $L_1$ extending in the direction of the contact angle $\theta_1$ from the vertex O of the contact angles and the straight line $L_2$ extending in the direction of the contact angle $\theta_2$ from the vertex O and on the side of the inner ring 14a. The resolver 30, the motor unit 16, and the cross roller bearing 14 are arranged on a radially identical plane.

In the stator 22, the annular inner wall member 22a projecting upward in the axial direction (the upward direction in FIG. 42) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 42) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner ring 14a is fixed to the outer wall member 22b of the stator 22 in a state in which the inner ring 14a is pressed in the axial direction. Specifically, the inner ring 14a is fixed by setting the upper end of the outer wall member 22b of the stator 22 in contact with the lower surface of the inner ring 14a, setting the pressing section 26b of the inner ring clamp 26 in contact with the upper surface of the inner ring 14a, and fastening the inner ring clamp 26 to the outer wall member 22b of the stator 22 with the bolt 26a.

The outer ring 14b is fixed to the outer wall member 12b of the rotor 12 in a state in which the outer ring 14b is pressed in the axial direction. Specifically, the outer ring 14b is fixed by setting the lower end of the outer wall member 12b of the rotor 12 in contact with the upper surface of the outer ring 14b, setting the pressing section 28b of the outer ring clamp 28 in contact with the lower surface of the outer ring 14b, and fastening the outer ring clamp 28 to the outer wall member 12b of the rotor 12 with the bolt 28a.

The permanent magnet 16a is attached to the outside edge of the inner wall member 12a of the rotor 12. On the other hand, the coil 16b is attached to the inside edge of the inner ring clamp 26 by the bolt 16c and fixed to the inside edge side of the outer wall member 22b of the stator 22 integrally with the inner ring clamp 26.

The resolver 30 is a resolver of the ABS/INC integral type that outputs a single-pole resolver signal and a multi-pole resolver signal. The resolver 30 has a function equivalent to that of the resolver 30 in the seventh and eighth embodiments except that the resolver 30 is integrally configured. The resolver rotor 18 is attached to the inside edge of the inner wall member 12a of the rotor 12 by the bolt 18a. On the other hand, the resolver stator 20 is attached to the outside edge of the inner wall member 22a of the stator 22 by the bolt 20a.

In this way, in the fifth configuration, the resolver 30, the motor unit 16, and the cross roller bearing 14 are arranged in the recited order from the radially inner side on a radially identical plane.

Consequently, besides the effect of reducing the likelihood of misdetection of the resolver 30 and the effect of realizing extension of the life of the cross roller bearing 14, since the cross roller bearing 14 is arranged on the radially outermost side, it is possible to house the cross roller bearing 14 having a large diameter and realize high rigidity.

In the configurations shown in FIGS. 38 to 42, the resolver of the ABS/INC integral type is provided. However, the present invention is not limited to this. The thin motor 100 can also be configured by only the resolver of the ABS type, can also be configured by only the resolver of the INC type, or can also be configured by the resolvers of the ABS type and the INC type.

In the eighth embodiment, the resolver 30, the cross roller bearing 14, and the motor unit 16 are arranged in the recited order from the radially inner side on a radially identical plane. However, the present invention is not limited to this. The arrangement order of the resolver 30, the cross roller bearing 14, and the motor unit 16 can be arbitrary as long as the resolver 30 is arranged in the two contact angles. For example, five configurations explained below can be adopted.

First, a first configuration is explained.

Figure 43:
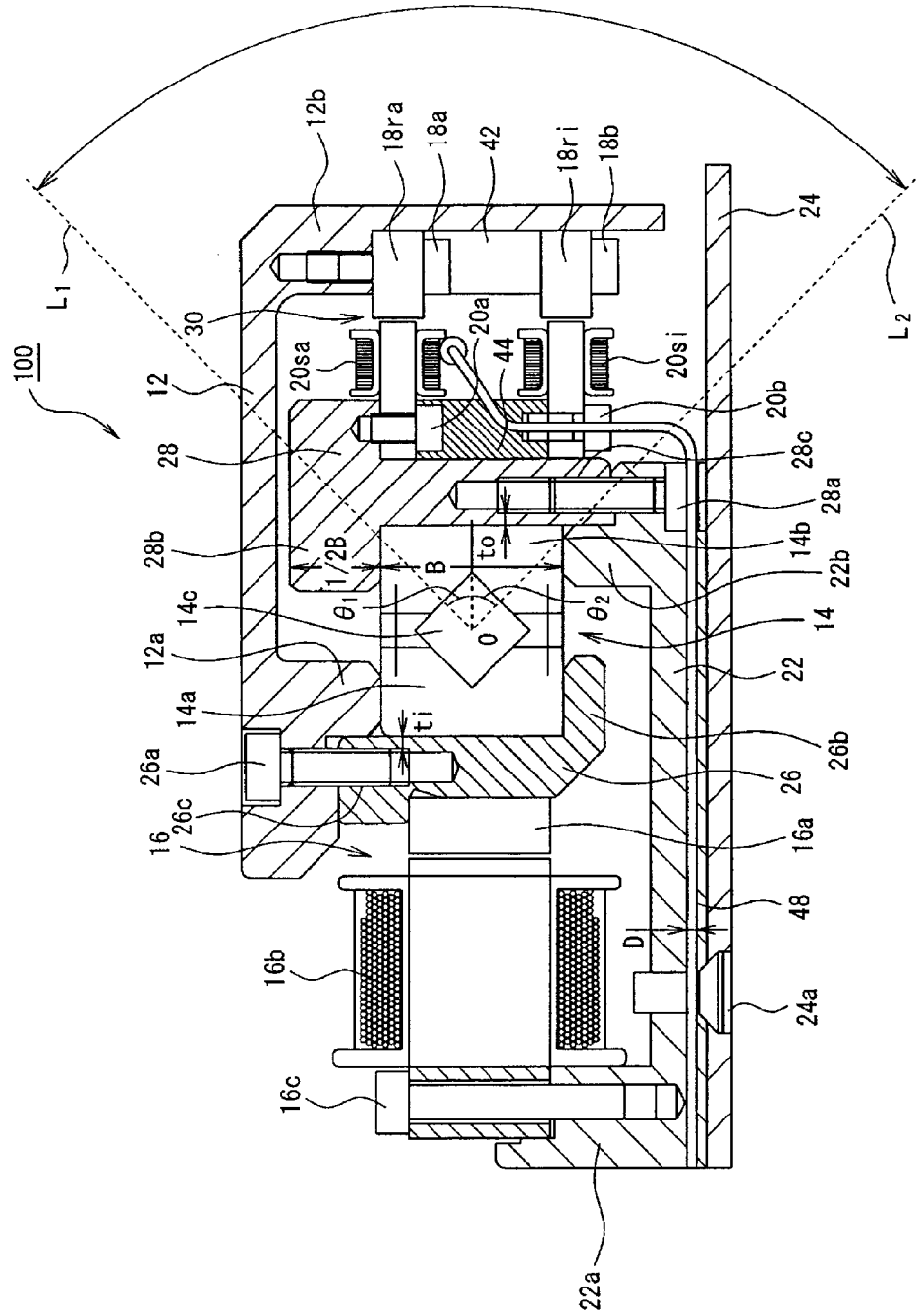
FIG. 43 is a sectional view in the axial direction of the thin motor 100 in the case in which the configuration shown in FIG. 38 is applied to the eighth embodiment.

FIG. 43 is a sectional view in the axial direction of the thin motor 100 in the case in which the configuration shown in FIG. 38 is applied to the eighth embodiment.

As shown in FIG. 43, the resolver 30 is configured as the resolvers of the ABS type and the INC type in the eighth embodiment rather than the resolver of the ABS/INC integral type.

The resolver rotors 18ra and 18ri are arranged at a very small interval via the inter-rotor seat 42. The resolver rotor 18ra is fixed and attached by the bolt 18a between the inside edge of the outer wall member 12b of the rotor 12 and the upper surface of the inter-rotor seat 42. The resolver rotor 18ri is attached to the lower surface of the inter-rotor seat 42 by the bolt 18b.

The resolver stators 20sa and 20si are arranged at a very small interval via the inter-stator seat 44. The resolver stator 20sa is fixed and attached by the bolt 20a between the outside edge of the outer ring clamp 28 and the upper surface of the inter-stator seat 44. The resolver stator 20si is attached to the lower surface of the inter-stator seat 44 by the bolt 20b. Therefore, the resolver stators 20sa and 20si are fixed to the outside edge side of the outer wall member 22b of the stator 22 integrally with the outer ring clamp 28.

The height D of the wiring tube 48 is set to the value obtained by the above Expression (13).

The thickness ti between the outside edge of the inner ring clamp 26 and the inner wall surface of the bolt hole 26c is set to a value in the range of the above Expression (14) and the thickness to between the inside edge of the outer ring clamp 28 and the inner wall surface of the bolt hole 28c is set to a value in the range of the above Expression (15).

The height H of the pressing section 28b of the outer ring clamp 28 is set to the value obtained by the above Expression (16).

Next, a second configuration is explained.

Figure 44:
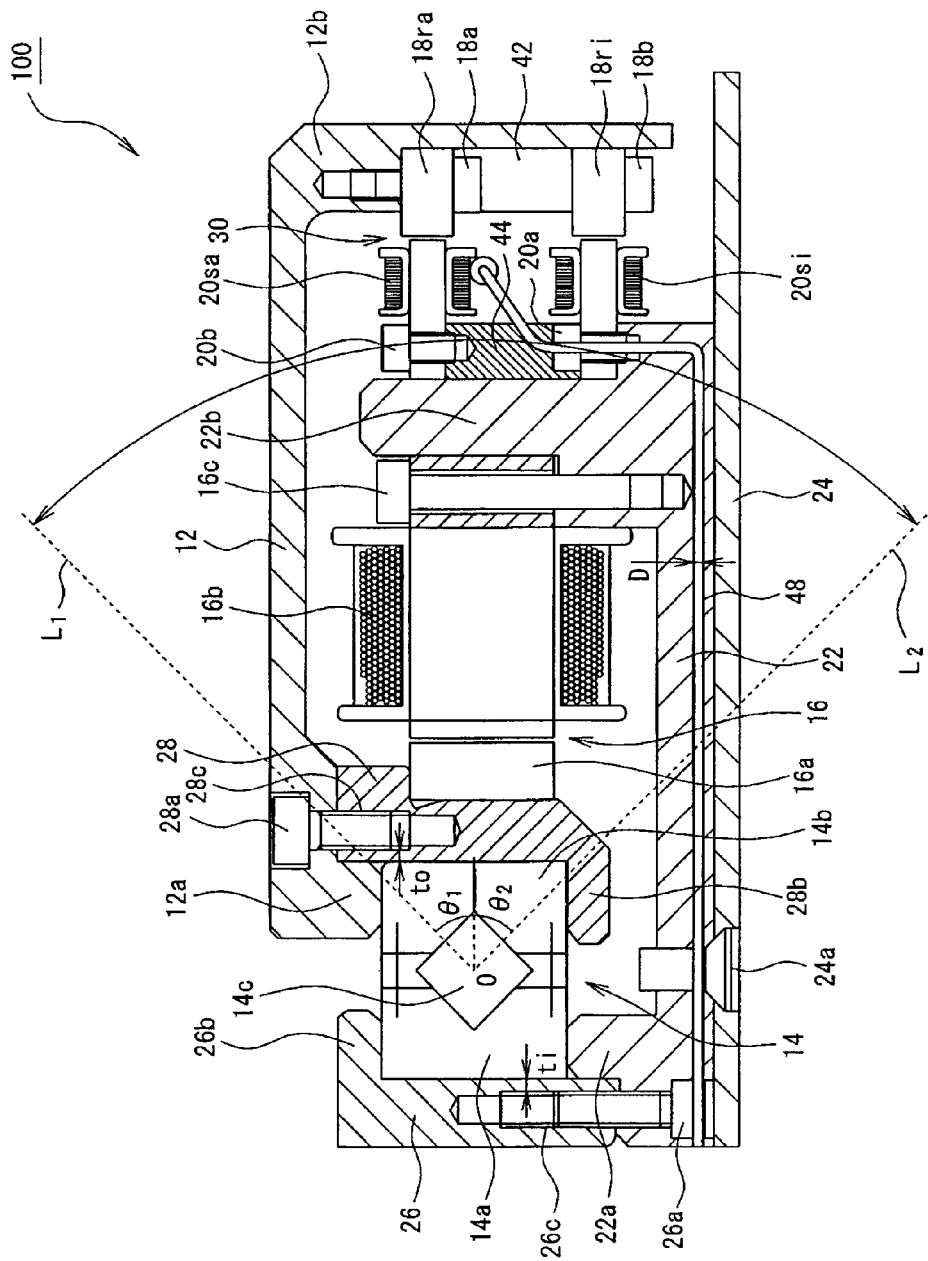
FIG. 44 is a sectional view in the axial direction of the thin motor 100 in the case in which the configuration shown in FIG. 39 is applied to the eighth embodiment.

FIG. 44 is a sectional view in the axial direction of the thin motor 100 in the case in which the configuration shown in FIG. 39 is applied to the eighth embodiment.

As shown in FIG. 44, the resolver 30 is configured as the resolvers of the ABS type and the INC type in the eighth embodiment rather than the resolver of the ABS/INC integral type.

The resolver rotors 18ra and 18ri are arranged at a very small interval via the inter-rotor seat 42. The resolver rotor 18ra is fixed and attached by the bolt 18a between the inside edge of the outer wall member 12b of the rotor 12 and the upper surface of the inter-rotor seat 42. The resolver rotor 18ri is attached to the lower surface of the inter-rotor seat 42 by the bolt 18b.

The resolver stators 20sa and 20si are arranged at a very small interval via the inter-stator seat 44. The resolver stator 20si is fixed and attached by the bolt 20a between the outside edge of the outer wall member 22b of the stator 22 and the lower surface of the inter-stator seat 44. The resolver stator 20sa is attached to the upper surface of the inter-stator seat 44 by the bolt 20b.

The height D of the wiring tube 48 is set to the value obtained by the above Expression (13).

The thickness ti between the outside edge of the inner ring clamp 26 and the inner wall surface of the bolt hole 26c is set to a value in the range of the above Expression (14) and the thickness to between the inside edge of the outer ring clamp 28 and the inner wall surface of the bolt hole 28c is set to a value in the range of the above Expression (15).

Next, a third configuration is explained.

Figure 45:
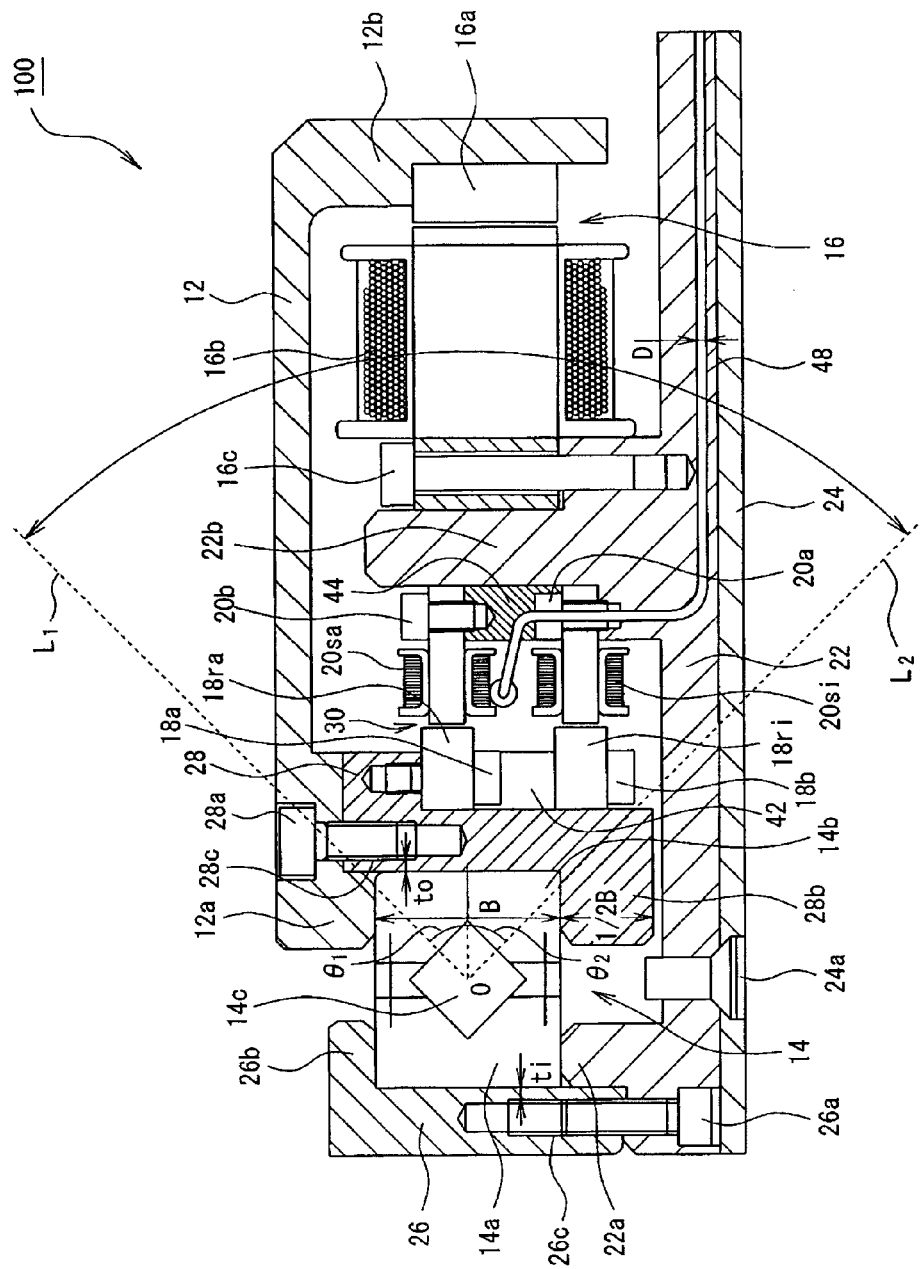
FIG. 45 is a sectional view in the axial direction of the thin motor 100 in the case in which the configuration shown in FIG. 40 is applied to the eighth embodiment.

FIG. 45 is a sectional view in the axial direction of the thin motor 100 in the case in which the configuration shown in FIG. 40 is applied to the eighth embodiment.

As shown in FIG. 45, the resolver 30 is configured as the resolvers of the ABS type and the INC type in the eighth embodiment rather than the resolver of the ABS/INC integral type.

The resolver rotors 18ra and 18ri are arranged at a very small interval via the inter-rotor seat 42. The resolver rotor 18ra is fixed and attached by the bolt 18a between the outside edge of the outer ring clamp 28 and the upper surface of the inter-rotor seat 42. The resolver rotor 18ri is attached to the lower surface of the inter-rotor seat 42 by the bolt 18b.

The resolver stators 20sa and 20si are arranged at a very small interval via the inter-stator seat 44. The resolver stator 20si is fixed and attached by the bolt 20a between the inside edge of the outer wall member 22b of the stator 22 and the lower surface of the inter-stator seat 44. The resolver stator 20sa is attached to the upper surface of the inter-stator seat 44 by the bolt 20b.

The height D of the wiring tube 48 is set to the value obtained by the above Expression (13).

The thickness ti between the outside edge of the inner ring clamp 26 and the inner wall surface of the bolt hole 26c is set to a value in the range of the above Expression (14) and the thickness to between the inside edge of the outer ring clamp 28 and the inner wall surface of the bolt hole 28c is set to a value in the range of the above Expression (15).

The height H of the pressing section 28b of the outer ring clamp 28 is set to the value obtained by the above Expression (16).

Next, a fourth configuration is explained.

Figure 46:
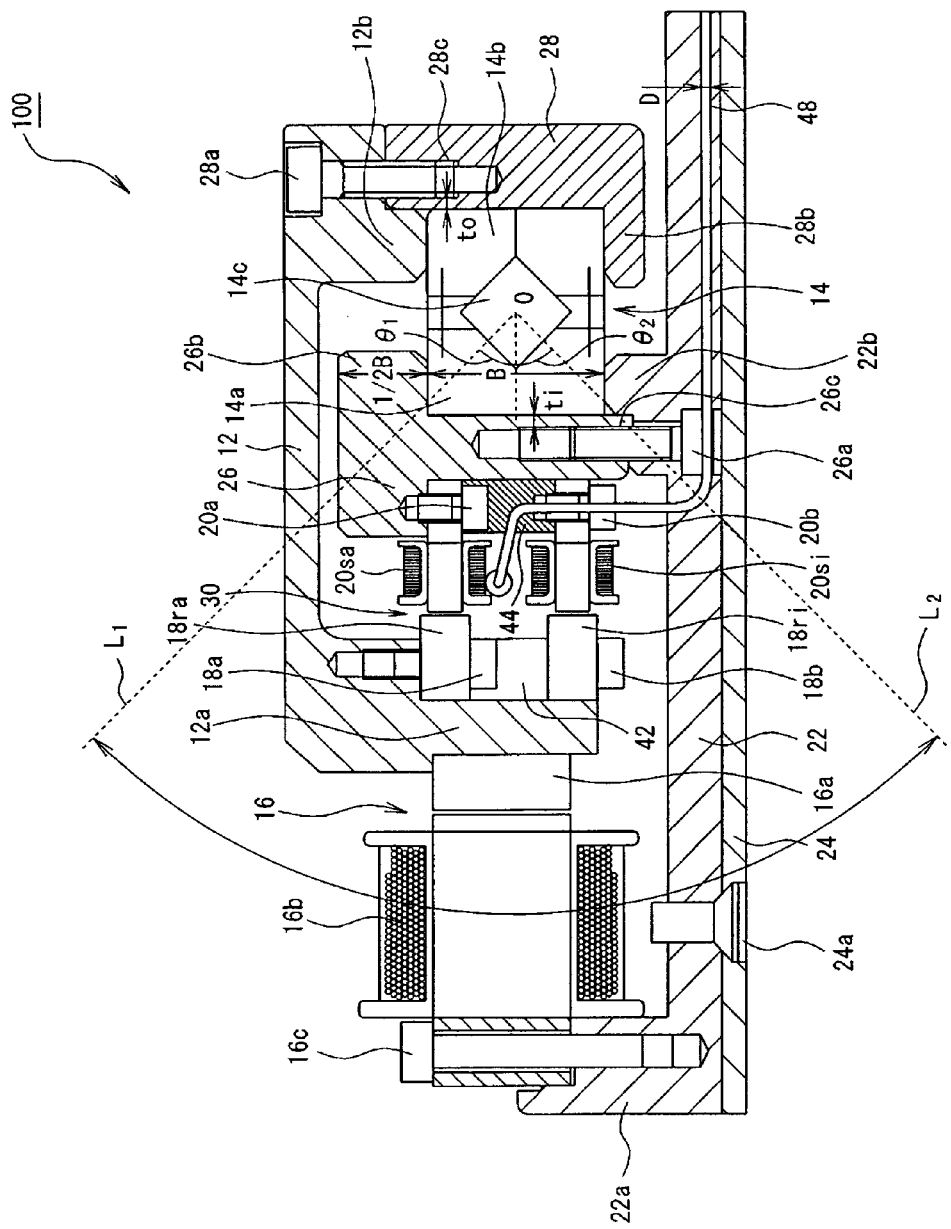
FIG. 46 is a sectional view in the axial direction of the thin motor 100 in the case in which the configuration shown in FIG. 41 is applied to the eighth embodiment.

FIG. 46 is a sectional view in the axial direction of the thin motor 100 in the case in which the configuration shown in FIG. 41 is applied to the eighth embodiment.

As shown in FIG. 46, the resolver 30 is configured as the resolvers of the ABS type and the INC type in the eighth embodiment rather than the resolver of the ABS/INC integral type.

The resolver rotors 18ra and 18ri are arranged at a very small interval via the inter-rotor seat 42. The resolver rotor 18ra is fixed and attached by the bolt 18a between the outside edge of the inner wall member 12a of the rotor 12 and the upper surface of the inter-rotor seat 42. The resolver rotor 18ri is attached to the lower surface of the inter-rotor seat 42 by the bolt 18b.

The resolver stators 20sa and 20si are arranged at a very small interval via the inter-stator seat 44. The resolver stator 20sa is fixed and attached by the bolt 20a between the inside edge of the inner ring clamp 26 and the upper surface of the inter-stator seat 44. The resolver stator 20si is attached to the lower surface of the inter-stator seat 44 by the bolt 20b. Therefore, the resolver stators 20sa and 20si are fixed to the inside edge side of the outer wall member 22b of the stator 22 integrally with the inner ring clamp 26.

The height D of the wiring tube 48 is set to the value obtained by the above Expression (13).

The thickness ti between the outside edge of the inner ring clamp 26 and the inner wall surface of the bolt hole 26c is set to a value in the range of the above Expression (14) and the thickness to between the inside edge of the outer ring clamp 28 and the inner wall surface of the bolt hole 28c is set to a value in the range of the above Expression (15).

The height H of the pressing section 26b of the inner ring clamp 26 is set to the value obtained by the above Expression (16).

Next, a fifth configuration is explained.

FIG. 47 is a sectional view in the axial direction of the thin motor 100 in the case in which the configuration shown in FIG. 42 is applied to the eighth embodiment.

As shown in FIG. 47, the resolver 30 is configured as the resolvers of the ABS type and the INC type in the eighth embodiment rather than the resolver of the ABS/INC integral type.

The resolver rotors 18ra and 18ri are arranged at a very small interval via the inter-rotor seat 42. The resolver rotor 18ra is fixed and attached by the bolt 18a between the inside edge of the inner wall member 12a of the rotor 12 and the upper surface of the inter-rotor seat 42. The resolver rotor 18ri is attached to the lower surface of the inter-rotor seat 42 by the bolt 18b.

The resolver stators 20sa and 20si are arranged at a very small interval via the inter-stator seat 44. The resolver stator 20si is fixed and attached by the bolt 20a between the outside edge of the inner wall member 22a of the stator 22 and the lower surface of the inter-stator seat 44. The resolver stator 20sa is attached to the upper surface of the inter-stator seat 44 by the bolt 20b.

The height D of the wiring tube 48 is set to the value obtained by the above Expression (13).

The thickness ti between the outside edge of the inner ring clamp 26 and the inner wall surface of the bolt hole 26c is set to a value in the range of the above Expression (14) and the thickness to between the inside edge of the outer ring clamp 28 and the inner wall surface of the bolt hole 28c is set to a value in the range of the above Expression (15).

In the configurations shown in FIGS. 43 to 47, the resolvers of the ABS type and the INC type are provided. However, the present invention is not limited to this. The thin motor 100 can also be configured by only the resolver of the ABS type, can also be configured by only the resolver of the INC type, or can also be configured by the resolver of the ABS/INC integral type.

In the seventh and eighth embodiments, the thin motor 100 is configured as the inner rotor type in which the inner side of the thin motor 100 rotates. However, the present invention is not limited to this. The thin motor 100 can also be configured as the outer rotor type in which the outer side of the thin motor 100 rotates. In this case, the rotor 12 is the inner-ring supported member and the stator 22 is the outer-ring supported member.

In the configurations shown in FIGS. 38 to 47, the thin motor 100 is configured as the outer rotor type in which the outer side of the thin motor 100 rotates. However, the present invention is not limited to this. The thin motor 100 can also be configured as the inner rotor type in which the inner side of the thin motor 100 rotates. In this case, the rotor 12 is the inner-ring supported member and the stator 22 is the outer-ring supported member.

In the seventh embodiment, the resolver rotor 18 is attached to the outside edge of the inner wall member 12a of the rotor 12 and the resolver stator 20 is attached to the inside edge of the inner ring clamp 26. However, the present invention is not limited to this. The resolver stator 20 can also be attached to the outside edge of the inner wall member 12a of the rotor 12 and the resolver rotor 18 can also be attached to the inside edge of the inner ring clamp 26. The same holds true for the configurations shown in FIGS. 38 to 47.

In the seventh and eighth embodiments, the resolver 30 of the ABS type and the Inc type is provided. However, the present invention is not limited to this. A tape scale that detects a mark formed in a circumferential direction can also be provided. The same holds true for the configurations shown in FIGS. 38 to 47.

In the seventh and eighth embodiments, the inner wall member 22a and the outer wall member 22b of the stator 22 are formed as a part of the stator 22. However, the present invention is not limited to this. The inner wall member 22a or the outer wall member 22b of the stator 22 can also be configured by a separate member and attached to the stator 22. The inner ring clamp 26 can also be directly attached to the stator 22 without forming the inner wall member 22a of the stator 22. However, in this case, the inner ring clamp 26 configures the inner wall member of the stator 22. The same holds true for the configurations shown in FIGS. 38 to 47.

In the seventh and eighth embodiments, the inner wall member 12a and the outer wall member 12b of the rotor 12 are formed as a part of the rotor 12. However, the present invention is not limited to this. The inner wall member 12a or the outer wall member 12b of the rotor 12 can also be configured by a separate member and attached to the rotor 12. The outer ring clamp 28 can also be directly attached to the rotor 12 without forming the outer wall member 12b of the rotor 12. However, in this case, the outer ring clamp 28 configures the outer wall member of the rotor 12. The same holds true for the configurations shown in FIGS. 38 to 47.

In the seventh and eighth embodiments, the resolver 30, the cross roller bearing 14, and the motor unit 16 are arranged on a radially identical plane. However, the present invention is not limited to this. The motor unit 16 does not have to be arranged on a plane radially identical with the resolver 30 and the cross roller bearing 14. The same holds true for the configurations shown in FIGS. 38 to 47.

In the seventh and eighth embodiments, the cross roller bearing 14 is applied. However, the present invention is not limited to this. A four-point contact ball bearing, an angular ball bearing, a deep groove ball bearing, a cylindrical roller bearing, a tapered roller bearing, and the like may be applied. In this case, it is desirable to adopt a roller bearing that can simultaneously receive moment load, axial load, and radial load. For example, the four-point contact ball bearing corresponds to such a roller bearing. The same holds true for the configurations shown in FIGS. 38 to 47.

In the seventh and eighth embodiments, the roller bearing device having an intra-contact angle arrangement structure of a rotation sensor according to the present invention is applied to the structure for rotatably supporting the stator 22 and the rotor 12. However, the present invention is not limited to this. The roller bearing device can be applied to any structure as long as the structure is interposed between two members and relatively rotatably supports the members. The same holds true for the configurations shown in FIGS. 38 to 47.

Ninth Embodiment

Next, a ninth embodiment of the present invention is explained with reference to the drawings. FIG. 48 is a diagram showing the ninth embodiment of a roller bearing device having an intra-contact angle arrangement structure of a resolver and a roller bearing device having an intra-bearing width arrangement structure of a resolver according to the present invention.

First, the configuration of the thin motor 100 to which the present invention is applied is explained.

FIG. 48 is a sectional view in the axial direction of the thin motor 100 according to this embodiment.

The thin motor 100 includes, as shown in FIG. 48, the stator 22 as a stator, the rotor 12 as a rotor, the cross roller bearing 14 that is interposed between the rotor 12 and the stator 22 and rotatably supports the rotor 12, the motor unit 16 that applies rotation torque to the rotor 12, and the resolver 30 that detects a rotation angle position of the rotor 12. The resolver 30, the cross roller bearing 14, and the motor unit 16 are arranged in the recited order from the radially inner side on a radially identical plane.

In the stator 22, the annular inner wall member 22a projecting upward in the axial direction (the upward direction in FIG. 48) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 48) is formed. Further on the radially outer side than the inner wall member 12a, the annular outer wall member 12b projecting downward in the axial direction is formed. The stator 22 and the rotor 12 are arranged to extend over each other such that the inner wall member 22a of the stator 22 is located between the inner wall member 12a and the outer wall member 12b of the rotor 12 and the outer wall member 12b of the rotor 12 is located between the inner wall member 22a and the outer wall member 22b of the stator 22.

The cross roller bearing 14 includes the inner ring 14a, the outer ring 14b, and the plural cross rollers (rollers) 14c rollably provided between the inner ring 14a and the outer ring 14b. The cross roller 14c is formed in a substantially cylindrical shape having a diameter slightly larger than length. An even number-th rotation axis on a track and an odd number-th rotation axis on the track incline 90° with respect to each other.

The cross roller bearing 14 has the different two contact angles $\theta_1$ and $\theta_2$. As the contact angles $\theta_1$ and $\theta_2$ are set larger, an axial load bearing ability of the cross roller bearing 14 can be improved. Conversely, as the contact angles $\theta_1$ and $\theta_2$ are set smaller, a radial load bearing ability of the cross roller bearing 14 can be improved. It is arbitrarily selected according to an environment of use and a purpose of use of the thin motor 100 which of the bearing abilities is improved. Therefore, values of the contact angles $\theta_1$ and $\theta_2$ are not specifically limited.

The inner ring 14a is fixed to the inner wall member 22a of the stator 22 in a state in which the inner ring 14a is pressed in the axial direction. Specifically, the inner ring 14a is fixed by setting the upper end of the inner wall member 22a of the stator 22 in contact with the lower surface of the inner ring 14a, setting the pressing section 26b of the inner ring clamp 26 in contact with the upper surface of the inner ring 14a, and fastening the inner ring clamp 26 to the inner wall member 22a of the stator 22 with the bolt 26a.

The outer ring 14b is fixed to the outer wall member 12b of the rotor 12 in a state in which the outer ring 14b is pressed in the axial direction. Specifically, the outer ring 14b is fixed by setting the lower end of the outer wall member 12b of the rotor 12 in contact with the upper surface of the outer ring 14b, setting the pressing section 28b of the outer ring clamp 28 in contact with the lower surface of the outer ring 14b, and fastening the outer ring clamp 28 to the outer wall member 12b of the rotor 12 with the bolt 28a.

The stator 22 is fixed to the fixing plate 24 by the bolt 24a and the rotor 12 fits in the outside edge of an output shaft.

The motor unit 16 includes the permanent magnet 16a and the coil 16b arranged to be opposed to the permanent magnet 16a at a predetermined interval. The permanent magnet 16a is attached to the outside edge of the outer ring clamp 28 and fixed to the outside edge side of the outer wall member 12b of the rotor 12 integrally with the outer ring clamp 28. On the other hand, the coil 16b is attached to the outer wall member 22b of the stator 22 by the bolt 16c.

The resolver 30 is a resolver of the outer rotor type including the resolver rotor 18 made of an hollow annular laminated core and the resolver stator 20 made of an annular laminated core that is arranged to be opposed to the resolver rotor 18 at a predetermined interval and in which plural stator poles are formed at equal intervals in the circumferential direction thereof. In FIG. 48, one resolver 30 (the upper one in the axial direction) is a single-pole resolver of the ABS type that includes the annular resolver rotor 18 having an inner circumference decentered with respect to the shaft center of the cross roller bearing 14 and outputs a single-pole resolver signal in which a fundamental wave component of a reluctance change is one period per one rotation of the resolver rotor 18 (in the following explanation, when the resolver 30 indicates the single-pole resolver, the resolver 30 is described as "single-pole resolver 30"). The other resolver 30 (the lower one in the axial direction) is a multi-pole resolver of the INC type that includes the resolver rotor 18 in which plural teeth of a salient pole shape are formed at equal intervals in a circumferential direction thereof and outputs a multi-pole resolver signal in which a fundamental wave component of a reluctance change is a multi-period per one rotation of the resolver rotor 18 (in the following explanation, when the resolver 30 indicates the multi-pole resolver, the resolver 30 is described as "multi-pole resolver 30).

The single-pole resolver 30 is arranged such that a gap surface thereof is located between the straight line $L_1$ extending in the direction of the contact angle $\theta_1$ from the vertex O of the contact angles and the straight line $L_2$ extending in the direction of the contact angle $\theta_2$ from the vertex O and on the side of the inner ring 14a (hereinafter referred to as within two contact angles) and is arranged such that the gap surface is located within a range of bearing width of the cross roller bearing 14 in the axial direction (hereinafter referred to as within bearing width). A gap of the resolver 30 means a gap in the radial direction between the resolver rotor 18 and the resolver stator 20. The gap surface means a surface where the resolver rotor 18 and the resolver stator 20 are opposed to each other via the gap.

The resolver rotors 18 of the two resolvers 30 are arranged at a very small interval via the inter-rotor seat 42 and attached to the outside edge of the inner wall member 12a of the rotor 12 by the bolt 18a. On the other hand, the resolver stators 20 of the two resolvers 30 are arranged at a very small interval via the inter-stator seat 44, attached to the inside edge of the inner ring clamp 26 by the bolt 20a, and fixed to the inside edge side of the inner wall member 22a of the stator 22 integrally with the inner ring clamp 26.

When the coil 16b is energized, whereby the rotor 12 and the resolver rotor 18 integrally rotate, a reluctance change is detected by the resolver stator 20 and control of rotating speed and positioning is performed by the controller (not shown).

Next, operation in this embodiment is explained.

When the coil 16*b* is energized, rotation torque is applied to the rotor 12 and the rotor 12 rotates. A reluctance change between the resolver 30 and the resolver rotor 18, which rotates integrally with the rotor 12, is detected by the resolver 30 and control of rotating speed and positioning is performed by the controller (not shown).

When moment load is applied to the thin motor 100, the thin motor 100 tilts around the cross roller bearing 14. However, since the single-pole resolver 30 is arranged such that a gap surface of the single-pole resolver 30 is located within the two contact angles and within the bearing width, it is possible to reduce a gap change of the single-pole resolver 30 having larger influence of the gap change than the multi-pole resolver 30.

Since the resolver 30, the cross roller bearing 14, and the motor unit 16 are arranged on a radially identical plane, it is possible to reduce the height (the length in the axial direction) of the thin motor 100.

Further, since the resolver 30 is arranged on the opposite side of the motor unit 16 across the cross roller bearing 14, the resolver 30 is less easily affected by noise and heat from the motor unit 16.

Further, when a method of, for example, increasing the preload of the cross roller bearing 14 is adopted, whereas the gap change can be suppressed, a deficiency in that the life of the cross roller bearing 14 is shortened is involved. However, in the present invention, since the gap change is reduced by arranging the single-pole resolver 30 in a position where the gap change is small, it is possible to realize extension of the life of the cross roller bearing 14.

In this way, in this embodiment, the thin motor 100 includes the cross roller bearing 14 including the inner ring 14*a* and the outer ring 14*b*, the stator 22 supported by the inner ring 14*a*, the rotor 12 supported by the outer ring 14*b*, the motor unit 16 that applies rotation torque to the rotor 12, and the single-pole resolver 30 and the multi-pole resolver 30 that detect a rotation angle position of the rotor 12. The single-pole resolver 30 is arranged such that the gap surface of the single-pole resolver 30 is located within the two contact angles.

Consequently, even if the moment load is applied to the thin motor 100, since the single-pole resolver 30 is arranged in the position where the gap change is small, compared with the past, it is possible to reduce the gap change of the single-pole resolver 30 and reduce the likelihood that the single-pole resolver 30 makes misdetection. In particular, since it is possible to reduce the gap change of the single-pole resolver 30 having larger influence of the gap change than the multi-pole resolver 30, it is possible to effective reduce the influence of the gap change. It is possible to realize extension of the life of the cross roller bearing 14 compared with the method of, for example, increasing the reload of the cross roller bearing 14.

Further, in this embodiment, the single-pole resolver 30 is arranged such that the gap surface of the single-pole resolver 30 is located within the bearing width.

Consequently, it is possible to further reduce the gap change of the single-pole resolver 30 and further reduce the likelihood that the single-pole resolver 30 makes misdetection. Since the single-pole resolver 30 and the cross roller bearing 14 are arranged on a radially identical plane, it is possible to reduce the height of the thin motor 100.

Further, in this embodiment, the resolver 30, the cross roller bearing 14, and the motor unit 16 are arranged on a radially identical plane.

Consequently, it is possible to further reduce the height of the thin motor 100. It is possible to reduce the gap change of the multi-pole resolver 30 and reduce the likelihood that the multi-pole resolver 30 makes misdetection.

Further, in this embodiment, the resolver 30, the cross roller bearing 14, and the motor unit 16 are arranged in the recited order from the radially inner side on a radially identical plane.

Consequently, since the resolver 30 is arranged on the opposite side of the motor unit 16 across the cross roller bearing 14, the resolver 30 is less easily affected by noise and heat from the motor unit 16 and it is possible to realize high detection accuracy.

Further, in this embedment, the cross roller bearing 14 is adopted.

Consequently, since it is possible to simultaneously receive moment load, axial load, and radial load, it is possible to reduce a gap change due to the moment load while maintaining rigidity against the axial load and the radial load.

In the ninth embodiment, the cross roller bearing 14 corresponds to the roller bearing in the inventions 42 to 47, the stator 22 corresponds to the inner-ring supported member of the invention 42, 45, or 47, the rotor 12 corresponds to the outer-ring supported member of the invention 42, 45, or 47, and the single-pole resolver 30 corresponds to the first resolver of the inventions 42 to 44 or 47. The multi-pole resolver 30 corresponds to the second resolver of the invention 42 or 47, the motor unit 16 corresponds to the driver of the invention 45, the straight line $L_1$ corresponds to the first straight line of the invention 42 or 44, and the straight line $L_2$ corresponds to the second straight line of the invention 42 or 44.

Tenth Embodiment

Figure 49:
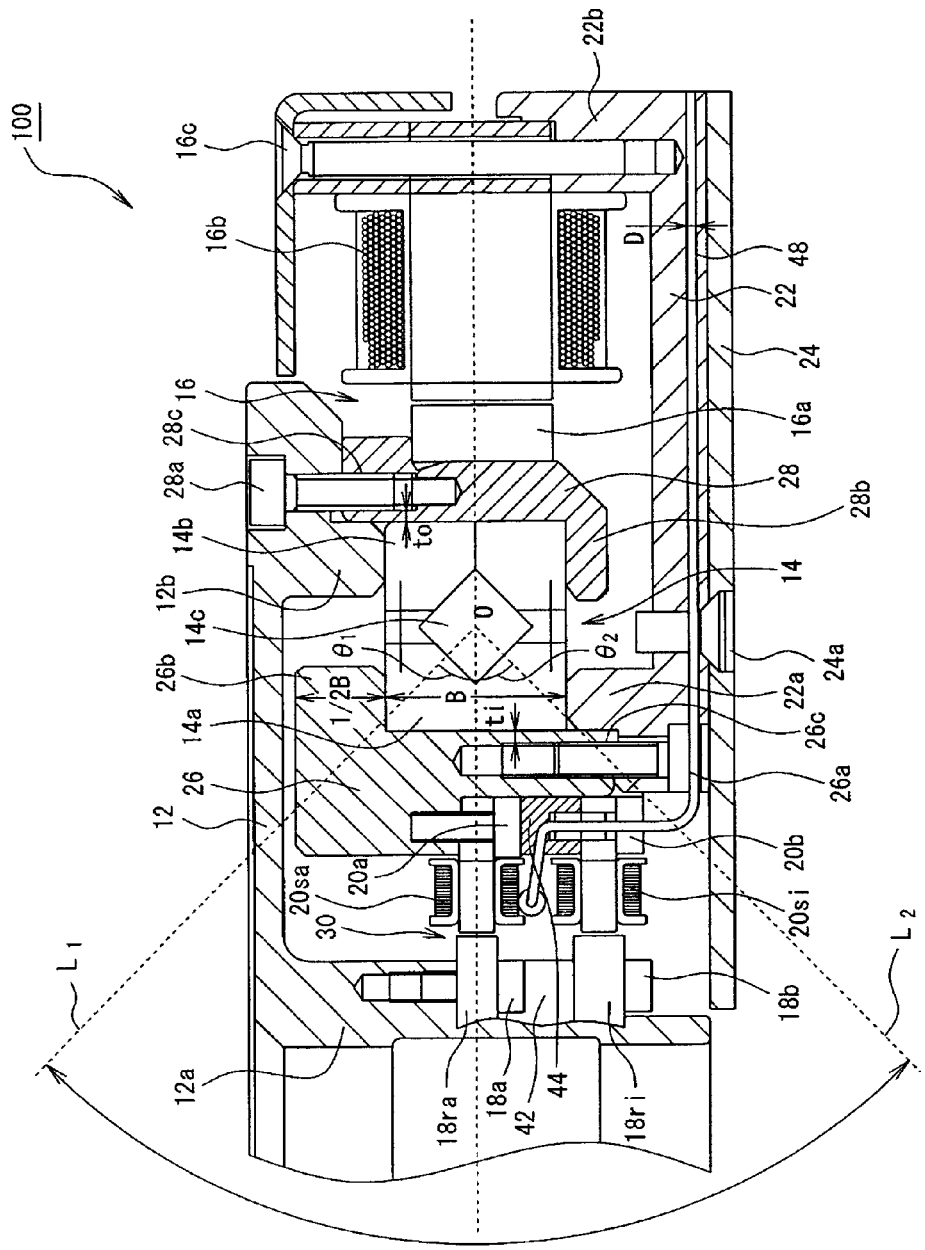
FIG. 49 is a sectional view in the axial direction of the thin motor 100 according to an embodiment of the present invention.
Figure 50:
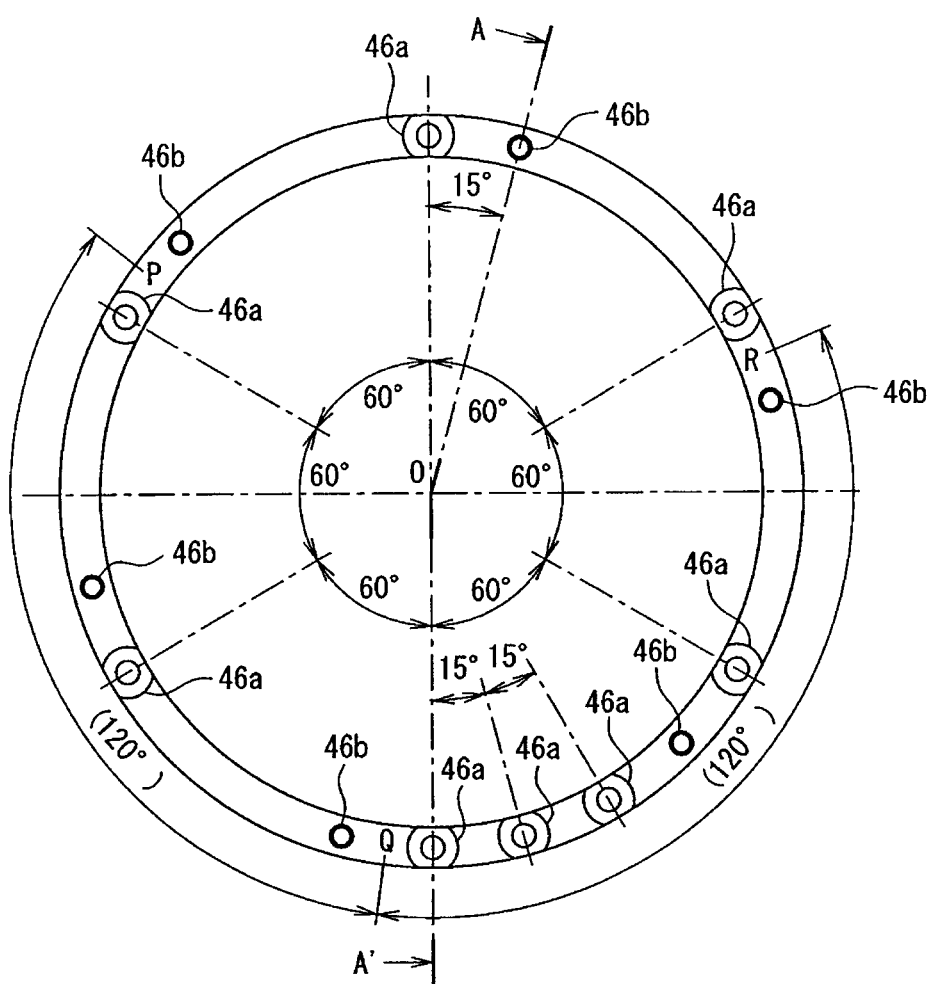
FIG. 50 is a bottom view of the inter-rotor seat 42.

Next, a first embodiment of the present invention is explained with reference to the drawings. FIGS. 49 to 51 are diagrams showing the tenth embodiment of the roller bearing device having an intra-contact angle arrangement structure of a resolver and the roller bearing device having an intra-bearing width arrangement structure of a resolver according to the present invention.

First, the configuration of the resolver 30 is explained.

FIG. 49 is a sectional view in the axial direction of the thin motor 100 according to this embodiment.

The resolver 30 is a resolver of the outer rotor type including, as shown in FIG. 49, a resolver rotor made of a hollow annular laminated core and a resolver stator that is arranged to be opposed to the resolver rotor at a predetermined interval and in which plural stator poles are formed at equal intervals in a circumferential direction thereof. In FIG. 49, one resolver 30 (the upper one in the axial direction) is a single-pole resolver of the ABS type that includes the annular resolver rotor 18*ra* having an inner circumference decentered with respect to the shaft center of the cross roller bearing 14 and the resolver stator 20*sa* arranged to be opposed to the resolver rotor 18*ra* and outputs a single-pole resolver signal in which a fundamental wave component of a reluctance change is one period per one rotation of the resolver rotor 18*ra*. The other resolver 30 (the lower one in the axial direction) is a multi-pole resolver of the INC type that includes the resolver rotor 18*ri* in which the plural teeth of a salient pole shape are formed at equal intervals in the circumferential direction thereof and the resolver stator 20*si* arranged to be opposed to the resolver rotor 18*ri* and outputs a multi-pole resolver signal in which a fundamental wave component of a reluctance change is a multi-period per one rotation of the resolver rotor 18*ri*.

The resolver rotors 18*ra* and 18*ri* are arranged at a very small interval via the inter-rotor seat 42. The resolver rotor 18*ra* is fixed and attached by the bolt 18*a* between the outside edge of the inner wall member 12*a* of the rotor 12 and the upper surface of the inter-rotor seat 42. The resolver rotor 18*ri* is attached to the lower surface of the inter-rotor seat 42 by the bolt 18*b*.

FIG. 50 is a bottom view of the inter-rotor seat 42.

FIG. 51 is a sectional view in the axial direction taken along an A-O-A' line in FIG. 50.

In the lower surface of the inter-rotor seat 42, as shown in FIG. 50, the bolt holes 46*a* through which the bolts 18*a* are inserted and the bolt holes 46*b* through which the bolts 18*b* are inserted are formed. Six bolt holes 46*a* are formed at intervals of 60° in the circumferential direction of the inter-rotor seat 42 and two bolt holes 46*a* are formed at an interval of 15° counterclockwise from the bolt hole 46*a* at the bottom of FIG. 50. The bolt holes 46*b* are respectively formed in positions at 15° clockwise from the bolt holes 46*a* formed at the intervals of 60°.

As shown in FIG. 51, the bolt hole 46*a* pierces through the inter-rotor seat 42 in the axial direction and the depth of counter bore thereof reaches depth of about a half in the axial direction of the inter-rotor seat 42. The depth of the bolt hole 46*b* reaches depth of about a half in the axial direction of the inter-rotor seat 42.

On the other hand, as shown in FIG. 49, the resolver stators 20*sa* and 20*si* are arranged at a very small interval via an inter-stator seat 44. The resolver stator 20*sa* is fixed and attached by the bolt 20*a* between the inside edge of the inner ring clamp 26 and the upper surface of the inter-stator seat 44. The resolver stator 20*si* is attached to the lower surface of the inter-stator seat 44 by the bolt 20*b*. Therefore, the resolver stators 20*sa* and 20*si* are fixed to the inside edge side of the inner wall member 22*a* of the stator 22 integrally with the inner ring clamp 26.

Next, the configuration of the stator 22 is explained.

In the stator 22, as shown in FIG. 49, the wiring tube 48 piercing through from the radially inner side to the radially outer side of the stator 22 is formed. The wires of the resolver 30 are housed in the wiring tube 48.

The height D of the wiring tube 48 is set to a value obtained by the following Expression (17) when a diameter of one wire of the resolver 30 is represented as d and a predetermined margin is represented as α (0<α<d):

$$D=2d+\alpha \quad (17)$$

The wires of the resolver 30 include plural wires such as a power line and a ground line. If these wires can be horizontally wired side by side without a twist, d is enough for the height D of the wiring tube. However, actually, the wires cross one another in the axial direction. Therefore, it is desirable to set the height D as 2d+α taking into account height required for the wires to cross once (d).

Next, the configuration of the inner ring clamp 26 and the outer ring clamp 28 is explained.

In the inner ring clamp 26, as shown in FIG. 49, the bolt hole 26*c* through which the bolt 26*a* is inserted is formed. In the ninth embodiment, the thickness between the outside edge of the inner ring clamp 26 and the inner wall surface of the bolt hole 26*c* is thickness equivalent to length for about three pitches of the bolt hole 26*c*. On the other hand, in this embodiment, thickness ti between the outside edge of the inner ring clamp 26 and the inner wall surface of the bolt hole 26*c* is set to a value in a range of the following Expression (18) when length for one pitch of the bolt hole 26*c* is represented as pi. Therefore, when the bolt 26*a* is screwed into the bolt hole 26*c*, since the outside edge of the inner ring clamp 26 is pushed out to the inner ring 14*a* side to lock the inner ring 14*a*, it is possible to fix the inner ring 14*a* without a gap. Therefore, it is possible to improve detection accuracy.

$$pi<ti<2pi \quad (18)$$

In Expression (18), when the thickness ti is set equal to or larger than 2pi, an action of pushing out the outside edge of the inner ring clamp 26 decreases and it is difficult to fix the inner ring 14*a* without a gap. On the other hand, when the thickness ti is set equal to or smaller than pi, it is likely that the inner wall of the bolt hole 26*c* is broken. Therefore, it is desirable to set the thickness ti to a value obtained by the above Expression (18).

In the outer ring clamp 28, as shown in FIG. 49, the bolt hole 28*c* through which the bolt 28*a* is inserted is formed. In the ninth embodiment, the thickness between the inside edge of the outer ring clamp 28 and the inner wall surface of the bolt hole 28*c* is thickness equivalent to length for about three pitches of the bolt hole 28*c*. On the other hand, in this embodiment, the thickness to between the inside edge of the outer ring clamp 28 and the inner wall surface of the bolt hole 28*c* is set to a value in a range of the following Expression (19) when length for one pitch of the bolt hole 28*c* is represented as po. Therefore, when the bolt 28*a* is screwed into the bolt hole 28*c*, since the inside edge of the outer ring clamp 28 is pushed out to the outer ring 14*b* side to lock the outer ring 14*b*, it is possible to fix the outer ring 14*b* without a gap. Therefore, it is possible to improve detection accuracy.

$$po<to<2po \quad (19)$$

In Expression (19), when the thickness to is set equal to or larger than 2po, an action of pushing out the inside edge of the outer ring clamp 28 decreases and it is difficult to fix the outer ring 14*a* without a gap. On the other hand, when the thickness to is set equal to or smaller than po, it is likely that the inner wall of the bolt hole 28*c* is broken. Therefore, it is desirable to set the thickness to to a value obtained by the above Expression (19).

In the ninth embodiment, the height of the pressing section 26*b* of the inner ring clamp 26 is about ¼B when the height of the cross roller bearing 14 is represented as B. However, when the height of the pressing section 26*b* of the inner ring clamp 26 is about ¼B, it is likely that the inner ring clamp 26 tilts to the resolver 30 side and a gap of the resolver 30 changes. Therefore, there is a problem in that a rotation angle position of the rotor 12 cannot be accurately detected.

Therefore, in this embodiment, as shown in FIG. 49, the height H of the pressing section 26*b* of the inner ring clamp 26 is set to a value obtained by the following Expression (20):

$$H=\tfrac{1}{2}B \quad (20)$$

Consequently, it is possible to reduce the likelihood that the gap of the resolver 30 changes. Therefore, it is possible to reduce the likelihood that the resolver 30 makes misdetection.

The height of the pressing section 28*b* of the outer ring clamp 28 is set to ¼B.

In this way, in this embodiment, the resolver rotors 18*ra* and 18*ri* are arranged at a very small interval via the inter-rotor seat 42 and respectively attached by the two bolts 18*a* and 18*b*.

Consequently, since the resolver rotors 18*ra* and 18*ri* can be independently fixed, it is possible to adjust each of the positions in the axial direction of the resolver rotors 18*ra* and 18*ri*.

Further, in this embodiment, the resolver stators 20sa and 20si are arranged at a very small interval via the inter-stator seat 44 and respectively attached by the two bolts 20a and 20b.

Consequently, since the resolver stators 20sa and 20si can be independently fixed, it is possible to adjust each of the positions in the axial direction of the resolver stators 20sa and 20si.

Further, in this embodiment, the resolver 30 is configured as the resolvers of the ABS type and the INC type.

Consequently, it is possible to effectively reduce the influence of the gap change.

Further, in this embodiment, the height D of the wiring tube 48 is set to the value obtained by the above Expression (17).

Consequently, since the height of the wiring tube 48 is reduced, it is possible to reduce the height of the thin motor 100. Since height for the plural wires of the resolver 30 to cross once is allowed, it is possible to reduce the likelihood that workability of housing the wires of the resolver 30 in the wiring tube 48 falls.

Further, in this embodiment, the thickness ti between the outside edge of the inner ring clamp 26 and the inner wall surface of the bolt hole 26c is set to the value obtained by the above Expression (18).

Consequently, since it is possible to fix the inner ring 14a without a gap, it is possible to improve detection accuracy.

Further, in this embodiment, the thickness to between the inside edge of the outer ring clamp 28 and the inner wall surface of the bolt hole 28c is set to a value obtained by the above Expression (19).

Consequently, since it is possible to fix the outer ring 14b without a gap, it is possible to improve detection accuracy.

Further, in this embodiment, the height H of the pressing section 26b of the inner ring clamp 26 is set to a value obtained by the above Expression (20).

Consequently, since it is possible to reduce the likelihood that a gap of the resolver 30 changes, it is possible to reduce the likelihood that the resolver 30 makes misdetection.

In the tenth embodiment, the cross roller bearing 14 corresponds to the roller bearing of the inventions 48 to 52, the stator 22 corresponds to the inner-ring supported member of the invention 49, 50, or 52, the rotor 12 corresponds to the outer-ring supported member of the invention 51, and the resolver 30 corresponds to the rotation sensor of the invention 49 or 52. The resolver rotor 18ra corresponds to the first resolver rotor of the invention 48, the resolver rotor 18ri corresponds to the second resolver rotor of the invention 48, and the bolts 18a and 18b correspond to the fixing means of the invention 48.

Modification of the Ninth and Tenth Embodiments

In the ninth embodiment, the resolver 30, the cross roller bearing 14, and the motor unit 16 are arranged in the recited order from the radially inner side on a radially identical plane. However, the present invention is not limited to this. The arrangement order of the resolver 30, the cross roller bearing 14, and the motor unit 16 can be arbitrary. For example, five configurations explained below can be adopted.

First, a first configuration is explained.

Figure 52:
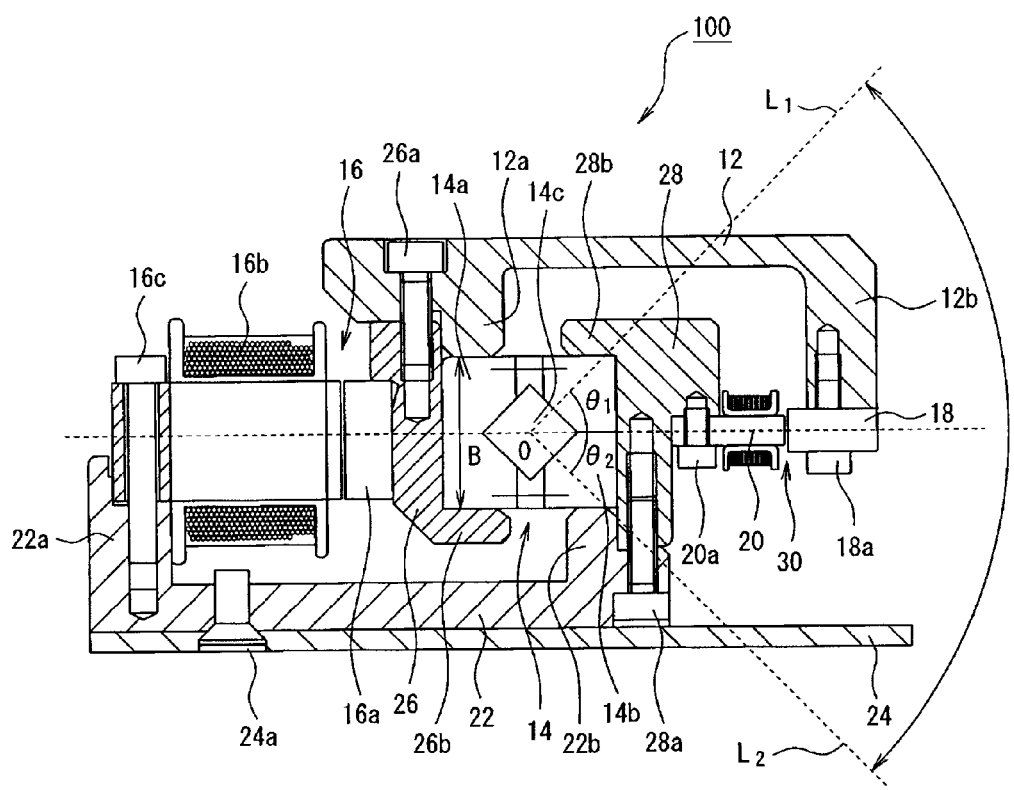
FIG. 52 is a sectional view in the axial direction of the thin motor 100 in which the motor unit 16, the cross roller bearing 14, and the resolver 30 are arranged in the recited order from the radially inner side on a radially identical plane.

FIG. 52 is a sectional view in the axial direction of the thin motor 100 in which the motor unit 16, the cross roller bearing 14, and the resolver 30 are arranged in the recited order from the radially inner side on a radially identical plane.

As shown in FIG. 52, the cross roller bearing 14 has the different two contact angles $\theta_1$ and $\theta_2$. The resolver 30 is arranged such that a gap surface thereof is located between the straight line $L_1$ extending in the direction of the contact angle $\theta_1$ from the vertex O of the contact angles and the straight line $L_2$ extending in the direction of the contact angle $\theta_2$ from the vertex O and on the side of the outer ring 14b and is arranged such that the gap surface is located within the bearing width. The motor unit 16, the cross roller bearing 14, and the resolver 30 are arranged on a radially identical plane.

In the stator 22, the annular inner wall member 22a projecting upward in the axial direction (the upward direction in FIG. 52) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 52) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner ring 14a is fixed to the inner wall member 12a of the rotor 12 in a state in which the inner ring 14a is pressed in the axial direction. Specifically, the inner ring 14a is fixed by setting the lower end of the inner wall member 12a of the rotor 12 in contact with the upper surface of the inner ring 14a, setting the pressing section 26b of the inner ring clamp 26 in contact with the lower surface of the inner ring 14a, and fastening the inner ring clamp 26 to the inner wall member 12a of the rotor 12 with the bolt 26a.

The outer ring 14b is fixed to the outer wall member 22b of the stator 22 in a state in which the outer ring 14b is pressed in the axial direction. Specifically, the outer ring 14b is fixed by setting the upper end of the outer wall member 22b of the stator 22 in contact with the lower surface of the outer ring 14b, setting the pressing section 28b of the outer ring clamp 28 in contact with the upper surface of the outer ring 14b, and fastening the outer ring clamp 28 to the outer wall member 22b of the stator 22 with the bolt 28a.

The permanent magnet 16a is attached to the inside edge of the inner ring clamp 26 and fixed to the inside edge side of the inner wall member 12a of the rotor 12 integrally with the inner ring clamp 26. On the other hand, the coil 16b is attached to the outside edge of the inner wall member 22a of the stator 22 by the bolt 16c.

The resolver 30 is a resolver of the ABS/INC integral type that outputs a single-pole resolver signal and a multi-pole resolver signal. The resolver 30 has a function equivalent to that of the resolver 30 in the ninth and tenth embodiments except that the resolver 30 is integrally configured. The resolver rotor 18 is attached to the outer wall member 12b of the rotor 12 by the bolt 18a. On the other hand, the resolver stator 20 is attached to the outside edge of the outer ring clamp 28 by the bolt 20a and fixed to the outside edge side of the outer wall member 22b of the stator 22 integrally with the outer ring clamp 28.

In this way, in the first configuration, the motor unit 16, the cross roller bearing 14, and the resolver 30 are arranged in the recited order from the radially inner side on a radially identical plane.

Consequently, besides the effect of reducing the likelihood of misdetection of the resolver 30 and the effect of realizing extension of the life of the cross roller bearing 14, since the resolver 30 is arranged on the opposite side of the motor unit 16 across the cross roller bearing 14, the resolver 30 is less easily affected by noise and heat from the motor unit 16 and it is possible to realize high detection accuracy. Since the resolver 30 is arranged on the radially outermost side, the diameter of the resolver 30 can be increased. Therefore, it is possible to stabilize accuracy, for example, during die machining and realize higher detection accuracy.

Next, a second configuration is explained.

Figure 53:
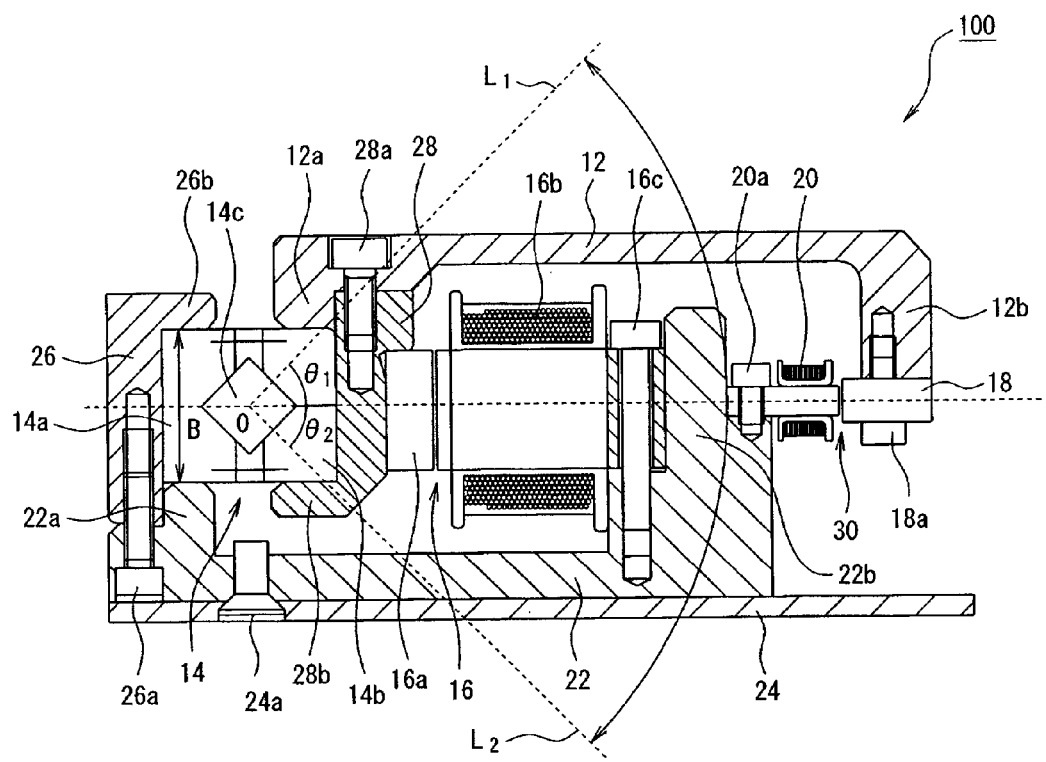
FIG. 53 is a sectional view in the axial direction of the thin motor 100 in which the cross roller bearing 14, the motor unit 16, and the resolver 30 are arranged in the recited order from the radially inner side on a radially identical plane.

FIG. 53 is a sectional view in the axial direction of the thin motor 100 in which the cross roller bearing 14, the motor unit 16, and the resolver 30 are arranged in the recited order from the radially inner side on a radially identical plane.

As shown in FIG. 53, the cross roller bearing 14 has the different two contact angles $\theta_1$ and $\theta_2$. The resolver 30 is arranged such that a gap surface thereof is located between the straight line $L_1$ extending in the direction of the contact angle $\theta_1$ from the vertex O of the contact angles and the straight line $L_2$ extending in the direction of the contact angle $\theta_2$ from the vertex O and on the side of the outer ring 14b and is arranged such that the gap surface is located within the bearing width. The cross roller bearing 14, the motor unit 16, and the resolver 30 are arranged on a radially identical plane.

In the stator 22, the annular inner wall member 22a projecting upward in the axial direction (the upward direction in FIG. 53) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 53) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner ring 14a is fixed to the inner wall member 22a of the stator 22 in a state in which the inner ring 14a is pressed in the axial direction. Specifically, the inner ring 14a is fixed by setting the upper end of the inner wall member 22a of the stator 22 in contact with the lower surface of the inner ring 14a, setting the pressing section 26b of the inner ring clamp 26 in contact with the upper surface of the inner ring 14a, and fastening the inner ring clamp 26 to the inner wall member 22a of the stator 22 with the bolt 26a.

The outer ring 14b is fixed to the inner wall member 12a of the rotor 12 in a state in which the outer ring 14b is pressed in the axial direction. Specifically, the outer ring 14b is fixed by setting the lower end of the inner wall member 12a of the rotor 12 in contact with the upper surface of the outer ring 14b, setting the pressing section 28b of the outer ring clamp 28 in contact with the lower surface of the outer ring 14b, and fastening the outer ring clamp 28 to the inner wall member 12a of the rotor 12 with the bolt 28a.

The permanent magnet 16a is attached to the outside edge of the outer ring clamp 28 and fixed to the outside edge side of the inner wall member 12a of the rotor 12 integrally with the outer ring clamp 28. On the other hand, the coil 16b is attached to the inside edge of the outer wall member 22b of the stator 22 by the bolt 16c.

The resolver 30 is a resolver of the ABS/INC integral type that outputs a single-pole resolver signal and a multi-pole resolver signal. The resolver 30 has a function equivalent to that of the resolver 30 in the ninth and tenth embodiments except that the resolver 30 is integrally configured. The resolver rotor 18 is attached to the outer wall member 12b of the rotor 12 by the bolt 18a. On the other hand, the resolver stator 20 is attached to the outside edge of the outer wall member 22b of the stator 22 by the bolt 20a.

In this way, in the second configuration, the cross roller bearing 14, the motor unit 16, and the resolver 30 are arranged in the recited order from the radially inner side on a radially identical plane.

Consequently, besides the effect of reducing the likelihood of misdetection of the resolver 30 and the effect of realizing extension of the life of the cross roller bearing 14, since the resolver 30 is arranged on the radially outermost side, the diameter of the resolver 30 can be increased. Therefore, it is possible to stabilize accuracy, for example, during die machining and realize higher detection accuracy. Since the cross roller bearing 14 is arranged on the radially innermost side, it is possible to reduce the height of the thin motor 100 by reducing the size of the cross roller bearing 14. Wiring to the motor unit 16 or the resolver 30 is easy and grease of the cross roller bearing 14 less easily leaks.

Next, a third configuration is explained.

Figure 54:
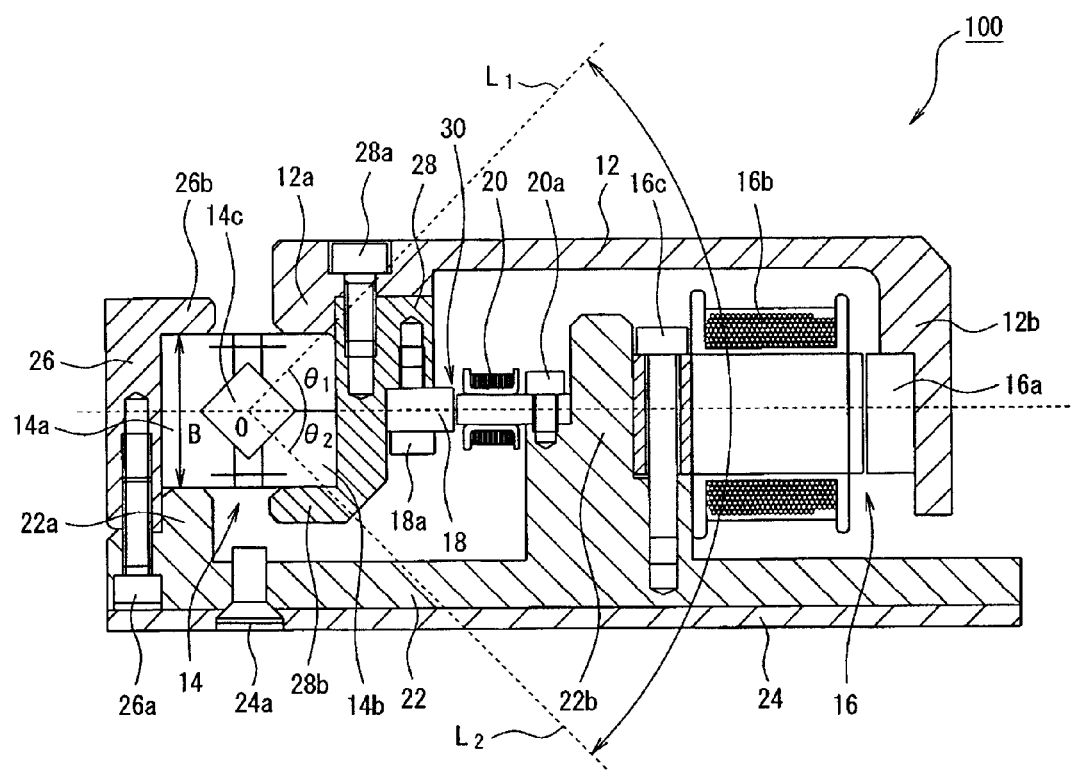
FIG. 54 is a sectional view in the axial direction of the thin motor 100 in which the cross roller bearing 14, the resolver 30, and the motor unit 16 are arranged in the recited order from the radially inner side on a radially identical plane.

FIG. 54 is a sectional view in the axial direction of the thin motor 100 in which the cross roller bearing 14, the resolver 30, and the motor unit 16 are arranged in the recited order from the radially inner side on a radially identical plane.

As shown in FIG. 54, the cross roller bearing 14 has the different two contact angles $\theta_1$ and $\theta_2$. The resolver 30 is arranged such that a gap surface thereof is located between the straight line $L_1$ extending in the direction of the contact angle $\theta_1$ from the vertex O of the contact angles and the straight line $L_2$ extending in the direction of the contact angle $\theta_2$ from the vertex O and on the side of the outer ring 14b and is arranged such that the gap surface is located within the bearing width. The cross roller bearing 14, the resolver 30, and the motor unit 16 are arranged on a radially identical plane.

In the stator 22, the annular inner wall member 22a projecting upward in the axial direction (the upward direction in FIG. 54) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 54) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner ring 14a is fixed to the inner wall member 22a of the stator 22 in a state in which the inner ring 14a is pressed in the axial direction. Specifically, the inner ring 14a is fixed by setting the upper end of the inner wall member 22a of the stator 22 in contact with the lower surface of the inner ring 14a, setting the pressing section 26b of the inner ring clamp 26 in contact with the upper surface of the inner ring 14a, and fastening the inner ring clamp 26 to the inner wall member 22a of the stator 22 with the bolt 26a.

The outer ring 14b is fixed to the inner wall member 12a of the rotor 12 in a state in which the outer ring 14b is pressed in the axial direction. Specifically, the outer ring 14b is fixed by setting the lower end of the inner wall member 12a of the rotor 12 in contact with the upper surface of the outer ring 14b, setting the pressing section 28b of the outer ring clamp 28 in contact with the lower surface of the outer ring 14b, and fastening the outer ring clamp 28 to the inner wall member 12a of the rotor 12 with the bolt 28a.

The permanent magnet 16a is attached to the inside edge of the outer wall member 12b of the rotor 12. On the other hand, the coil 16b is attached to the outside edge of the outer wall member 22b of the stator 22 by the bolt 16c.

The resolver 30 is a resolver of the ABS/INC integral type that outputs a single-pole resolver signal and a multi-pole resolver signal. The resolver 30 has a function equivalent to that of the resolver 30 in the ninth and tenth embodiments except that the resolver 30 is integrally configured. The resolver rotor 18 is attached to the outside edge of the outer ring clamp 28 by the bolt 18a and fixed to the outside edge side of the inner wall member 12a of the rotor 12 integrally with the outer ring clamp 28. On the other hand, the resolver stator 20 is attached to the inside edge of the outer wall member 22b of the stator 22 by the bolt 20a.

In this way, in the third configuration, the cross roller bearing 14, the resolver 30, and the motor unit 16 are arranged in the recited order from the radially inner side on a radially identical plane.

Consequently, besides the effect of reducing the likelihood of misdetection of the resolver 30 and the effect of realizing extension of the life of the cross roller bearing 14, since the cross roller bearing 14 is arranged on the radially innermost side, it is possible to reduce the height of the thin motor 100 by reducing the size of the cross roller bearing 14. Wiring to the motor unit 16 or the resolver 30 is easy and grease of the cross roller bearing 14 less easily leaks. Since the motor unit 16 is arranged on the radially outermost side, it is possible to secure a large space for winding wires and realize high output torque. Further, it is possible to increase the number of poles of the motor unit 16 and realize operation at low speed to ultra-low speed.

Next, a fourth configuration is explained.

Figure 55:
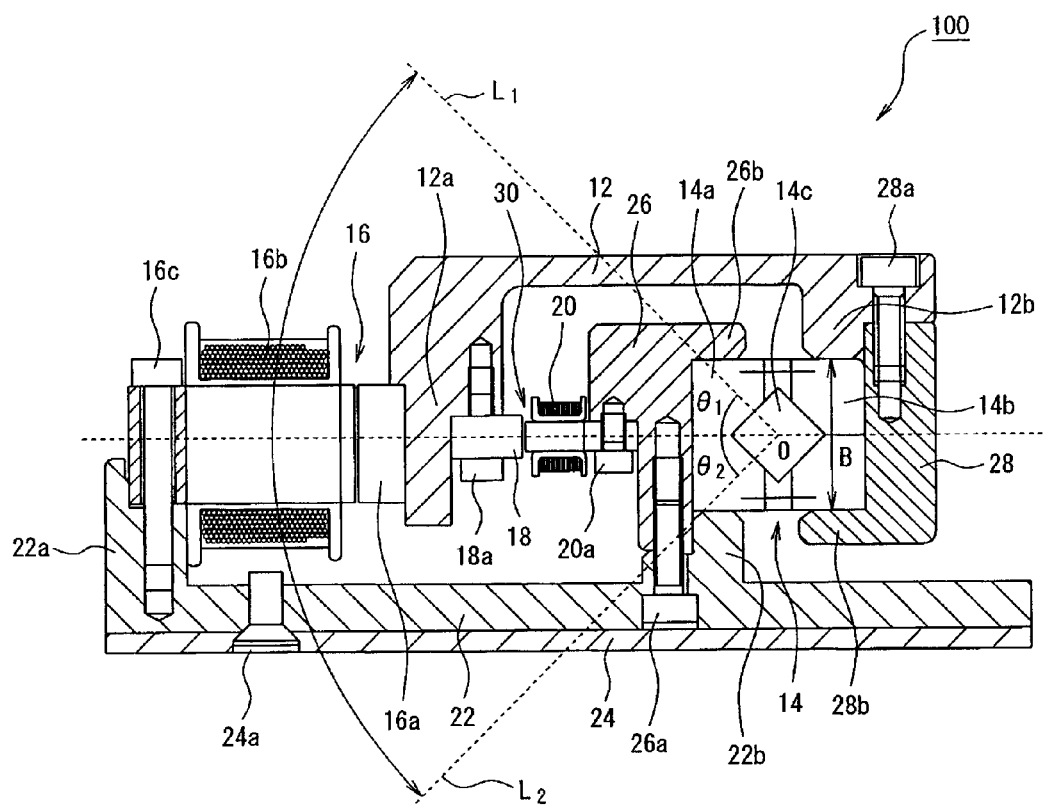
FIG. 55 is a sectional view in the axial direction of the thin motor 100 in which the motor unit 16, the resolver 30, and the cross roller bearing 14 are arranged in the recited order from the radially inner side on a radially identical plane.

FIG. 55 is a sectional view in the axial direction of the thin motor 100 in which the motor unit 16, the resolver 30, and the cross roller bearing 14 are arranged in the recited order from the radially inner side on a radially identical plane.

As shown in FIG. 55, the cross roller bearing 14 has the different two contact angles $\theta_1$ and $\theta_2$. The resolver 30 is arranged such that a gap surface thereof is located between the straight line $L_1$ extending in the direction of the contact angle $\theta_1$ from the vertex O of the contact angles and the straight line $L_2$ extending in the direction of the contact angle $\theta_2$ from the vertex O and on the side of the inner ring 14a and is arranged such that the gap surface is located within the bearing width. The motor unit 16, the resolver 30, and the cross roller bearing 14 are arranged on a radially identical plane.

In the stator 22, the annular inner wall member 22a projecting upward in the axial direction (the upward direction in FIG. 55) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 55) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner ring 14a is fixed to the outer wall member 22b of the stator 22 in a state in which the inner ring 14a is pressed in the axial direction. Specifically, the inner ring 14a is fixed by setting the upper end of the outer wall member 22b of the stator 22 in contact with the lower surface of the inner ring 14a, setting the pressing section 26b of the inner ring clamp 26 in contact with the upper surface of the inner ring 14a, and fastening the inner ring clamp 26 to the outer wall member 22b of the stator 22 with the bolt 26a.

The outer ring 14b is fixed to the outer wall member 12b of the rotor 12 in a state in which the outer ring 14b is pressed in the axial direction. Specifically, the outer ring 14b is fixed by setting the lower end of the outer wall member 12b of the rotor 12 in contact with the upper surface of the outer ring 14b, setting the pressing section 28b of the outer ring clamp 28 in contact with the lower surface of the outer ring 14b, and fastening the outer ring clamp 28 to the outer wall member 12b of the rotor 12 with the bolt 28a.

The permanent magnet 16a is attached to the inside edge of the inner wall member 12a of the rotor 12. On the other hand, the coil 16b is attached to the outside edge of the inner wall member 22a of the stator 22 by the bolt 16c.

The resolver 30 is a resolver of the ABS/INC integral type that outputs a single-pole resolver signal and a multi-pole resolver signal. The resolver 30 has a function equivalent to that of the resolver 30 in the ninth and tenth embodiments except that the resolver 30 is integrally configured. The resolver rotor 18 is attached to the outside edge of the inner wall member 12a of the rotor 12 by the bolt 18a. On the other hand, the resolver stator 20 is attached to the inside edge of the inner ring clamp 26 by the bolt 20a and fixed to the inside edge side of the outer wall member 22b of the stator 22 integrally with the inner ring clamp 26.

In this way, in the fourth configuration, the motor unit 16, the resolver 30, and the cross roller bearing 14 are arranged in the recited order from the radially inner side on a radially identical plane.

Consequently, besides the effect of reducing the likelihood of misdetection of the resolver 30 and the effect of realizing extension of the life of the cross roller bearing 14, since the cross roller bearing 14 is arranged on the radially outermost side, it is possible to house the cross roller bearing 14 having a large diameter and realize high rigidity.

Next, a fifth configuration is explained.

Figure 56:
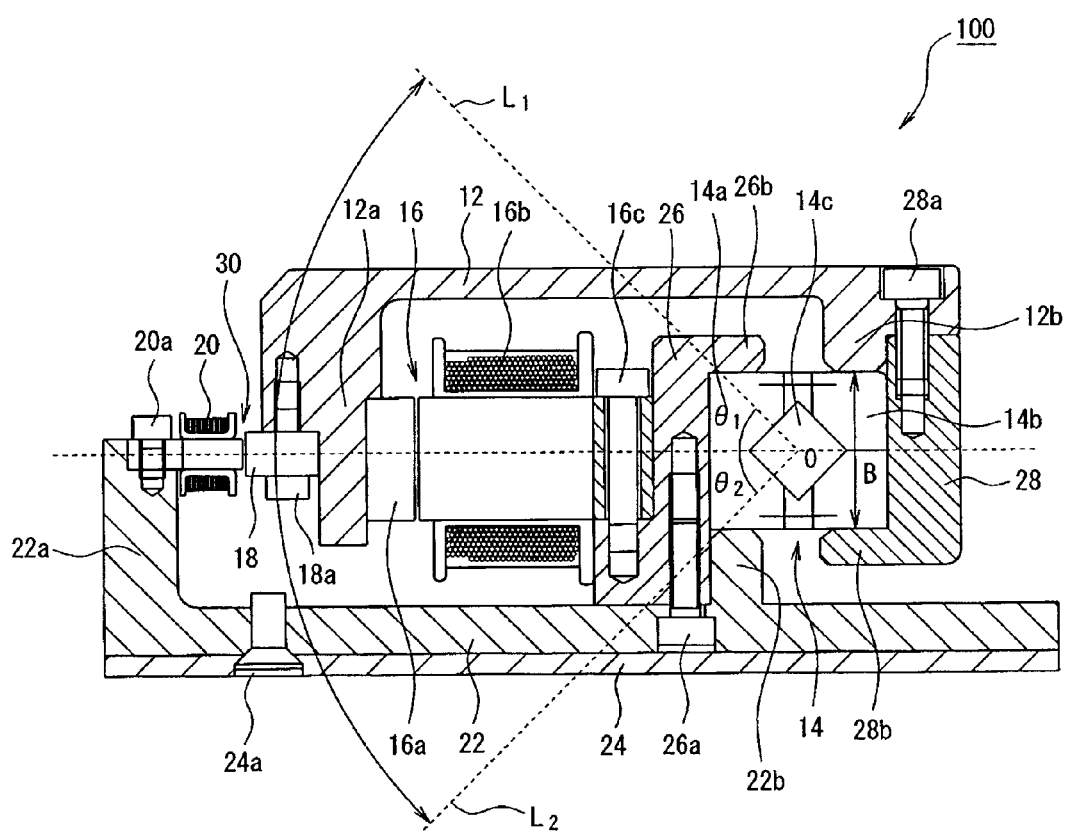
FIG. 56 is a sectional view in the axial direction of the thin motor 100 in which the resolver 30, the motor unit 16, and the cross roller bearing 14 are arranged in the recited order from the radially inner side on a radially identical plane.

FIG. 56 is a sectional view in the axial direction of the thin motor 100 in which the resolver 30, the motor unit 16, and the cross roller bearing 14 are arranged in the recited order from the radially inner side on a radially identical plane.

As shown in FIG. 56, the cross roller bearing 14 has the different two contact angles $\theta_1$ and $\theta_2$. The resolver 30 is arranged such that a gap surface thereof is located between the straight line $L_1$ extending in the direction of the contact angle $\theta_1$ from the vertex O of the contact angles and the straight line $L_2$ extending in the direction of the contact angle $\theta_2$ from the vertex O and on the side of the inner ring 14a and is arranged such that the gap surface is located within the bearing width. The resolver 30, the motor unit 16, and the cross roller bearing 14 are arranged on a radially identical plane.

In the stator 22, the annular inner wall member 22a projecting upward in the axial direction (the upward direction in FIG. 56) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 56) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner ring 14a is fixed to the outer wall member 22b of the stator 22 in a state in which the inner ring 14a is pressed in the axial direction. Specifically, the inner ring 14a is fixed by setting the upper end of the outer wall member 22b of the stator 22 in contact with the lower surface of the inner ring 14a, setting the pressing section 26b of the inner ring clamp 26 in contact with the upper surface of the inner ring 14a, and fastening the inner ring clamp 26 to the outer wall member 22b of the stator 22 with the bolt 26a.

The outer ring 14b is fixed to the outer wall member 12b of the rotor 12 in a state in which the outer ring 14b is pressed in the axial direction. Specifically, the outer ring 14b is fixed by setting the lower end of the outer wall member 12b of the rotor 12 in contact with the upper surface of the outer ring 14b, setting the pressing section 28b of the outer ring clamp 28 in contact with the lower surface of the outer ring 14b, and fastening the outer ring clamp 28 to the outer wall member 12b of the rotor 12 with the bolt 28a.

The permanent magnet 16a is attached to the outside edge of the inner wall member 12a of the rotor 12. On the other hand, the coil 16b is attached to the inside edge of the inner ring clamp 26 by the bolt 16c and fixed to the inside edge side of the outer wall member 22b of the stator 22 integrally with the inner ring clamp 26.

The resolver 30 is a resolver of the ABS/INC integral type that outputs a single-pole resolver signal and a multi-pole resolver signal. The resolver 30 has a function equivalent to that of the resolver 30 in the ninth and tenth embodiments except that the resolver 30 is integrally configured. The resolver rotor 18 is attached to the inside edge of the inner wall member 12a of the rotor 12 by the bolt 18a. On the other hand, the resolver stator 20 is attached to the outside edge of the inner wall member 22a of the stator 22 by the bolt 20a.

In this way, in the fifth configuration, the resolver 30, the motor unit 16, and the cross roller bearing 14 are arranged in the recited order from the radially inner side on a radially identical plane.

Consequently, besides the effect of reducing the likelihood of misdetection of the resolver 30 and the effect of realizing extension of the life of the cross roller bearing 14, since the cross roller bearing 14 is arranged on the radially outermost side, it is possible to house the cross roller bearing 14 having a large diameter and realize high rigidity.

In the configurations shown in FIGS. 52 to 56, the resolver of the ABS/INC integral type is provided. However, the present invention is not limited to this. The thin motor 100 can also be configured by only the resolver of the ABS type, can also be configured by only the resolver of the INC type, or can also be configured by the resolvers of the ABS type and the INC type.

In the tenth embodiment, the resolver 30, the cross roller bearing 14, and the motor unit 16 are arranged in the recited order from the radially inner side on a radially identical plane. However, the present invention is not limited to this. The arrangement order of the resolver 30, the cross roller bearing 14, and the motor unit 16 can be arbitrary. For example, five configurations explained below can be adopted.

First, a first configuration is explained.

Figure 57:
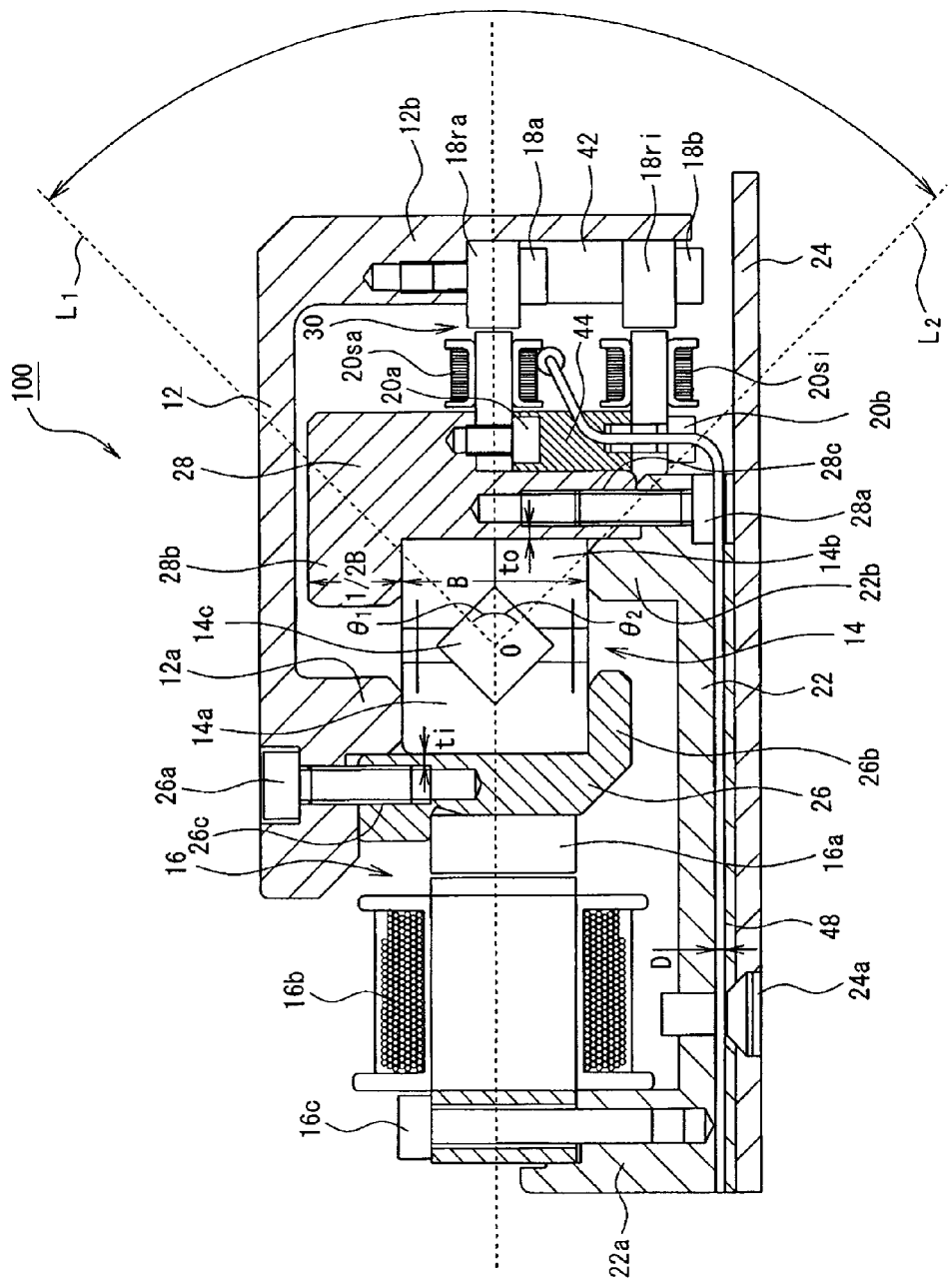
FIG. 57 is a sectional view in the axial direction of the thin motor 100 in the case in which the configuration shown in FIG. 52 is applied to the tenth embodiment.

FIG. 57 is a sectional view in the axial direction of the thin motor 100 in the case in which the configuration shown in FIG. 52 is applied to the tenth embodiment.

As shown in FIG. 57, the resolver 30 is configured as the resolvers of the ABS type and the INC type in the tenth embodiment rather than the resolver of the ABS/INC integral type.

The resolver rotors 18ra and 18ri are arranged at a very small interval via the inter-rotor seat 42. The resolver rotor 18ra is fixed and attached by the bolt 18a between the inside edge of the outer wall member 12b of the rotor 12 and the upper surface of the inter-rotor seat 42. The resolver rotor 18ri is attached to the lower surface of the inter-rotor seat 42 by the bolt 18b.

The resolver stators 20sa and 20si are arranged at a very small interval via the inter-stator seat 44. The resolver stator 20sa is fixed and attached by the bolt 20a between the outside edge of the outer ring clamp 28 and the upper surface of the inter-stator seat 44. The resolver stator 20si is attached to the lower surface of the inter-stator seat 44 by the bolt 20b. Therefore, the resolver stators 20sa and 20si are fixed to the outside edge side of the outer wall member 22b of the stator 22 integrally with the outer ring clamp 28.

The height D of the wiring tube 48 is set to the value obtained by the above Expression (17).

The thickness ti between the outside edge of the inner ring clamp 26 and the inner wall surface of the bolt hole 26c is set to a value in the range of the above Expression (18) and the thickness to between the inside edge of the outer ring clamp 28 and the inner wall surface of the bolt hole 28c is set to a value in the range of the above Expression (19).

The height H of the pressing section 28b of the outer ring clamp 28 is set to the value obtained by the above Expression (20).

Next, a second configuration is explained.

Figure 58:
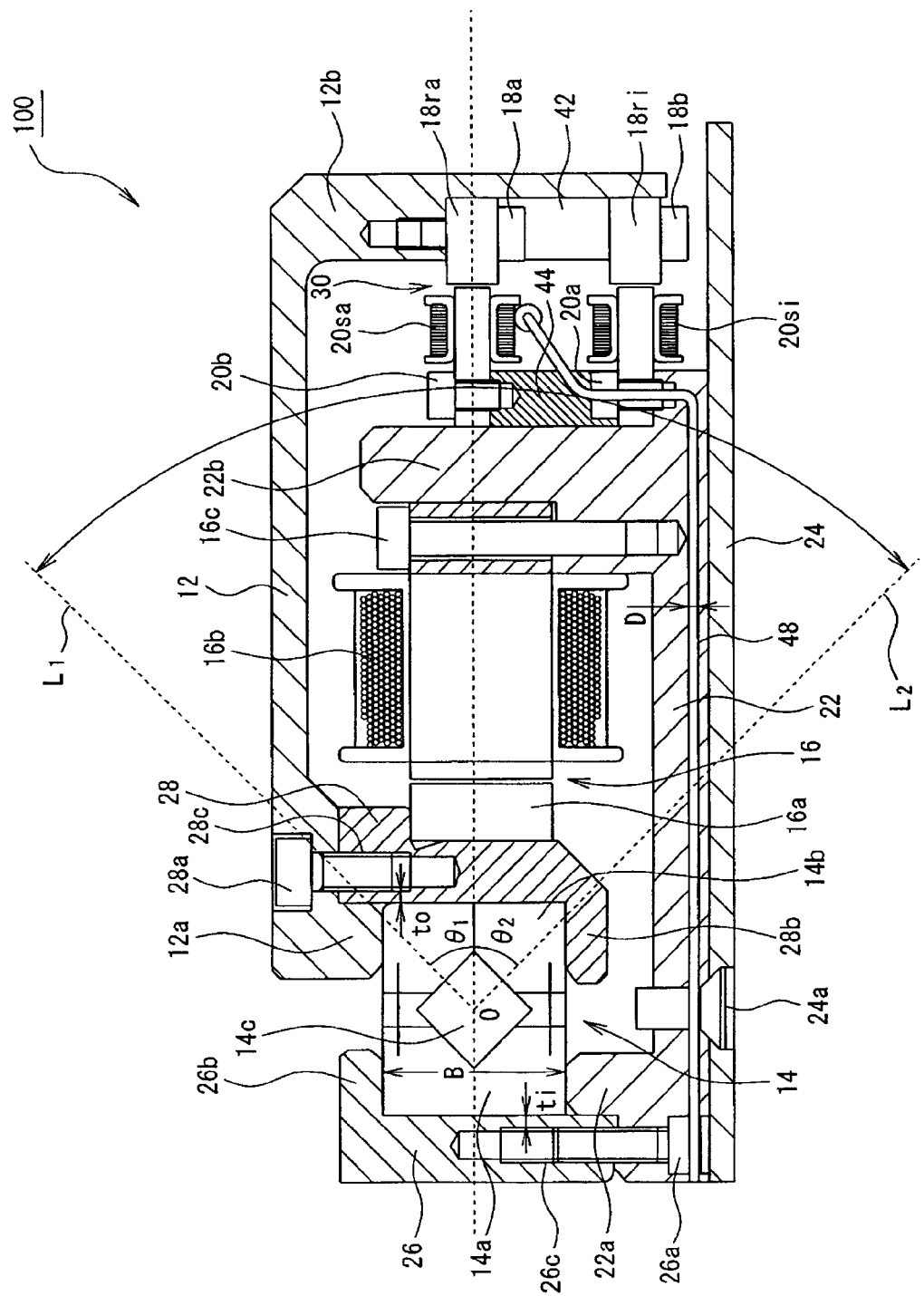
FIG. 58 is a sectional view in the axial direction of the thin motor 100 in the case in which the configuration shown in FIG. 53 is applied to the tenth embodiment.

FIG. 58 is a sectional view in the axial direction of the thin motor 100 in the case in which the configuration shown in FIG. 53 is applied to the tenth embodiment.

As shown in FIG. 58, the resolver 30 is configured as the resolvers of the ABS type and the INC type in the tenth embodiment rather than the resolver of the ABS/INC integral type.

The resolver rotors 18ra and 18ri are arranged at a very small interval via the inter-rotor seat 42. The resolver rotor 18ra is fixed and attached by the bolt 18a between the inside edge of the outer wall member 12b of the rotor 12 and the upper surface of the inter-rotor seat 42. The resolver rotor 18ri is attached to the lower surface of the inter-rotor seat 42 by the bolt 18b.

The resolver stators 20sa and 20si are arranged at a very small interval via the inter-stator seat 44. The resolver stator 20si is fixed and attached by the bolt 20a between the outside edge of the outer wall member 22b of the stator 22 and the lower surface of the inter-stator seat 44. The resolver stator 20sa is attached to the upper surface of the inter-stator seat 44 by the bolt 20b.

The height D of the wiring tube 48 is set to the value obtained by the above Expression (17).

The thickness ti between the outside edge of the inner ring clamp 26 and the inner wall surface of the bolt hole 26c is set to a value in the range of the above Expression (18) and the thickness to between the inside edge of the outer ring clamp 28 and the inner wall surface of the bolt hole 28c is set to a value in the range of the above Expression (19).

Next, a third configuration is explained.

Figure 59:
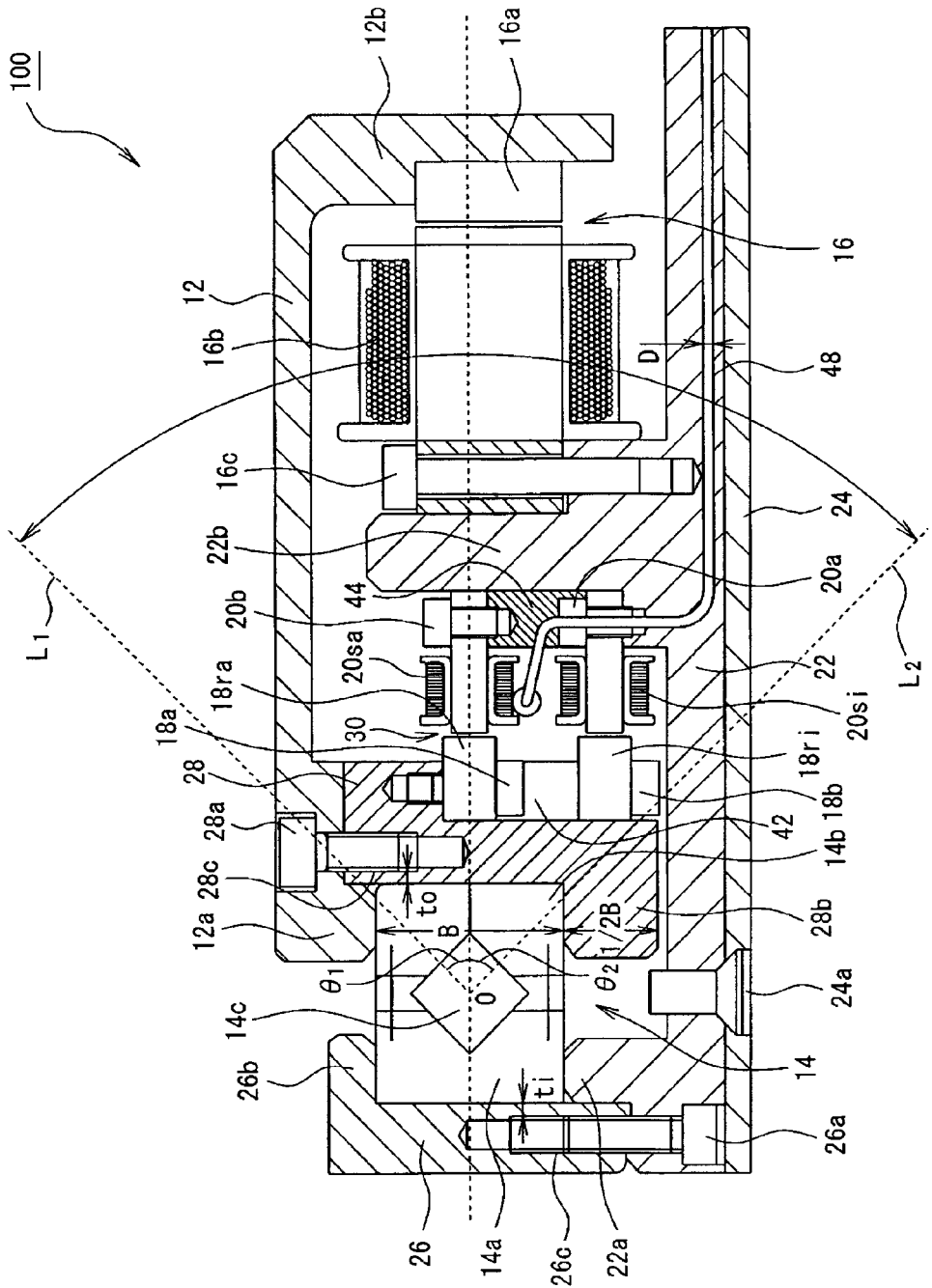
FIG. 59 is a sectional view in the axial direction of the thin motor 100 in the case in which the configuration shown in FIG. 54 is applied to the tenth embodiment.

FIG. 59 is a sectional view in the axial direction of the thin motor 100 in the case in which the configuration shown in FIG. 54 is applied to the tenth embodiment.

As shown in FIG. 59, the resolver 30 is configured as the resolvers of the ABS type and the INC type in the tenth embodiment rather than the resolver of the ABS/INC integral type.

The resolver rotors 18*ra* and 18*ri* are arranged at a very small interval via the inter-rotor seat 42. The resolver rotor 18*ra* is fixed and attached by the bolt 18*a* between the outside edge of the outer ring clamp 28 and the upper surface of the inter-rotor seat 42. The resolver rotor 18*ri* is attached to the lower surface of the inter-rotor seat 42 by the bolt 18*b*.

The resolver stators 20*sa* and 20*si* are arranged at a very small interval via the inter-stator seat 44. The resolver stator 20*si* is fixed and attached by the bolt 20*a* between the inside edge of the outer wall member 22*b* of the stator 22 and the lower surface of the inter-stator seat 44. The resolver stator 20*sa* is attached to the upper surface of the inter-stator seat 44 by the bolt 20*b*.

The height D of the wiring tube 48 is set to the value obtained by the above Expression (17).

The thickness ti between the outside edge of the inner ring clamp 26 and the inner wall surface of the bolt hole 26*c* is set to a value in the range of the above Expression (18) and the thickness to between the inside edge of the outer ring clamp 28 and the inner wall surface of the bolt hole 28*c* is set to a value in the range of the above Expression (19).

The height H of the pressing section 28*b* of the outer ring clamp 28 is set to the value obtained by the above Expression (20).

Next, a fourth configuration is explained.

Figure 60:
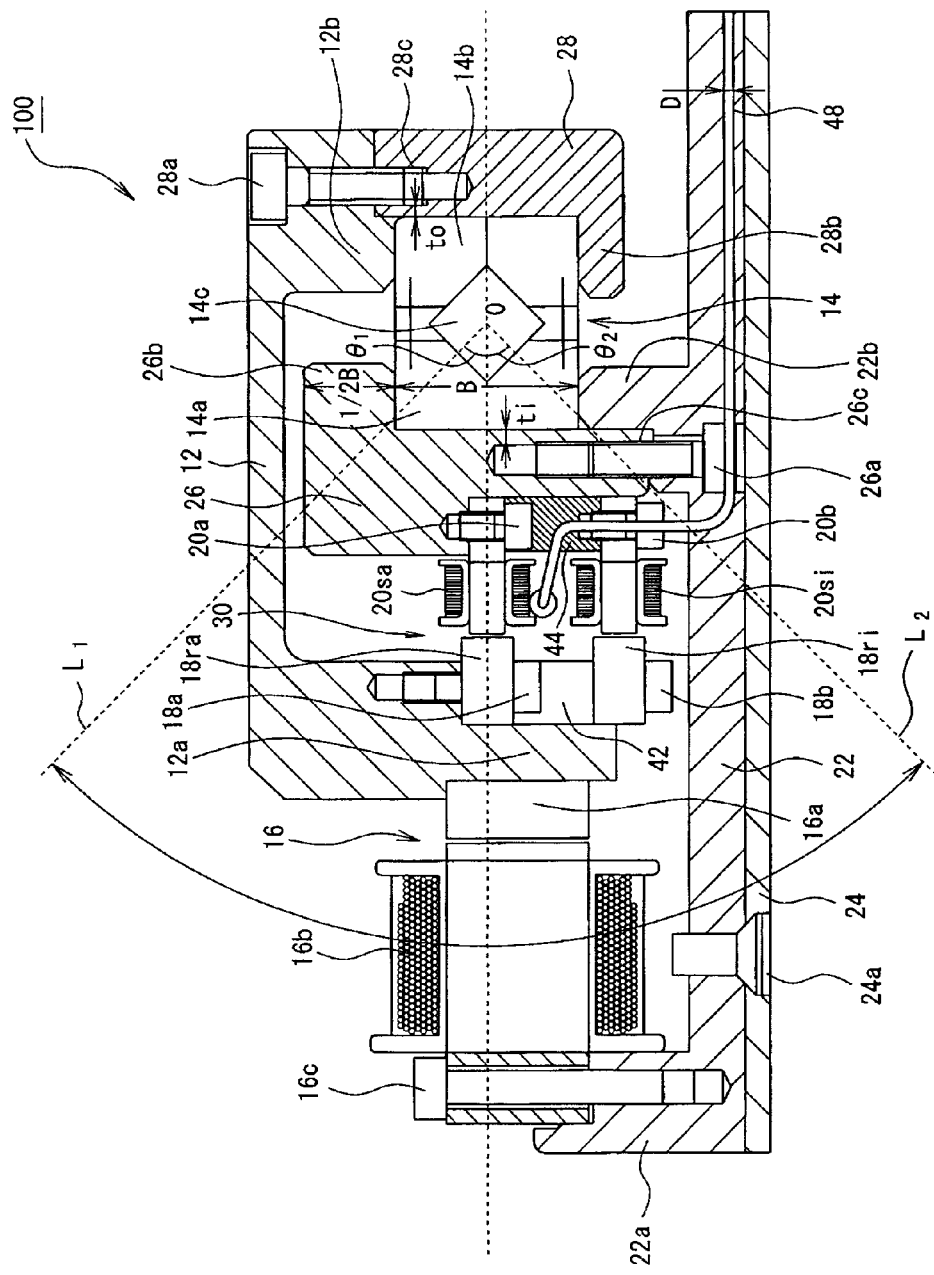
FIG. 60 is a sectional view in the axial direction of the thin motor 100 in the case in which the configuration shown in FIG. 55 is applied to the tenth embodiment.

FIG. 60 is a sectional view in the axial direction of the thin motor 100 in the case in which the configuration shown in FIG. 55 is applied to the tenth embodiment.

As shown in FIG. 60, the resolver 30 is configured as the resolvers of the ABS type and the INC type in the tenth embodiment rather than the resolver of the ABS/INC integral type.

The resolver rotors 18*ra* and 18*ri* are arranged at a very small interval via the inter-rotor seat 42. The resolver rotor 18*ra* is fixed and attached by the bolt 18*a* between the outside edge of the inner wall member 12*a* of the rotor 12 and the upper surface of the inter-rotor seat 42. The resolver rotor 18*ri* is attached to the lower surface of the inter-rotor seat 42 by the bolt 18*b*.

The resolver stators 20*sa* and 20*si* are arranged at a very small interval via the inter-stator seat 44. The resolver stator 20*sa* is fixed and attached by the bolt 20*a* between the inside edge of the inner ring clamp 26 and the upper surface of the inter-stator seat 44. The resolver stator 20*si* is attached to the lower surface of the inter-stator seat 44 by the bolt 20*b*. Therefore, the resolver stators 20*sa* and 20*si* are fixed to the inside edge side of the outer wall member 22*b* of the stator 22 integrally with the inner ring clamp 26.

The height D of the wiring tube 48 is set to the value obtained by the above Expression (17).

The thickness ti between the outside edge of the inner ring clamp 26 and the inner wall surface of the bolt hole 26*c* is set to a value in the range of the above Expression (18) and the thickness to between the inside edge of the outer ring clamp 28 and the inner wall surface of the bolt hole 28*c* is set to a value in the range of the above Expression (19).

The height H of the pressing section 26*b* of the inner ring clamp 26 is set to the value obtained by the above Expression (20).

Next, a fifth configuration is explained.

Figure 61:
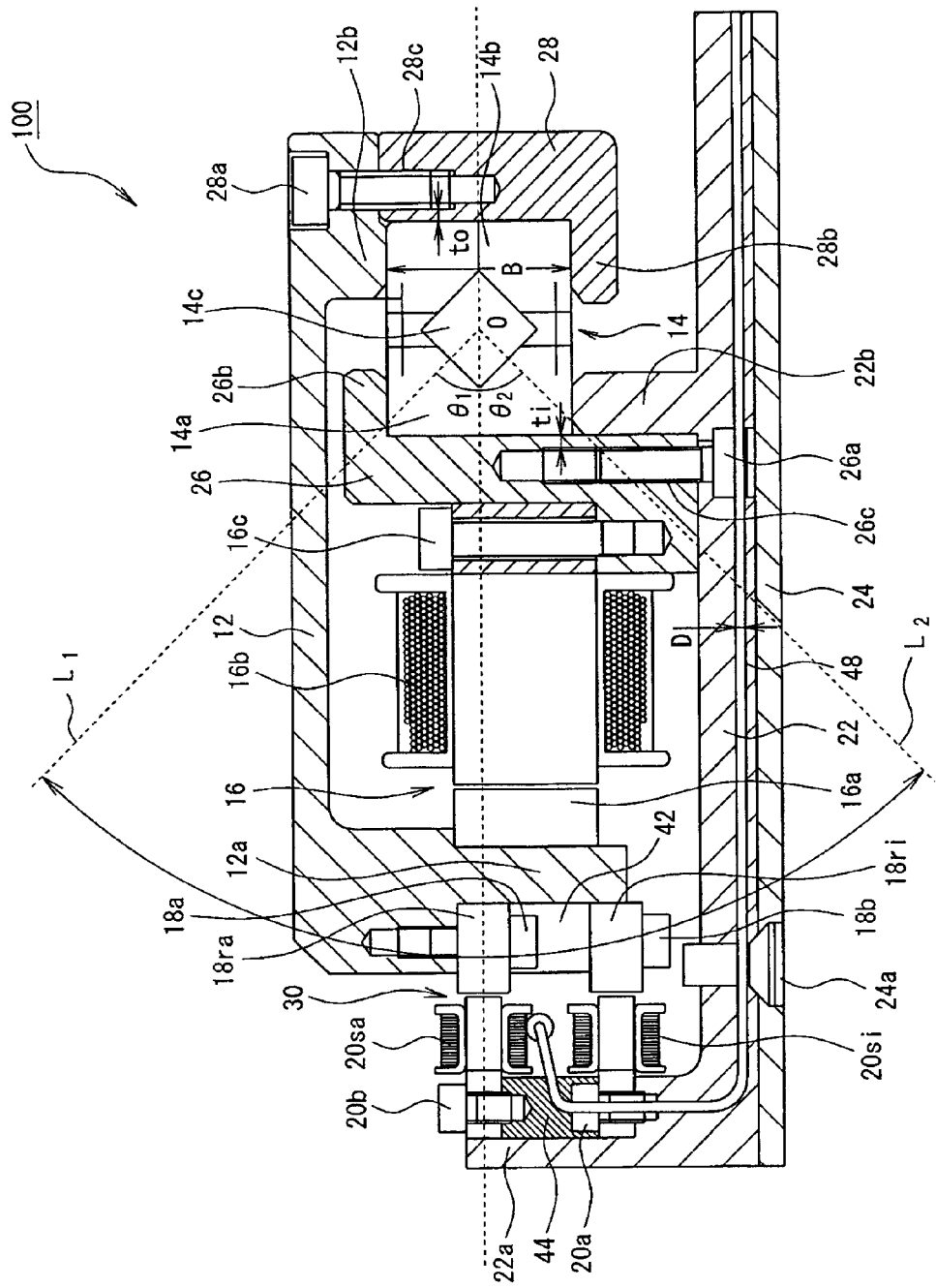
FIG. 61 is a sectional view in the axial direction of the thin motor 100 in the case in which the configuration shown in FIG. 56 is applied to the tenth embodiment.

FIG. 61 is a sectional view in the axial direction of the thin motor 100 in the case in which the configuration shown in FIG. 56 is applied to the tenth embodiment.

As shown in FIG. 61, the resolver 30 is configured as the resolvers of the ABS type and the INC type in the tenth embodiment rather than the resolver of the ABS/INC integral type.

The resolver rotors 18*ra* and 18*ri* are arranged at a very small interval via the inter-rotor seat 42. The resolver rotor 18*ra* is fixed and attached by the bolt 18*a* between the inside edge of the inner wall member 12*a* of the rotor 12 and the upper surface of the inter-rotor seat 42. The resolver rotor 18*ri* is attached to the lower surface of the inter-rotor seat 42 by the bolt 18*b*.

The resolver stators 20*sa* and 20*si* are arranged at a very small interval via the inter-stator seat 44. The resolver stator 20*si* is fixed and attached by the bolt 20*a* between the outside edge of the inner wall member 22*a* of the stator 22 and the lower surface of the inter-stator seat 44. The resolver stator 20*sa* is attached to the upper surface of the inter-stator seat 44 by the bolt 20*b*.

The height D of the wiring tube 48 is set to the value obtained by the above Expression (17).

The thickness ti between the outside edge of the inner ring clamp 26 and the inner wall surface of the bolt hole 26*c* is set to a value in the range of the above Expression (18) and the thickness to between the inside edge of the outer ring clamp 28 and the inner wall surface of the bolt hole 28*c* is set to a value in the range of the above Expression (19).

In the configurations shown in FIGS. 57 to 61, the resolvers of the ABS type and the INC type are provided. However, the present invention is not limited to this. The thin motor 100 can also be configured by only the resolver of the ABS type, can also be configured by only the resolver of the INC type, or can also be configured by the resolver of the ABS/INC integral type.

In the ninth and tenth embodiments, the thin motor 100 is configured as the inner rotor type in which the inner side of the thin motor 100 rotates. However, the present invention is not limited to this. The thin motor 100 can also be configured as the outer rotor type in which the outer side of the thin motor 100 rotates. In this case, the rotor 12 is the inner-ring supported member and the stator 22 is the outer-ring supported member.

In the configurations shown in FIGS. 52 to 61, the thin motor 100 is configured as the outer rotor type in which the outer side of the thin motor 100 rotates. However, the present invention is not limited to this. The thin motor 100 can also be configured as the inner rotor type in which the inner side of the thin motor 100 rotates. In this case, the rotor 12 is the inner-ring supported member and the stator 22 is the outer-ring supported member.

In the ninth embodiment, the resolver rotor 18 is attached to the outside edge of the inner wall member 12*a* of the rotor 12 and the resolver stator 20 is attached to the inside edge of the inner ring clamp 26. However, the present invention is not limited to this. The resolver stator 20 can also be attached to the outside edge of the inner wall member 12*a* of the rotor 12 and the resolver rotor 18 can also be attached to the inside edge of the inner ring clamp 26. The same holds true for the configurations shown in FIGS. 52 to 61.

In the ninth and tenth embodiments, the inner wall member 22*a* and the outer wall member 22*b* of the stator 22 are formed as a part of the stator 22. However, the present invention is not limited to this. The inner wall member 22*a* or the outer wall member 22*b* of the stator 22 can also be configured by a separate member and attached to the stator 22. The inner ring clamp 26 can also be directly attached to the stator 22 without forming the inner wall member 22a of the stator 22. However, in this case, the inner ring clamp 26 configures the inner wall member of the stator 22. The same holds true for the configurations shown in FIGS. 52 to 61.

In the ninth and tenth embodiments, the inner wall member 12a and the outer wall member 12b of the rotor 12 are formed as a part of the rotor 12. However, the present invention is not limited to this. The inner wall member 12a or the outer wall member 12b of the rotor 12 can also be configured by a separate member and attached to the rotor 12. The outer ring clamp 28 can also be directly attached to the rotor 12 without forming the outer wall member 12b of the rotor 12. However, in this case, the outer ring clamp 28 configures the outer wall member of the rotor 12. The same holds true for the configurations shown in FIGS. 52 to 61.

In the ninth and tenth embodiments, the resolver 30, the cross roller bearing 14, and the motor unit 16 are arranged on a radially identical plane. However, the present invention is not limited to this. The motor unit 16 does not have to be arranged on a plane radially identical with the resolver 30 and the cross roller bearing 14. The same holds true for the configurations shown in FIGS. 52 to 61.

In the ninth and tenth embodiments, the cross roller bearing 14 is applied. However, the present invention is not limited to this. A four-point contact ball bearing, an angular ball bearing, a deep groove ball bearing, a cylindrical roller bearing, a tapered roller bearing, and the like may be applied. In this case, it is desirable to adopt a roller bearing that can simultaneously receive moment load, axial load, and radial load. For example, the four-point contact ball bearing corresponds to such a roller bearing. The same holds true for the configurations shown in FIGS. 52 to 61.

In the ninth and tenth embodiments, the roller bearing device having an intra-contact angle arrangement structure of a resolver and the roller bearing device having an intra-bearing width arrangement structure of a resolver according to the present invention are applied to the structure for rotatably supporting the stator 22 and the rotor 12. However, the present invention is not limited to this. The roller bearing devices can be applied to any structure as long as the structure is interposed between two members and relatively rotatably supports the members. The same holds true for the configurations shown in FIGS. 52 to 61.

Eleventh Embodiment

Figure 62:
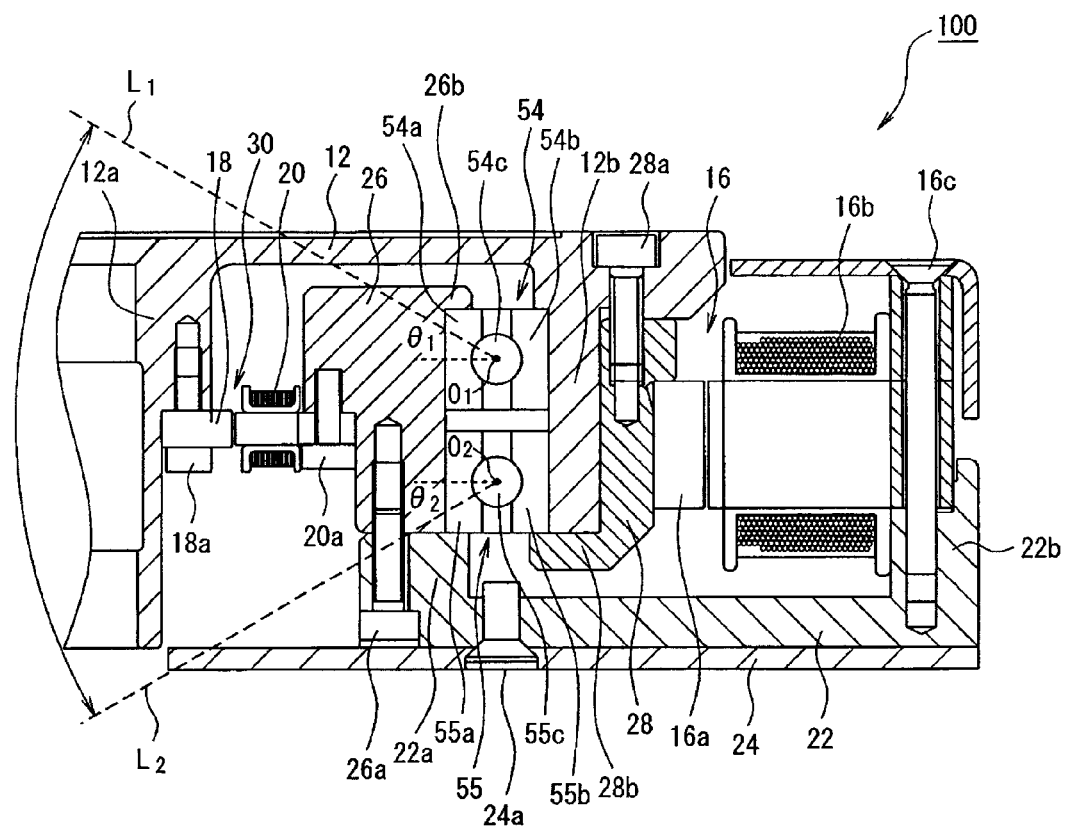
FIG. 62 is a sectional view in the axial direction of the thin motor 100 according to an embodiment of the present invention.

Next, an eleventh embodiment of the present invention is explained with reference to the drawings. FIG. 62 is a diagram showing the eleventh embodiment of a roller bearing device having an intra-contact angle arrangement structure of a duplex bearing according to the present invention.

First, the configuration of the thin motor 100 to which the present invention is applied is explained.

FIG. 62 is a sectional view in the axial direction of the thin motor 100 according to this embodiment.

The thin motor 100 includes, as shown in FIG. 62, the stator 22 as a stator, the rotor 12 as a rotor, angular ball bearings 54 and 55 that are interposed between the rotor 12 and the stator 22 and rotatably support the rotor 12, the motor unit 16 that applies rotation torque to the rotor 12, and the resolver 30 that detects a rotation angle position of the rotor 12.

The angular ball bearings 54 and 55 form a face-to-face duplex bearing and have the contact angles $\theta_1$ and $\theta_2$. As the contact angles $\theta_1$ and $\theta_2$ are set larger, an axial load bearing ability of the angular ball bearings 54 and 55 can be improved. Conversely, as the contact angles $\theta_1$ and $\theta_2$ are set smaller, a radial load bearing ability of the angular ball bearings 54 and 55 can be improved. It is arbitrarily selected according to an environment of use and a purpose of use of the thin motor 100 which of the bearing abilities is improved. Therefore, values of the contact angles $\theta_1$ and $\theta_2$ are not specifically limited.

The resolver 30 is arranged such that a gap surface thereof is located between the straight line $L_1$ extending in the direction of the contact angle $\theta_1$ from a vertex $O_1$ of the contact angle $\theta_1$ of the angular ball bearing 54 and the straight line $L_2$ extending in the direction of the contact angle $\theta_2$ from a vertex $O_2$ of the contact angle $\theta_2$ of the angular ball bearing 55 and on the side of inner rings 54a and 55a (hereinafter referred to as within two contact angles). A gap of the resolver 30 means a gap in the radial direction between the resolver rotor 18 and the resolver stator 20. The gap surface means a surface where the resolver rotor 18 and the resolver stator 20 are opposed to each other via the gap. The motor unit 16 is arranged on the opposite side of the resolver 30 across the angular ball bearings 54 and 55. Further, the resolver 30, the angular ball bearings 54 and 55, and the motor unit 16 are arranged on a radially identical plane.

In the stator 22, the annular inner wall member 22a projecting upward in the axial direction (the upward direction in FIG. 62) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 62) is formed. Further on the radially outer side than the inner wall member 12a, the annular outer wall member 12b projecting downward in the axial direction is formed. The stator 22 and the rotor 12 are arranged to extend over each other such that the inner wall member 22a of the stator 22 is located between the inner wall member 12a and the outer wall member 12b of the rotor 12 and the outer wall member 12b of the rotor 12 is located between the inner wall member 22a and the outer wall member 22b of the stator 22.

The angular ball bearing 54 includes an inner ring 54a, an outer ring 54b, and plural balls 54c rollably provided between the inner ring 54a and the outer ring 54b. The angular ball bearing 55 includes an inner ring 55a, an outer ring 55b, and plural balls 55c rollably provided between the inner ring 55a and the outer ring 55b. The angular ball bearings 54 and 55 are arranged to be opposed to each other as a face-to-face combination with preload applied thereto.

The inner rings 54a and 55a are fixed to the inner wall member 22a of the stator 22 in a state in which the inner rings 54a and 55a are pressed in the axial direction. Specifically, the inner rings 54a and 55a are fixed by setting the upper end of the inner wall member 22a of the stator 22 in contact with the lower surfaces of the inner rings 54a and 55a, setting the pressing section 26b of the inner ring clamp 26 in contact with the upper surfaces of the inner rings 54a and 55a, and fastening the inner ring clamp 26 to the inner wall member 22a of the stator 22 with the bolt 26a.

The outer rings 54b and 55b are fixed to the outer wall member 12b of the rotor 12 in a state in which the outer rings 54b and 55b are pressed in the axial direction. Specifically, the outer rings 54b and 55b are fixed by setting the lower end of the outer wall member 12b of the rotor 12 in contact with the upper surfaces of the outer rings 54b and 55b, setting the pressing section 28b of the outer ring clamp 28 in contact with the lower surfaces of the outer rings 54b and 55b, and fastening the outer ring clamp 28 to the outer wall member 12b of the rotor 12 with the bolt 28a.

The stator 22 is fixed to the fixing plate 24 by the bolt 24a and the rotor 12 fits in the outside edge of an output shaft.

The motor unit 16 includes the permanent magnet 16a and the coil 16b arranged to be opposed to the permanent magnet 16a at a predetermined interval. The permanent magnet 16a is attached to the outside edge of the outer ring clamp 28 and fixed to the outside edge side of the outer wall member 12b of the rotor 12 integrally with the outer ring clamp 28. On the other hand, the coil 16b is attached to the outer wall member 22b of the stator 22 by the bolt 16c.

The resolver 30 is a resolver of the ABS/INC integral type of the outer rotor type including the resolver rotor 18 made of a hollow annular laminated core and the resolver stator 20 made of an annular laminated core.

In the resolver rotor 18, plural teeth of a salient pole shape are formed at equal intervals in a circumferential direction thereof. The inner circumference of the resolver rotor 18 is decentered with respect to the shaft center of the angular ball bearings 54 and 55. In the resolver stator 20, plural stator poles are formed at equal intervals along a circumferential direction of an annular stator base. Winding for single-pole detection that outputs a single-pole resolver signal for detecting an absolute angle position of the resolver rotor 18 and winding for multi-pole detection that outputs a multi-pole resolver signal for detecting a relative angle position of the resolver rotor 18 are wound around each of the stator poles. Consequently, the resolver 30 outputs, per one rotation of the resolver rotor 18, a single-pole resolver signal in which a fundamental wave component of a reluctance change is one period and a multi-pole resolver signal in which a fundamental wave component of a reluctance change is a multi-period.

The resolver rotor 18 is attached to the outside edge of the inner wall member 12a of the rotor 12 by the bolt 18a. On the other hand, the resolver stator 20 is attached to the inside edge of the inner ring clamp 26 by the bolt 20a and fixed to the inside edge side of the inner wall member 22a of the stator 22 integrally with the inner ring clamp 26.

The thin motor 100 is configured to perform control of rotating speed and positioning with a controller (not shown) on the basis of the single-pole resolver signal and the multi-pole resolver signal detected by the resolver 30.

Next, operation in this embodiment is explained.

When the coil 16b is energized, rotation torque is applied to the rotor 12 and the rotor 12 rotates. A reluctance change between the resolver 30 and the resolver rotor 18, which rotates integrally with the rotor 12, is detected by the resolver 30 and control of rotating speed and positioning is performed by the controller (not shown).

When moment load is applied to the thin motor 100, the thin motor 100 tilts around the angular ball bearings 54 and 55. However, since the resolver 30 is arranged such that the gap surface of the resolver 30 is located within the two contact angles, it is possible to reduce a gap change of the resolver 30.

Since the resolver 30, the angular ball bearings 54 and 55, and the motor unit 16 are arranged on a radially identical plane, it is possible to reduce the height (the length in the axial direction) of the thin motor 100.

Further, since the resolver 30 is arranged on the opposite side of the motor unit 16 across the angular ball bearings 54 and 55, the resolver 30 is less easily affected by noise and heat from the motor unit 16.

Further, when a method of, for example, increasing the preload of the angular ball bearings 54 and 55 is adopted, whereas the gap change can be suppressed, a deficiency in that the life of the angular ball bearings 54 and 55 is shortened is involved. However, in the present invention, since the gap change is reduced by arranging the resolver 30 in a position where the gap change is small, it is possible to realize extension of the life of the angular ball bearings 54 and 55.

In this way, in this embodiment, the thin motor 100 includes the angular ball bearings 54 and 55 including the inner rings 54a and 55a and the outer rings 54b and 55b, the stator 22 supported by the inner rings 54a and 55a, the rotor 12 supported by the outer rings 54b and 55b, the motor unit 16 that applies rotation torque to the rotor 12, and the resolver 30 that detects a rotation angle position of the rotor 12. The resolver 30 is arranged such that the gap surface of the resolver 30 is located within the two contact angles.

Consequently, even if the moment load is applied to the thin motor 100, since the resolver 30 is arranged in the position where the gap change is small, compared with the past, it is possible to reduce the gap change of the resolver 30 and reduce the likelihood that the resolver 30 makes misdetection. Further, compared with the method of, for example, increasing the preload of the angular ball bearings 54 and 55, it is possible to realize extension of the life of the angular ball bearings 54 and 55.

Further, in this embodiment, the face-to-face duplex bearing in which the angular ball bearings 54 and 55 are arranged to be opposed to each other with preload applied thereto is adopted.

Consequently, even if a support component such as a bearing for backup is set on the outside of the thin motor 100 or plural roller bearings are set, it is possible to use the bearings without casing the bearings to interfere with one another.

Further, in this embodiment, the resolver 30, the angular ball bearings 54 and 55, and the motor unit 16 are arranged on a radially identical plane.

Consequently, it is possible to reduce the height of the thin motor 100.

Further, in this embodiment, the resolver 30, the angular ball bearings 54 and 55, and the motor unit 16 are arranged in the recited order from the radially inner side on a radially identical plane.

Consequently, since the resolver 30 is arranged on the opposite side of the motor unit 16 across the angular ball bearings 54 and 55, the resolver 30 is less easily affected by noise and heat from the motor unit 16 and realizes high detection accuracy.

Further, in this embodiment, the resolver 30 includes the annular resolver rotor 18 having the inner circumference decentered with respect to the shaft center of the angular ball bearings 54 and 55 and the resolver stator 20 that is arranged to be opposed to the resolver rotor 18 at the predetermined interval and detects a reluctance change between the resolver stator 20 and the resolver rotor 18.

In this way, in the resolver 30 of a type in which a fundamental component of a reluctance change is one period per one rotation, since the influence of the gap change due to the moment load is large, the reduction in the gap change is effective for prevention of misdetection.

In the eleventh embodiment, the angular ball bearings 54 and 55 correspond to the roller bearing of the inventions 53 to 57, the stator 22 corresponds to the inner-ring supported member of the invention 53, 56, and 57, the rotor 12 corresponds to the outer-ring supported member of the invention 53, 56, or 57, and the resolver 30 corresponds to the rotation sensor of the inventions 53 to 57. The resolver rotor 18 corresponds to the detected member of the invention 57, the resolver stator 20 corresponds to the resolver stator of the invention 55 or the detecting means of the invention 57, the motor unit 16 corresponds to the driver of the invention 56, and the straight line $L_1$ corresponds to the first straight line of the inventions 53 to 55.

In the eleventh embodiment, the straight line $L_2$ corresponds to the second straight line of the inventions 53 to 55.

Modification of the Eleventh Embodiment

In the eleventh embodiment, the resolver 30, the angular ball bearings 54 and 55, and the motor unit 16 are arranged in the recited order from the radially inner side on a radially identical plane. However, the present invention is not limited to this. The arrangement order of the resolver 30, the angular ball bearings 54 and 55, and the motor unit 16 can be arbitrary as long as the resolver 30 is arranged within the two contact angles. For example, five configurations explained below can be adopted.

First, a first configuration is explained.

Figure 63:
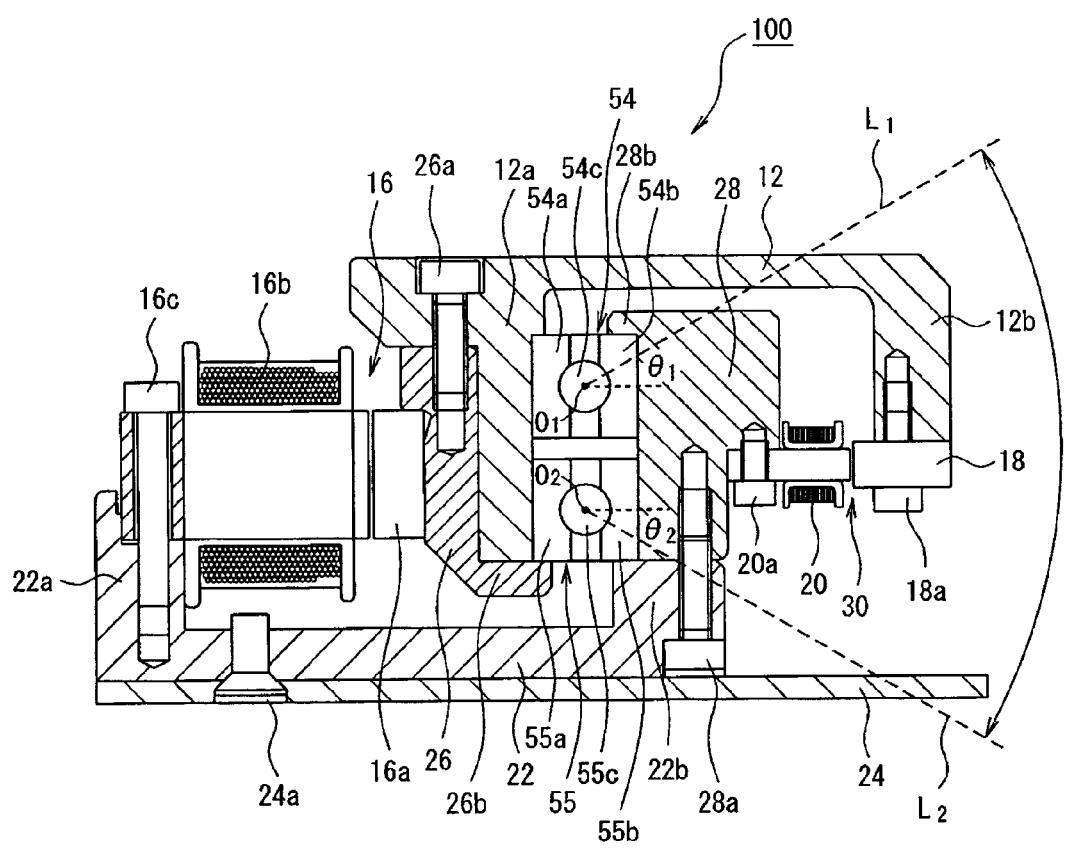
FIG. 63 is a sectional view in the axial direction of the thin motor 100 in which the motor unit 16, angular ball bearings 54 and 55, and the resolver 30 are arranged in the recited order from the radially inner side on a radially identical plane.

FIG. 63 is a sectional view in the axial direction of the thin motor 100 in which the motor unit 16, the angular ball bearings 54 and 55, and the resolver 30 are arranged in the recited order from the radially inner side on a radially identical plane.

As shown in FIG. 63, the angular ball bearings 54 and 55 form a face-to-face duplex bearing and have the contact angles $\theta_1$ and $\theta_2$. The resolver 30 is arranged such that a gap surface thereof is located between the straight line $L_1$ extending in the direction of the contact angle $\theta_1$ from the vertex $O_1$ of the contact angle $\theta_1$ of the angular ball bearing 54 and the straight line $L_2$ extending in the direction of the contact angle $\theta_2$ from the vertex $O_2$ of the contact angle $\theta_2$ of the angular ball bearing 55 and on the side of the outer rings 54b and 55b. The motor unit 16, the angular ball bearings 54 and 55, and the resolver 30 are arranged on a radially identical plane.

In the stator 22, the annular inner wall member 22a projecting upward in the axial direction (the upward direction in FIG. 63) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 63) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner rings 54a and 55a are fixed to the inner wall member 12a of the rotor 12 in a state in which the inner rings 54a and 55a are pressed in the axial direction. Specifically, the inner rings 54a and 55a are fixed by setting the lower end of the inner wall member 12a of the rotor 12 in contact with the upper surfaces of the inner rings 54a and 55a, setting the pressing section 26b of the inner ring clamp 26 in contact with the lower surfaces of the inner rings 54a and 55a, and fastening the inner ring clamp 26 to the inner wall member 12a of the rotor 12 with the bolt 26a.

The outer rings 54b and 55b are fixed to the outer wall member 22b of the stator 22 in a state in which the outer rings 54b and 55b are pressed in the axial direction. Specifically, the outer rings 54b and 55b are fixed by setting the upper end of the outer wall member 22b of the stator 22 in contact with the lower surfaces of the outer rings 54b and 55b, setting the pressing section 28b of the outer ring clamp 28 in contact with the upper surfaces of the outer rings 54b and 55b, and fastening the outer ring clamp 28 to the outer wall member 22b of the stator 22 with the bolt 28a.

The permanent magnet 16a is attached to the inside edge of the inner ring clamp 26 and fixed to the inside edge side of the inner wall member 12a of the rotor 12 integrally with the inner ring clamp 26. On the other hand, the coil 16b is attached to the outside edge of the inner wall member 22a of the stator 22 by the bolt 16c.

The resolver rotor 18 is attached to the outer wall member 12b of the rotor 12 by the bolt 18a. On the other hand, the resolver stator 20 is attached to the outside edge of the outer ring clamp 28 by the bolt 20a and fixed to the outside edge side of the outer wall member 22b of the stator 22 integrally with the outer ring clamp 28.

In this way, in the first configuration, the motor unit 16, the angular ball bearings 54 and 55, and the resolver 30 are arranged in the recited order from the radially inner side on a radially identical plane.

Consequently, besides the effect of reducing the likelihood of misdetection of the resolver 30 and the effect of realizing extension of the life of the angular ball bearings 54 and 55, since the resolver 30 is arranged on the opposite side of the motor unit 16 across the angular ball bearings 54 and 55, the resolver 30 is less easily affected by noise and heat from the motor unit 16 and it is possible to realize high detection accuracy. Since the resolver 30 is arranged on the radially outermost side, the diameter of the resolver 30 can be increased. Therefore, it is possible to stabilize accuracy, for example, during die machining and realize higher detection accuracy.

Next, a second configuration is explained.

Figure 64:
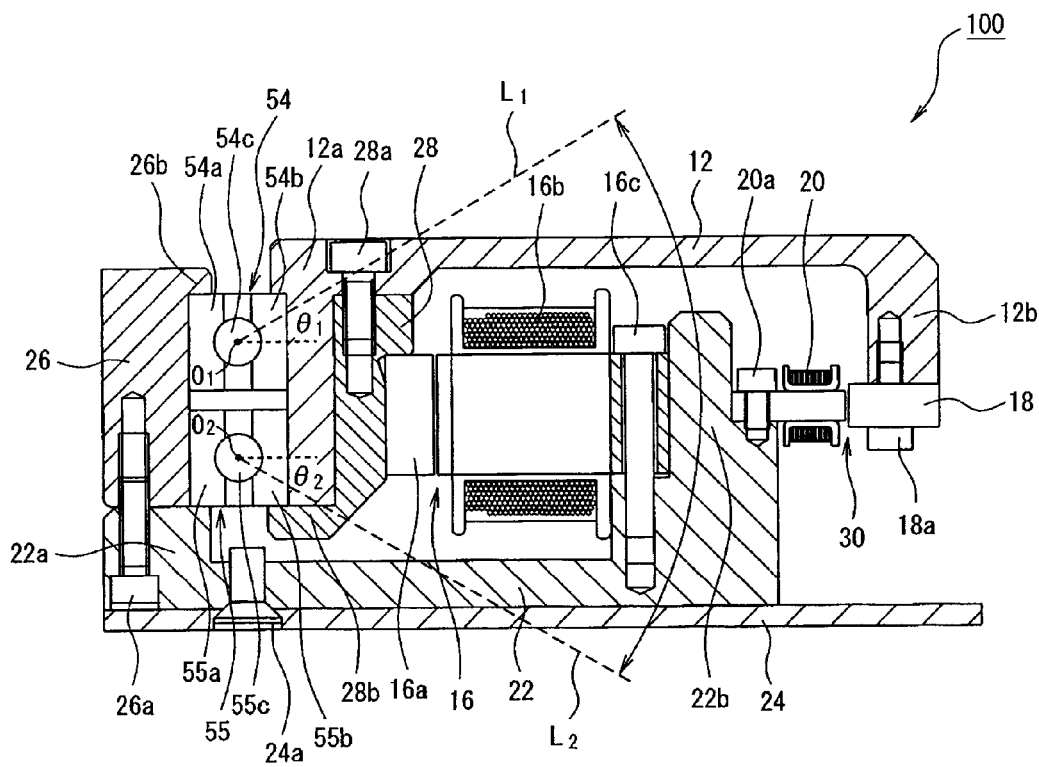
FIG. 64 is a sectional view in the axial direction of the thin motor 100 in which the angular ball bearings 54 and 55, the motor unit 16, and the resolver 30 are arranged in the recited order from the radially inner side on a radially identical plane.

FIG. 64 is a sectional view in the axial direction of the thin motor 100 in which the angular ball bearings 54 and 55, the motor unit 16, and the resolver 30 are arranged in the recited order from the radially inner side on a radially identical plane.

As shown in FIG. 64, the angular ball bearings 54 and 55 form a face-to-face duplex bearing and have the contact angles $\theta_1$ and $\theta_2$. The resolver 30 is arranged such that a gap surface thereof is located between the straight line $L_1$ extending in the direction of the contact angle $\theta_1$ from the vertex $O_1$ of the contact angle $\theta_1$ of the angular ball bearing 54 and the straight line $L_2$ extending in the direction of the contact angle $\theta_2$ from the vertex $O_2$ of the contact angle $\theta_2$ of the angular ball bearing 55 and on the side of the outer rings 54b and 55b. The angular ball bearings 54 and 55, the motor unit 16, and the resolver 30 are arranged on a radially identical plane.

In the stator 22, the annular inner wall member 22a projecting upward in the axial direction (the upward direction in FIG. 64) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 64) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner rings 54a and 55a are fixed to the inner wall member 22a of the stator 22 in a state in which the inner rings 54a and 55a are pressed in the axial direction. Specifically, the inner rings 54a and 55a are fixed by setting the upper end of the inner wall member 22a of the stator 22 in contact with the lower surfaces of the inner rings 54a and 55a, setting the pressing section 26b of the inner ring clamp 26 in contact with the upper surfaces of the inner rings 54a and 55a, and fastening the inner ring clamp 26 to the inner wall member 22a of the stator 22 with the bolt 26a.

The outer rings 54b and 55b are fixed to the inner wall member 12a of the rotor 12 in a state in which the outer rings 54b and 55b are pressed in the axial direction. Specifically, the outer rings 54b and 55b are fixed by setting the lower end of the inner wall member 54b of the rotor 12 in contact with the upper surfaces of the outer rings 54b and 55b, setting the pressing section 28b of the outer ring clamp 28 in contact with the lower surfaces of the outer rings 54b and 55b, and fastening the outer ring clamp 28 to the inner wall member 12a of the rotor 12 with the bolt 28a.

The permanent magnet 16a is attached to the outside edge of the outer ring clamp 28 and fixed to the outside edge side of the inner wall member 12a of the rotor 12 integrally with the outer ring clamp 28. On the other hand, the coil 16b is attached to the inside edge of the outer wall member 22b of the stator 22 by the bolt 16c.

The resolver rotor 18 is attached to the outer wall member 12b of the rotor 12 by the bolt 18a. On the other hand, the resolver stator 20 is attached to the outside edge of the outer wall member 22b of the stator 22 by the bolt 20a.

In this way, in the second configuration, the angular ball bearings 54 and 55, the motor unit 16, and the resolver 30 are arranged in the recited order from the radially inner side on a radially identical plane.

Consequently, besides the effect of reducing the likelihood of misdetection of the resolver 30 and the effect of realizing extension of the life of the angular ball bearings 54 and 55, since the resolver 30 is arranged on the radially outermost side in the radial direction, it is possible to increase the diameter of the resolver 30. Therefore, it is possible to stabilize accuracy, for example, during die machining and realize higher detection accuracy. Further, since the angular ball bearings 54 and 55 are arranged on the radially innermost side, it is possible to reduce the height of the thin motor 100 by reducing the size of the angular ball bearings 54 and 55. Wiring to the motor unit 16 or the resolver 30 is easy and grease of the angular ball bearings 54 and 55 less easily leaks.

Next, a third configuration is explained.

FIG. 65 is a sectional view in the axial direction of the thin motor 100 in which the angular ball bearings 54 and 55, the resolver 30, and the motor unit 16 are arranged in the recited order from the radially inner side on a radially identical plane.

As shown in FIG. 65, the angular ball bearings 54 and 55 form a face-to-face duplex bearing and have the contact angles $\theta_1$ and $\theta_2$. The resolver 30 is arranged such that a gap surface thereof is located between the straight line $L_1$ extending in the direction of the contact angle $\theta_1$ from the vertex $O_1$ of the contact angle $\theta_1$ of the angular ball bearing 54 and the straight line $L_2$ extending in the direction of the contact angle $\theta_2$ from the vertex $O_2$ of the contact angle $\theta_2$ of the angular ball bearing 55 and on the side of the outer rings 54b and 55b. The angular ball bearings 54 and 55, the resolver 30, and the motor unit 16 are arranged on a radially identical plane.

In the stator 22, the annular inner wall member 22a projecting upward in the axial direction (the upward direction in FIG. 65) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 65) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner rings 54a and 55a are fixed to the inner wall member 22a of the stator 22 in a state in which the inner rings 54a and 55a are pressed in the axial direction. Specifically, the inner rings 54a and 55a are fixed by setting the upper end of the inner wall member 22a of the stator 22 in contact with the lower surfaces of the inner rings 54a and 55a, setting the pressing section 26b of the inner ring clamp 26 in contact with the upper surfaces of the inner rings 54a and 55a, and fastening the inner ring clamp 26 to the inner wall member 22a of the stator 22 with the bolt 26a.

The outer rings 54b and 55b are fixed to the inner wall member 12a of the rotor 12 in a state in which the outer rings 54b and 55b are pressed in the axial direction. Specifically, the outer rings 54b and 55b are fixed by setting the lower end of the inner wall member 12a of the rotor 12 in contact with the upper surfaces of the outer rings 54b and 55b, setting the pressing section 28b of the outer ring clamp 28 in contact with the lower surfaces of the outer rings 54b and 55b, and fastening the outer ring clamp 28 to the inner wall member 12a of the rotor 12 with the bolt 28a.

The permanent magnet 16a is attached to the inside edge of the outer wall member 12b of the rotor 12. On the other hand, the coil 16b is attached to the outside edge of the outer wall member 22b of the stator 22 by the bolt 16c.

The resolver rotor 18 is attached to the outside edge of the outer ring clamp 28 by the bolt 18a and fixed to the outside edge of the inner wall member 12a of the rotor 12 integrally with the outer ring clamp 28. On the other hand, the resolver stator 20 is attached to the inside edge of the outer wall member 22b of the stator 22 by the bolt 20a.

In this way, in the third configuration, the angular ball bearings 54 and 55, the resolver 30, and the motor unit 16 are arranged in the recited order from the radially inner side on a radially identical plane.

Consequently, besides the effect of reducing the likelihood of misdetection of the resolver 30 and the effect of realizing extension of the life of the angular ball bearings 54 and 55, since the angular ball bearings 54 and 55 are arranged on the radially innermost side, it is possible to reduce the height of the thin motor by reducing the size of the angular ball bearings 54 and 55. Wiring to the motor unit 16 or the resolver 30 is easy and grease of the angular ball bearings 54 and 55 less easily leaks. Since the motor unit 16 is arranged on the radially outermost side, it is possible to secure a large space for winding wires and realize high output torque. Further, it is possible to increase the number of poles of the motor unit 16 and realize operation at low speed to ultra-low speed.

Next, a fourth configuration is explained.

FIG. 66 is a sectional view in the axial direction of the thin motor 100 in which the motor unit 16, the resolver 30, and the angular ball bearings 54 and 55 are arranged in the recited order from the radially inner side on a radially identical plane.

As shown in FIG. 66, the angular ball bearings 54 and 55 form a face-to-face duplex bearing and have the contact angles $\theta_1$ and $\theta_2$. The resolver 30 is arranged such that a gap surface thereof is located between the straight line $L_1$ extending in the direction of the contact angle $\theta_1$ from the vertex $O_1$ of the contact angle $\theta_1$ of the angular ball bearing 54 and the straight line $L_2$ extending in the direction of the contact angle $\theta_2$ from the vertex $O_2$ of the contact angle $\theta_2$ of the angular ball bearing 55 and on the side of the inner rings 54a and 55a.

The motor unit 16, the resolver 30, and the angular ball bearings 54 and 55 are arranged on a radially identical plane.

In the stator 22, the annular inner wall member 22a projecting upward in the axial direction (the upward direction in FIG. 66) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 66) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner rings 54a and 55a are fixed to the outer wall member 22b of the stator 22 in a state in which the inner rings 54a and 55a are pressed in the axial direction. Specifically, the inner rings 54a and 55a are fixed by setting the upper end of the outer wall member 22b of the stator 22 in contact with the lower surfaces of the inner rings 54a and 55a, setting the pressing section 26b of the inner ring clamp 26 in contact with the upper surfaces of the inner rings 54a and 55a, and fastening the inner ring clamp 26 to the outer wall member 22b of the stator 22 with the bolt 26a.

The outer rings 54b and 55b are fixed to the outer wall member 12b of the rotor 12 in a state in which the outer rings 54b and 55b are pressed in the axial direction. Specifically, the outer rings 54b and 55b are fixed by setting the lower end of the outer wall member 12b of the rotor 12 in contact with the upper surfaces of the outer rings 54b and 55b, setting the pressing section 28b of the outer ring clamp 28 in contact with the lower surfaces of the outer rings 54b and 55b, and fastening the outer ring clamp 28 to the outer wall member 12b of the rotor 12 with the bolt 28a.

The permanent magnet 16a is attached to the inside edge of the inner wall member 12a of the rotor 12. On the other hand, the coil 16b is attached to the outside edge of the inner wall member 22a of the stator 22 by the bolt 16c.

The resolver rotor 18 is attached to the outside edge of the inner wall member 12a of the rotor 12 by the bolt 18a. On the other hand, the resolver stator 20 is attached to the inside edge of the inner ring clamp 26 by the bolt 20a and fixed to the inside edge side of the outer wall member 22b of the stator 22 integrally with the inner ring clamp 26.

In this way, in the fourth configuration, the motor unit 16, the resolver 30, and the angular ball bearings 54 and 55 are arranged in the recited order from the radially inner side on a radially identical plane.

Consequently, besides the effect of reducing the likelihood of misdetection of the resolver 30 and the effect of realizing extension of the life of the angular ball bearings 54 and 55, since the angular ball bearings 54 and 55 are arranged on the radially outermost side, it is possible to house the angular ball bearings 54 and 55 having a large diameter and realize high rigidity.

Next, a fifth configuration is explained.

Figure 67:
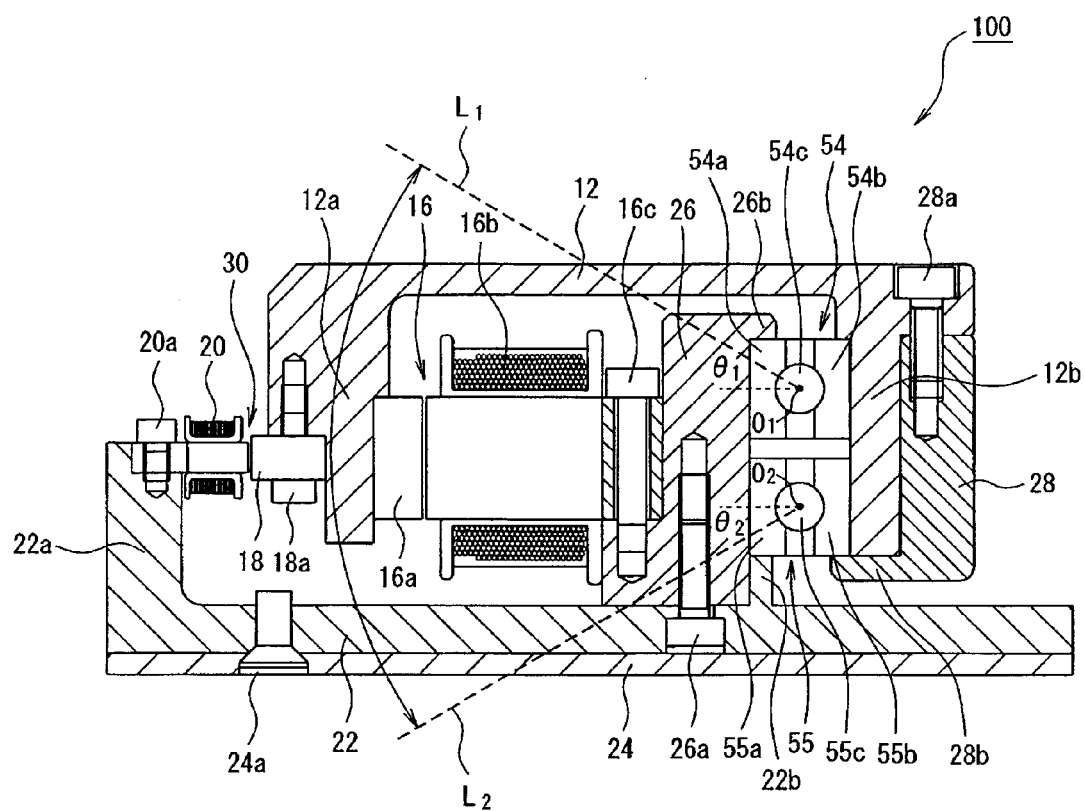
FIG. 67 is a sectional view in the axial direction of the thin motor 100 in which the resolver 30, the motor unit 16, and the angular ball bearings 54 and 55 are arranged in the recited order from the radially inner side on a radially identical plane.

FIG. 67 is a sectional view in the axial direction of the thin motor 100 in which the resolver 30, the motor unit 16, and the angular ball bearings 54 and 55 are arranged in the recited order from the radially inner side on a radially identical plane.

As shown in FIG. 67, the angular ball bearings 54 and 55 form a face-to-face duplex bearing and have the contact angles $\theta_1$ and $\theta_2$. The resolver 30 is arranged such that a gap surface thereof is located between the straight line $L_1$ extending in the direction of the contact angle $\theta_1$ from the vertex $O_1$ of the contact angle $\theta_1$ of the angular ball bearing 54 and the straight line $L_2$ extending in the direction of the contact angle $\theta_2$ from the vertex $O_2$ of the contact angle $\theta_2$ of the angular ball bearing 55 and on the side of the inner rings 54a and 55a. The resolver 30, the motor unit 16, and the angular ball bearings 54 and 55 are arranged on a radially identical plane.

In the stator 22, the annular inner wall member 22a projecting upward in the axial direction (the upward direction in FIG. 67) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 67) is formed. Further on the radially outer side than the inner wall member 12a, the annular outer wall member 12b projecting downward in the axial direction is formed. The stator 22 and the rotor 12 are arranged to extend over each other such that the inner wall member 12a of the rotor 12 is located between the inner wall member 22a and the outer wall member 22b of the stator 22 and the outer wall member 22b of the stator 22 is located between the inner wall member 12a and the outer wall member 12b of the rotor 12.

The inner rings 54a and 55a are fixed to the outer wall member 22b of the stator 22 in a state in which the inner rings 54a and 55a are pressed in the axial direction. Specifically, the inner rings 54a and 55a are fixed by setting the upper end of the outer wall member 22b of the stator 22 in contact with the lower surfaces of the inner rings 54a and 55a, setting the pressing section 26b of the inner ring clamp 26 in contact with the upper surfaces of the inner rings 54a and 55a, and fastening the inner ring clamp 26 to the outer wall member 22b of the stator 22 with the bolt 26a.

The outer rings 54b and 55b are fixed to the outer wall member 12b of the rotor 12 in a state in which the outer rings 54b and 55b are pressed in the axial direction. Specifically, the outer rings 54b and 55b are fixed by setting the lower end of the outer wall member 12b of the rotor 12 in contact with the upper surfaces of the outer rings 54b and 55b, setting the pressing section 28b of the outer ring clamp 28 in contact with the lower surfaces of the outer rings 54b and 55b, and fastening the outer ring clamp 28 to the outer wall member 12b of the rotor 12 with the bolt 28a.

The permanent magnet 16a is attached to the outside edge of the inner wall member 12a of the rotor 12. On the other hand, the coil 16b is attached to the inside edge of the inner ring clamp 26 by the bolt 16c and fixed to the inside edge side of the outer wall member 22b of the stator 22 integrally with the inner ring clamp 26.

The resolver rotor 18 is attached to the inside edge of the inner wall member 12a of the rotor 12 by the bolt 18a. On the other hand, the resolver stator 20 is attached to the outside edge of the inner wall member 22a of the stator 22 by the bolt 20a.

In this way, in the fifth configuration, the resolver 30, the motor unit 16, and the angular ball bearings 54 and 55 are arranged in the recited order from the radially inner side on a radially identical plane.

Consequently, besides the effect of reducing the likelihood of misdetection of the resolver 30 and the effect of realizing extension of the life of the angular ball bearings 54 and 55, since the angular ball bearings 54 and 55 are arranged on the radially outermost side, it is possible to house the angular ball bearings 54 and 55 having a large diameter and realize high rigidity.

In the eleventh embodiment, the face-to-face duplex bearing is adopted. However, the present invention is not limited to this. It is also possible to adopt a back-to-back duplex bearing.

Figure 68:
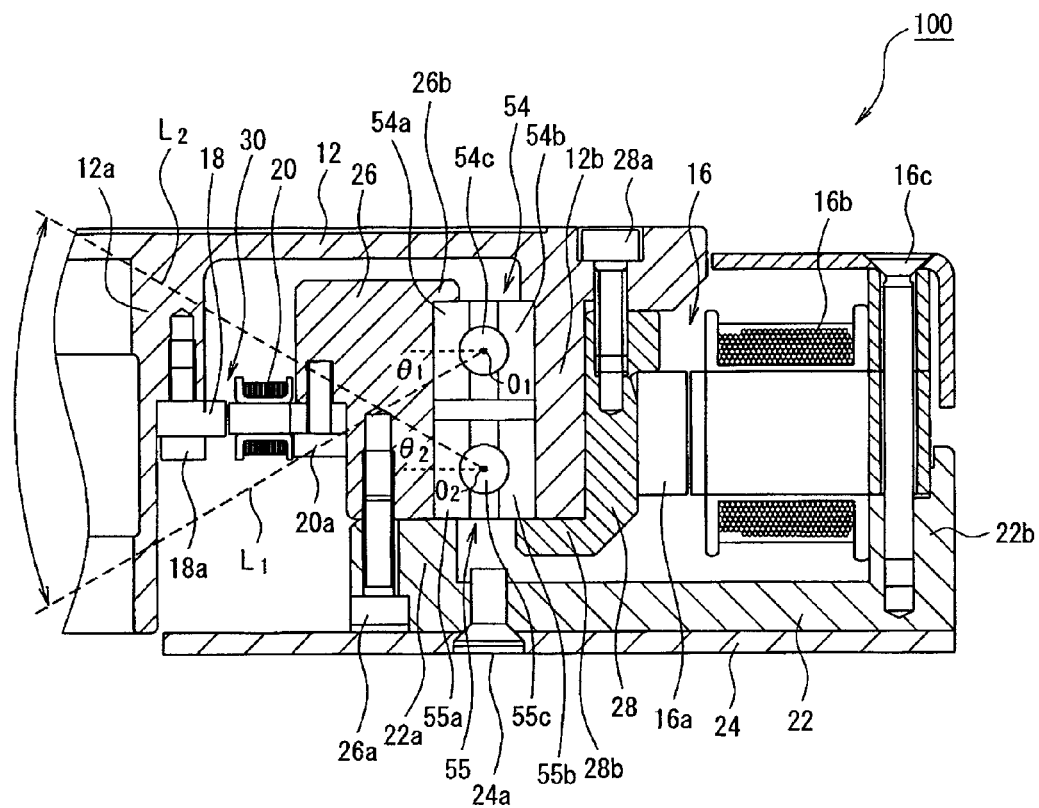
FIG. 68 is a sectional view in the axial direction of the thin motor 100 adopting a back-to-back duplex bearing.

FIG. 68 is a sectional view in the axial direction of the thin motor 100 in which the back-to-back duplex bearing is adopted.

As shown in FIG. 68, the resolver 30 is arranged such that a gap surface thereof is located between the straight line $L_1$ and the straight line $L_2$ and on the side of the inner rings 54a and 55a. This configuration is different from the configuration shown in FIG. 62 in that the straight line $L_1$ extends downward in the axial direction, the straight line $L_2$ extends upward in the axial direction, and the resolver 30 is arranged such that the gap surface is located above the straight line $L_1$ and below the straight line $L_2$.

Even with such a configuration, an effect equivalent to the effect of the eleventh embodiment can be obtained.

The same holds true for the configurations shown in FIGS. 63 to 67.

In the eleventh embodiment, the thin motor 100 is configured as the inner rotor type in which the inner side of the thin motor 100 rotates. However, the present invention is not limited to this. The thin motor 100 can also be configured as the outer rotor type in which the outer side of the thin motor 100 rotates. In this case, the rotor 12 is the inner-ring supported member and the stator 22 is the outer-ring supported member.

In the configurations shown in FIGS. 63 to 67, the thin motor 100 is configured as the outer rotor type in which the outer side of the thin motor 100 rotates. However, the present invention is not limited to this. The thin motor 100 can also be configured as the inner rotor type in which the inner side of the thin motor 100 rotates. In this case, the rotor 12 is the inner-ring supported member and the stator 22 is the outer-ring supported member.

In the eleventh embodiment, the resolver rotor 18 is attached to the outside edge of the inner wall member 12a of the rotor 12 and the resolver stator 20 is attached to the inside edge of the inner ring clamp 26. However, the present invention is not limited to this. The resolver stator 20 can also be attached to the outside edge of the inner wall member 12a of the rotor 12 and the resolver rotor 18 can also be attached to the inside edge of the inner ring clamp 26. The same holds true for the configurations shown in FIGS. 63 to 67.

In the eleventh embodiment, the resolver 30 of the ABS/INC integral type is provided. However, the present invention is not limited to this. A resolver of the ABS type can be provided or a resolver of the INC type can be provided. Instead of the resolver, a tape scale that detects a mark formed in a circumferential direction can be provided. The same holds true for the configurations shown in FIGS. 63 to 67.

In the eleventh embodiment, the inner wall member 22a and the outer wall member 22b of the stator 22 are formed as a part of the stator 22. However, the present invention is not limited to this. The inner wall member 22a or the outer wall member 22b of the stator 22 can also be configured by a separate member and attached to the stator 22. The inner ring clamp 26 can also be directly attached to the stator 22 without forming the inner wall member 22a of the stator 22. However, in this case, the inner ring clamp 26 configures the inner wall member of the stator 22. The same holds true for the configurations shown in FIGS. 63 to 67.

In the eleventh embodiment, the inner wall member 12a and the outer wall member 12b of the rotor 12 are formed as a part of the rotor 12. However, the present invention is not limited to this. The inner wall member 12a or the outer wall member 12b of the rotor 12 can also be configured by a separate member and attached to the rotor 12. The outer ring clamp 28 can also be directly attached to the rotor 12 without forming the outer wall member 12b of the rotor 12. However, in this case, the outer ring clamp 28 configures the outer wall member of the rotor 12. The same holds true for the configurations shown in FIGS. 63 to 67.

In the eleventh embodiment, the resolver 30, the angular ball bearings 54 and 55, and the motor unit 16 are arranged on a radially identical plane. However, the present invention is not limited to this. The motor unit 16 does not have to be arranged on a plane radially identical with the resolver 30 and the angular ball bearings 54 and 55. The same holds true for the configurations shown in FIGS. 63 and 67.

In the eleventh embodiment, the angular ball bearings 54 and 55 are applied. However, the present invention is not limited to this. A deep groove ball bearing, a cylindrical roller bearing, a tapered roller bearing, and the like may be applied. The same holds true for the configurations shown in FIGS. 63 to 67.

In the eleventh embodiment, the roller bearing device having an intra-contact angle arrangement structure of a duplex bearing according to the present invention is applied to the structure for rotatably supporting the stator 22 and the rotor 12. However, the present invention is not limited to this. The roller bearing device can be applied to any structure as long as the structure is interposed between two members and relatively rotatably supports the members. The same true for the configurations shown in FIGS. 63 to 67.

Twelfth Embodiment

Figure 69:
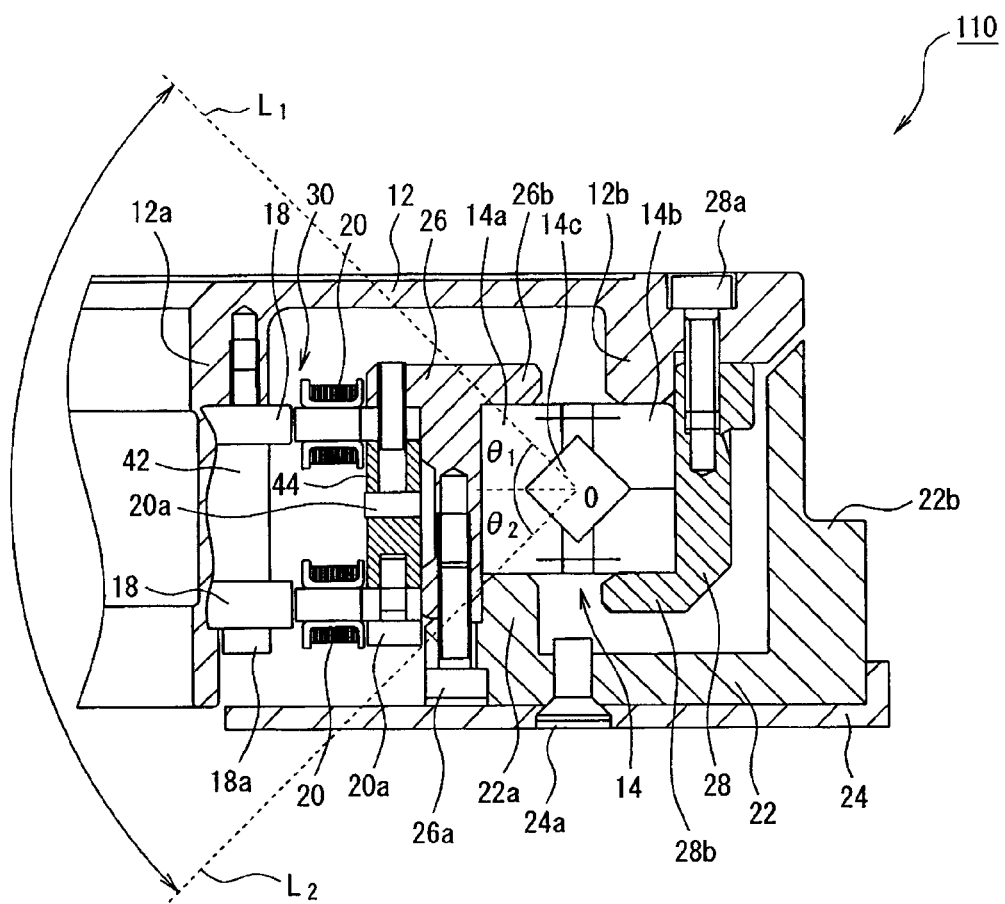
FIG. 69 is a sectional view in the axial direction of a resolver device 110 according to an embodiment of the present invention.

Next, a twelfth embodiment of the present invention is explained with reference to the drawings. FIG. 69 is a diagram showing the twelfth embodiment of the roller bearing device having an intra-contact angle arrangement structure of a rotation sensor according to the present invention.

The configuration of a resolver device 110 to which the present invention is applied is explained.

FIG. 69 is a sectional view in the axial direction of the resolver device 110 according to this embodiment.

The resolver device 110 has a configuration same as that of the thin motor 100 shown in FIG. 34 except that the resolver device 110 does not include the motor unit 16.

As shown in FIG. 69, the cross roller bearing 14 has the different two contact angles $\theta_1$ and $\theta_2$. The resolver 30 is arranged between the straight line $L_1$ extending in the direction of the contact angle $\theta_1$ from the vertex O of the contact angles and the straight line $L_2$ extending in the direction of the contact angle $\theta_2$ from the vertex O and on the side of the inner ring 14a. The resolver 30 and the cross roller bearing 14 are arranged on a radially identical plane.

In the stator 22, the annular inner wall member 22a projecting upward in the axial direction (the upward direction in FIG. 69) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 69) is formed. Further on the radially outer side than the inner wall member 12a, the annular outer wall member 12b projecting downward in the axial direction is formed. The stator 22 and the rotor 12 are arranged to extend over each other such that the inner wall member 22a of the stator 22 is located between the inner wall member 12a and the outer wall member 12b of the rotor 12 and the outer wall member 12b of the rotor 12 is located between the inner wall member 22a and the outer wall member 22b of the stator 22.

The inner ring 14a is fixed to the inner wall member 22a of the stator 22 in a state in which the inner ring 14a is pressed in the axial direction. Specifically, the inner ring 14a is fixed by setting the upper end of the inner wall member 22a of the stator 22 in contact with the lower surface of the inner ring 14a, setting the pressing section 26b of the inner ring clamp 26 in contact with the upper surface of the inner ring 14a, and fastening the inner ring clamp 26 to the inner wall member 22a of the stator 22 with the bolt 26a.

The outer ring 14b is fixed to the outer wall member 12b of the rotor 12 in a state in which the outer ring 14b is pressed in the axial direction. Specifically, the outer ring 14b is fixed by setting the lower end of the outer wall member 12b of the rotor 12 in contact with the upper surface of the outer ring 14b, setting the pressing section 28b of the outer ring clamp 28 in contact with the lower surface of the outer ring 14b, and fastening the outer ring clamp 28 to the outer wall member 12b of the rotor 12 with the bolt 28a.

The stator 22 is fixed to the fixing plate 24 by the bolt 24a and the rotor 12 fits in the outside edge of an output shaft of a motor or the like.

The resolver rotor 18 is arranged at a very small interval via the inter-rotor seat 42 and attached to the outside edge of the inner wall member 12a of the rotor 12 by the bolt 18a. On the other hand, the resolver stator 20 is arranged at a very small interval via the inter-stator seat 44, attached to the inside edge of the inner ring clamp 26 by the bolt 20a, and fixed to the inside edge side of the inner wall member 22a of the stator 22 integrally with the inner ring clamp 26.

In this way, in this embodiment, the resolver device 110 includes the cross roller bearing 14 having the inner ring 14a and the outer ring 14b, the stator 22 supported by the inner ring 14a, the rotor 12 supported by the outer ring 14b, and the resolver 30 that detects a rotation angle position of the rotor 12. The resolver 30 is arranged between the straight line $L_1$ and the straight line $L_2$ and on the side of the inner ring 14a.

Consequently, even if the moment load is applied to the resolver device 110, since the resolver 30 is arranged in the position where the gap change is small, compared with the past, it is possible to reduce the gap change of the resolver 30 and reduce the likelihood that the resolver 30 makes misdetection. Compared with the method of, for example, increasing the preload of the cross roller bearing 14, it is possible to realize extension of the life of the cross roller bearing 14.

Further, in this embodiment, the resolver 30 and the cross roller bearing 14 are arranged on a radially identical plane.

Consequently, it is possible to reduce the height of the resolver device 110.

In the twelfth embodiment, the cross roller bearing 14 corresponds to the roller bearing of the invention 32, 33, 35, or 36, the stator 22 corresponds to the inner-ring supported member of the invention 32 or 36, the rotor 12 corresponds to the outer-ring supported member of the invention 32 or 36, and the resolver 30 corresponds to the rotation sensor of the invention 32, 33, 35, or 36. The resolver rotor 18 corresponds to the detected member of the invention 36, the resolver stator 20 corresponding to the detecting means of the invention 36, the straight line $L_1$ corresponds to the first straight line of the invention 32 or 33, and the straight line $L_2$ corresponds to the second straight line of the invention 32 or 33.

Thirteenth Embodiment

Figure 70:
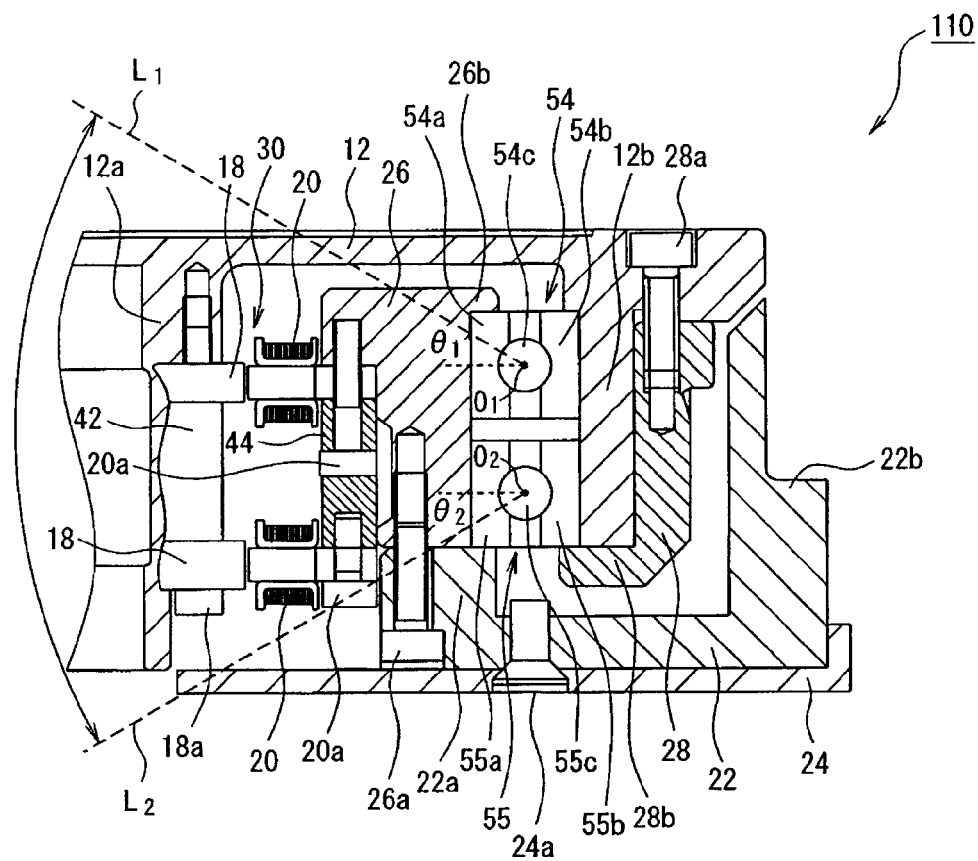
FIG. 70 is a sectional view in the axial direction of the resolver device 110 according to an embodiment of the present invention.

Next, a thirteenth embodiment of the present invention is explained with reference to the drawings. FIG. 70 is a diagram showing the thirteenth embodiment of the roller bearing device having an intra-contact angle arrangement structure of a duplex bearing according to the present invention.

The configuration of the resolver device 110 to which the present invention is applied is explained.

FIG. 70 is a sectional view in the axial direction of the resolver device 110 according to this embodiment.

The resolver device 110 has a configuration equivalent to that of the thin motor 100 shown in FIG. 62 except that the resolver device 110 does not have the motor unit 16 and uses the resolvers 30 of the ABS type and the INC type.

As shown in FIG. 70, the angular ball bearings 54 and 55 form a face-to-face duplex bearing and have the contact angles $\theta_1$ and $\theta_2$. The resolver 30 is arranged such that a gap surface thereof is located between the straight line $L_1$ extending in the direction of the contact angle $\theta_1$ from the vertex $O_1$ of the contact angle $\theta_1$ of the angular ball bearing 54 and the straight line $L_2$ extending in the direction of the contact angle $\theta_2$ from the vertex $O_2$ of the contact angle $\theta_2$ of the angular ball bearing 55 and on the side of the inner rings 54a and 55a. The resolver 30 and the angular ball bearings 54 and 55 are arranged on a radially identical plane.

In the stator 22, the annular inner wall member 22a projecting upward in the axial direction (the upward direction in FIG. 70) is formed. Further on the radially outer side than the inner wall member 22a, the annular outer wall member 22b projecting upward in the axial direction is formed. On the other hand, in the rotor 12, the annular inner wall member 12a projecting downward in the axial direction (the downward direction in FIG. 70) is formed. Further on the radially outer side than the inner wall member 12a, the annular outer wall member 12b projecting downward in the axial direction is formed. The stator 22 and the rotor 12 are arranged to extend over each other such that the inner wall member 22a of the stator 22 is located between the inner wall member 12a and the outer wall member 12b of the rotor 12 and the outer wall member 12b of the rotor 12 is located between the inner wall member 22a and the outer wall member 22b of the stator 22.

The inner rings 54a and 55a are fixed to the inner wall member 22a of the stator 22 in a state in which the inner rings 54a and 55a are pressed in the axial direction. Specifically, the inner rings 54a and 55a are fixed by setting the upper end of the inner wall member 22a of the stator 22 in contact with the lower surfaces of the inner rings 54a and 55a, setting the pressing section 26b of the inner ring clamp 26 in contact with the upper surfaces of the inner rings 54a and 55a, and fastening the inner ring clamp 26 to the inner wall member 22a of the stator 22 with the bolt 26a.

The outer rings 54b and 55b are fixed to the outer wall member 12b of the rotor 12 in a state in which the outer rings 54b and 55b are pressed in the axial direction. Specifically, the outer rings 54b and 55b are fixed by setting the lower end of the outer wall member 12b of the rotor 12 in contact with the upper surfaces of the outer rings 54b and 55b, setting the pressing section 28b of the outer ring clamp 28 in contact with the lower surfaces of the outer rings 54b and 55b, and fastening the outer ring clamp 28 to the outer wall member 12b of the rotor 12 with the bolt 28a.

The stator 22 is fixed to the fixing plate 24 by the bolt 24a and the rotor 12 fits in the outside edge of an output shaft of a motor or the like.

The resolver 30 is the resolvers of the ABS type and the INC type in the seventh and eighth embodiments and has a function equivalent to that of the resolver of the ABS/INC integral type except that the resolver 30 is integrally configured. The resolver rotor 18 is arranged at a very small interval via the inter-rotor seat 42 and attached to the outside edge of the inner wall member 12a of the rotor 12 by the bolt 18a. On the other hand, the resolver stator 20 is arranged at a very small interval via the inter-stator seat 44, attached to the inside edge of the inner ring clamp 26 by the bolt 20*a*, and fixed to the inside edge side of the inner wall member 22*a* of the stator 22 integrally with the inner ring clamp 26.

In this way, in this embodiment, the resolver device 110 includes the angular ball bearings 14 and 15 having the inner rings 14*a* and 15*a* and the outer rings 14*b* and 15*b*, the stator 22 supported by the inner rings 14*a* and 15*a*, the rotor 12 supported by the outer rings 14*b* and 15*b*, and the resolver 30 that detects a rotation angle position of the rotor 12. The resolver 30 is arranged such that a gap surface thereof is located between the straight line $L_1$ and the straight line $L_2$ and on the side of the inner rings 54*a* and 55*a*.

Consequently, even if the moment load is applied to the resolver device 110, since the resolver 30 is arranged in the position where the gap change is small, compared with the past, it is possible to reduce the gap change of the resolver 30 and reduce the likelihood that the resolver 30 makes misdetection. Compared with the method of, for example, increasing the preload of the angular ball bearings 14 and 15, it is possible to realize extension of the life of the angular ball bearings 14 and 15.

Further, in this embodiment, the face-to-face duplex bearing in which the angular ball bearings 14 and 15 are arranged to be opposed to each other with preload applied thereto.

Consequently, even if a supporting component such as a bearing for backup is set on the outside of the resolver device 110 or even if plural roller bearings are set, it is possible to use the bearings without causing the bearings to interfere with one another.

Further, in this embodiment, the resolver 30 and the angular ball bearings 14 and 15 are arranged on a radially identical plane.

Consequently, it is possible to reduce the height of the resolver device 110.

In the thirteenth embodiment, the angular ball bearings 14 and 15 correspond to the roller bearing of the inventions 53 to 55 or 57, the stator 22 corresponds to the inner-ring supported member of the invention 53 or 57, the rotor 12 corresponds to the outer-ring supported member of the invention 53 or 57, and the resolver 30 corresponds to the rotation sensor of the inventions 53 to 55 or 57. The resolver rotor 18 corresponds to the detected member of the invention 57, the resolver stator 20 corresponds to the resolver stator of the invention 55 or the detecting means of the invention 57, the straight line $L_1$ corresponds to the first straight line of the inventions 53 to 55, and the straight line $L_2$ corresponds to the second straight line of the inventions 53 to 55.

Fourteenth Embodiment

Figure 71:
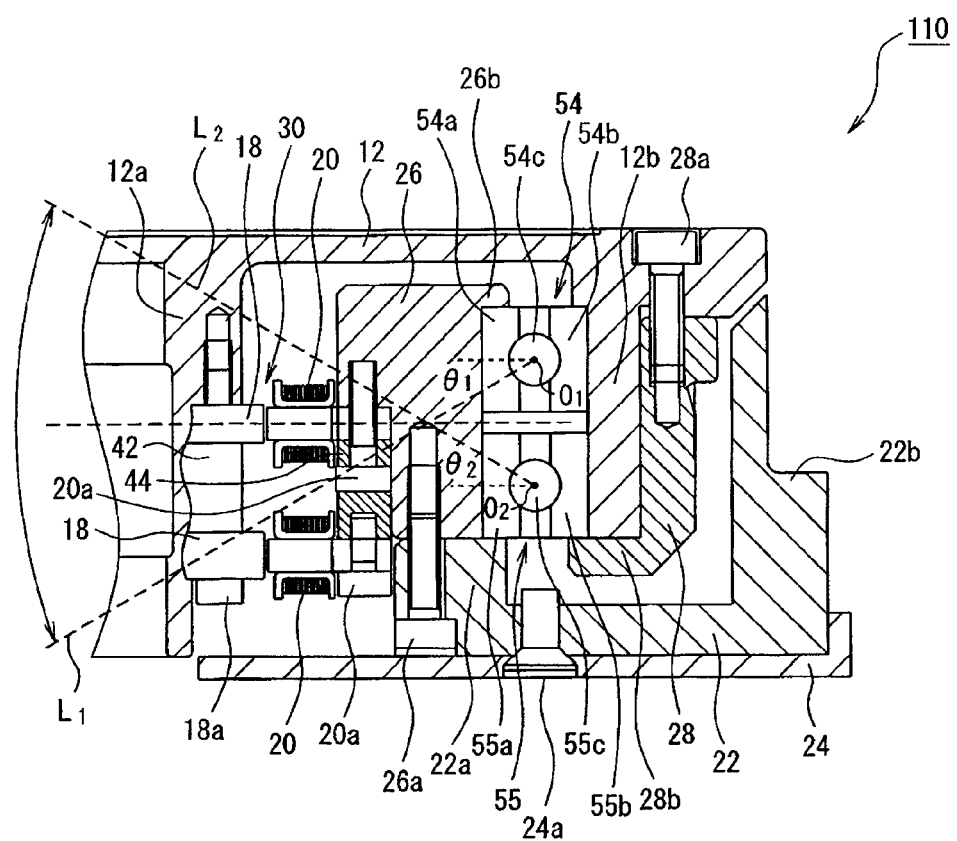
FIG. 71 is a sectional view in the axial direction of the resolver device 110 according to an embodiment of the present invention.
Figure 72:
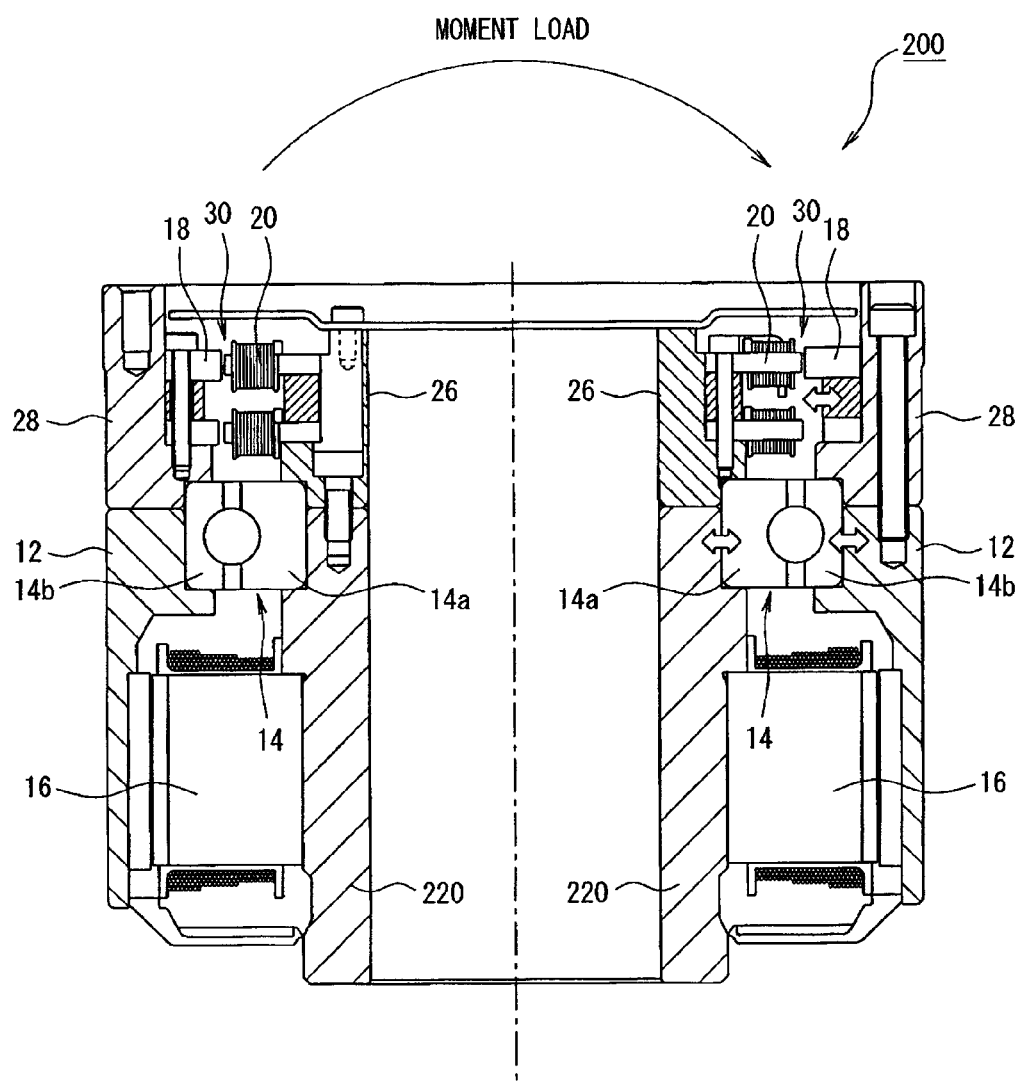
FIG. 72 is a sectional view in the axial direction of a conventional thin motor 200.

Next, a fourteenth embodiment of the present invention is explained with reference to the drawings. FIG. 71 is a diagram showing the fourteenth embodiment of the roller bearing device having an intra-contact angle arrangement structure of a duplex bearing according to the present invention.

The configuration of the resolver device 110 to which the present invention is applied is explained.

FIG. 71 is a sectional view in the axial direction of the resolver device 110 according to this embodiment.

The resolver device 110 has a configuration equivalent to that of the thin motor 100 shown in FIG. 62 except that the resolver device 110 does not have the motor unit 16, the resolvers 30 of the ABS type and the INC type are used, and a back-to-back duplex bearing is adopted.

As shown in FIG. 71, the angular ball bearings 54 and 55 form a back-to-back duplex bearing and have the contact angles $\theta_1$ and $\theta_2$. The single-pole resolver 30 is arranged such that a gap surface thereof is located between the straight line $L_1$ extending in the direction of the contact angle $\theta_1$ from the vertex $O_1$ of the contact angle $\theta_1$ of the angular ball bearing 54 and the straight line $L_2$ extending in the direction of the contact angle $\theta_2$ from the vertex $O_2$ of the contact angle $\theta_2$ of the angular ball bearing 55 and on the side of the inner rings 54*a* and 55*a*. Further, the resolver 30 is arranged such that the gap surface is located within a range of the bearing width of the cross roller bearing 14 in the axial direction. The resolver 30 and the angular ball bearings 54 and 55 are arranged on a radially identical plane.

In the stator 22, the annular inner wall member 22*a* projecting upward in the axial direction (the upward direction in FIG. 71) is formed. Further on the radially outer side than the inner wall member 22*a*, the annular outer wall member 22*b* projecting upward in the axial direction is formed. On the other hand, in the rotor 12, the annular inner wall member 12*a* projecting downward in the axial direction (the downward direction in FIG. 71) is formed. Further on the radially outer side than the inner wall member 12*a*, the annular outer wall member 12*b* projecting downward in the axial direction is formed. The stator 22 and the rotor 12 are arranged to extend over each other such that the inner wall member 22*a* of the stator 22 is located between the inner wall member 12*a* and the outer wall member 12*b* of the rotor 12 and the outer wall member 12*b* of the rotor 12 is located between the inner wall member 22*a* and the outer wall member 22*b* of the stator 22.

The inner rings 54*a* and 55*a* are fixed to the inner wall member 22*a* of the stator 22 in a state in which the inner rings 54*a* and 55*a* are pressed in the axial direction. Specifically, the inner rings 54*a* and 55*a* are fixed by setting the upper end of the inner wall member 22*a* of the stator 22 in contact with the lower surfaces of the inner rings 54*a* and 55*a*, setting the pressing section 26*b* of the inner ring clamp 26 in contact with the upper surfaces of the inner rings 54*a* and 55*a*, and fastening the inner ring clamp 26 to the inner wall member 22*a* of the stator 22 with the bolt 26*a*.

The outer rings 54*b* and 55*b* are fixed to the outer wall member 12*b* of the rotor 12 in a state in which the outer rings 54*b* and 55*b* are pressed in the axial direction. Specifically, the outer rings 54*b* and 55*b* are fixed by setting the lower end of the outer wall member 12*b* of the rotor 12 in contact with the upper surfaces of the outer rings 54*b* and 55*b*, setting the pressing section 28*b* of the outer ring clamp 28 in contact with the lower surfaces of the outer rings 54*b* and 55*b*, and fastening the outer ring clamp 28 to the outer wall member 12*b* of the rotor 12 with the bolt 28*a*.

The stator 22 is fixed to the fixing plate 24 by the bolt 24*a* and the rotor 12 fits in the outside edge of an output shaft of a motor or the like.

The resolver 30 is the resolvers of the ABS type and the INC type in the seventh and eighth embodiments and has a function equivalent to that of the resolver of the ABS/INC integral type except that the resolver 30 is integrally configured. The resolver rotor 18 is arranged at a very small interval via the inter-rotor seat 42 and attached to the outside edge of the inner wall member 12*a* of the rotor 12 by the bolt 18*a*. On the other hand, the resolver stator 20 is arranged at a very small interval via the inter-stator seat 44, attached to the inside edge of the inner ring clamp 26 by the bolt 20*a*, and fixed to the inside edge side of the inner wall member 22*a* of the stator 22 integrally with the inner ring clamp 26.

In this way, in this embodiment, the resolver device 110 includes the angular ball bearings 14 and 15 having the inner rings 14a and 15a and the outer rings 14b and 15b, the stator 22 supported by the inner rings 14a and 15a, the rotor 12 supported by the outer rings 14b 15b, and the resolver 30 that detects a rotation angle position of the rotor 12. The single-pole resolver 30 is arranged such that a gap surface thereof is located between the straight line $L_1$ and the straight line $L_2$ and on the side of the inner rings 54a and 55a.

Consequently, even if the moment load is applied to the resolver device 110, since the single-pole resolver 30 is arranged in the position where the gap change thereof is small, compared with the past, it is possible to reduce the gap change of the single-pole resolver 30 and reduce the likelihood that the single-pole resolver 30 makes misdetection. In particular, it is possible to reduce the gap change of the single-pole resolver 30 having larger influence of the gap change than the multi-pole resolver 30. Therefore, it is possible to effectively reduce the influence of the gap change.

Further, in this embodiment, the single-pole resolver 30 is arranged such that a gap surface of the single-pole resolver 30 is located within a range of the bearing width of the cross roller bearing 14 in the axial direction.

Consequently, it is possible to further reduce the gap change of the single-pole resolver 30 and further reduce the likelihood that the single-pole resolver 30 makes misdetection.

In the fourteenth embodiment, the angular ball bearings 14 and 15 correspond to the roller bearing of the inventions 42 to 44 or 47 or 58, the stator 22 corresponds to the inner-ring supported member of the invention 42, 47, or 58, and the rotor 12 corresponds to the outer-ring supported member of the invention 42, 47, or 58. The resolver 30 corresponds to the rotation sensor of the invention 42, 47, or 58, the straight line $L_1$ corresponds to the first straight line of the invention 42, 44, or 58, and the straight line $L_2$ corresponds to the second straight line of the invention 42, 44, or 58.

Modification of the Twelfth to Fourteenth Embodiments

In the twelfth embodiment, combinations with the eighth embodiment or the modifications of the seventh and eight embodiments are also possible.

In the thirteenth embodiment, combinations with the modifications of the eleventh embodiment are also possible.

In the fourteenth embodiment, combinations with the tenth embodiment or the modifications of the tenth and eleventh embodiments are also possible.

In the twelfth and thirteenth embodiments, the resolvers of the ABS type and the INC type are provided. However, the present invention is not limited to this. The resolver device 110 can also be configured by only the resolver of the ABS type, can also be configured by only the resolver of the INC type, or can also be configured by the resolver of the ABS/INC integral type.

In the fourteenth embodiment, the resolvers of the ABS type and the INC type are provided. However, the present invention is not limited to this. The resolver device 110 can also be configured by only the resolver of the ABS type or can also be configured by the resolver of the ABS/INC integral type.

In the thirteenth embodiment, the face-to-face duplex bearing is adopted. However, the present invention is not limited to this. The back-to-back duplex bearing can also be adopted.

In the fourteenth embodiment, the back-to-back duplex bearing is adopted. However, the present invention is not limited to this. The face-to-face duplex bearing can also be adopted.

In the twelfth embodiment, the cross roller bearing 14 is applied. However, the present invention is not limited to this. A four-point contact ball bearing, an angular ball bearing, a deep groove ball bearing, a cylindrical roller bearing, a tapered roller bearing, and the like can also be applied. In this case, it is desirable to adopt a roller bearing that can simultaneously receive moment load, axial load, and radial load. For example, the four-point contact ball bearing corresponds to such a roller bearing. When the four-point contact ball bearing is adopted, it is possible to set allowable rotating speed high and realize a reduction in thickness with a minimum component configuration.

In the thirteenth and fourteenth embodiment, the angular ball bearings 14 and 15 are applied. However, the present invention is not limited to this. A deep groove ball bearing, a cylindrical roller bearing, a tapered roller bearing, and the like may be applied.

The invention claimed is:

1. A roller bearing device having an intra-contact angle arrangement structure of a rotation sensor comprising:
    a roller bearing having an inner ring and an outer ring;
    an inner-ring supported member supported by the inner ring; and
    an outer-ring supported member supported by the outer ring,
    wherein the rotation sensor is arranged between the inner-ring supported member and the outer-ring supported member and outputs a sensor signal that changes according to relative positions thereof, and
    wherein, the roller bearing has two different contact angles, and
    wherein, the rotation sensor is arranged between a first straight line extending from a vertex of the contact angles in a direction of one of the contact angles and a second straight line extending from the vertex of the contact angles in a direction of the other contact angle and on either one side of the inner ring or the outer ring, and
    wherein, the rotation sensor comprises: a first resolver having a first resolver rotor and a first detecting means for detecting a reluctance change between the first detecting means and the first resolver rotor; and a second resolver having a second resolver rotor and a second detecting means for detecting a reluctance change between the second detecting means and the second resolver rotor; and
    wherein both of a gap between the first resolver rotor and the first detecting means and a gap between the second resolver rotor and the second detecting means are located within a range of bearing width of the roller bearing in an axial direction.

2. The roller bearing device according to claim 1, wherein the rotation sensor is arranged between the first straight line and the second straight line and on the side of the inner ring.

3. The roller bearing device according to claim 1, further comprising a driver that relatively rotates the inner-ring supported member and the outer-ring supported member, wherein the driver is arranged on the opposite side of the rotation sensor across the roller bearing.

4. The roller bearing device according to claim 1, wherein the roller bearing is a cross roller bearing or a four-point contact ball bearing.

5. The roller bearing device according to claim 1, wherein, the first resolver rotor is a first annular detected member, one of a first inner circumference and a first outer circumference of which is decentered with respect to the shaft center of the roller bearing, and wherein, the second resolver rotor is a second annular detected member, one of a second inner circumference and a second outer circumference of which is decentered with respect to the shaft center of the roller bearing, and wherein, the first resolver rotor is provided in one of the inner-ring supported member and the outer-ring supported member and the first detecting means is provided in the other such that a decentered one of the first inner circumference and the first outer circumference is opposed to the first detecting means, and wherein, the second resolver rotor is provided in one of the inner-ring supported member and the outer-ring supported member and the second detecting means is provided in the other such that a decentered one of the second inner circumference and the second outer circumference is opposed to the second detecting means.

6. The roller bearing device according to claim 1, wherein, the first resolver rotor and the second resolver rotor are arranged at a very small interval via an inter-rotor seat and attached to each other by two fixing means.

7. The roller bearing device according to claim 1, wherein, a wiring tube that pierces through from a radially inner side to a radially outer side of the inner-ring supported member and houses wires of the rotation sensor is formed in the inner-ring supported member, and wherein, height D of the wiring tube is set to a value obtained by D=2d+α when the diameter of one wire of the rotation sensor is represented as d and a predetermined margin is represented as α (0≤α≤d).

8. The roller bearing device according to claim 1, further comprising an inner ring clamp that fixes the inner ring to the inner-ring supported member in the axial direction, wherein, a bolt hole through which a bolt for fixing the inner ring clamp is inserted is formed in the inner ring clamp in the axial direction, and wherein, thickness ti between an outside edge of the inner ring clamp and an inner wall surface of the bolt hole is set to a value in a range of pi<ti<2pi when length for one pitch of the bolt hole is represented as pi.

9. The roller bearing device according to claim 1, further comprising an outer ring clamp that fixes the outer ring to the outer-ring supported member in the axial direction, wherein, a bolt hole through which a bolt for fixing the outer ring clamp is inserted is formed in the outer ring clamp in the axial direction, and wherein, thickness to between an inside edge of the outer ring clamp and an inner wall surface of the bolt hole is set to a value in a range of po<to <2po when length for one pitch of the bolt hole is represented as po.

10. The roller bearing device according to claim 1, further comprising an inner ring clamp that fixes the inner ring to the inner-ring supported member in the axial direction, wherein, the rotation sensor, the inner ring clamp, and the roller bearing are arranged in the recited order from the radially inner side on a radially identical plane, and wherein, height H of a pressing section of the inner ring clamp is set to a value obtained by H=1/2B when the height of the roller bearing is represented as B.

11. A thin motor comprising:

a roller bearing device having an intra-contact angle arrangement structure of a rotation sensor, the roller bearing device including:

a roller bearing having an inner ring and an outer ring;

an inner-ring supported member supported by the inner ring; and an outer-ring supported member supported by the outer ring, wherein, the rotation sensor is arranged between the inner-ring supported member and the outer-ring supported member and outputs a sensor signal that changes according to relative positions thereof, and wherein, the roller bearing has two different contact angles, and wherein, the rotation sensor is arranged between a first straight line extending from a vertex of the contact angles in a direction of one of the contact angles and a second straight line extending from the vertex of the contact angles in a direction of the other contact angle and on either one side of the inner ring or the outer ring, and wherein, the rotation sensor includes: a first resolver having a first resolver rotor having a first resolver rotor and a first detecting means for detecting a reluctance change between the first detecting means and the first resolver rotor; and a second resolver having a second resolver rotor and a second detecting means for detecting a reluctance change between the second detecting means and the second resolver rotor; and wherein both of a gap between the first resolver rotor and the first detecting means and a gap between the second resolver rotor and the second detecting means are located within a range of bearing width of the roller bearing in an axial direction.

* * * * *